(12) United States Patent
Schlangen

(10) Patent No.: US 12,728,934 B2
(45) Date of Patent: Sep. 8, 2026

(54) UTILITY VEHICLE

(71) Applicant: Polaris Industries Inc., Medina, MN (US)

(72) Inventor: Adam J. Schlangen, Rush City, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/244,468

(22) Filed: Sep. 11, 2023

(65) Prior Publication Data

US 2024/0100941 A1 Mar. 28, 2024

Related U.S. Application Data

(63) Continuation of application No. 18/211,019, filed on Jun. 16, 2023, which is a continuation of application (Continued)

(51) Int. Cl.

*B62D 33/06* (2006.01)
*B60G 3/20* (2006.01)

(Continued)

(52) U.S. Cl.

CPC ............... *B62D 33/06* (2013.01); *B60G 3/20* (2013.01); *B60G 7/001* (2013.01); *B60K 11/06* (2013.01);

(Continued)

(58) Field of Classification Search

CPC ................ B62D 33/06; B62D 33/0617; B62D 33/0625; B62D 23/005; B60R 21/11;

(Continued)

(56) References Cited

U.S. PATENT DOCUMENTS 1,523,636 A 1/1925 Dunn
1,581,931 A 4/1926 Arthur (Continued)

FOREIGN PATENT DOCUMENTS

AU 2013317853 A1 4/2015
AU 2014344796 A1 6/2016

(Continued)

OTHER PUBLICATIONS

Yamaha, Company Website, 2006 Rhino 450 Auto 4 .times. 4, .Copyrgt. 2005, 3 pages.

(Continued)

*Primary Examiner* — Laura Freedman
(74) *Attorney, Agent, or Firm* — SCHWEGMAN LUNDBERG & WOESSNER, P.A.

(57) ABSTRACT

A utility vehicle including a plurality of ground-engaging members, a drivetrain assembly operably coupled to the ground-engaging members, a frame assembly supported by the ground-engaging members and extending along a longitudinal axis of the vehicle, the frame assembly including a roll over protection assembly, and a seating section defining an operator area and supported by the frame assembly, the seating section including at least a first seat and a second seat in a side-by-side configuration. The roll-over protection assembly generally surrounds an upper portion of the seating section. The roll-over protection assembly includes a first cross tube, a second cross tube, at least one frame tube coupled to a central region of the second cross tube and extending rearwardly, and a plurality of frame tubes coupled to the second cross tube.

17 Claims, 85 Drawing Sheets

Related U.S. Application Data

No. 17/554,383, filed on Dec. 17, 2021, now Pat. No. 11,780,326, which is a continuation of application No. 16/687,161, filed on Nov. 18, 2019, now Pat. No. 11,235,814, which is a continuation of application No. 15/487,018, filed on Apr. 13, 2017, now Pat. No. 10,486,748, which is a continuation of application No. 14/430,074, filed as application No. PCT/US2013/061002 on Sep. 20, 2013, now Pat. No. 9,623,912.

(60) Provisional application No. 61/822,113, filed on May 10, 2013, provisional application No. 61/703,383, filed on Sep. 20, 2012.

(51) Int. Cl.

*B60G 7/00* (2006.01)
*B60K 11/06* (2006.01)
*B60K 15/063* (2006.01)
*B60K 17/34* (2006.01)
*B60N 2/01* (2006.01)
*B60N 2/38* (2006.01)
*B60R 11/00* (2006.01)
*B60R 21/00* (2006.01)
*B60R 21/13* (2006.01)
*B62D 23/00* (2006.01)
*B62D 25/08* (2006.01)
*B62D 25/20* (2006.01)
*B62D 33/02* (2006.01)
*B62D 33/027* (2006.01)

(52) U.S. Cl.

CPC ............ *B60K 15/063* (2013.01); *B60K 17/34* (2013.01); *B60N 2/012* (2013.01); *B60N 2/38* (2013.01); *B60R 21/13* (2013.01); *B60R 21/131* (2013.01); *B62D 23/005* (2013.01); *B62D 25/084* (2013.01); *B62D 25/20* (2013.01); *B62D 33/02* (2013.01); *B62D 33/0273* (2013.01); *B62D 33/0617* (2013.01); *B62D 33/0625* (2013.01); *B60G 2200/144* (2013.01); *B60G 2300/13* (2013.01); *B60K 2015/0635* (2013.01); *B60R 11/00* (2013.01); *B60R 2021/0074* (2013.01); *B60R 2021/134* (2013.01)

(58) Field of Classification Search

CPC .................. B60R 21/13; B60R 21/131; B60R 2021/0074; B60R 2021/0076; B60R 2021/0081; B60R 2021/137

See application file for complete search history.

(56) References Cited

U.S. PATENT DOCUMENTS 2,309,432 A 1/1943 Alden
2,672,103 A 3/1954 Hohmes
3,259,211 A 7/1966 Ryskamp
3,336,074 A 8/1967 Barnes et al.
3,422,918 A 1/1969 Musser et al.
3,600,768 A 8/1971 Romanzi et al.
3,727,712 A 4/1973 Colloton
3,814,201 A 6/1974 O Brien
3,833,253 A 9/1974 Butler
3,856,323 A 12/1974 Arning et al.
3,858,902 A 1/1975 Howells et al.
3,917,310 A 11/1975 Mitsuishi
4,027,892 A 6/1977 Parks
4,045,075 A 8/1977 Pulver
4,046,403 A 9/1977 Yoshida
4,089,542 A 5/1978 Westerman
4,098,414 A 7/1978 Abiera
4,340,124 A 7/1982 Leonard
4,457,525 A 7/1984 Tanaka et al.
4,533,172 A 8/1985 Oliver
4,561,323 A 12/1985 Stromberg
D286,760 S 11/1986 Ooba et al.
4,626,024 A 12/1986 Swann
4,627,512 A 12/1986 Clohessy
4,641,854 A 2/1987 Masuda et al.
4,650,210 A 3/1987 Hirose et al.
4,657,271 A 4/1987 Salmon
4,660,345 A 4/1987 Browning
4,679,450 A 7/1987 Hayakawa et al.
4,695,089 A 9/1987 Fukutomi et al.
4,700,982 A 10/1987 Kuraoka et al.
D300,011 S 2/1989 Oba et al.
4,817,985 A 4/1989 Enokimoto et al.
4,821,825 A 4/1989 Somerton-Rayner
4,934,737 A 6/1990 Nakatsuka
D312,989 S 12/1990 Murata et al.
5,036,939 A 8/1991 Johnson et al.
5,042,835 A 8/1991 Burns
5,057,062 A 10/1991 Yamasaki et al.
5,078,229 A 1/1992 Kikuchi et al.
5,086,858 A 2/1992 Mizuta et al.
5,094,313 A 3/1992 Mauws
5,107,951 A 4/1992 Kawamura
5,251,713 A 10/1993 Enokimoto
5,306,044 A 4/1994 Tucker
5,327,989 A 7/1994 Furuhashi et al.
5,393,194 A 2/1995 Smith
5,429,290 A 7/1995 Greene, Jr.
5,516,130 A 5/1996 Mitchell
5,573,300 A 11/1996 Simmons
5,704,866 A 1/1998 Pritchard et al.
5,738,471 A 4/1998 Zentner et al.
5,752,791 A 5/1998 Ehrlich
5,753,300 A 5/1998 Wessels et al.
5,779,272 A 7/1998 Panek et al.
5,816,650 A 10/1998 Lucas, Jr.
5,833,269 A 11/1998 Gastesi
5,842,732 A 12/1998 Daggett et al.
5,863,277 A 1/1999 Melbourne
5,895,063 A 4/1999 Hasshi et al.
5,950,750 A 9/1999 Dong et al.
5,954,364 A 9/1999 Nechushtan
5,971,434 A 10/1999 Neufeld et al.
6,029,750 A 2/2000 Carrier
6,070,689 A 6/2000 Tanaka et al.
6,092,877 A 7/2000 Rasidescu et al.
6,113,328 A 9/2000 Claucherty
6,126,227 A 10/2000 Bitelli
6,149,540 A 11/2000 Johnson et al.
6,161,853 A 12/2000 Jung
6,199,894 B1 3/2001 Anderson
6,202,777 B1 3/2001 Surridge
D442,119 S 5/2001 Murata et al.
6,293,588 B1 9/2001 Clune
6,293,605 B2 9/2001 Neubrand
6,293,610 B1 9/2001 Howard
6,295,713 B1 10/2001 Hilliard et al.
6,309,024 B1 10/2001 Busch
6,315,351 B1 * 11/2001 Mondragon Sarmiento ................ B62D 33/06 296/190.08
D453,912 S 2/2002 Hettich et al.
6,412,797 B1 7/2002 Park
6,416,108 B1 7/2002 Elswick
6,431,569 B2 8/2002 Handa
6,457,543 B1 10/2002 Wooldridge
6,467,787 B1 10/2002 Marsh
D467,200 S 12/2002 Luo et al.
6,557,922 B1 5/2003 Hommel
6,582,004 B1 6/2003 Hamm
6,622,968 B1 9/2003 St. Clair et al.
6,695,566 B2 2/2004 Rodriguez Navio
6,705,670 B2 3/2004 Forssell
6,725,962 B1 4/2004 Fukuda

(56) References Cited

U.S. PATENT DOCUMENTS 6,752,235 B1 6/2004 Bell et al.
6,767,022 B1 7/2004 Chevalier
6,786,526 B1 9/2004 Blalock
D497,324 S 10/2004 Chestnut et al.
6,799,779 B2 10/2004 Shibayama
6,799,781 B2 10/2004 Rasidescu et al.
6,827,371 B2 12/2004 Greil
D500,707 S 1/2005 Lu
6,837,324 B2 1/2005 Nagai et al.
D503,657 S 4/2005 Katoh
D503,658 S 4/2005 Lu
D504,638 S 5/2005 Tanaka et al.
6,908,108 B1 * 6/2005 Scarla .................. A63H 17/262 280/756
6,916,142 B2 7/2005 Hansen et al.
6,923,507 B1 8/2005 Billberg et al.
D511,317 S 11/2005 Tanaka et al.
6,978,857 B2 12/2005 Korenjak
7,014,241 B2 3/2006 Toyota et al.
7,055,454 B1 6/2006 Whiting et al.
7,124,853 B1 10/2006 Kole, Jr.
7,125,134 B1 10/2006 Hedlund et al.
7,128,178 B1 10/2006 Heinle et al.
7,165,702 B1 1/2007 Billberg
7,210,547 B2 5/2007 Nojima
7,222,882 B2 5/2007 Boucher
7,232,156 B2 6/2007 Rife et al.
7,237,789 B1 7/2007 Herman
7,239,032 B1 7/2007 Wilson et al.
7,240,472 B2 7/2007 Evers
7,240,960 B2 7/2007 Fallis et al.
7,281,753 B2 10/2007 Curtis et al.
D555,036 S 11/2007 Eck
7,331,896 B1 2/2008 Kroppe
7,380,805 B1 6/2008 Turner
7,387,181 B2 6/2008 Adoline et al.
D574,297 S 8/2008 Carl
D575,675 S 8/2008 Williams et al.
7,410,182 B1 8/2008 Giese et al.
D578,433 S 10/2008 Kawaguchi et al.
D578,934 S 10/2008 Tanaka et al.
7,431,024 B2 10/2008 Buchwitz et al.
7,451,844 B2 11/2008 Kunikata
7,475,748 B2 1/2009 Nakamura et al.
7,475,750 B2 1/2009 Tokuhara
7,485,984 B2 2/2009 Fulks et al.
7,500,709 B2 3/2009 Heselhaus
D592,998 S 5/2009 Woodard et al.
D595,613 S 7/2009 Lai et al.
7,559,403 B2 7/2009 Schmitz
7,559,596 B2 7/2009 Garska et al.
7,565,944 B2 7/2009 Sakamoto et al.
7,568,732 B2 8/2009 Schlup, Jr.
7,578,523 B2 8/2009 Kosuge et al.
7,610,132 B2 10/2009 Yanai et al.
D604,201 S 11/2009 Kawaguchi et al.
D605,555 S 12/2009 Tanaka et al.
D606,900 S 12/2009 Flores
7,625,048 B2 12/2009 Rouhana et al.
D607,377 S 1/2010 Shimomura et al.
7,665,792 B1 2/2010 Flynn
7,677,599 B2 3/2010 Kuerten et al.
7,677,634 B2 3/2010 Flynn
7,677,646 B2 3/2010 Nakamura
7,717,495 B2 5/2010 Leonard et al.
7,762,567 B2 7/2010 Marur
D621,423 S 8/2010 Nakanishi et al.
D622,631 S 8/2010 Lai et al.
7,782,000 B2 8/2010 Suzuki
7,795,602 B2 9/2010 Leonard et al.
D624,848 S 10/2010 Shimomura
D625,662 S 10/2010 Li
7,819,220 B2 10/2010 Sunsdahl et al.
7,841,624 B2 11/2010 Kobayashi et al.
7,845,452 B2 12/2010 Bennett et al.
D631,395 S 1/2011 Tandrup et al.
7,871,106 B2 1/2011 Leonard et al.
RE42,086 E 2/2011 Saito et al.
D633,006 S 2/2011 Sanschagrin et al.
7,896,422 B2 3/2011 Willard et al.
7,900,743 B2 3/2011 Kaku et al.
7,913,505 B2 3/2011 Nakamura
D636,295 S * 4/2011 Eck ................................. D12/1
D636,704 S 4/2011 Yoo et al.
7,922,201 B2 4/2011 Kuerten et al.
7,950,486 B2 5/2011 Van et al.
D640,598 S 6/2011 Zhang
7,967,365 B2 6/2011 Gerhardt et al.
D641,288 S 7/2011 Sun
7,971,904 B2 7/2011 David
D642,493 S 8/2011 Goebert et al.
8,029,021 B2 10/2011 Leonard et al.
8,037,959 B2 10/2011 Yamamura et al.
8,052,202 B2 11/2011 Nakamura
8,055,928 B2 11/2011 Bougaev et al.
8,056,928 B2 11/2011 Ijaz et al.
D649,909 S * 12/2011 Mullen .......................... D12/86
D652,348 S * 1/2012 King .............................. D12/14
8,100,434 B2 1/2012 Miura
8,104,524 B2 1/2012 Manesh et al.
8,118,125 B2 2/2012 Suzuki et al.
8,172,310 B2 * 5/2012 Gagnon .................... B60P 1/26 296/183.1
8,176,957 B2 5/2012 Manesh et al.
8,191,952 B2 6/2012 Mokhtari et al.
8,205,910 B2 6/2012 Leonard et al.
8,215,694 B2 7/2012 Smith et al.
8,240,748 B2 8/2012 Chapman
8,256,561 B2 9/2012 Mochizuki et al.
8,312,949 B2 11/2012 Hirukawa et al.
8,328,235 B2 12/2012 Schneider et al.
8,353,534 B2 1/2013 Arnold et al.
8,371,408 B2 2/2013 Kawashiri et al.
8,382,130 B2 2/2013 Nakamura
8,403,404 B2 3/2013 Kihara et al.
8,414,082 B2 4/2013 Nakamura
8,453,775 B2 6/2013 Belzile et al.
8,454,041 B2 6/2013 Fujii et al.
8,464,824 B1 6/2013 Reisenberger
8,465,050 B1 6/2013 Spindler et al.
8,479,854 B1 7/2013 Gagnon
8,517,135 B2 8/2013 Schapf et al.
8,544,582 B2 10/2013 Kaku et al.
8,548,710 B1 10/2013 Reisenberger
8,596,405 B2 12/2013 Sunsdahl et al.
8,596,709 B2 12/2013 Ugolini
8,613,335 B2 12/2013 Deckard et al.
8,640,814 B2 2/2014 Deckard et al.
D703,102 S 4/2014 Eck et al.
8,690,177 B2 4/2014 Buchwitz et al.
8,746,719 B2 6/2014 Safranski et al.
8,781,705 B1 7/2014 Reisenberger
8,827,025 B2 9/2014 Hapka
8,827,028 B2 9/2014 Sunsdahl et al.
8,944,465 B2 2/2015 Shinbori
8,967,666 B2 3/2015 Iardella et al.
8,973,693 B2 3/2015 Kinsman et al.
8,979,124 B2 3/2015 Shinbori et al.
8,994,494 B2 3/2015 Koenig et al.
8,997,908 B2 4/2015 Kinsman et al.
9,045,163 B2 6/2015 Theodore
9,150,182 B1 10/2015 Schlangen et al.
9,152,607 B2 10/2015 Wetterlund et al.
9,174,686 B1 * 11/2015 Messina ............... B62D 23/005
9,221,496 B2 12/2015 Barr et al.
9,283,992 B2 3/2016 Deschamps
9,393,894 B2 7/2016 Steinmetz et al.
9,440,671 B2 9/2016 Schlangen et al.
9,457,756 B2 * 10/2016 Hirooka ................. B60N 2/305
9,566,858 B2 2/2017 Hicke et al.
9,592,782 B2 3/2017 Raska et al.
9,623,912 B2 4/2017 Schlangen
9,650,078 B2 5/2017 Kinsman et al.
9,771,112 B2 * 9/2017 Spindler .............. B62D 23/005

(56) References Cited

U.S. PATENT DOCUMENTS 9,776,481 B2 10/2017 Deckard et al.
9,895,946 B2 2/2018 Schlangen et al.
9,932,073 B2 4/2018 Dube et al.
9,981,519 B2 5/2018 Despres-Nadeau et al.
9,988,083 B1 6/2018 Smith
10,029,736 B1 * 7/2018 Arora .................... B62D 25/06
10,160,497 B2 12/2018 Wimpfheimer et al.
10,207,554 B2 2/2019 Schroeder et al.
10,214,100 B2 2/2019 Ajisaka
10,232,882 B2 3/2019 Bertezzolo
10,239,571 B2 3/2019 Kennedy et al.
10,246,153 B2 4/2019 Deckard et al.
10,328,939 B2 * 6/2019 Hall ....................... B60T 8/172
10,399,401 B2 9/2019 Schlangen et al.
10,464,386 B2 11/2019 Hisada et al.
10,486,748 B2 11/2019 Deckard et al.
10,668,780 B2 6/2020 Despres-Nadeau et al.
10,737,737 B2 8/2020 Birnschein et al.
10,800,224 B2 10/2020 Sellars et al.
10,800,470 B2 10/2020 Barkey et al.
10,850,582 B2 12/2020 Despres-Nadeau et al.
10,967,694 B2 4/2021 Brady et al.
10,981,448 B2 4/2021 Safranski et al.
11,014,420 B2 5/2021 Sawai et al.
11,104,194 B2 8/2021 Schlangen et al.
11,235,814 B2 * 2/2022 Schlangen ......... B62D 33/0625
11,370,262 B2 6/2022 Weiss
11,607,920 B2 3/2023 Schlangen et al.
11,780,326 B2 10/2023 Schlangen et al.
11,787,251 B2 10/2023 Schlangen et al.
11,787,279 B2 * 10/2023 Ward ....................... B60K 5/04
180/311
11,926,190 B2 * 3/2024 Schlangen ............ B60K 11/04
11,945,388 B2 * 4/2024 Gordon ................ B62D 23/005
11,951,794 B2 4/2024 Schlangen
2001/0031185 A1 10/2001 Swensen
2002/0011374 A1 1/2002 Brister
2002/0107101 A1 8/2002 Bowen et al.
2002/0135175 A1 9/2002 Schroth
2002/0147072 A1 10/2002 Goodell et al.
2002/0178968 A1 12/2002 Christensen
2003/0001409 A1 1/2003 Semple et al.
2003/0089166 A1 5/2003 Mizuno et al.
2003/0168887 A1 9/2003 Stoffels et al.
2003/0211913 A1 11/2003 Spitale
2003/0233732 A1 12/2003 Kohlstrand et al.
2004/0026948 A1 2/2004 Novajovsky
2004/0079561 A1 4/2004 Ozawa et al.
2004/0108159 A1 6/2004 Rondeau et al.
2004/0124028 A1 7/2004 Lachapelle et al.
2004/0195797 A1 10/2004 Nash et al.
2004/0242090 A1 12/2004 Gibbs
2005/0006048 A1 1/2005 Vuk
2005/0040000 A1 2/2005 Kelley et al.
2005/0073140 A1 4/2005 Boucher
2005/0073177 A1 4/2005 Bendel et al.
2005/0073187 A1 4/2005 Frank et al.
2005/0077098 A1 4/2005 Takayanagi et al.
2005/0116505 A1 6/2005 Carcioffi
2005/0173177 A1 8/2005 Smith et al.
2005/0173180 A1 8/2005 Hypes et al.
2005/0173940 A1 8/2005 Smith et al.
2005/0248116 A1 11/2005 Fanson
2005/0257989 A1 11/2005 Iwami et al.
2005/0279330 A1 12/2005 Okazaki et al.
2006/0006696 A1 1/2006 Umemoto et al.
2006/0043754 A1 3/2006 Smith
2006/0169514 A1 8/2006 Lim et al.
2006/0214415 A1 9/2006 Rife et al.
2006/0219462 A1 10/2006 Martin et al.
2006/0261570 A1 11/2006 Eshelman et al.
2006/0273566 A1 12/2006 Hepner et al.
2007/0214818 A1 9/2007 Nakamura
2007/0225105 A1 9/2007 Bowen
2007/0290493 A1 12/2007 David
2008/0023240 A1 1/2008 Sunsdahl et al.
2008/0023249 A1 1/2008 Sunsdahl et al.
2008/0042390 A1 2/2008 Geslin et al.
2008/0084091 A1 4/2008 Nakamura et al.
2008/0093883 A1 4/2008 Shibata et al.
2008/0150249 A1 6/2008 Murata
2008/0256738 A1 10/2008 Malone
2008/0265556 A1 10/2008 Kobayashi et al.
2008/0283326 A1 11/2008 Bennett et al.
2008/0284124 A1 11/2008 Brady et al.
2009/0025997 A1 1/2009 Ishii et al.
2009/0184531 A1 7/2009 Yamamura et al.
2009/0301830 A1 12/2009 Kinsman et al.
2009/0302590 A1 12/2009 Van et al.
2009/0308682 A1 12/2009 Ripley et al.
2010/0012412 A1 1/2010 Deckard et al.
2010/0019538 A1 1/2010 Kiley et al.
2010/0019539 A1 * 1/2010 Nakamura ............. B62D 33/08
296/190.04
2010/0060026 A1 3/2010 Bowers
2010/0090430 A1 4/2010 Weston
2010/0090797 A1 4/2010 Koenig et al.
2010/0194086 A1 8/2010 Yamamura et al.
2010/0194087 A1 8/2010 Yamamura et al.
2010/0314184 A1 12/2010 Stenberg et al.
2010/0314191 A1 12/2010 Deckard et al.
2011/0062748 A1 3/2011 Kaita et al.
2011/0139529 A1 6/2011 Eichenberger et al.
2011/0155087 A1 6/2011 Wenger et al.
2011/0156433 A1 6/2011 Horiuchi et al.
2011/0240395 A1 10/2011 Hurd et al.
2011/0297462 A1 12/2011 Grajkowski et al.
2011/0298189 A1 12/2011 Schneider et al.
2012/0031688 A1 2/2012 Safranski et al.
2012/0031693 A1 2/2012 Deckard et al.
2012/0137059 A1 5/2012 Yang
2012/0161468 A1 6/2012 Tsumiyama et al.
2012/0161477 A1 6/2012 Furman et al.
2012/0193163 A1 8/2012 Wimpfheimer et al.
2012/0223500 A1 9/2012 Kinsman et al.
2013/0033070 A1 2/2013 Kinsman et al.
2013/0048409 A1 2/2013 Fujii
2013/0199097 A1 8/2013 Spindler et al.
2013/0240272 A1 9/2013 Gass et al.
2013/0256050 A1 10/2013 Novotny et al.
2013/0277937 A1 10/2013 Keller et al.
2013/0319785 A1 12/2013 Spindler et al.
2014/0124279 A1 5/2014 Schlangen et al.
2014/0210234 A1 7/2014 Ricketts et al.
2014/0262583 A1 9/2014 Url
2014/0353956 A1 12/2014 Bjerketvedt et al.
2015/0014974 A1 1/2015 Cotnoir et al.
2015/0165886 A1 6/2015 Bennett et al.
2015/0175114 A1 6/2015 Schroeder et al.
2015/0197128 A1 7/2015 Miller et al.
2015/0210319 A1 7/2015 Tiramani
2015/0343900 A1 12/2015 Schlangen
2016/0032625 A1 2/2016 Suzuki
2016/0207418 A1 7/2016 Bergstrom et al.
2016/0257360 A1 9/2016 MacKenzie et al.
2016/0347350 A1 12/2016 Heon et al.
2017/0028802 A1 2/2017 Schlangen
2017/0137059 A1 5/2017 Ohba et al.
2017/0274935 A1 9/2017 Deckard et al.
2018/0154717 A1 6/2018 Neu et al.
2018/0170134 A1 6/2018 Schlangen et al.
2018/0281861 A1 10/2018 Gordon
2019/0118883 A1 4/2019 Spindler et al.
2019/0118884 A1 4/2019 Spindler et al.
2020/0001673 A1 1/2020 Schlangen et al.
2020/0122776 A1 4/2020 Schlangen et al.
2020/0331533 A1 10/2020 Jin
2021/0061036 A1 3/2021 Despres-Nadeau et al.
2021/0078639 A1 3/2021 Gordon
2022/0032701 A1 2/2022 Schlangen et al.
2022/0126638 A1 4/2022 Schlangen et al.
2022/0169114 A1 6/2022 Harris et al.
2022/0169315 A1 6/2022 Schlangen et al.
2022/0281274 A1 9/2022 Schlangen et al.

(56) References Cited

U.S. PATENT DOCUMENTS

| | | | |
|---|---|---|---|
| 2022/0281275 | A1 | 9/2022 | Schlangen et al. |
| 2024/0116357 | A1 | 4/2024 | Schlangen et al. |
| 2024/0227941 | A1 | 7/2024 | Rasa |

FOREIGN PATENT DOCUMENTS

| | | | |
|---|---|---|---|
| AU | 2015266694 | A1 | 1/2017 |
| AU | 2017204255 | A1 | 7/2017 |
| CA | 2265693 | A1 | 3/1998 |
| CH | 317335 | A | 11/1956 |
| CN | 1724283 | A | 1/2006 |
| CN | 101115635 | A | 1/2008 |
| CN | 101177110 | A | 5/2008 |
| CN | 201597405 | U | 10/2010 |
| CN | 101903205 | A | 12/2010 |
| CN | 201679362 | U | 12/2010 |
| CN | 101952164 | A | 1/2011 |
| CN | 103249578 | A | 8/2013 |
| CN | 105377672 | A | 3/2016 |
| CN | 105730221 | A | 7/2016 |
| DE | 0037435 | | 10/1886 |
| DE | 0116605 | | 2/1900 |
| DE | 0351667 | C | 4/1922 |
| DE | 1755101 | | 4/1971 |
| DE | 3033707 | | 4/1982 |
| DE | 3516671 | A1 | 11/1986 |
| DE | 4122690 | A1 | 1/1992 |
| DE | 102009038853 | A1 | 3/2011 |
| DE | 102010017784 | A1 | 1/2012 |
| EP | 0238077 | A2 | 9/1987 |
| EP | 0709247 | A2 | 5/1996 |
| EP | 0794096 | A2 | 9/1997 |
| EP | 0952024 | A3 | 11/2001 |
| EP | 1215107 | A1 | 6/2002 |
| EP | 1318938 | A2 | 6/2003 |
| EP | 1493624 | A1 | 1/2005 |
| EP | 1557345 | A2 | 7/2005 |
| EP | 1564123 | A2 | 8/2005 |
| EP | 1627762 | A2 | 2/2006 |
| EP | 1985488 | A1 | 10/2008 |
| EP | 2057060 | A2 | 5/2009 |
| EP | 2581240 | B1 | 6/2017 |
| EP | 3328717 | A1 | 6/2018 |
| EP | 3536583 | A1 | 9/2019 |
| FR | 2772333 | A1 | 6/1999 |
| FR | 2914597 | A1 | 10/2008 |
| GB | 2036659 | A | 7/1980 |
| GB | 2417226 | A | 2/2006 |
| JP | 57-205277 | A | 12/1982 |
| JP | 62-218209 | A | 9/1987 |
| JP | 63-025977 | | 5/1988 |
| JP | 07-040783 | A | 2/1995 |
| JP | 11-334447 | A | 12/1999 |
| JP | 2000-177434 | A | 6/2000 |
| JP | 2001-130304 | A | 5/2001 |
| JP | 3385382 | B2 | 3/2003 |
| JP | 2003-237530 | A | 8/2003 |
| JP | 2007-038709 | A | 2/2007 |
| JP | 2010-083192 | A | 4/2010 |
| JP | 2010-095106 | A | 4/2010 |
| JP | 2015-517430 | A | 6/2015 |
| JP | 2018-523603 | A | 8/2018 |
| WO | 97/41010 | A1 | 11/1997 |
| WO | 97/46407 | A1 | 12/1997 |
| WO | 98/12095 | A2 | 3/1998 |
| WO | 02/22427 | A2 | 3/2002 |
| WO | 2008/016377 | A2 | 2/2008 |
| WO | 2011/152817 | A1 | 12/2011 |
| WO | 2012/018896 | A2 | 2/2012 |
| WO | 2012/109546 | A1 | 8/2012 |
| WO | 2013/166310 | A1 | 11/2013 |
| WO | 2014/047488 | A1 | 3/2014 |
| WO | 2014/059258 | A1 | 4/2014 |
| WO | 2015/071904 | A1 | 5/2015 |
| WO | 2015/184354 | A1 | 12/2015 |
| WO | 2017/023726 | A1 | 2/2017 |

OTHER PUBLICATIONS

Yamaha, company website, 2006 Rhino 660 Auto 4.times.4 Special Edition, Copyright 2006, 4 pgs.

Yamaha, Company Website, Rhino 660 Auto 4×4 Exploring Edition Specifications, (Copyrights) 2006; 3 pages.

American Sport Works, Zircon, http://www.amsportworks.com/pdf/gokarts-minibikes/zircon-hangtag.pdf, Apr. 9, 2013; 2 pages.

Artic Cat, Company Website, Prowler XT650 H1, undated; 9 pages.

Brochure, Fully Equipped LTATV Sales, accessed Jul. 15, 2014, copyright 2010-2011; available at http://chrishainesoffroad.com/vheciles.pdf, last accessed Jul. 15, 2014, copyright 2010-2011; 2 pages.

Brochure, Strike Razer, Advanced Mobile Systems for Rapid Response; 5 pages.

BRP Can-Am Commander photo, undated; 1 page.

Buyer's Guide Supplement, 2006 Kart Guide, Powersports Business Magazine; 6 pages.

Club Car, Company Website, product pages for XRT 1500 SE, undated; 2 pages.

Examination Report issued by the Intellectual Property of India, dated Aug. 20, 2019, for Indian Patent Application No. 2145/DELNP/2015; 6 pages.

Examination Report No. 1 issued by the Australian Government IP Australia, dated Nov. 19, 2018, for Australian Patent Application No. 2016303426; 3 pages.

Extended Search Report issued by the European Patent Office, dated Apr. 24, 2020, for European Patent Application No. 20153935.0; 8 pages.

Honda Hippo 1800 New Competition for Yamaha's Rhino, Dirt Wheels Magazine, Apr. 2006, pp. 91-92.

International Preliminary Report on Patentability issued by the European Patent Office, dated Apr. 14, 2015 for International Patent Application No. PCT/US2013/064516; 18 pages.

International Preliminary Report on Patentability issued by the European Patent Office, dated Mar. 8, 2013, for International PCT Application No. PCT/US2012/024664; 24 pages.

International Preliminary Report on Patentability issued by the European Patent Office, dated Sep. 8, 2016, for International Application No. PCT/US2015/033327; 13 pages.

International Preliminary Report on Patentability received for PCT Patent Application No. PCT/US13/61002, mailed on Apr. 2, 2015, 9 pages.

International Preliminary Report on Patentability received for PCT Patent Application No. PCT/US2016/044630, mailed on Feb. 15, 2018, 7 pages.

International Preliminary Report on Patentablility issued by the European Patent Office, dated Nov. 4, 2014, for International PCT Application No. PCT/US2013/039304; 7 pages.

International Search Report and Written Opinion issued by the European Patent Office, dated Jan. 14, 2014, for International Application No. PCT/US2013/064516; 24 pages.

International Search Report and Written Opinion issued by the European Patent Office, dated Aug. 27, 2008, for related International Patent Application No. PCT/US2008/003485; 15 pages.

International Search Report and Written Opinion issued by the European Patent Office, dated Jul. 23, 2013, for International PCT Application No. PCT/US2013/039304; 11 pages.

International Search Report and Written Opinion issued by the European Patent Office, dated Jun. 28, 2012, for International PCT Application No. PCT/US2012/024664; 19 pages.

International Search Report and Written Opinion issued by the European Patent Office, dated Oct. 2, 2008, for related International Patent Application No. PCT/US2008/003483; 18 pages.

International Search Report and Written Opinion of the International Searching Authority, issued by the European Patent Office, dated Jan. 3, 2014, for International Application No. PCT/US2013/061002; 14 pages.

(56) References Cited

OTHER PUBLICATIONS

International Search Report and Written Opinion received for PCT Patent Application No. PCT/US2016/044630, Oct. 5, 2016, 8 pages.
International Search Report and Written Opinion, issued by the European Patent Office, dated Aug. 6, 2015, for International Patent Application No. PCT/US2015/033327; 8 pages.
Kawasaki Mule the Off-Road Capable 610 4 .times. 4 XC Brochure 2011, .Copyrgt. 2010, 6 pages.
Kawasaki Mule Utility Vehicle Brochure 2009, .Copyrgt. 2008; 10 pages.
Kawasaki Teryx 750 F1 4×4 Sport Brochure 2011, (Copyrights) 2010; 6 pages.
Kawasaki Teryx Recreation Utility Vehicle Brochure 2009, (Copyrights) 2008; 8 pages.
Office Action dated Apr. 7, 2016 issued by the Australian Patent Office in Australian Patent Application No. 2013329090; 3 pages.
Office Action issued by the Canadian Intellectual Property Office, dated Apr. 29, 2021, for Canadian Patent Application to. 2,946,343; 4 pages.
Office Action issued by the European Patent Office, dated Dec. 14, 2016, for European Patent Application No. 13784068.2; 4 pages.
Office Action issued by the European Patent Office, dated Jun. 9, 2017, for European Patent Application No. 13784068.2; 5 pages.
Office Action issued by the Japanese Patent Office, dated Feb. 13, 2019, for Japanese Patent Application No. 2018-500917; 5 pages.
Owner's Manual. Trail Master—300XRX Dune Buggy. Jul. 29, 2011 [online], [retrieved on May 23, 2013], Retrieved from the Internet <URL: http://gokartsusa.com/pdf/TrailMaster-300-XRX-Owners-Manual.pdf>.
Patent Examination Report No. 1 issued by IP Australia, dated Jun. 28, 2018, for Australian Patent Application No. 2017204255; 3 pages.
Patent Examination Report No. 1 issued by the Australian Government IP Australia, dated Jul. 24, 2017, for Australian Patent Application No. 2015266694; 4 pages.
Patent Examination Report No. 1 issued by the Australian Government IP Australia, dated Mar. 18, 2016; 5 pages.
Patent Examination Report No. 1 issued by the Australian Government IP Australia, dated Sep. 29, 2016; for Australian Patent Application No. 2013317853; 5 pages.
Polaris Ranger Brochure 2009, .Copyrgt. 2008, 32 pages.
Polaris Ranger Brochure 2011, (Copyright) 2010, 22 pages.
Polaris Ranger Brochure ATVs and Side .times. Sides Brochure 2010, .Copyrgt. 2009, 26 pages.
Polaris Ranger Off-Road Utility Vehicles Brochure 2004, .Copyrgt. 2003; 20 pages.
Polaris Ranger RZR Brochure 2011, .Copyrgt. 2010; 16 pages.
Polaris Ranger Welcome to Ranger Country Brochure 2006, .Copyrgt. 2005, 24 pages.
Polaris Ranger Work/Play Only Brochure 2008, .Copyrgt. 2007, 28 pages.
Ray Sedorchuk, New for 2004, Yamaha Rhino 660 4×4, ATV Connection Magazine, (Copyrights) 2006; 3 pages.
Strike Razor: Light Tactical Vehicle, Advanced Mobile Systems, copyright 2011, 2 pages.
Webpage, RP Advanced Mobile Systems: Military SxS Tactical Defense Vehicles, available at http://web.archive.org/web/20120324210549/http://www.rpadvancedmobilesyst- ems.com/, available as early as Mar. 24, 2012, last accessed Jul. 15, 2014; 4 pages.
Written Opinion issued by the European Patent Office, dated Sep. 1, 2008, for related International Patent Application No. PCT/US2008/003480; 12 pages.
U.S. Appl. No. 18/211,019 filed Jun. 16, 2023
U.S. Appl. No. 17/554,383, filed Dec. 17, 2021.
U.S. Appl. No. 16/687,161, filed Nov. 18, 2019.
U.S. Appl. No. 15/487,018, filed Apr. 13, 2017.
U.S. Appl. No. 14/430,074, filed Mar. 20, 2015.
"U.S. Appl. No. 18/211,019, Non Final Office Action mailed Mar. 4, 2025", 10 pgs.
"U.S. Appl. No. 18/211,019, Notice of Allowance mailed Jun. 27, 2025", 8 pgs.
"U.S. Appl. No. 18/211,019, Preliminary Amendment filed Jun. 16, 2023",7 pgs.
"U.S. Appl. No. 18/211,019, Response filed May 23, 2025 to Non Final Office Action mailed Mar. 4, 2025", 9 pgs.
"750 FI 4×4 Sport Brochure 2011", Kawasaki Teryx, 2010, 6 pages.
"Recreation Utility Vehicle Brochure 2009", Kawasaki Teryx, 2008, 8 pgs.
"2006 Rhino 660 Auto 4×4", Yamaha, Company Website, 2006, 4 pgs.
"Patent Examination Report No. 1 issued by the Australian Goverment IP Australian", Mar. 18, 2016, 5 pgs.
"Patent Examination Report No. 1 issued by the Australian Goverment IP Australia", Sep. 29, 2016, 5 pgs.
Kawasaki, Utility Vehicle Brochure 2009, 10 pages.
"U.S. Appl. No. 18/211,019, Notice of Allowance mailed Apr. 15, 2026", 6 pages.
"U.S. Appl. No. 18/596,249, Non Final Office Action mailed Apr. 30, 2026", 10 pages.
"U.S. Appl. No. 18/211,019, Corrected Notice of Allowability mailed Jul. 22, 2026", 2 pgs.
"Austrailian Application No. 2025203943, First Examination Report mailed Jun. 1, 2026".

* cited by examiner 50
24
10
10

50
22
6
6

20
270a
270
270a
50

406
402
410
408
410a
374
406a
404
408a
430a
430
422
440
440a
370
380
420
376
378

424
442
432
372
432a
386a
392
392a
442a
390a
386
382
390
388
388a
384

460
464
12
490
462
464
468
462
86
89
88
88

1500
12
1502
1504

1556
1559
1560
1557
1553
1558
1550
1584
1552
1562
1561
1566
1564
1561
1563
1555
1563
1565
1554

1568
1567
1569

1536
1530'
1546
1534
1546a
1547
1546b
1546b
1549
1548

1200
1580
1582
1580
1430
1530
1410
1444
1404
1582
1432
1440

UTILITY VEHICLE

CROSS-REFERENCE TO RELATED APPLICATIONS

The present application is a continuation of U.S. patent application Ser. No. 18/211,019, filed Jun. 16, 2023, which is a continuation of U.S. patent application Ser. No. 17/554,383, filed Dec. 17, 2021, which is a continuation of U.S. patent application Ser. No. 16/687,161, filed Nov. 18, 2019, which is a continuation of U.S. patent application Ser. No. 15/487,018, filed Apr. 13, 2017, which is a continuation of U.S. patent application Ser. No. 14/430,074, filed Mar. 20, 2015, entitled "UTILITY VEHICLE," which is a national stage application under 35 U.S.C. § 371 of International Patent Application No. PCT/US13/61002, filed on Sep. 20, 2013, and entitled "VEHICLE," which claims priority to U.S. Patent Application Ser. No. 61/703,383, filed Sep. 20, 2012, entitled "VEHICLE" and U.S. Patent Application Ser. No. 61/822,113, filed May 10, 2013, entitled "VEHICLE," the complete disclosures of which are expressly incorporated by reference herein.

BACKGROUND OF THE DISCLOSURE

The present invention relates generally to a vehicle configured to support one or more passengers and a cargo load and, more particularly, to a utility vehicle with features and systems configured for military operations and applications.

Vehicles such as utility vehicles, all-terrain vehicles, tractors, and other similar vehicles are known. Such vehicles may include forward and rear storage compartments, such as trunks. The vehicles also may be configured to couple with sub-assemblies having axles, such as trailers.

Utility vehicles are also configured to support at least an operator. Some utility vehicles may support one or more passengers. The passengers may share a bench seat, or the vehicle may be individual seats in a side-by-side configuration.

SUMMARY OF THE DISCLOSURE

In one embodiment, a utility vehicle includes a plurality of ground-engaging members configured to contact a ground surface, and a drivetrain assembly operably coupled to the ground-engaging members. The utility vehicle also includes a frame supported by the ground-engaging members and extending along a longitudinal axis of the utility vehicle. The utility vehicle further includes a tunnel member coupled to the frame and extending along the longitudinal axis. The tunnel member is positioned at a first height from the ground surface. Additionally, the utility vehicle includes a cargo portion supported by the frame and positioned generally rearward of the tunnel member. The cargo portion has a cargo surface substantially aligned with the tunnel member and positioned at a second height from the ground surface. The first height is approximately equal to the second height.

In another embodiment, a utility vehicle includes a plurality of ground-engaging members, and a frame assembly supported by the ground-engaging members and extending along a longitudinal axis of the utility vehicle. The utility vehicle also includes a seating section supported by the frame assembly and including a plurality of seats in a side-by-side configuration. The utility vehicle further includes a drivetrain assembly supported by the frame assembly, and a fuel tank operably coupled to the drivetrain assembly and positioned intermediate the seats.

Another embodiment includes a utility vehicle having a plurality of ground-engaging members configured to contact a ground surface, and a drivetrain assembly operably coupled to the ground-engaging members. The utility vehicle further includes a frame assembly comprised of a plurality of frame members defining a front portion and a rear portion. At least one of the frame members of the front portion is substantially comprised of a high-strength material. Additionally, the utility vehicle includes at least one accessory mount integrally coupled to the front portion of the frame assembly and configured to increase the vertical strength of the frame assembly.

A further embodiment includes a utility vehicle having a plurality of ground-engaging members, and a drivetrain assembly operably coupled to the ground-engaging members. The utility vehicle also includes a frame assembly extending along a longitudinal axis of the utility vehicle and including a front end and a rear end. The frame assembly includes a plurality of longitudinally-extending frame members extending generally parallel to the longitudinal axis and between the front and rear ends of the frame assembly. The longitudinally-extending frame members are configured with at least one accessory bracket, which is configured to support an accessory positioned laterally outward of the utility vehicle and generally perpendicular to the longitudinal axis.

Another embodiment includes a utility vehicle having a plurality of ground-engaging members, and a drivetrain assembly operably coupled to the ground-engaging members. The utility vehicle further includes a frame assembly supported by the ground-engaging members and including at least one central frame member. The utility vehicle also includes a seating section within an operator area and supported by the frame assembly. The seating section includes at least a first seat and a second seat in a side-by-side configuration. The first and second seat are laterally outward of the at least one central frame member of the frame assembly. Additionally, the utility vehicle includes a roll cage assembly coupled to the frame assembly and generally surrounding the seating section. The roll cage assembly includes a plurality of roll cage members, and at least one of the roll cage members extends downwardly and inwardly to couple with the at least one central frame member of the frame assembly. The at least one roll cage member is configured to increase space in the operator area.

In one embodiment, a utility vehicle has a main frame; a plurality of ground engaging members adapted to support the main frame above the ground. The ground engaging members comprise front and rear ground engaging members. A first seating area is supported by the main frame. An engine is supported by the main frame, forward of the first seating area. A front suspension is also provided. The front suspension comprises a lower control arm coupled to the frame at first and second coupling points; an upper control arm coupled to the frame at third and fourth coupling points; and a shock absorber coupled to the frame at an upper end thereof and to the lower control arm, the shock being positioned between the second and fourth coupling points.

In another embodiment, a utility vehicle has a main frame; a plurality of ground engaging members adapted to support the main frame above the ground. The ground engaging members comprise front and rear ground engaging members. A first seating area is supported by the main frame. An engine is supported by the main frame, forward of the first seating area. A rear suspension is also provided. The rear suspension comprises rear trailing arms coupled to the frame at a front end thereof and to the axle at a rear end thereof;

rear alignment arms are coupled to the frame at a front end thereof and to the axle at a rear end thereof and a shock absorber is coupled to the frame at an upper end thereof and to the rear trailing arm at a lower end thereof.

Another embodiment includes a utility vehicle comprising a frame having a front section, a midsection, and a rear section. The frame defines a cab rearward of the front section. The utility vehicle further comprises a plurality of ground engaging members operably coupled to the frame and configured for use on a ground surface; and a plurality of body panels. The body panels include a hood, a first side panel, and a second side panel coupled to the front section of the frame. The utility vehicle further comprises an engine supported by the frame and operably coupled to the ground engaging members; and a cooling assembly fluidly coupled to the engine and supported by the front section of the frame. The cooling assembly is angled relative to the longitudinal direction and is spaced apart from a line of sight extending from the cab.

A further embodiment includes a utility vehicle comprising a frame extending along a centerline of the utility vehicle and having a front section, a midsection, and a rear section. The frame defines a cab rearward of the front section. The utility vehicle further comprises a plurality of ground engaging members operably coupled to the frame. Additionally, the utility vehicle comprises an engine supported by the frame along the centerline of the utility vehicle; a drive shaft spaced apart from the engine; a transfer case operably coupled to the drive shaft and supported by the front section of the frame; and a front final drive operably coupled to the transfer case and supported by the frame. The final drive is positioned along the centerline of the utility vehicle.

Another embodiment includes a utility vehicle comprising a frame extending along a centerline of the utility vehicle; a plurality of ground engaging members operably coupled to the frame; and a drivetrain assembly supported by the frame. The drivetrain assembly includes an engine supported by the frame; and a drive shaft off-center from the centerline of the utility vehicle. The drive shaft has an input end operably coupled to the engine and an output end. The drivetrain assembly further includes a final drive positioned along the centerline of the utility vehicle. The final drive has an input end operably coupled to the drive shaft and an output end operably coupled to the ground engaging members. Additionally, the drivetrain assembly includes a transfer case positioned intermediate the drive shaft and the final drive. The transfer case is perpendicular to the output end of the drive shaft and is perpendicular to the input end of the final drive.

A further embodiment includes a utility vehicle comprising a frame extending along a centerline of the utility vehicle; a plurality of ground engaging members operably coupled to the frame; a drivetrain assembly supported by the frame; and a suspension assembly operably coupled to the ground engaging members. The suspension assembly includes upper control arms, lower control arms, and shock absorbers. The utility vehicle further comprises a steering assembly configured to move the ground engaging members. A portion of the steering assembly is positioned between the upper control arms and is elevated relative to the lower control arms.

A utility vehicle, comprising a frame extending along a centerline of the utility vehicle; a plurality of ground engaging members operably coupled to the frame; a drivetrain assembly supported by the frame; a rear cargo bed supported by the frame; a rear tailgate pivotally mounted to the cargo bed, the cargo bed having at least one first and second bracket; and a locking lever, pivotally supported by frame, the locking lever is movable from a first locked position in engagement with the first bracket, to a second locked position with the second bracket.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, snowmobiles, and golf carts.

Figure 1:
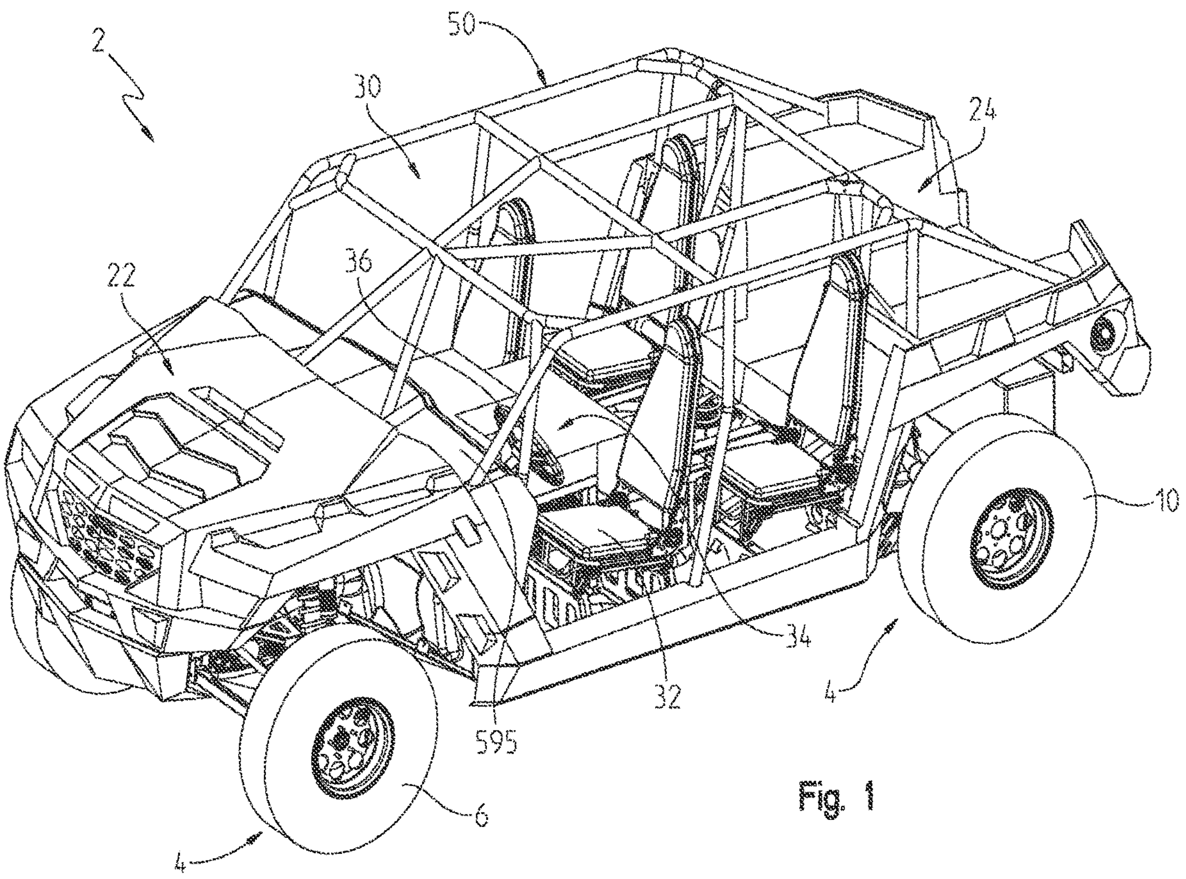
FIG. 1 is a front left perspective view of a vehicle according to the present disclosure.
Figure 6:
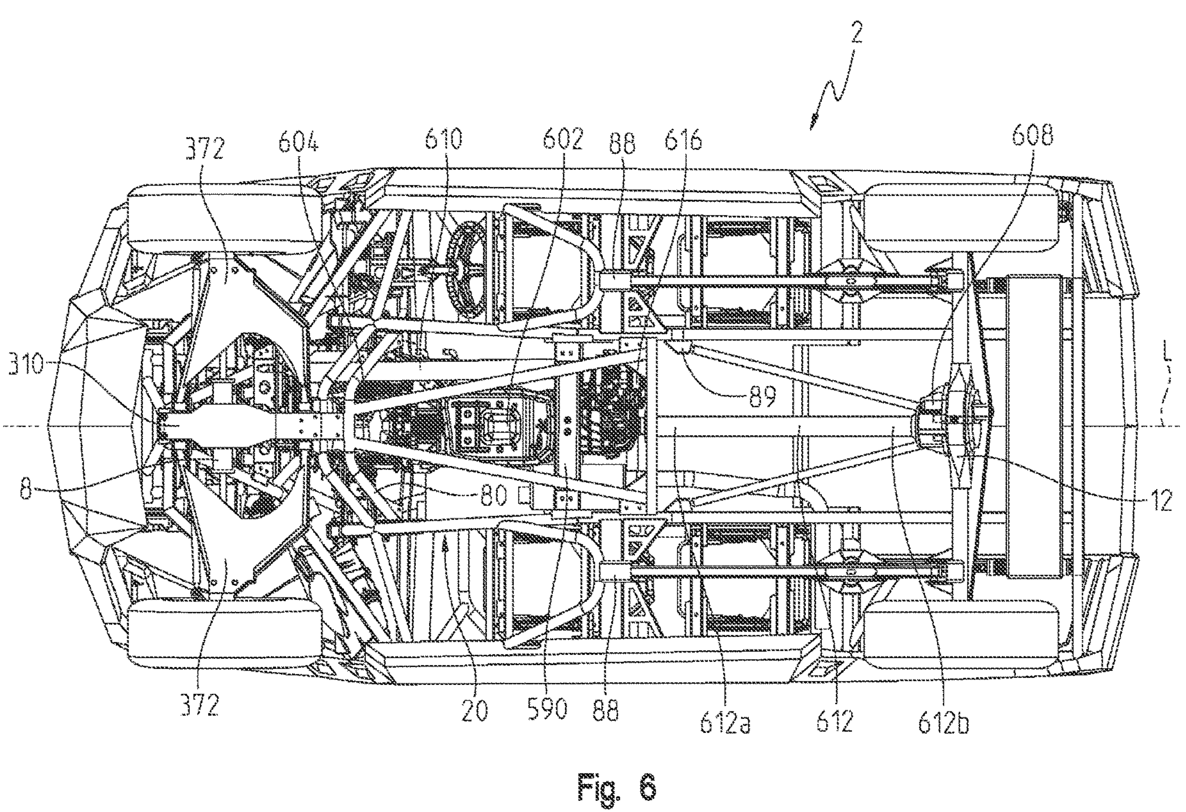
FIG. 6 is a bottom view of the vehicle FIG. 1.
Figures 7, 8:
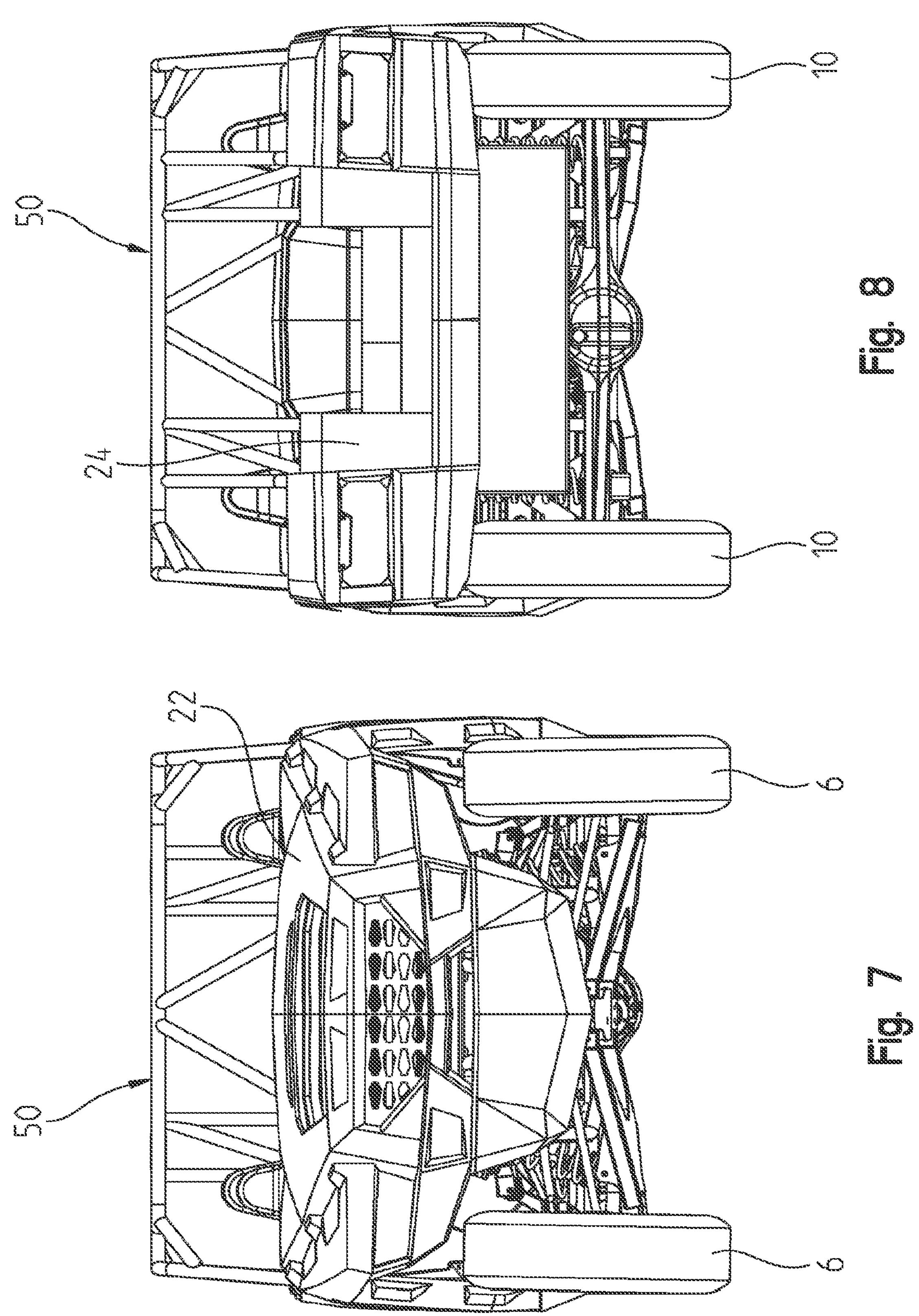
FIG. 7 is a front view of the vehicle of FIG. 1.
FIG. 8 is a rear view of the vehicle of FIG. 1.

Referring to FIG. 1, an illustrative embodiment of a vehicle 2 is shown. Vehicle 2 as illustrated includes a plurality of ground engaging members 4, illustratively wheels. A first set of wheels 6, one on each side of vehicle 2, generally correspond to a front axle 8 (FIG. 6). A second set of wheels 10, one on each side of vehicle 2, generally correspond to a rear axle 12 (FIG. 6). It should be understood that the vehicle described herein could include any of the components of previous military vehicles as described and depicted in U.S. Pat. Nos. 7,795,602; 8,029,021; 7,717, 495; and U.S. Pat. No. 8,205,910 (PLR-09-2019.04P-01); the subject matter of which is incorporated herein by reference.

In one embodiment, one or more of the wheels may be replaced with tracks, such as the Prospector II Tracks available from Polaris Industries, Inc. located at 2100 Highway 55 in Medina, MN 55340. As shown, wheels include pneumatic tires mounted on standard steel rims. Alternatively, tires could be non-pneumatic tires as shown in U.S. Pat. Nos. 8,176,957; 8,104,524 or in U.S. Patent application 61/611,300, the subject matter of which is incorporated herein by reference.

Vehicle 2 further includes a frame 20 (FIG. 6) supported by the plurality of ground engaging members 4. Frame 20 supports a vehicle body 22 and a rear cargo support area 24. Vehicle 2 defines an operator area 30 which includes seating 32 for one or more passengers. Operator area 30 further includes a plurality of operator controls 34 by which an operator may provide input into the control of vehicle 2. Operator area 30 and controls 34 may further include a portion of an HVAC system for the comfort of the operator and the passengers.

Controls 34 include a steering wheel 36 which is rotated by the operator to change the orientation of one or more of ground engaging members 6, to steer vehicle 2. Controls 34 also include a first foot pedal 38 actuable by the operator to control the acceleration and speed of vehicle 2 through the control of an engine described in more detail herein. Controls 34 also include a second foot pedal 40 to control the braking and deceleration of vehicle 2.

Figure 3:
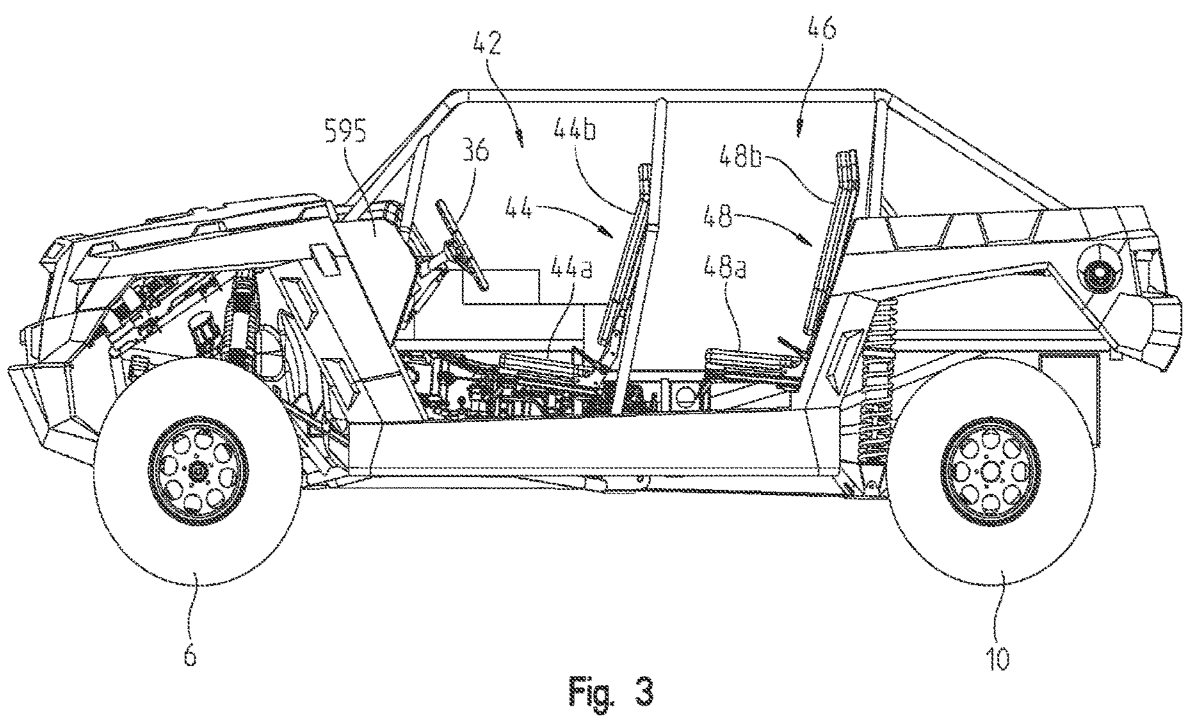
FIG. 3 is a left side view of the vehicle of FIG. 1.
Figure 4:
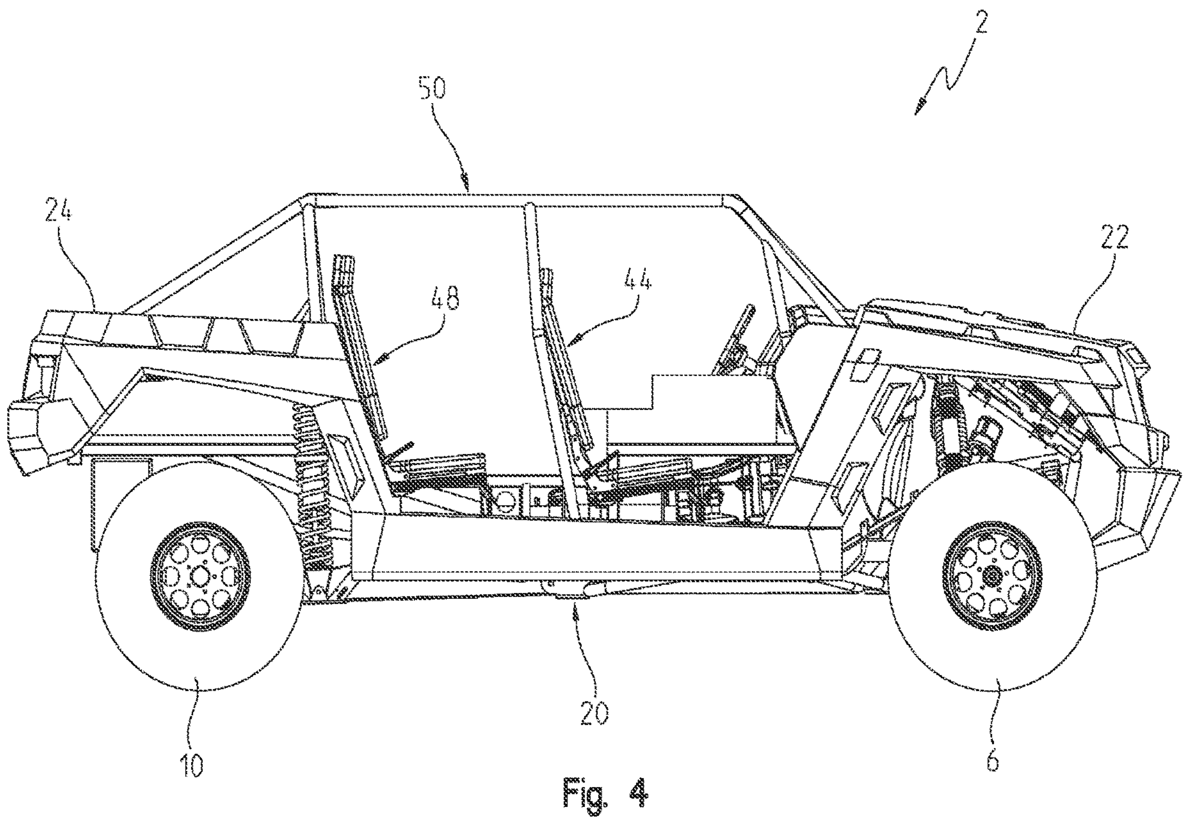
FIG. 4 is a right side view of the vehicle of FIG. 1.
Figure 5:
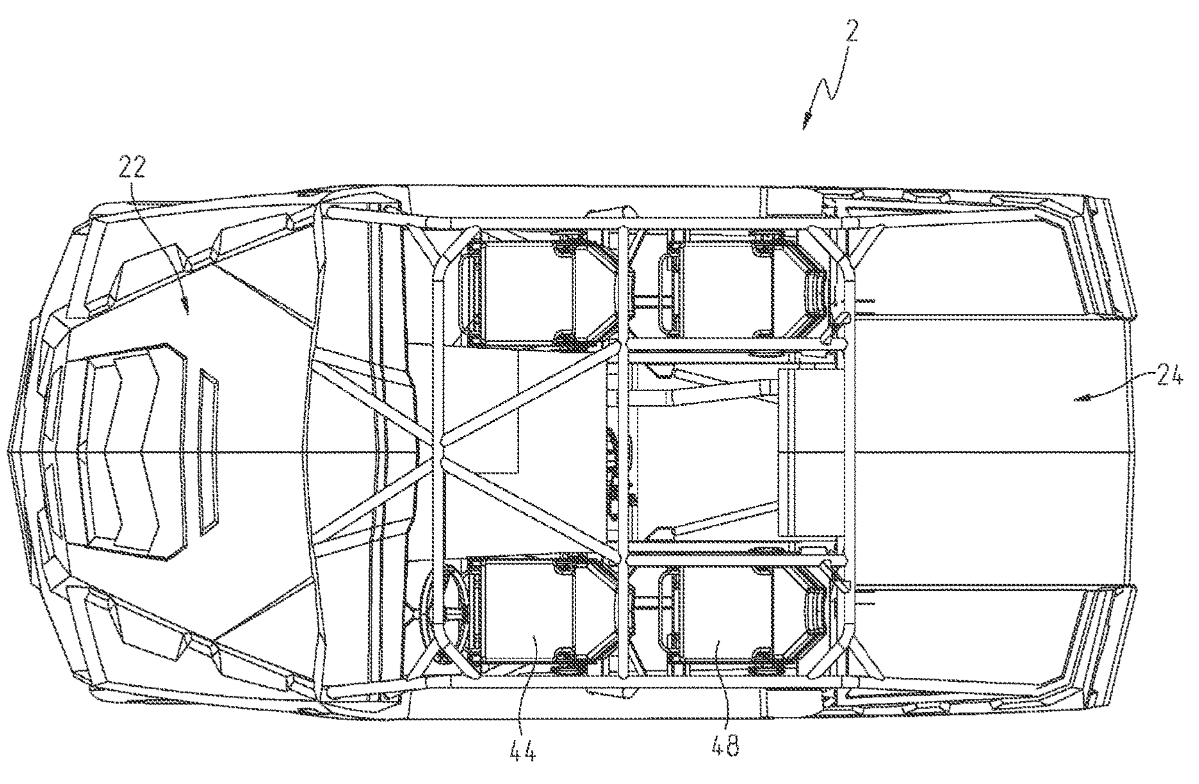
FIG. 5 is a top view of the vehicle of FIG. 1.

As shown in FIG. 3, operator area 30 further includes a front seating area 42 having front seats 44, with seat bottoms 44*a* and seat backs 44*b*; and rear seating area 46 having seats 48, with seat bottoms 48*a* and seat backs 48*b*. While not shown operator area 30 could further includes passenger seat belts and harnesses for securing the passenger in their respective seats 44, 48, as more fully described in U.S. patent application Ser. No. 12/484,888, incorporated herein by reference. Furthermore, operator area could include side nets, again to add further security to the passengers, as more fully described in U.S. patent application Ser. No. 12/796, 495 incorporated herein by reference.

Frame 20 includes a portion 50 extending above operator area 30. Portion 50 is provided to protect the occupants of operator area 30 if vehicle 2 tips or rolls over. In the illustrated embodiment, portion 50 is a roll cage. In one embodiment, portion 50 may be moveable from a first position protecting operator area 30 to a second position which provides vehicle 2 with a smaller envelope than when portion 50 is in the first position. Additional details about exemplary moveable portions are provided in U.S. Pat. No. 7,871,106. In a second embodiment, portion 50 may be collapsible from a first position to a second position as shown in U.S. Patent application Ser. No. 61/617,844, the subject matter of which is incorporated herein by reference.

Figure 9:
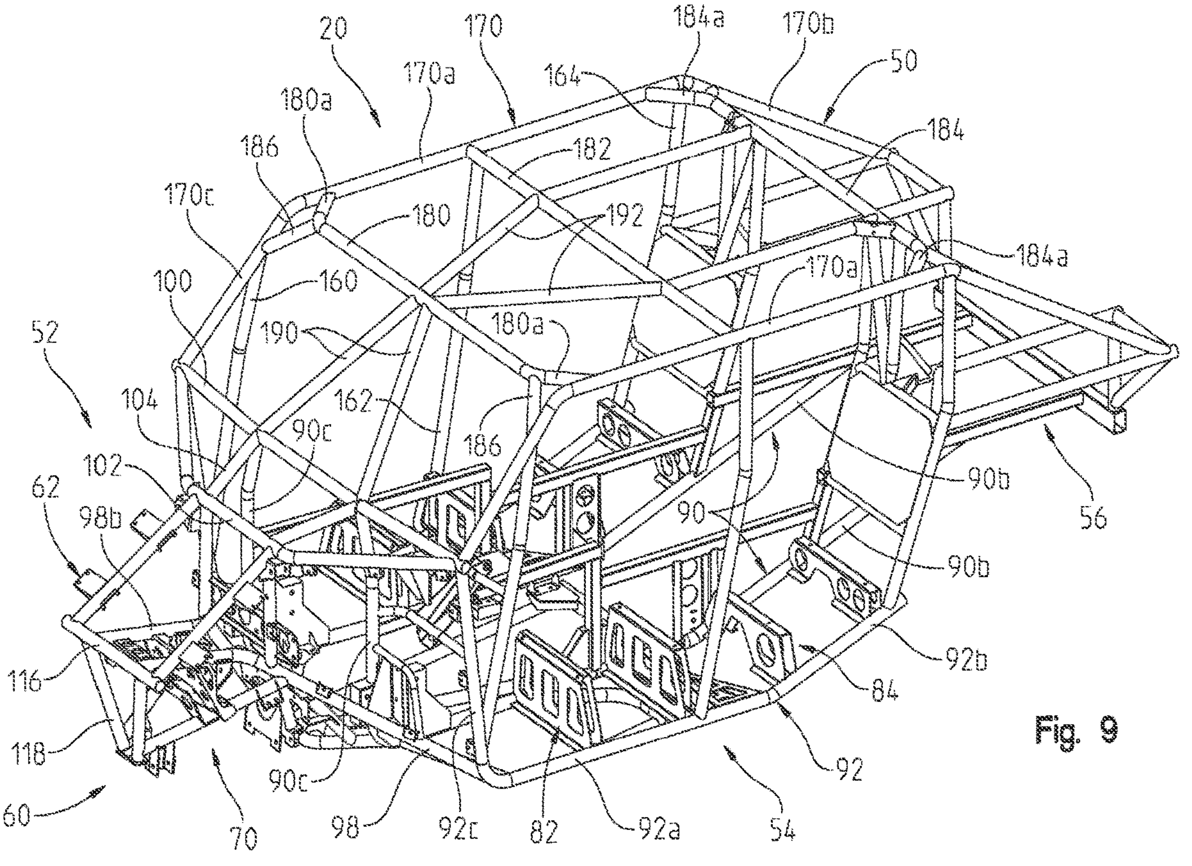
FIG. 9 is a front left perspective view of the frame for the vehicle of FIG. 1.
Figure 10:
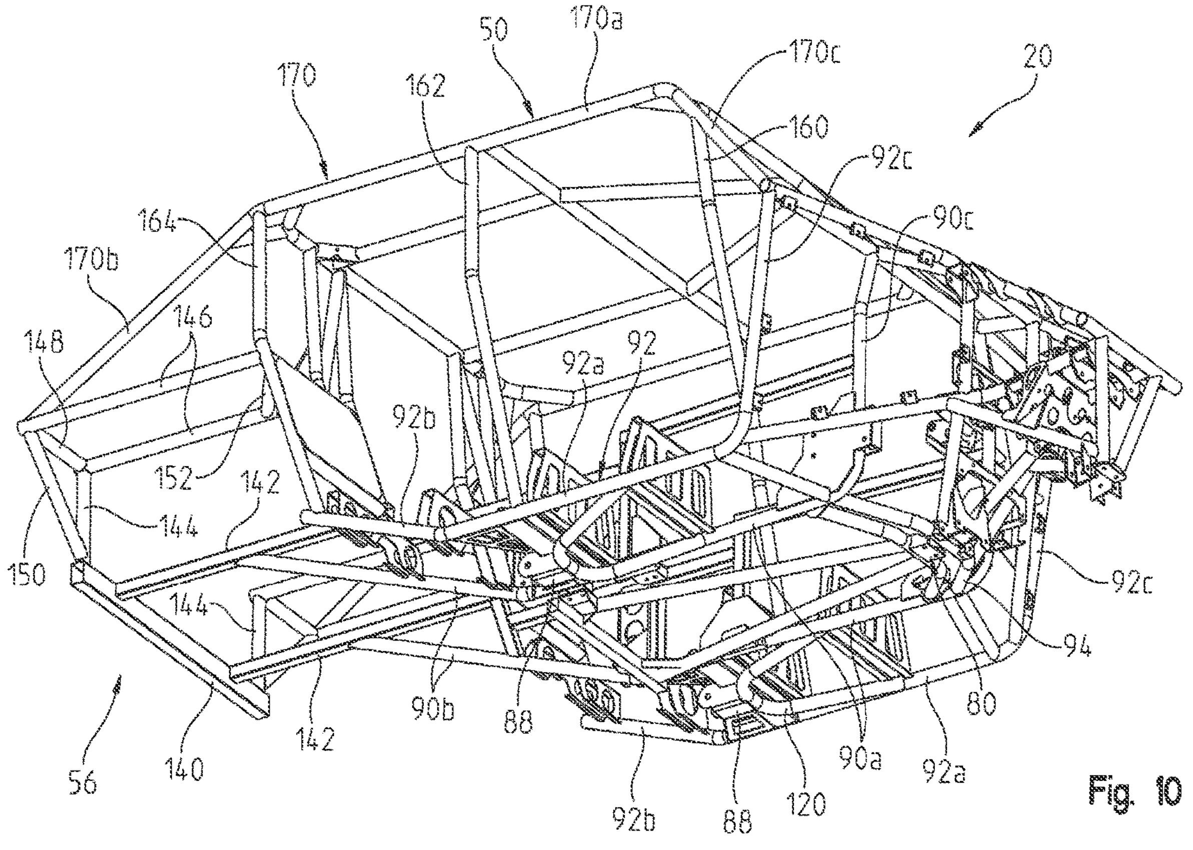
FIG. 10 is a front underside perspective view of the frame of FIG. 9.
Figure 16:
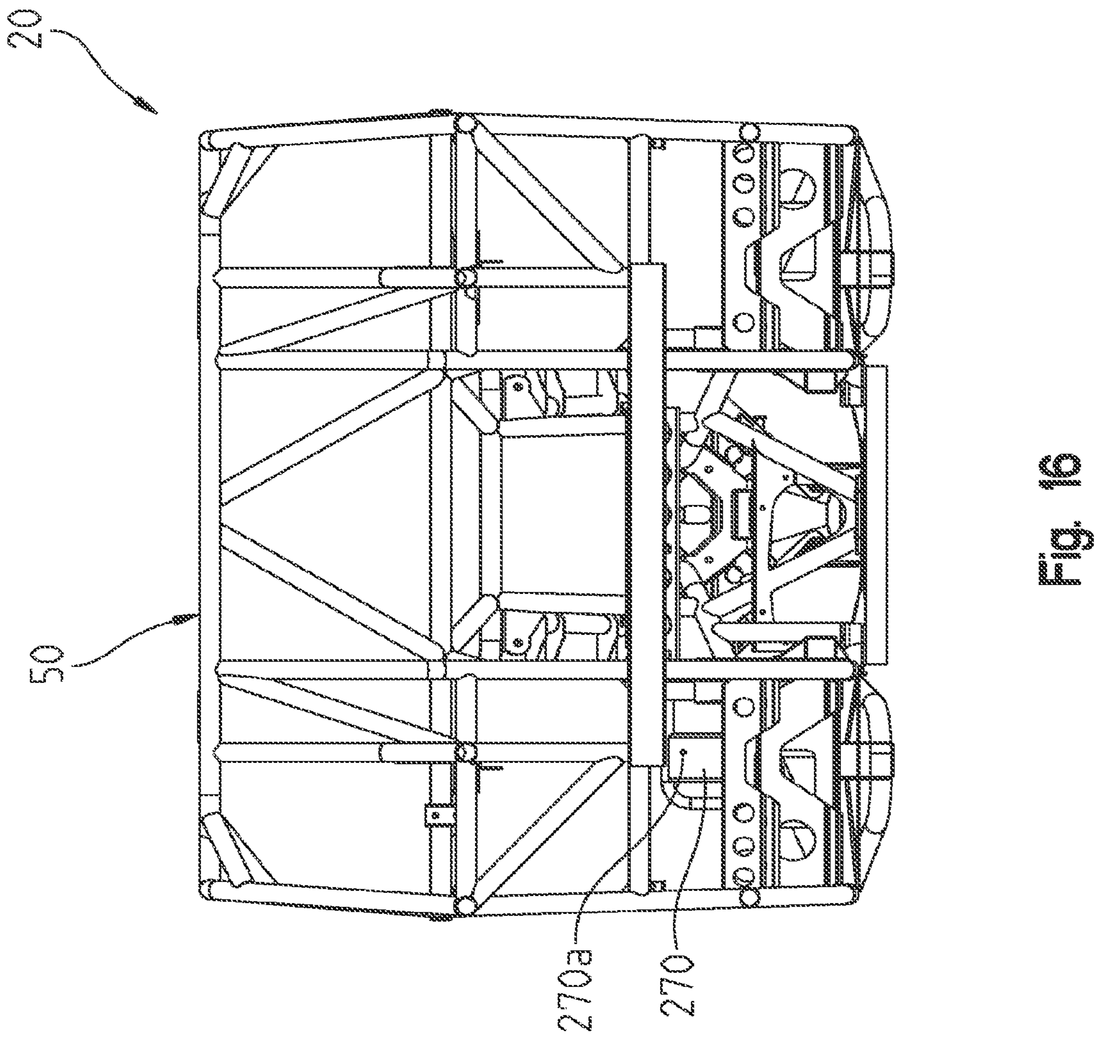
FIG. 16 is a rear view of the frame of FIG. 9.
Figure 17:
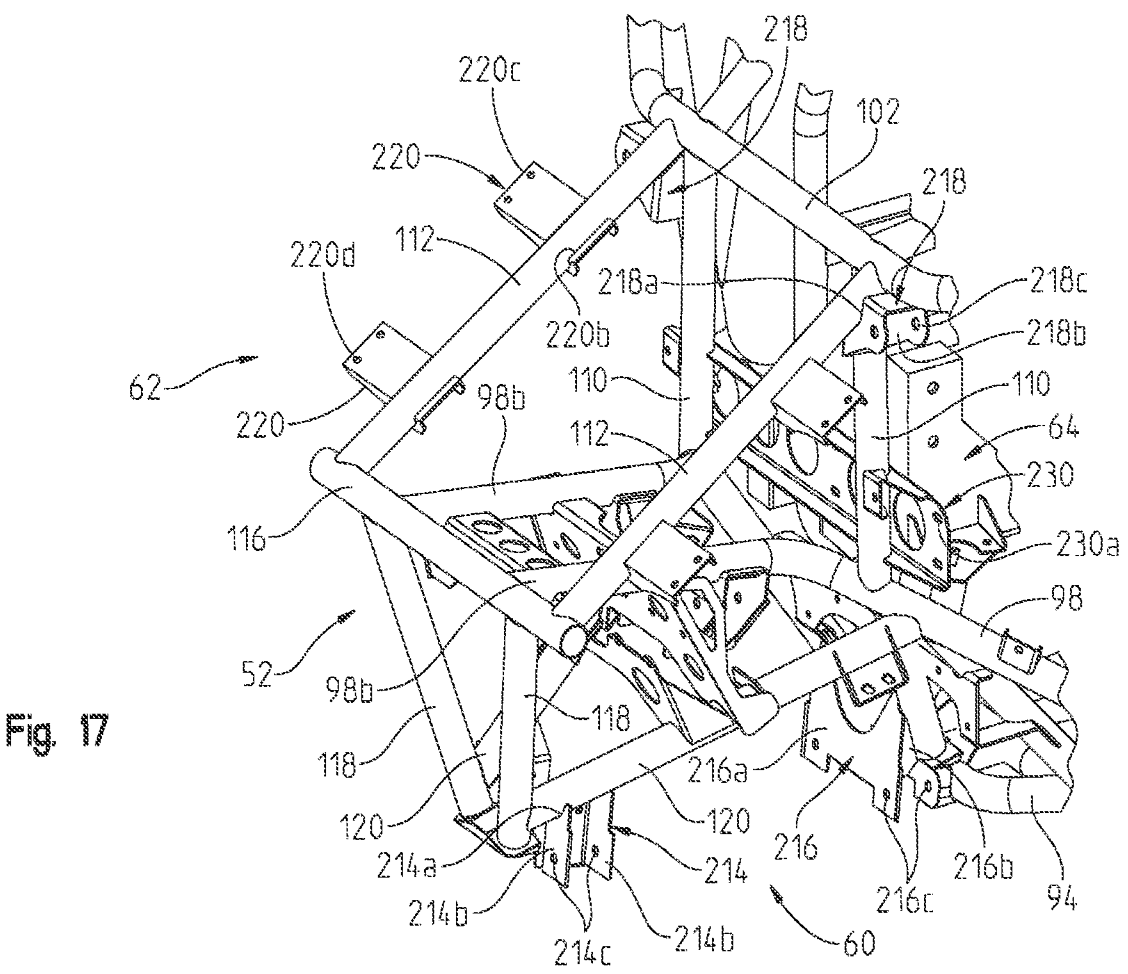
FIG. 17 is an enlarged perspective view, partially broken away, of the frame shown in FIG. 9.
Figure 18:
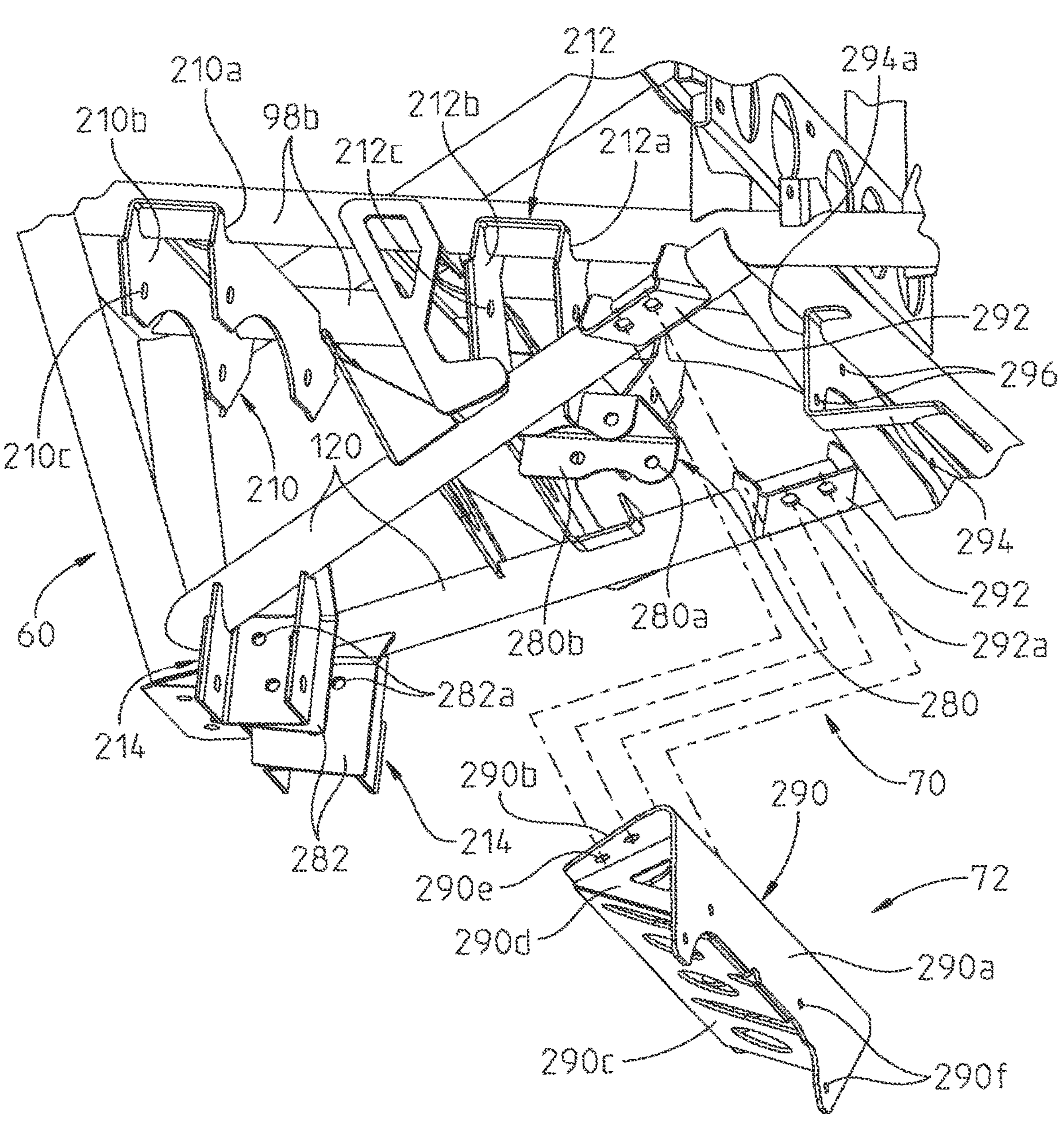
FIG. 18 is an underside perspective view, partially broken away, of the frame showing a front transfer case mount.

With reference now to FIGS. 9-18, frame 20 will be described in greater detail. As shown best in FIG. 9, frame 20 includes front section 52, midsection 54, and rear section 56. In addition to providing the structural rigidity for the vehicle, each frame section provides mounting accessories for mounting various vehicle components. Front section 52 includes a front suspension mount 60, radiator mount 62, steering mount 64 (FIG. 11), engine mount 66 (FIG. 11), controls mount 68 (FIG. 11), front final drive mount 70 (FIG. 9), and front transfer case mount 72 (FIG. 18). As shown in FIG. 10, frame 20 further includes a removable section 80 providing lower access to the frame for the addition and removal of a powertrain as described herein in greater detail.

Figure 22:
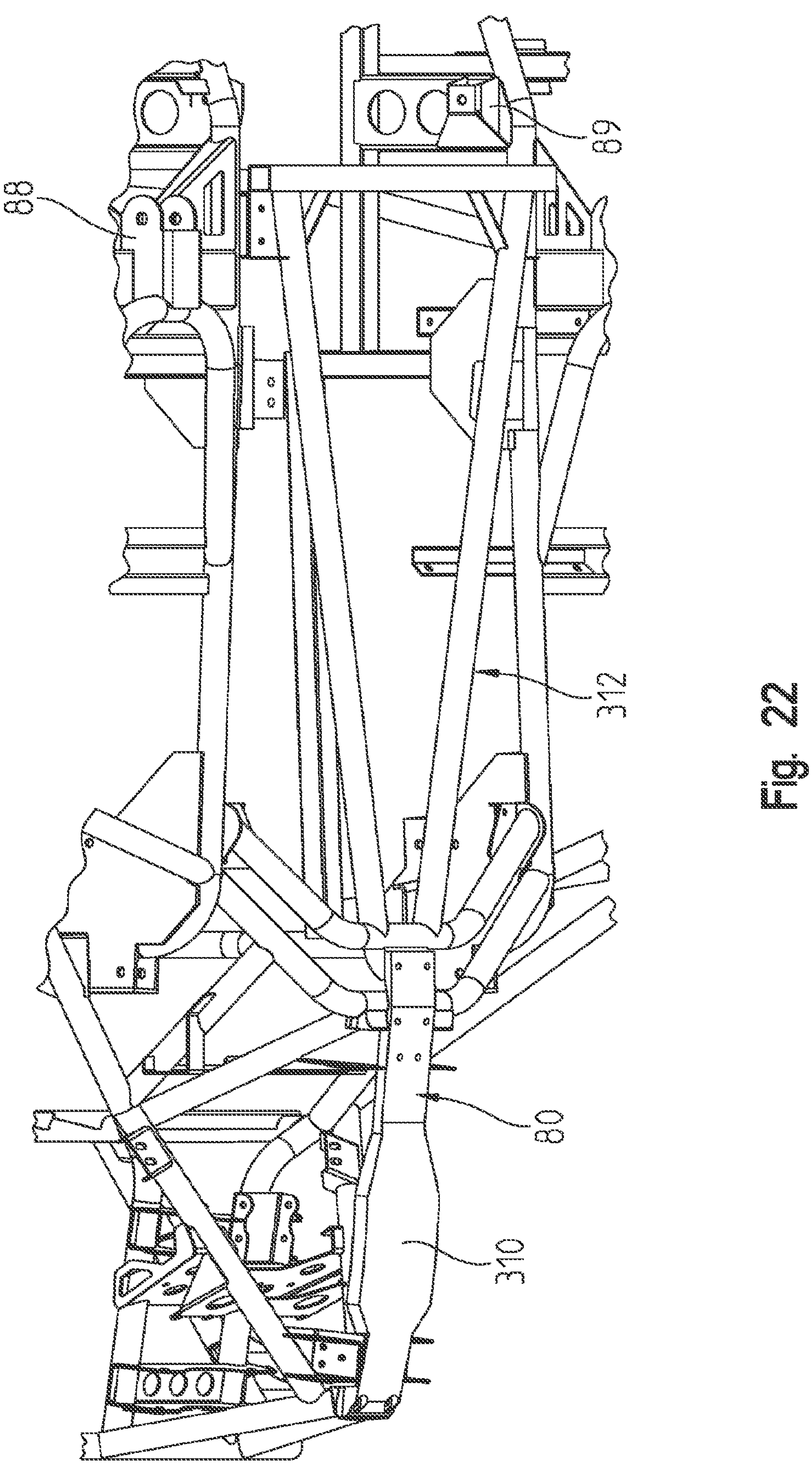
FIG. 22 is an underside perspective view of a removable portion of the frame.

Midsection 54 includes front seating supports 82 and rear seating supports 84. Finally, rear section 56 includes rear shock mounts 86 (FIG. 11), and rear suspension mounts 88 (FIG. 10) and 89 (FIG. 22). With reference now to FIGS. 9-18, the structural components of the frame will be described in greater detail.

Figure 14:
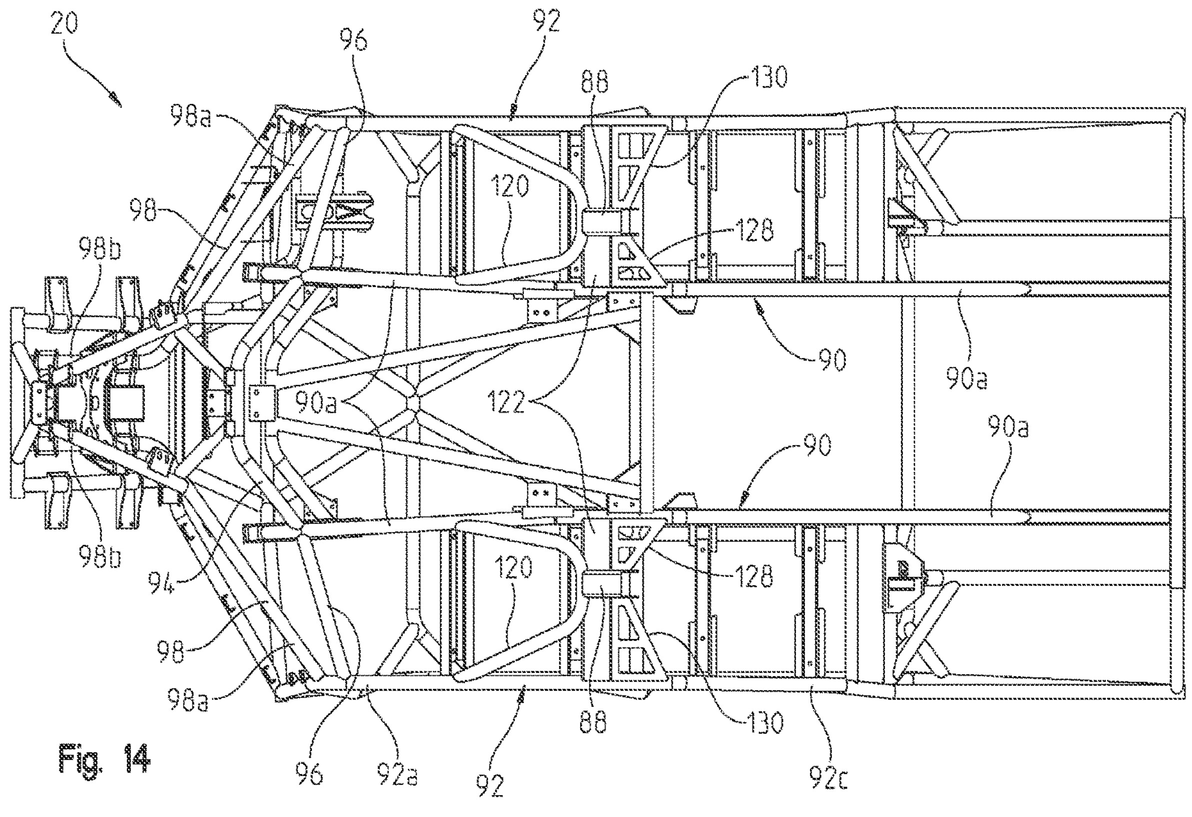
FIG. 14 is a bottom view of the frame of FIG. 9.

As shown best in FIGS. 9 and 14, frame 20 includes longitudinally extending frame tubes 90, which include generally horizontally extending portions 90*a* (FIG. 10) and rearwardly and upwardly extending portions 90*b*. Meanwhile a vertically extending portion 90*c* extends vertically upwardly from the generally horizontally extending portions 90*a*. Frame tubes 92 extend generally parallel to frame tube 90 having generally horizontally extending sections 92*a*, rearwardly and upwardly extending sections 92*b* and front and vertically extending sections 92*c*. As shown in FIG. 10, frame tubes 92 flank frame tubes 90 and sections 90*a*, 92*a*; 90*b*, 92*b*; and 90*c* and 92*c* are generally parallel with each other.

As shown best in FIG. 14, a U-shaped tube 94, couples frame tubes 90 together from an inside position and frame tubes 96 couple together frame tubes 90 and 92. As shown in FIGS. 9 and 14, frame tubes 98 couple to frame tubes 92 at a portion 98*a*, and couple to frame tube portion 92*a* at a portion 98*b*. Tube portions 98*a* extend in a generally longitudinally extending direction and in a closely spaced apart position as shown in FIG. 14. As shown best FIG. 9, cross tube 100 extends across frame 20 and is coupled to top ends of frame tubes 90*c* and 92*c*. A second cross tube 102 extends in a somewhat C-shape and is coupled at it ends to cross tube 100 and is further coupled by frame tubes 104.

With reference now to FIG. 17, upstanding frame tubes 110 extend between frame tubes 98 and cross tube 102, and frame tubes 112 extend forwardly from cross tube 102 and couple to cross tube 116. Front frame tubes 118 extend downwardly from cross tube 116 and couple with frame tubes 120, which in turn couple with frame tubes 98. As best shown in FIG. 14, frame 20 further includes U-shaped frame tubes 120, which extend between frame tubes 90 and 92, and couple with channels 122 to which rear suspension mounts 88 are mounted, as described in greater detail herein. Frame 20 is further fortified by triangular truss plates 128, 130.

With reference now to FIG. 10, rear frame portion 56 will be described. Rear frame portion 56 includes rear cross tube 140 coupled to frame tubes 142, which in turn couple to frame tubes 90*b*. Rear frame portion 56 further includes upstanding frame tubes 144, longitudinally extending frame tubes 146, and connecting tubes 148, 150 and 152.

Figure 11:
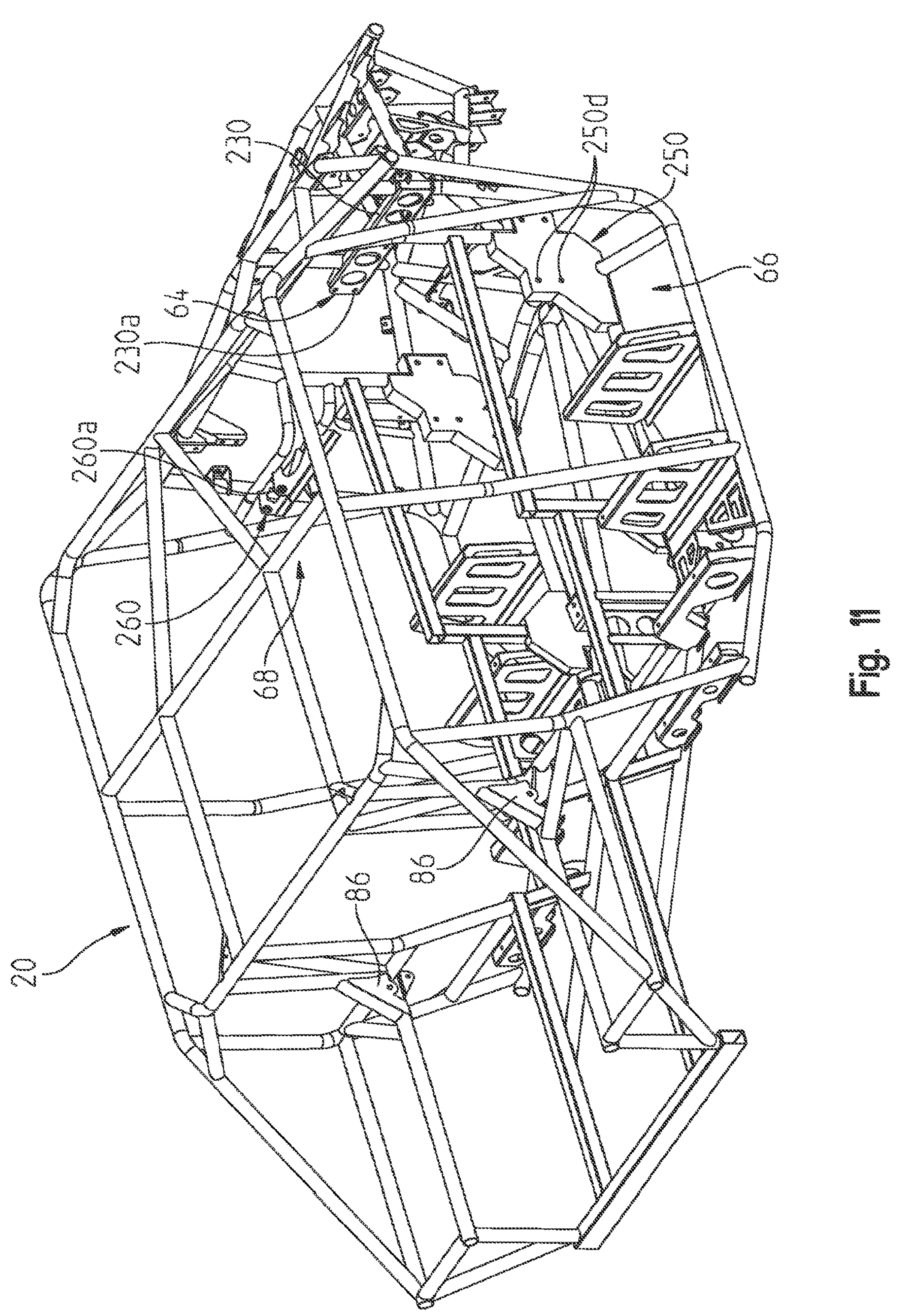
FIG. 11 is a top perspective view of the frame of FIG. 9.
Figure 12:
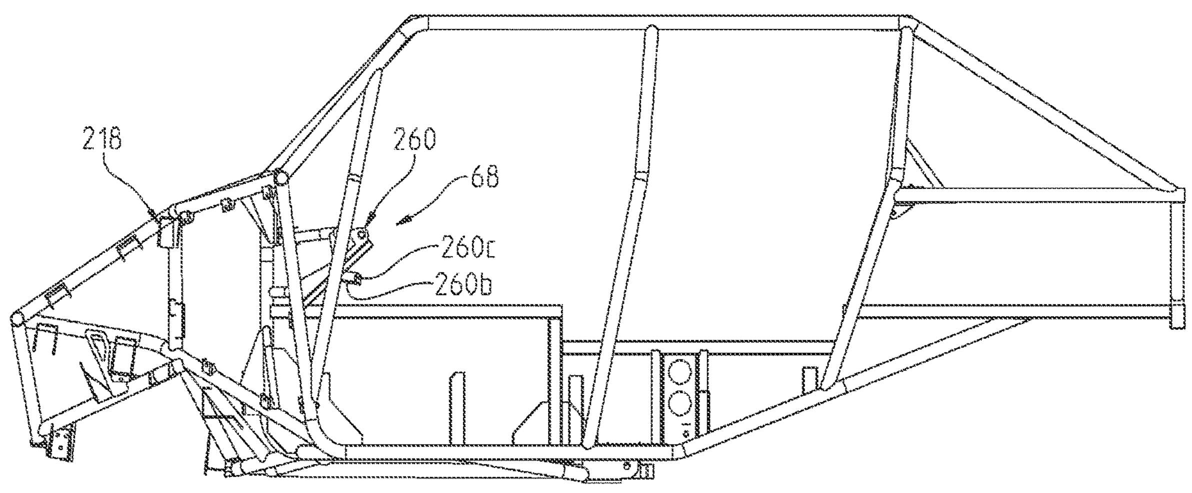
FIG. 12 is a left side view of the frame of FIG. 9.
Figure 13:
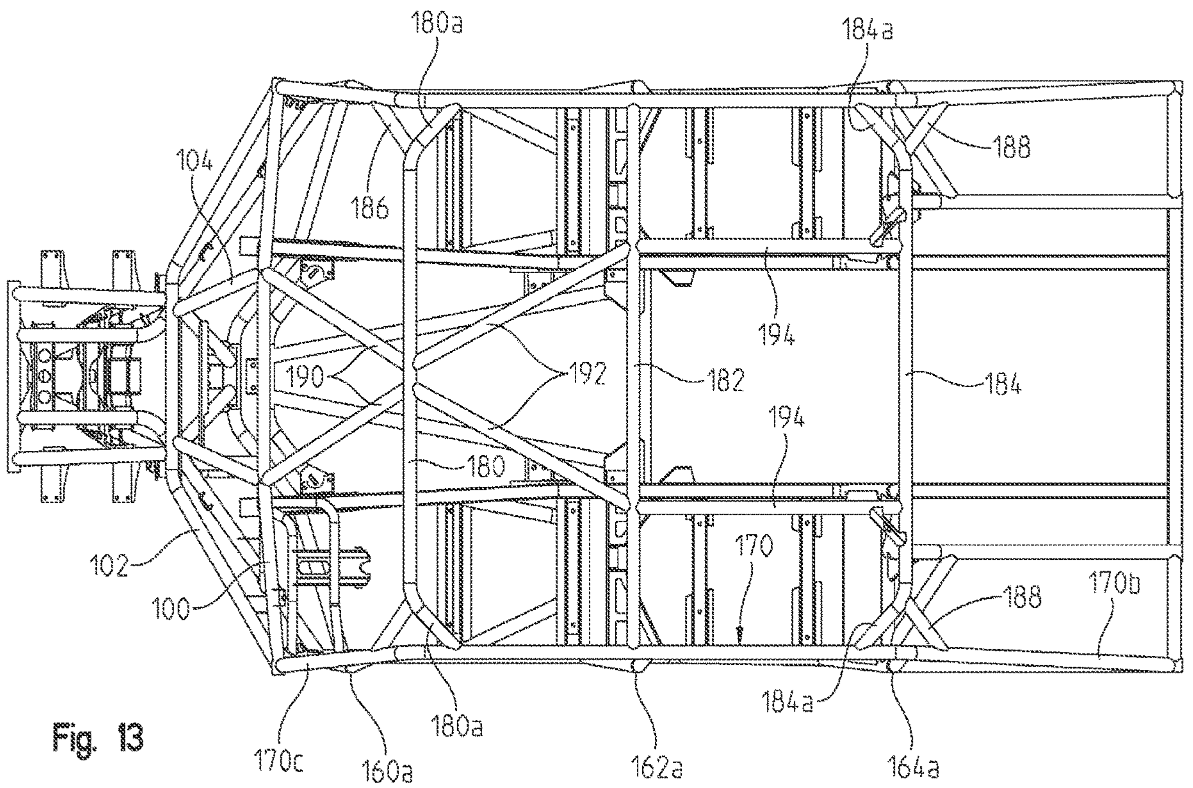
FIG. 13 is a top view of the frame of FIG. 9.

With reference now to FIGS. 9-13, upper structure 50 will be described in greater detail. As shown first in FIG. 10, upper structure 50 includes outer vertically extending members 160, 162, and 164. An outer and upper tube 170 is coupled to a top portion of each of the vertically extending members 160, 162, 164 and includes a generally horizontal section 170*a*, a rearwardly and downwardly extending section 170*b*, and a front and generally downwardly extending section 170*c*. As shown, vertically extending members 162 and 164 are coupled to tube portion 170*a*, and vertically extending member 160 is coupled to front section 170*c*. Rearward portion 170*b* extends between vertically extending member 164 and frame tubes 146. As shown in FIG. 13, each of the vertically extending members 160, 162, and 164, include an outward most point 160*a*, 162*a*, 164*a*, respectively, which is wider than the frame in order to protect the occupants of the vehicle in case of a rollover.

As shown best in FIG. 9, three cross tubes 180, 182, and 184, together with upper tubes 170*a* forming a substantial part of the overhead canopy. Cross tubes 180 are coupled to frame tubes 170 at end portions 180*a* and by two portions 186 forming a triangular connection point. Cross tube 180 is coupled to cross tube 100 by way of frame tubes 190, and cross tube 180 is coupled to cross tube 182 by way of frame tubes 192. Rear cross tube 184 is coupled to frame tubes 170 by way of sections 184*a* and by way of coupling tubes 188 (FIG. 13). Cross tube 182 is coupled to cross tube 184 by way of frame tubes 194.

With the structural frame as described above, the mounting sections will now be described with reference to FIGS. 9-18.

With reference now to FIGS. 17 and 18, front suspension mount 60 will be described in greater detail. With reference first to FIG. 18, front suspension mount 60 includes first and second brackets 210, 212 which are coupled between front frame tube portions 98*b*. Each of the brackets 210 and 212 include U-shaped cut-out portions 210*a*, 212*a*, respectively, to receive therein the tube portions 98B. Each of the brackets further includes sidewalls 210*b* and 212*b*, respectively, having apertures 210*c* and 212*c*, respectively, for mounting of the front suspension as further described herein. In a like manner, front suspension mount 60 includes a lower bracket 214; (FIG. 17), having a cylindrical cutout 214*a* for coupling to tube 120. Bracket 214 also includes sidewalls 214*b* providing an aperture at 214*c* for mounting a suspension arm as further provided herein. As also shown in FIG. 17, front suspension mount 60 includes a bracket 216 having sidewalls 216*a*, 216*b* defining apertures 216*c* for mounting a lower control arm of front suspension as further described herein. Bracket 216 also includes apertures 216*d* (FIG. 23) at an underside thereof, as described in further detail herein. Front suspension mount 60 further includes a top bracket 218 having U-shaped cutouts at 218*a* for attachment to frame tubes 112, sidewalls 218*b*, and apertures 218*c*. Brackets 218 provide a mounting structure for a front shock absorber as described herein.

With reference now to FIG. 17, radiator mount section is shown at 62 being defined by brackets 220 and having U-shaped cutouts at 220*b* to be received over frame tubes 112. This positions a top face 220*c* of bracket 220 in a planar relationship with other brackets 220 for mounting of a radiator as further described herein.

Figure 20:
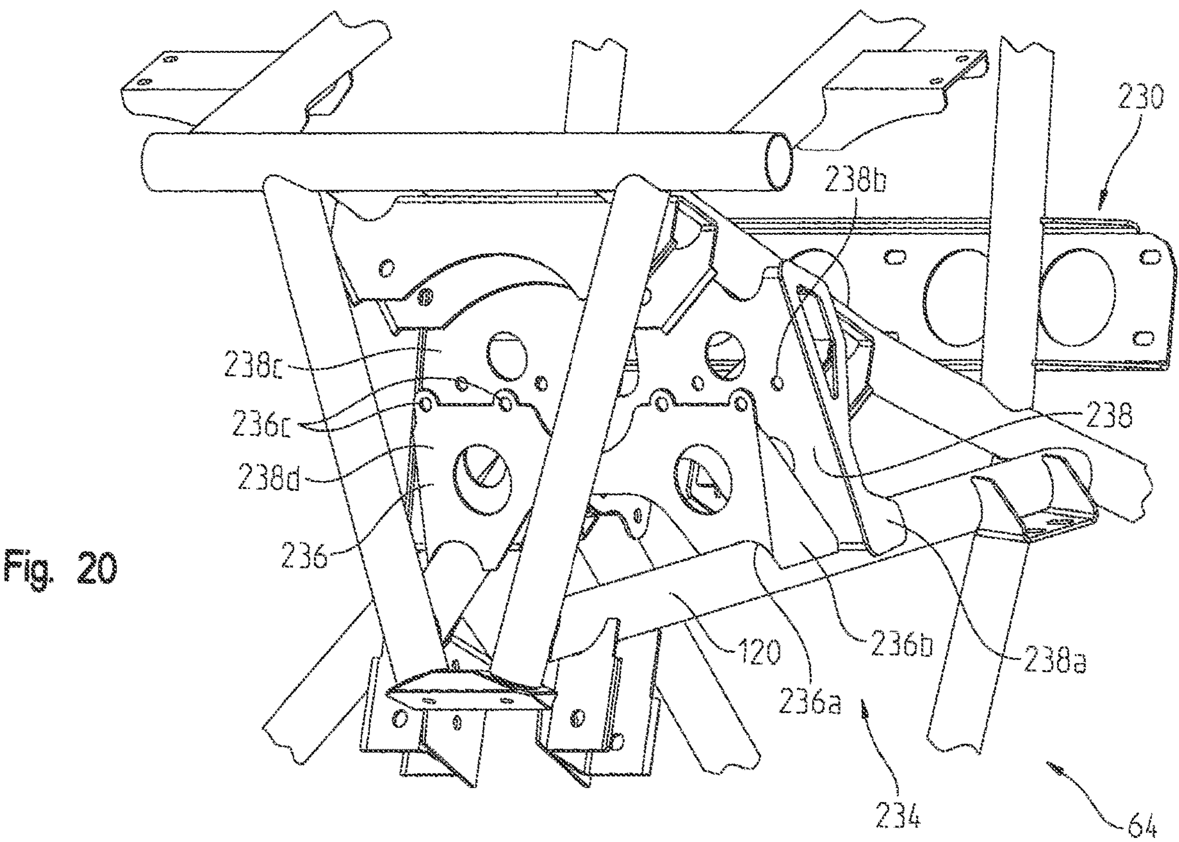
FIG. 20 is a front perspective view, partially broken away, of the frame showing a steering rack and pinion mount.

With reference now FIGS. 11 and 17, steering mount section 64 will be described in greater detail. As shown, a first bracket 230 is provided, which extends across and is coupled to vertical frame tubes 110. A plurality of apertures 230*a* are provided for coupling a first steering mechanism as further described herein. With reference now to FIG. 20 steering mount section 64 includes a second bracket assembly 234. Bracket assembly 234 includes a first bracket 236 having a cutout portion at 236*a* and a flange 236*b* for mounting of the bracket 236 to frame tubes 120. Mounting apertures 236*c* are provided on bracket plate portion 238*d* for mounting of the steering assembly as further described herein. Bracket assembly 234 includes a second bracket 238 having a flange 238*a* for mounting bracket 238 to the frame tubes 120. Mounting apertures 238*b* are provided on bracket plate portion 238*c* for mounting of the steering assembly as further described herein. As shown, apertures 236*c* are longitudinally aligned with apertures 238*b*, for receiving a fastener therethrough as described herein.

Figure 19:
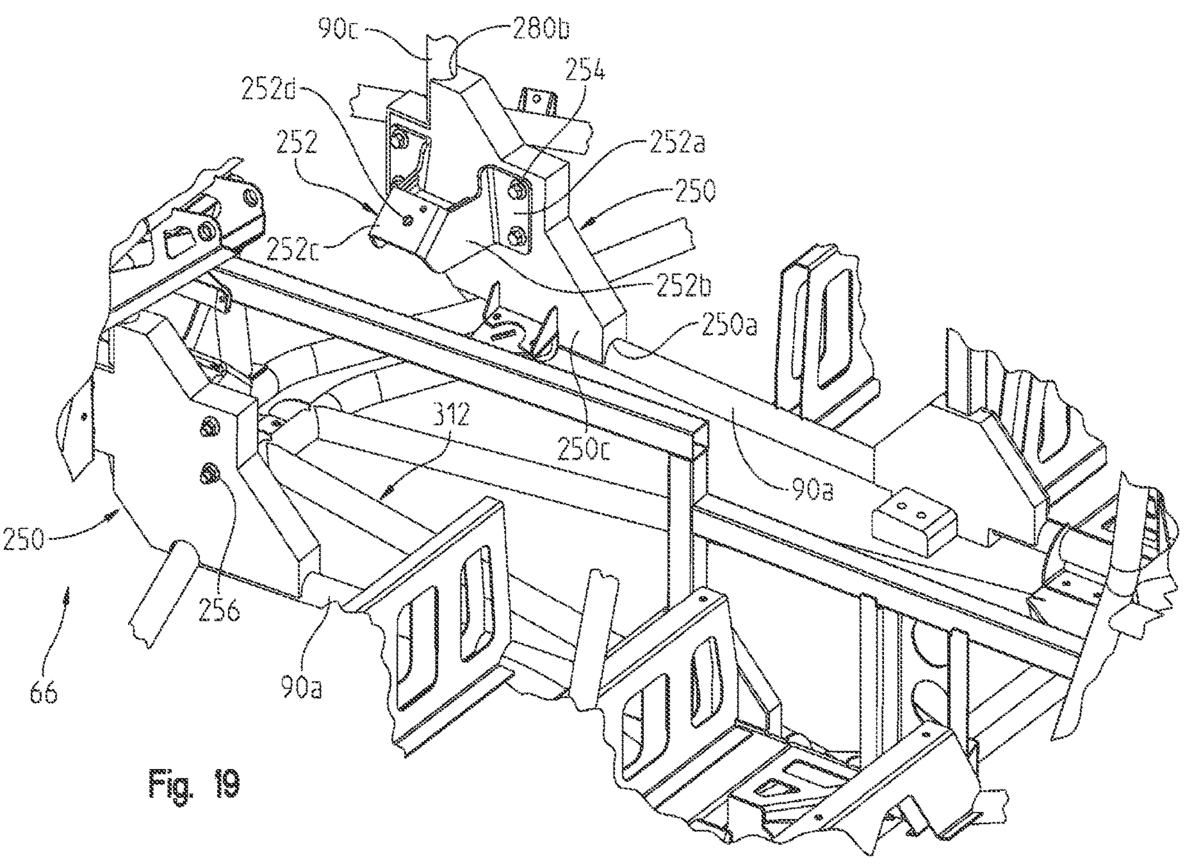
FIG. 19 is a perspective view, partially broken away, of the frame showing an engine mount.

With reference now to FIGS. 11 and 19, engine mount section 66 will be described in greater detail. As shown best in FIG. 19, engine mount section 66 includes a bracket 250 having U-shaped cutouts 250*a* for overlying frame tube 90*a* and U-shaped cutouts 250*b* for overlying frame tube portion 90*c*. Bracket 250 includes an internal surface 250*c* having a bracket 252 mounted thereto. Bracket 250 receives fasteners 254 therethrough, and fasteners 254 and 256 attach bracket 252 thereto. Bracket 252 includes flanges 252*a* for mounting against surface 250*c* and for receipt therethrough of fasteners 254. Bracket arms 252*b* and support plate 252*c* are also provided for support of an engine as described further herein. An aperture 252*d* allows mounting of the engine to bracket 252 as described in further detail herein.

Figure 15:
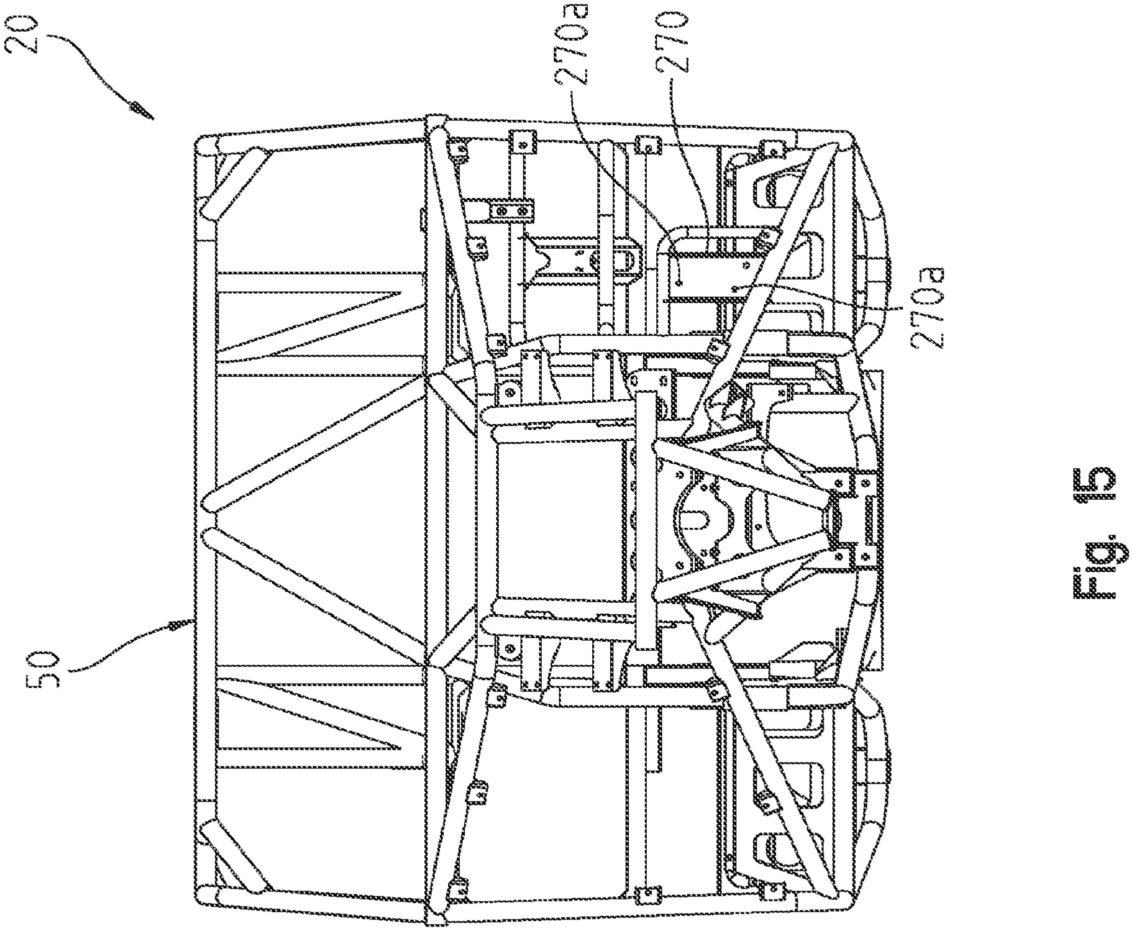
FIG. 15 is a front view of the frame of FIG. 9.

With reference now to FIGS. 11, 12, 15, and 16, the controls mount 68 will be described in greater detail. As shown in FIGS. 11 and 12, the controls mounts 68 includes a steering control bracket 260 coupled to the frame 20 defined as a U-shaped channel (FIG. 11) having a mounting aperture at 260*a*, and a mounting leg at 260*b* (FIG. 12) providing a mounting aperture at 260*c*. As shown in FIGS. 15 and 16, a bracket 270 is shown for at least one foot control having apertures at 270*a*.

With reference again to FIG. 18, front final drive mount 70 will be described. As shown, a bracket 280 is coupled to a lower edge of bracket 212 having mounting apertures 280*a* positioned through sidewalls 280*b* of bracket 280. Furthermore, bracket 214 includes two plate portions 282 attached thereto defining apertures 282*a* for attachment to front final drive, as described further herein.

With reference still to FIG. 18, front transfer case mount 72 will be described. As shown, mount 72 includes bracket 290 configured in a substantially folded and triangular configuration comprising a rear wall 290*a*, a front wall 290*b*, lower wall 290*c*, and sidewalls 290*d*. Front wall 290*b* includes apertures 290*e*. Rear wall 290*a* includes mounting apertures 290*f*. As also shown in FIG. 18, brackets 292 are attached to frame tubes 120 and include apertures at 292*a*. It should be appreciated that apertures 290*e* of brackets 72 and apertures 292*e* of brackets 292 align with each other and that bracket 290 is fixed by way of fasteners through apertures 290*e* and 292*a*.

Figure 21:
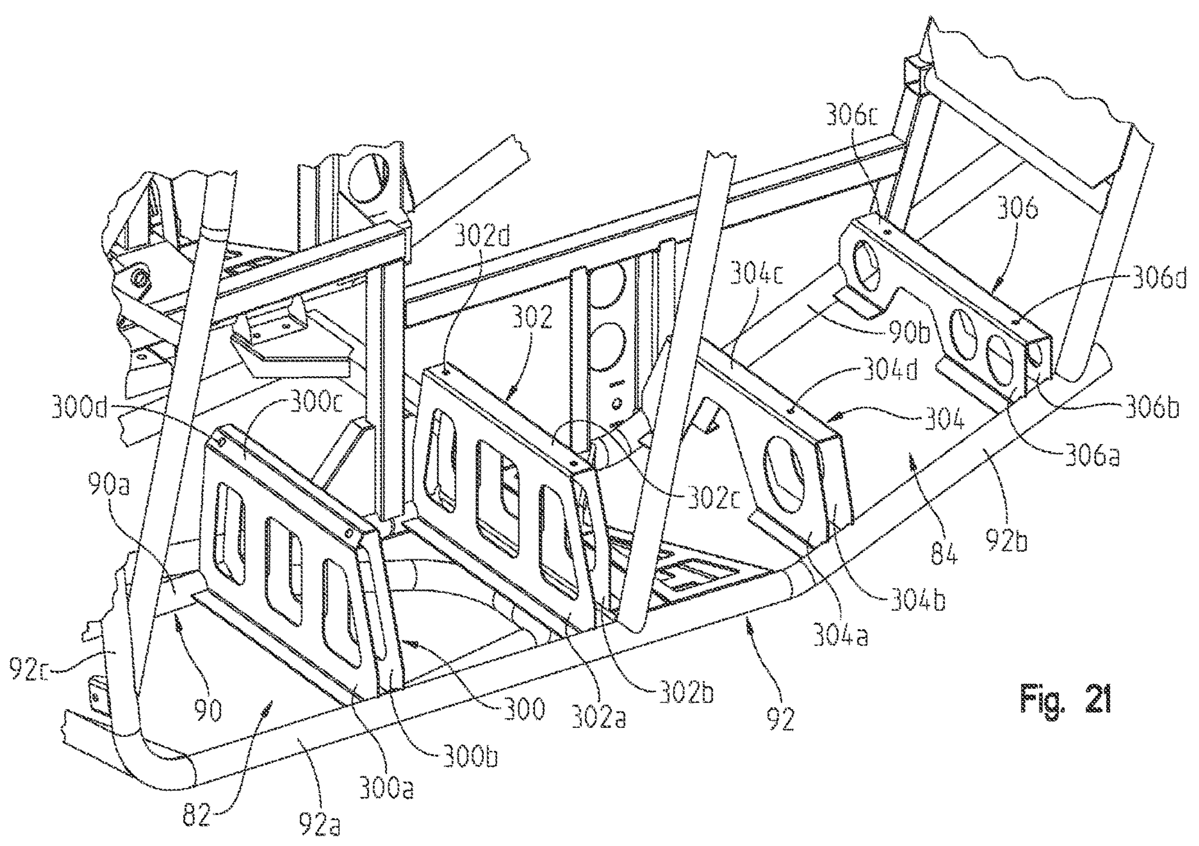
FIG. 21 is an enlarged front perspective view, partially broken away, of the frame showing seat mounts.

With reference now to FIG. 21, front seating support 82 will be described in greater detail. As shown, support 82 includes first bracket 300 having parallel plate portions 300*a*, 300*b* fixedly retained between longitudinal frame tubes 90, 92 and attached at tube portions 90*a*, 92*a*. Bracket 300 includes a front edge portion 300*c* having apertures 300*d* for attachment of seating as described herein.

With reference still to FIG. 21, front seating support 82 includes second bracket 302 having parallel plate portions 302*a*, 302*b* fixedly retained between longitudinal frame tubes 90, 92 and attached at tube portions 90*a*, 92*a*. Bracket 302 includes a top edge portion 302*c* having apertures 302*d* for attachment of seating as described herein.

With reference still to FIG. 21, rear seating support 82 includes first bracket 304 having parallel plate portions 304*a*, 304*b* fixedly retained between longitudinal frame tubes 90, 92 and attached at tube portions 90*a*, 92*b*. Bracket 304 includes a top edge portion 304*c* having apertures 304*d* for attachment of seating as described herein.

With reference still to FIG. 21, rear seating support 82 includes second bracket 306 having parallel plate portions 306*a*, 306*b* fixedly retained between longitudinal frame tubes 90, 92 and attached at tube portions 90*b*, 92*b*. Bracket 306 includes a top edge portion 306*c* having apertures 306*d* for attachment of seating as described herein.

Figure 23:
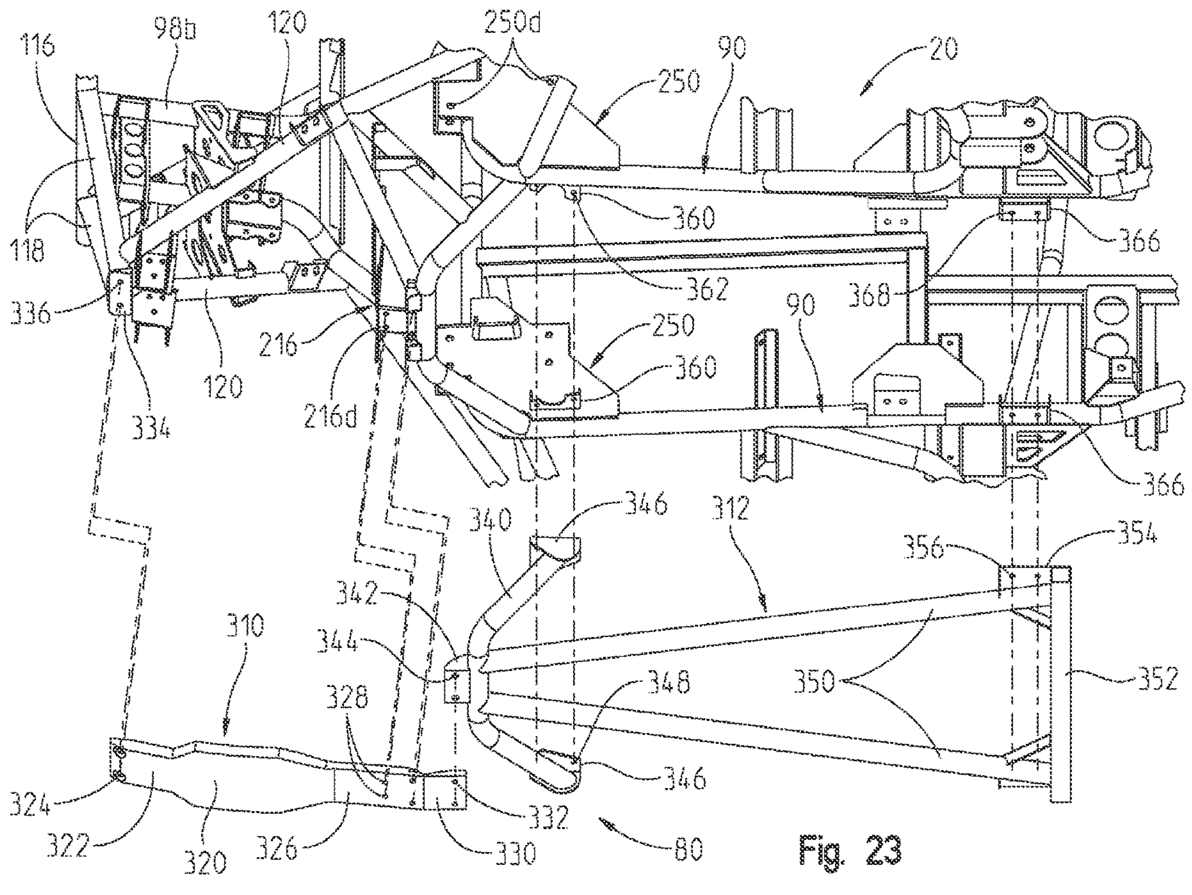
FIG. 23 is an underside perspective view of the frame of FIG. 22, with the removable frame exploded away from the remainder of the frame.

With reference now to FIGS. 22 and 23, the frame removable portion 80 will be described in greater detail. As shown, the removable portion 80 includes a front most portion 310 and a rearward portion 312. As shown best in FIG. 23, the front portion 310 includes a skid plate portion 320 having a front connector portion 322 having apertures 324. Portion 310 includes a mid connector portion 326 having apertures 328. A rearward most connector part 330 has apertures 332. As shown best in FIG. 23, the front of frame 20 includes a bracket 334 attached to a lower portion of frame tubes 118 having threaded apertures 336.

Removable frame portion 312 includes a U-shaped tube 340 having a front bracket 342 having apertures 344. Brackets 346 are positioned at opposite ends of tube 340 and include mounting apertures at 348. Rearwardly extending tubes 350 extend from tube 340 and include a rear cross tube 352 and mounting brackets 354 having mounting apertures at 356. Mounting brackets 360 are coupled to inside surfaces of bracket 250 and includes apertures 362. Finally, brackets 366 are mounted to frame tubes 90 and include mounting apertures at 368.

Thus as shown best in FIG. 23, removable frame portion 312 may be positioned with brackets 346 aligned with brackets 360; and with brackets 354 aligned with brackets 366. The removable portion 312 may be fixed to frame tubes 90 by way of fasteners (not shown) through apertures 348, 362; and 356, 368. Removable portion 310 may then be positioned with apertures 324 aligned with apertures 336 in bracket 334; with apertures 328 aligned with apertures 216*d*; and with apertures 332 aligned with apertures 344 in removable portion 312. Again, fasteners may be used to hold removable portion 310 in position.

Figure 24:
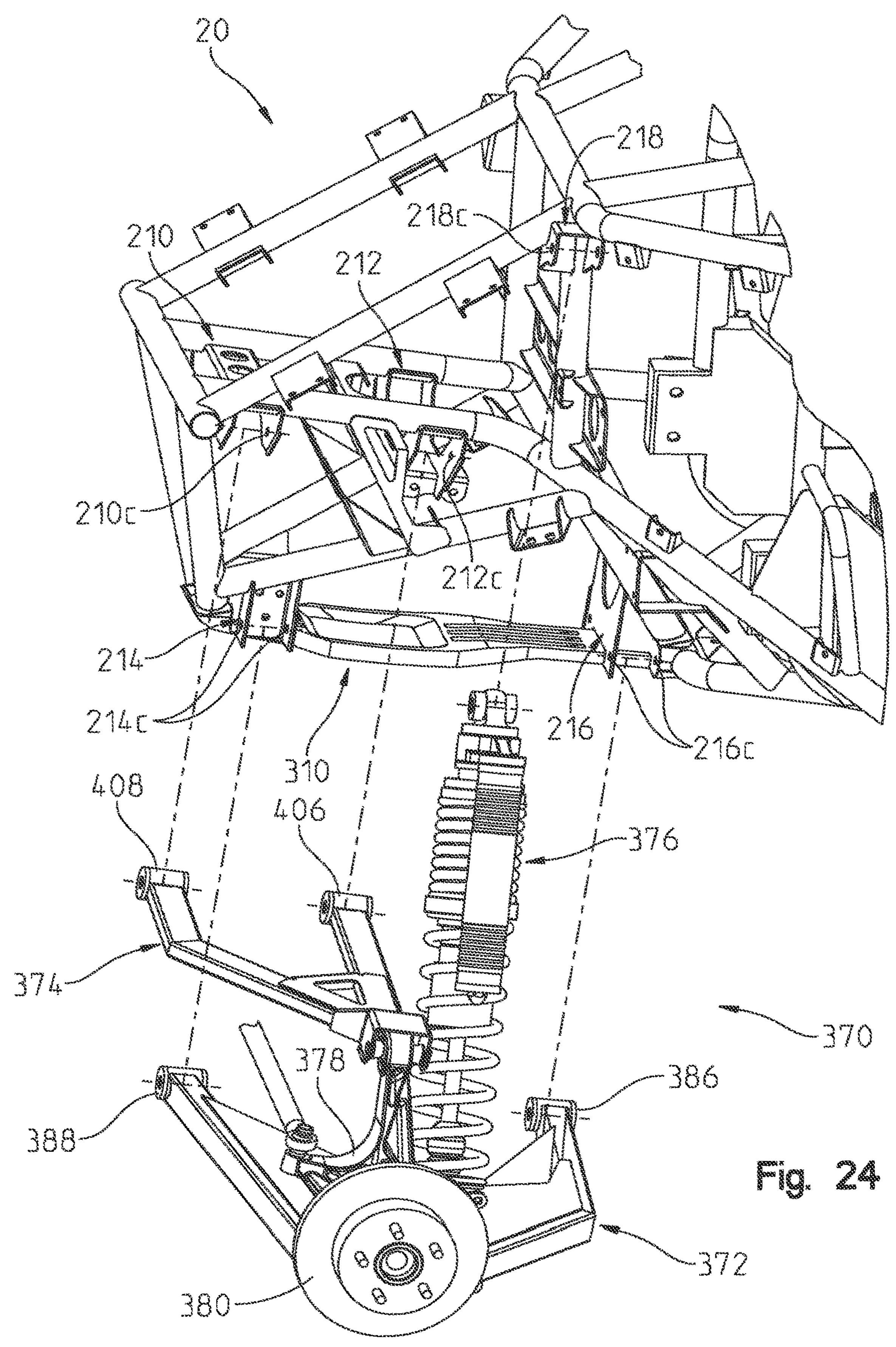
FIG. 24 is an exploded view of a front suspension system.
Figure 25:
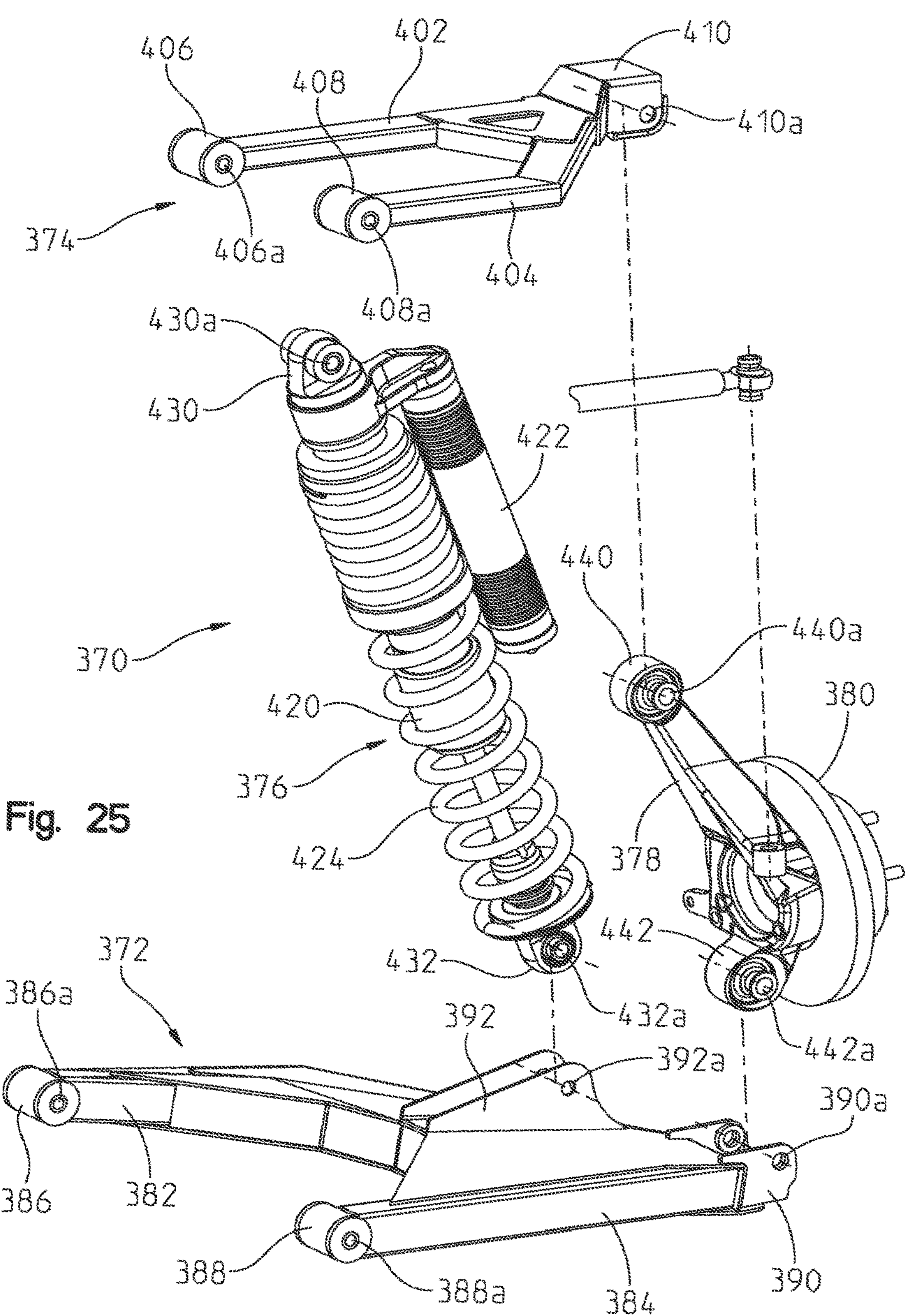
FIG. 25 is an exploded view of the front suspension systems of FIG. 24.

With reference now to FIGS. 24 and 25, front suspension 370 will be described in greater detail. As shown, front suspension 370 is generally comprised of a lower control arm 372, upper control arm 374, and shock absorber 376; where upper and lower control arms 374, 372 are coupled to a wheel spindle 378, which in turn is coupled to wheel hub 380. As shown best in FIG. 25, lower control arm 372 is comprised of arm portions 382 and 384 having couplers 386 and 388 at respective ends thereof. Couplers 386 and 388 include mounting apertures at 386*a* and 388*a*. Lower control arm 372 further includes a bracket at 390 having a mounting aperture 390*a*; and an upper bracket at 392 having a mounting aperture 392*a*.

Upper control arm 374 is similar in nature to lower control arm 372 including arm portions 402 and 404; couplers 406, 408 and mounting apertures at 406*a* and 408*a*. A bracket 410 is positioned at an outer most part of control arm 374 and includes apertures at 410*a*.

Shock absorber 376 includes a gas shock portion 420 having a gas canister at 422 together with an over spring at 424. Shock 376 includes an upper coupler 430 having an aperture at 430*a* and a lower coupler 432 having an aperture at 432*a*.

Wheel spindle 378 includes an upper coupler at 440 having an aperture at 440*a* and a lower coupler 442 having an aperture at 442*a*.

It should be appreciated that couplers 386, 388 couple with brackets 216, 214, respectively, as best shown in FIG. 24. Fasteners are received through apertures 386*a*, 216*c*; and 388*a*, 214*c*. It should also be appreciated that upper control arm 374 is coupled to frame 20 by positioning couplers 408, 406 in brackets 210, 212 and by positioning fasteners through respective apertures 210*c*, 408*a*; and 212*c*, 406*a*. Wheel spindle 378 is thereafter coupled to upper and lower control arms 374, 372 by way of fasteners through apertures 410*a*, 440*a*; and 390*a*, 442*a*. Finally, shock absorber is coupled to frame by positioning a fastener through apertures 218*c* (FIG. 24), 430*a*, and through 392*a*, 432*a*.

As shown best in FIG. 24, upper control arm 374 is substantially narrower than lower control arm 372. In fact, the linear distance between a center of couplers 406-408, is approximately one-half the same distance between couplers 386-388. Thus, the narrowed width of upper control arm 374 allows shock absorber 376 to be attached to lower control arm 372 rather than upper control arm 374. Also the shock mount brackets 218 are positioned high in the frame 20. This allows shock absorber 376 to be substantially longer than shock absorbers on prior vehicles and has an increased shock stroke length. In the embodiment shown, the shock 376 is a 3-inch internal bypass shock available from Fox Shox.

Figure 26:
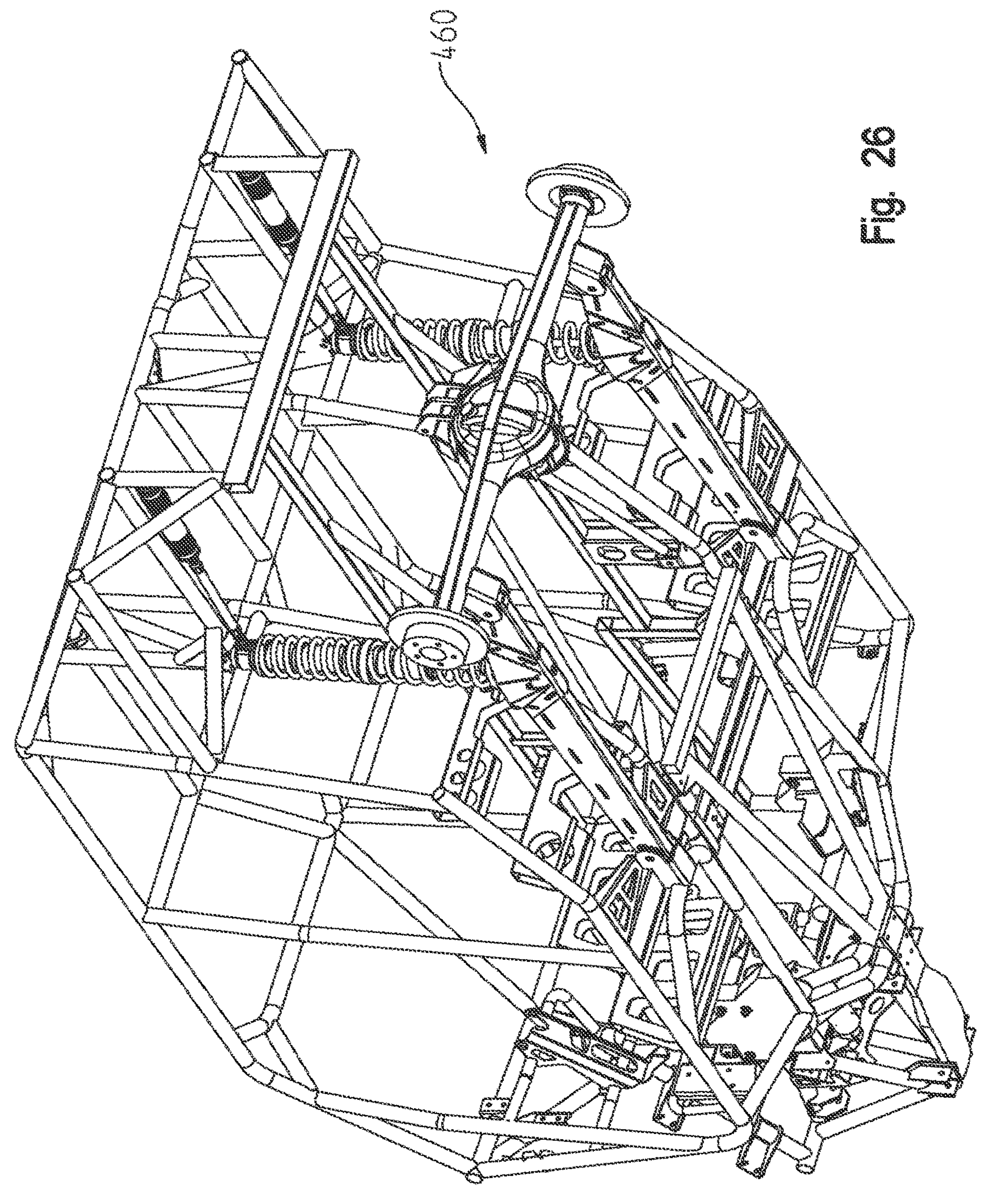
FIG. 26 is a rear perspective view of a rear suspension.
Figure 27:
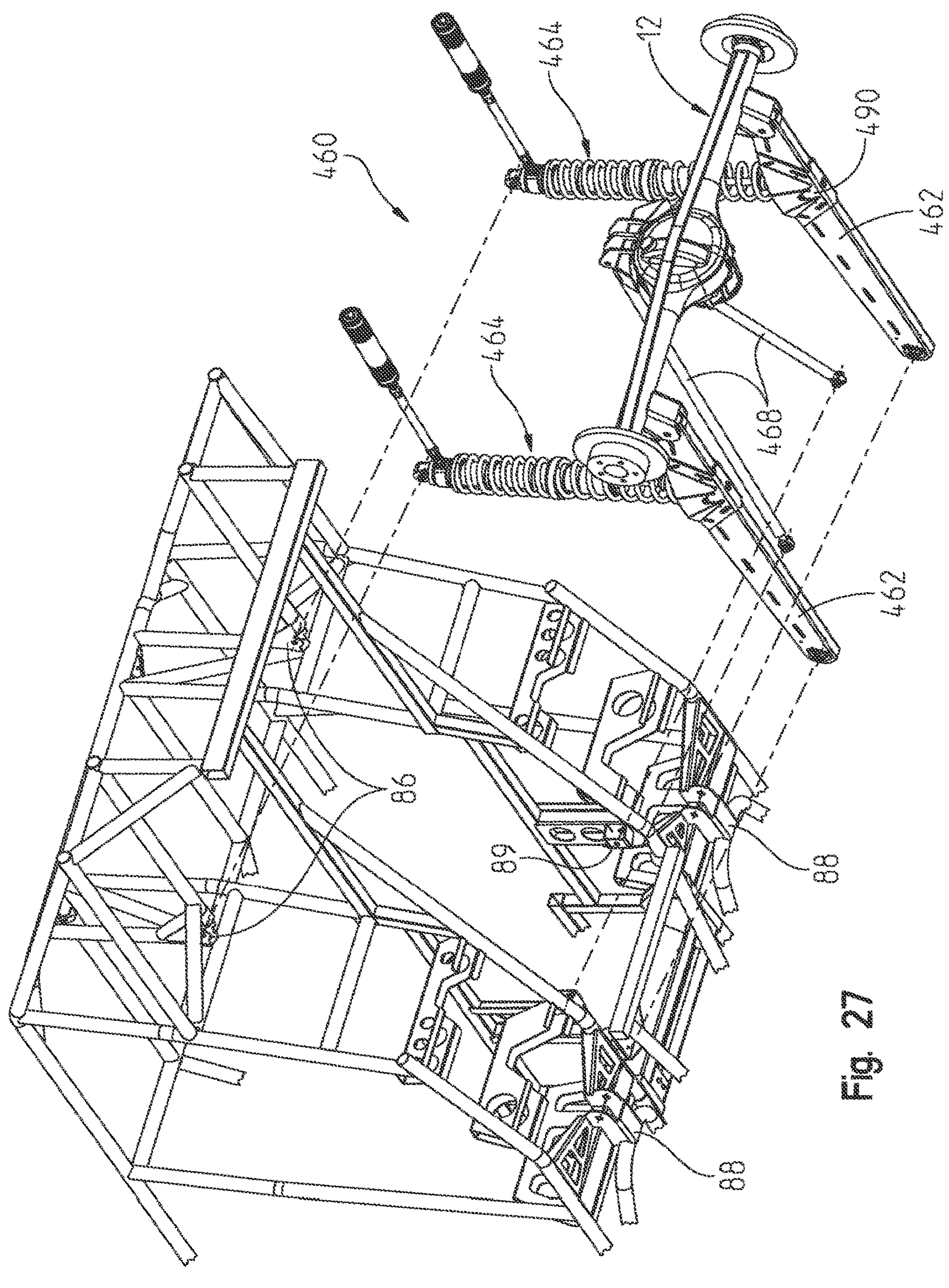
FIG. 27 is a view of the rear suspension system exploded away from the frame.
Figure 28:
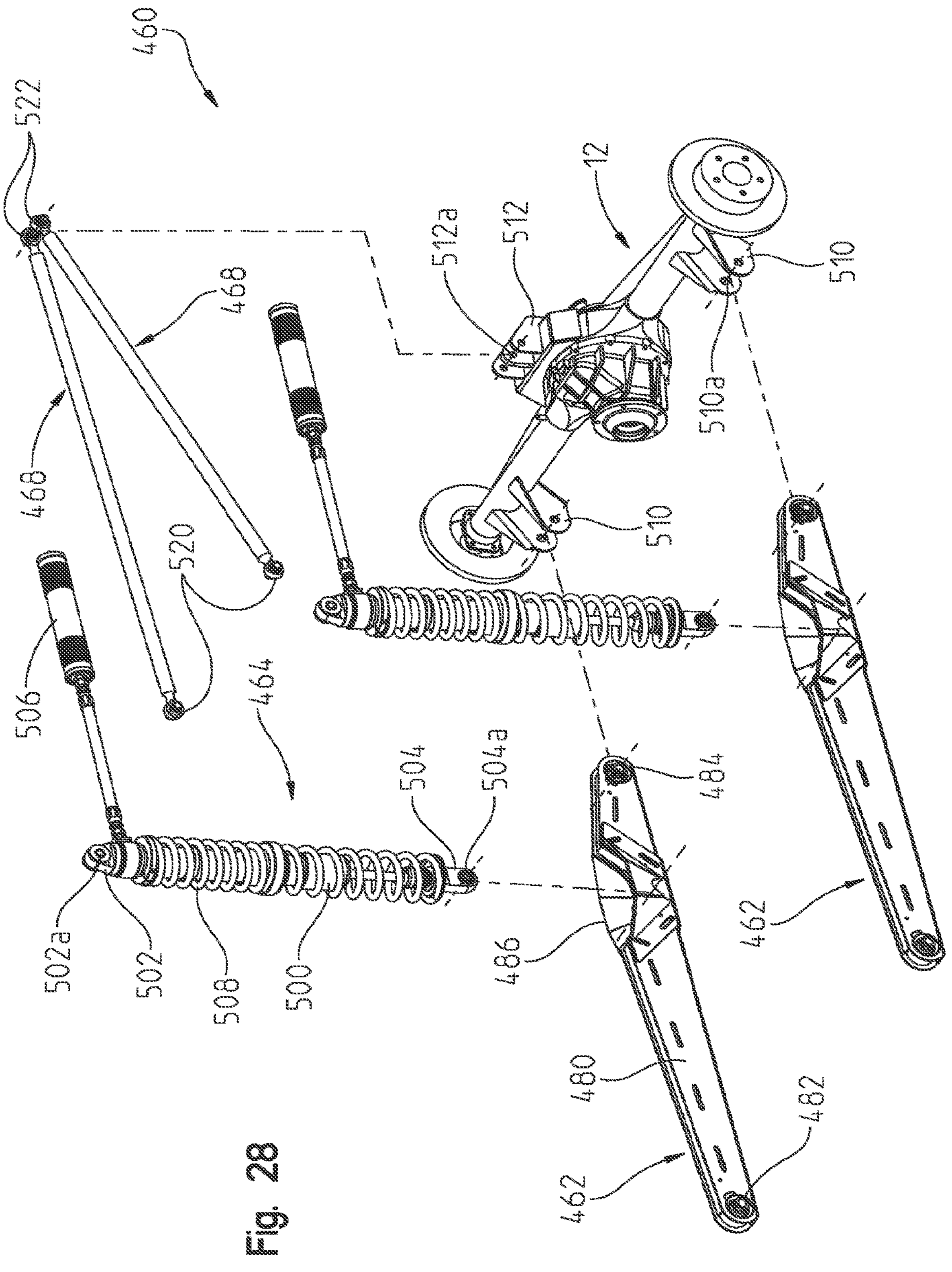
FIG. 28 is an exploded view of the rear suspension system.

With reference now to FIGS. 26-28, rear suspension 460 will be described in greater detail. As shown best in FIGS. 27 and 28, rear suspension 460 generally includes rear trailing arms 462, shock absorbers 464, and rear alignment arms 468 coupled to rear axle 12. As shown in FIG. 28, trailing arms 462 include elongate arm portions 480 having a front coupler 482 and rear coupler 484. Trailing arm 462 further includes a funnel-shaped receiving area 486 having an internal connecting point 490 (FIG. 27).

Shock absorbers 464 are similar to front shock absorbers and include a gas shock portion 500 having an upper coupler 502 with mounting aperture 502*a*, and a lower coupler 504 having a mounting aperture 504*a*. Shock 464 further includes a gas canister 506 and an overspring at 508.

Rear axle 12 includes a first set of brackets 510 having mounting apertures 510*a* and a second set of brackets 512 having mounting apertures at 512*a*. Rear control arms 468 include front couplers 520 and rear couplers 522.

Figure 28A:
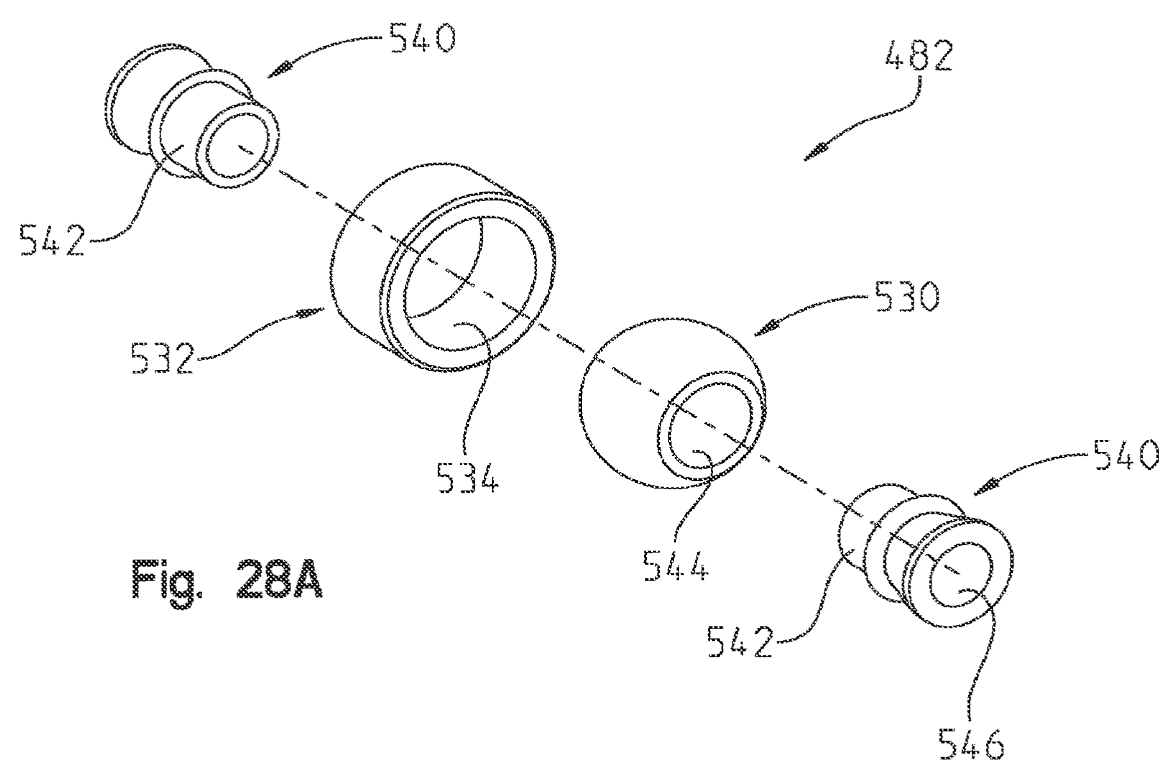
FIG. 28A is an exploded view of a first bearing assembly of the rear suspension system of FIG. 28.

With reference now to FIG. 28A, the front coupler and rear couplers 482, 484 will be described in greater detail. Front coupler 482 is comprised of a ball joint portion 530 which is profiled for receipt within a ball race 532, where the race 532 includes an interior spherical surface 534 matching a spherical profile of ball 530. Front coupler 482 further includes a mounting insert 540 having a cylindrical surface 542 receivable within aperture 544 of ball 530. Inserts 540 include apertures 546. Rear coupler 484 is substantially similar to front couplers 482.

Figure 28B:
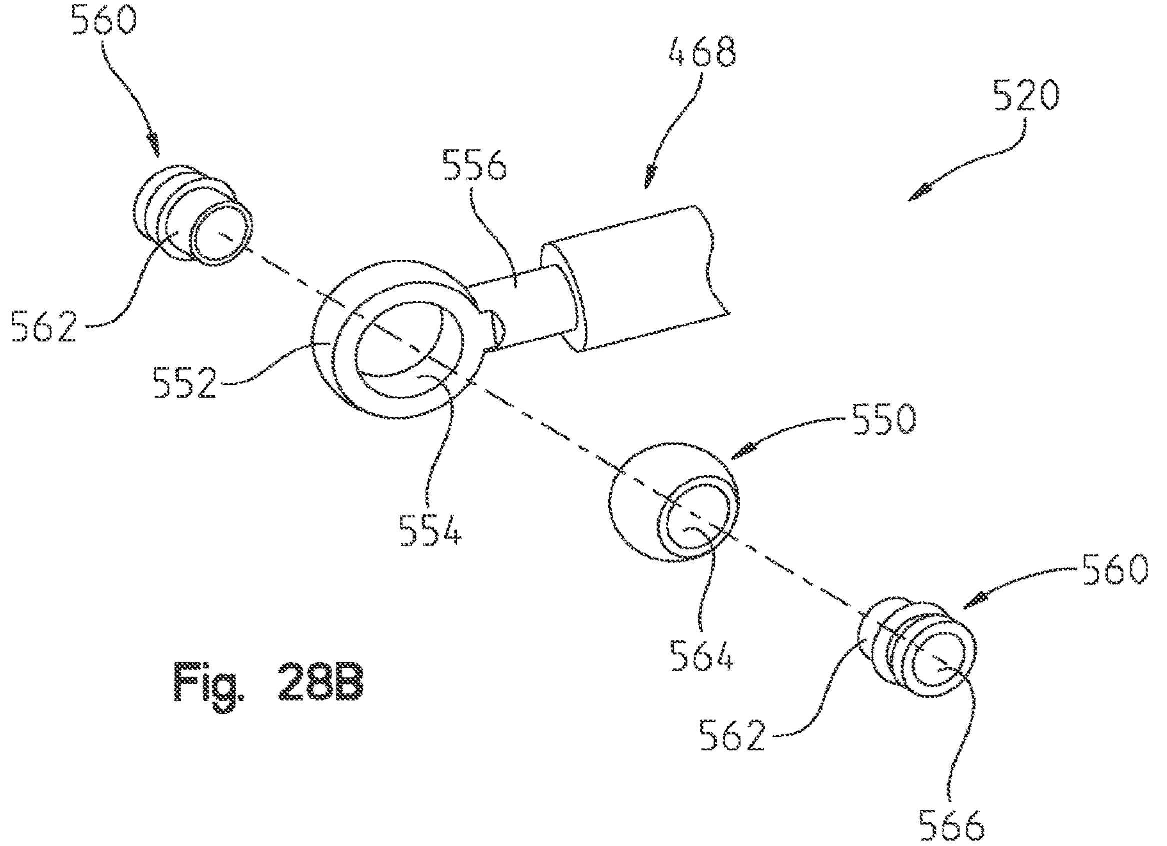
FIG. 28B is an exploded view of a second bearing assembly of the rear suspension system of FIG. 28.

With reference now to FIG. 28B, the front coupler and rear couplers 520, 522 will be described in greater detail. Coupler 520 is comprised of a ball joint portion 550 which is profiled for receipt within a ball race 552, where the race 552 includes an interior spherical surface 554 matching a spherical profile of ball 550. In this case, race 552 is profiled like a tie rod having a threaded end 556, so as to allow the overall length of the rear alignment arm to be adjustable. Coupler 520 further includes a mounting insert 560 having a cylindrical surface 562 receivable within aperture 564 of ball 550. Inserts 560 include apertures 566.

Thus, it should be appreciated that trailing arms 462 may be attached to frame 20 by way of connection of ball joints 482 with couplers 88 and by way of couplers 484 with brackets 510. Alternatively, trailing arms 462 may be attached to frame 20 with polymeric bushings. Rear alignment arms 468 are also attached to frame 20 by way of couplers 520 attached to brackets 89 (FIG. 27) and with couplers 522 coupled to brackets 512 on axle 12. Top coupler 502 of shock absorber 500 is then attached to bracket 86 on frame 20 (FIG. 27) and lower couplers 504 of shock absorber 464 is connected to connection point 490 (FIG. 27) of trailing arms 462. In the embodiment shown, the shock 376 is a 3-inch internal bypass shock available from Fox Shox.

Figure 29:
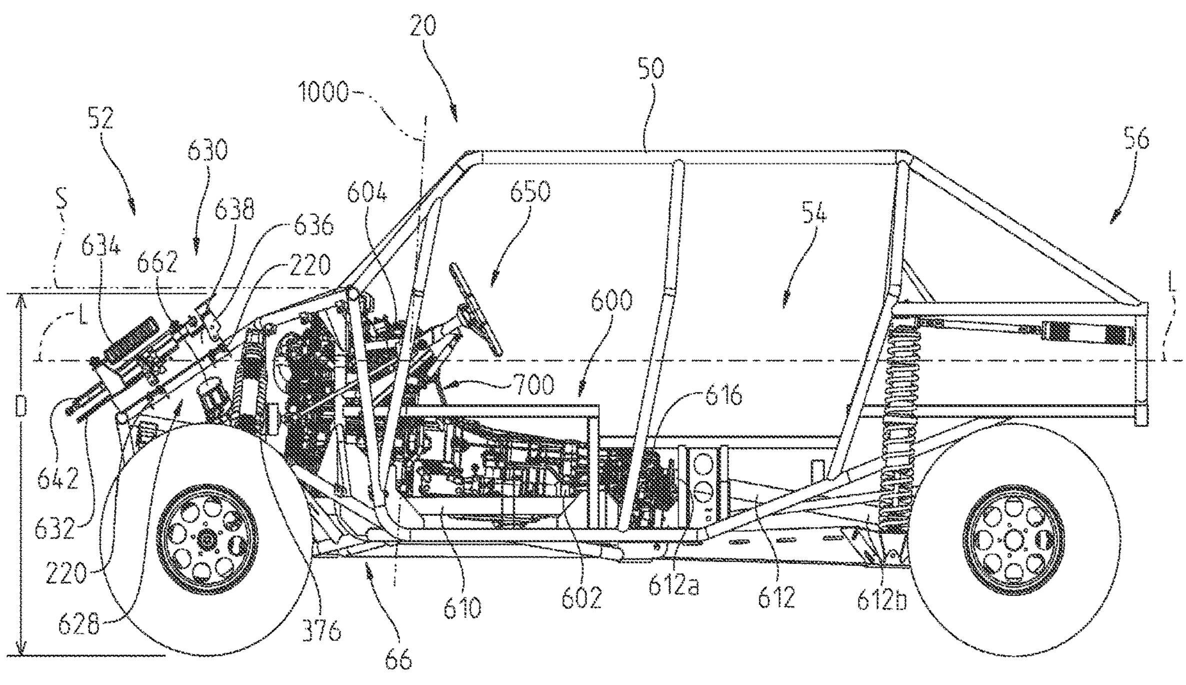
FIG. 29 is a side view of the frame, a drivetrain assembly, a cooling assembly, and a steering assembly of the vehicle of FIG. 1.
Figure 30:
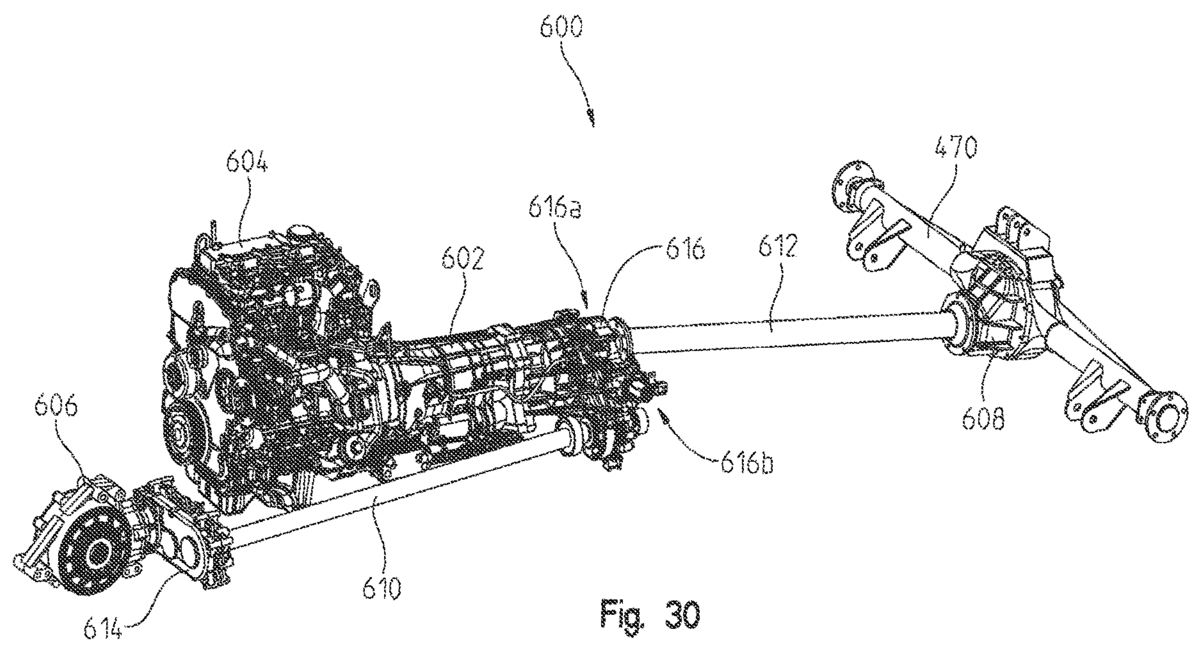
FIG. 30 is a front perspective view of the drivetrain assembly of FIG. 29.

Referring to FIGS. 29 and 30, frame 20 further supports a drivetrain assembly 600, a cooling assembly 630, a steering assembly 650, and a brake assembly 700. Drivetrain assembly 600 is generally positioned at the centerline of vehicle 2 along a longitudinal axis L and extends from front section 52 to rear section 56. Drivetrain assembly 600 illustratively includes a transmission 602, an engine 604, a front final drive 606, a rear final drive 608, a front drive shaft 610, a rear drive shaft 612, a front transfer case 614, and a rear transfer case 616. Final drives 606, 608 may be in the form of differentials. Drivetrain assembly 600 also may include a turbocharger operably coupled to engine 604. In operation, engine 604 is operably coupled to transmission 602 at interface 1000 in order to drive front wheels 6 via front drive shaft 610 and rear wheels 10 via rear drive shaft 612.

Illustrative transmission 602 is rearward of engine 602 at interface 1000. Transmission 602 is positioned at midsection 54 of frame 20 between front seats 44 of operator area 30 and may be coupled to a cross-member 590 (FIG. 6). Cross-member 590 may be coupled to frame 20 and transmission 602 with conventional fasteners (not shown), such as bolts, welds, and/or rivets. Illustratively, cross-member 590 is removable in order to facilitate assembly of transmission 602 with frame 20. Transmission 602 may be an automatic transmission or, alternatively, may be another type of transmission, for example a sequential transmission having a manual shift lever, an electric shift lever, or paddle levers.

Engine 604 is operably coupled to transmission 602 forward of interface 1000 and is a front-mid engine, i.e., engine 604 is supported between front section 52 and midsection 54 of frame 20. As shown in FIG. 29, engine 602 is positioned within operator area 30 and extends upwardly from the footwell area for the operator and passenger. Additionally, engine 602 is forward of steering wheel 36 and rearward of front suspension 370 and front axle 8, thereby allowing sufficient space for front suspension 370, a portion of steering assembly 650, and other components of vehicle 2, as is detailed further herein.

Brackets 252 support engine 604 on frame 20 at engine mount section 66. As shown in FIG. 19, engine 604 is supported on support plate 252*c* of bracket 252 through conventional coupling means, such as bolts, welds, or rivets. For example, a bolt (not shown) may be received through aperture 252*d* of support plate 252*c* in order to couple engine 604 to frame 20. Rubber bushings (not shown) also may be used to mount engine 604 to engine mount section 66.

Engine 604 is positioned between frame tubes 104 and removable section 80 (FIG. 6). Removable section 80 supports engine 604 at engine mount section 66, however, section 80 may be removed in order to install engine 604 through the bottom of frame 20, rather than from above frame 20. The position of engine 604 may be adjusted to accommodate various cargo loads and uniformly distribute the weight of vehicle 2. Engine 604 contributes to the weight load near the front of vehicle 2 such that the weight distribution of vehicle 2 may be biased towards the front. However, by positioning engine 604 in a front-mid position, the cargo space at the rear of vehicle 2 is increased, which contributes to a uniform weight distribution for vehicle 2.

Engine 604 also is assembled with an air intake assembly, including an airbox 624, in order to operate engine 604. Airbox 624 is illustratively supported by front section 52 of frame 20 along a passenger side of vehicle 2.

As shown in FIG. 30, engine 604 is operably coupled to rear final drive 608 through transmission 602 and rear drive shaft 612. Rear final drive 608 is supported on rear axle 470 and drive rear wheels 10 according to an output from transmission 602. Rear drive shaft 612 generally extends in the direction of longitudinal axis L of vehicle 2 (see FIG. 6). Also, as best shown in FIG. 29, rear drive shaft 612 extends at a generally downward angle toward rear final drive 608, such that a front portion 612*a* of rear drive shaft 612 is elevated relative a rear portion 612*b* of rear drive shaft 612.

Referring to FIG. 30, rear transfer case 616 is operably coupled to front portion 612*a* of rear drive shaft 612 and transmission 602. In particular, rear transfer case 616 is positioned intermediate transmission 602 and rear drive shaft 612 and operably couples rear drive shaft 612 to front drive shaft 610. Rear transfer case 616 allows front drive shaft 610 to be off-center, i.e., laterally spaced apart from longitudinal axis L of vehicle 2 and rear drive shaft 612. Rear drive shaft 612 is perpendicular to an inner end 616*a* of rear transfer case 616, and front drive shaft 610 is perpendicular to an outer end 616*b* of rear transfer case 616. Illustrative vehicle 2 may be configured for four-wheel drive operation and, as such, rear transfer case 616 allows output from transmission 602 to drive both front and rear drive shafts 610, 612, as is detailed further herein.

Front drive shaft 610 extends between rear transfer case 616 and front transfer case 614. Front transfer case 614 includes an input shaft 618 for engaging front drive shaft 610. Input shaft 618 may be splined to engage with front drive shaft 610. Illustratively, as shown in FIGS. 6 and 30, front drive shaft 610 is positioned below the operator seat, rather than along longitudinal axis L. In other words, front drive shaft 610 is off-center.

Figure 31:
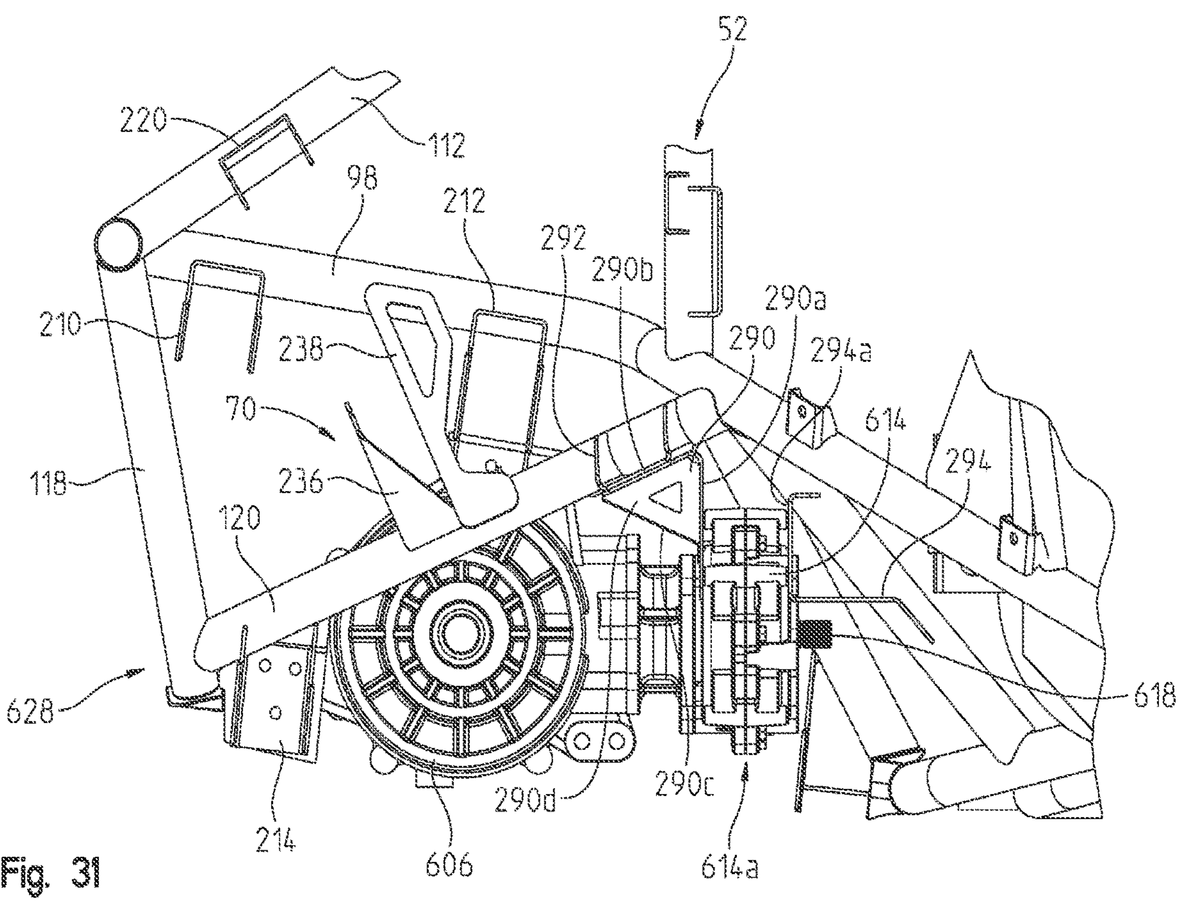
FIG. 31 is a side view of a front final drive of the drivetrain assembly of FIG. 30 coupled to the frame.
Figure 32:
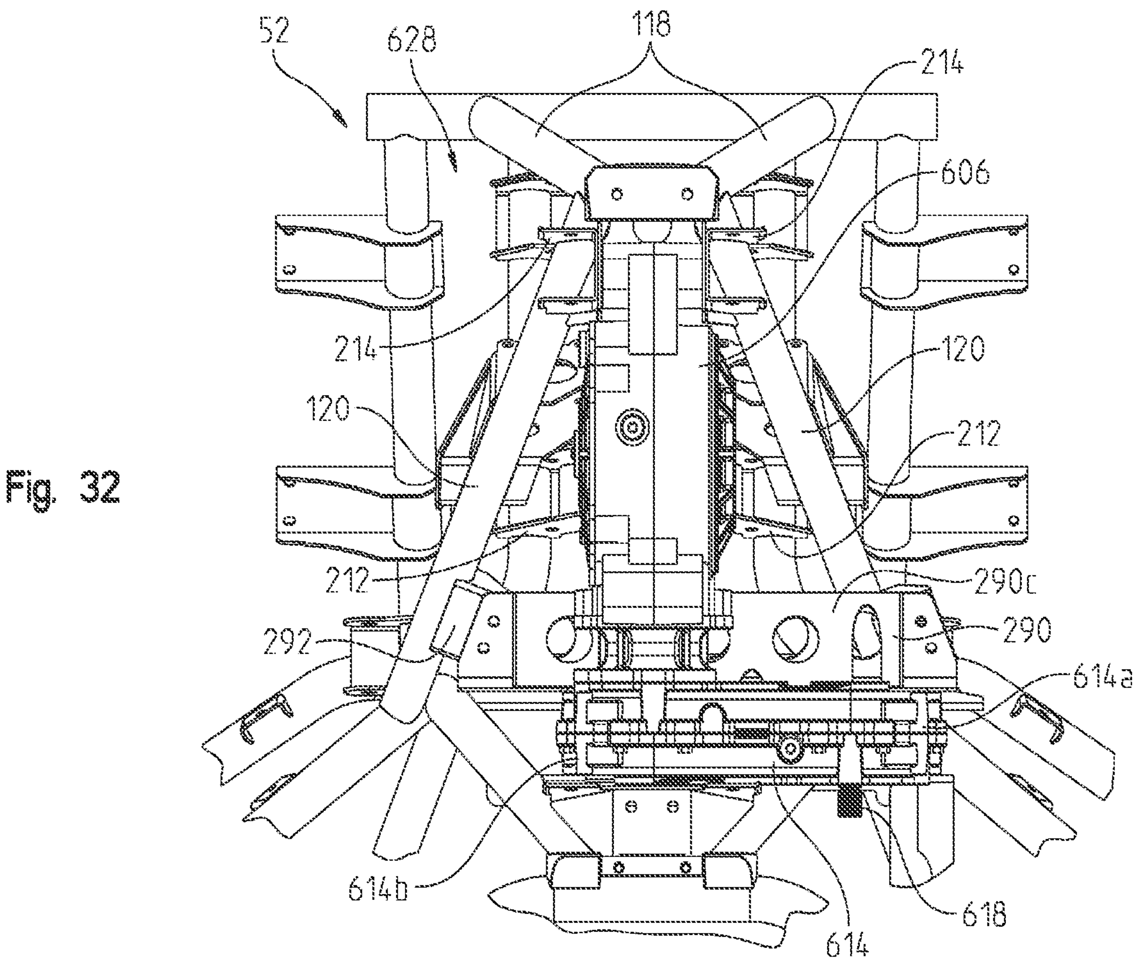
FIG. 32 is a bottom elevational view of the front final drive of the drivetrain assembly coupled to the frame.
Figure 33:
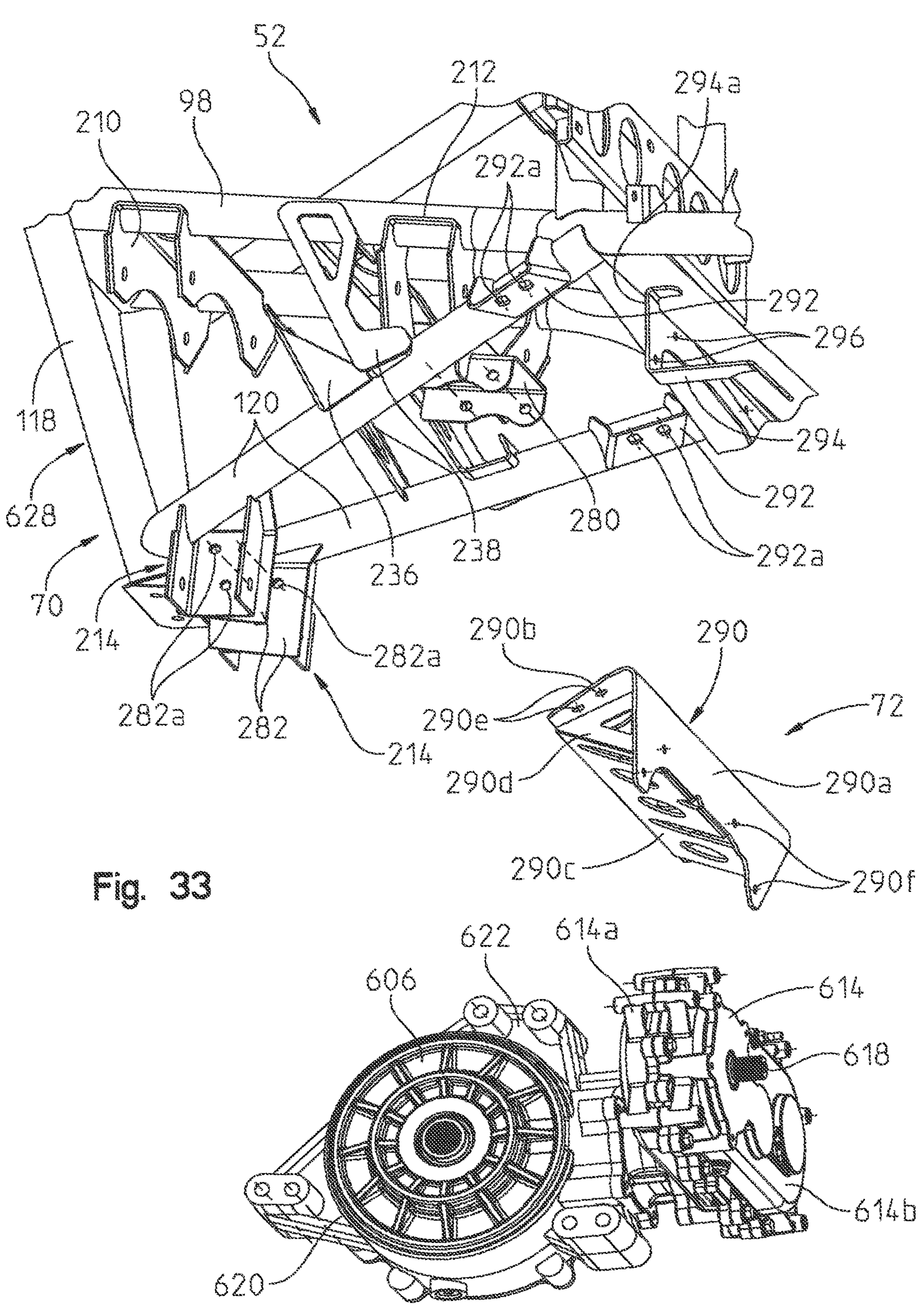
FIG. 33 is an exploded view of the frame and the front final drive of FIG. 30.

Referring to FIGS. 31-33, front transfer case 614 is supported on front section 52 of frame 20 by front transfer case mount 72 and is positioned intermediate engine 604 and front final drive 606. Front transfer case 614 is generally perpendicular to front drive shaft 610, front final drive 606, and longitudinal axis L of vehicle 2. Front transfer case 614 includes an outer end 614*a* and an inner end 614*b*. Outer end 614*a* extends laterally outward in a generally perpendicular direction from longitudinal axis L of vehicle 2 and, more particularly, extends toward an operator side of vehicle 2 in order to engage input shaft 618 with front drive shaft 610. Inner end 614*b* is positioned along longitudinal axis L in order to engage with front final drive 606, which also is positioned along longitudinal axis L. As such, front transfer case 614 transfers power from front drive shaft 610 to front final drive 606 in order to drive front wheels 6.

Front transfer case 614 is coupled to rear wall 290*a* of bracket 290 with conventional fasteners (not shown), which are received through apertures 290*f*. Additionally, front transfer case 614 is coupled to a bracket 294, and in particular to a front wall 294*a* of bracket 294, with conventional fasteners (not shown), which are received through apertures 296. Front transfer case 614 extends downwardly from front section 52 of frame 20 and is generally suspended from brackets 290, 294.

Front final drive 606 is positioned forward of front transfer case 614 and is coupled to front section 52 of frame 20 by front final drive mount 70. Portion 310 also may support front final drive 606 and may be removed from frame 20 when drivetrain assembly 600 is assembled with frame 20. As shown in FIG. 33, an upper mounting portion 622 of front final drive 606 is coupled to brackets 212, 280 with conventional fasteners (not shown). A lower mounting portion 620 of front final drive 606 is coupled to an inner surface of plate portion 282 of lower brackets 214 with conventional fasteners (not shown), which are received through apertures 282*a*. Additionally, an outer portion of plate portion 282 is coupled with lower control arms 372 of front suspension 370, thereby maximizing the coupling surfaces of lower brackets 214.

Front final drive 606 generally extends along longitudinal axis L of vehicle 2. As such, front final drive 606 is aligned with inner end 614*b* of front transfer case 614, rather than outer end 614*a* of front transfer case 614. As shown best in FIG. 30, front final drive 606 is not aligned with front drive shaft 610. Front final drive 606 is operably coupled to front drive shaft 610 via front transfer case 614. In addition to driving front wheels 6, front final drive 606 may assist with suspension travel of front suspension 370 and increase stability and control of the movement of wheel 6.

As detailed above, lower brackets 214 are coupled to both front final drive 606 and lower control arms 372 of front suspension 370. Front final drive extends below lower brackets 214 and, as such, extends below a generally horizontal plane defined by lower control arms 372. In general, front suspension 370 is positioned around front final drive 606 such that front suspension 370 defines an envelope 628 for supporting various components of vehicle 2 on frame 20. Front final drive 606 is positioned within an opening defined by lower control arms 372 (see FIG. 6). Portion 310 may be positioned below front final drive 606 in order to cover and protect front final drive 606.

Front and rear final drives 606, 608 may be selectively locking final drives configured for at least approximately 7,000 lb-ft of torque. Illustratively, front final drive 606 is a locking final drive available from The Hilliard Corporation of Elmira, New York. Additionally, rear final drive 608 also may be a locking final drive available from The Hilliard Corporation of Elmira, New York. The configuration of frame 20 and final drive mount 70 allows other types of front final drives to be used for vehicle 2, such as positive traction final drives, limited-slip final drives, open final drives, automatic torque biasing final drives, high-friction final drives, and other embodiments thereof. Because vehicle 2 is able to support various types of final drives, drivetrain assembly 600 may be selectively customized to operator needs and preferences. Other components of drivetrain assembly 600 also may be interchanged to allow for additional customization of vehicle 2.

During operation of drivetrain assembly 600 in two-wheel drive mode, engine 604 and transmission 602 operate according to user inputs, such as a user input on first foot pedal 38. The output from transmission 602 is transmitted to rear drive shaft 612 in order to operate rear final drive 608 and drive rear wheels 10. Rear drive shaft 612 also drives front drive shaft 610. Alternatively, when four-wheel drive mode is selected by the user from operator controls 34, the output of transmission 602 is transmitted to both front and rear drive shafts 610, 612 via rear transfer case 616. As such, both front and rear drive shafts 610, 612 drive the operation of the respective front and rear final drives 606, 608 and front and rear wheels 6, 10. Front transfer case 614 is engaged in order to operably align the output from front drive shaft 610 with the input of front final drive 606. Vehicle 2 may be configured with selective drive modes, such as all-wheel drive, two-wheel drive, four-wheel drive, and others. Alternatively, vehicle 2 may automatically change the drive mode or may continuously operate in one particular mode.

Figure 33A:
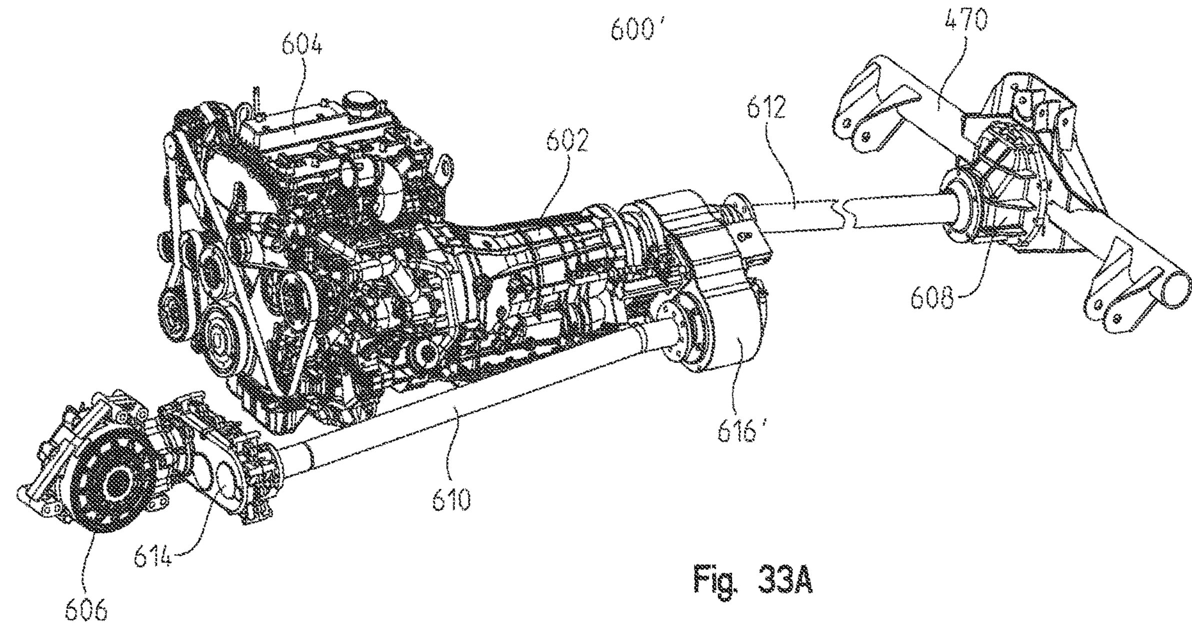
FIG. 33A is a front perspective view of an alternative embodiment of the drivetrain assembly of FIG. 30.

An alternative embodiment of drivetrain assembly 600 is shown as drivetrain assembly 600' in FIG. 33A. Drivetrain assembly 600' includes transmission 602, engine 604, front final drive 606, rear final drive 608, rear drive shaft 612, front drive shaft 610, front transfer case 614, and rear transfer case 616'. Rear transfer case 616' allows vehicle 1200 to be in the neutral gear position. Furthermore, rear transfer case 616' allows front drive shaft 610 to rotate during forward and reverse operation of vehicle 1200, such that the rotational speed of rear drive shaft 612 is approximately the same as the rotational speed of front drive shaft 610. As such, the rotational speed of rear drive shaft 612 generally matches that of front drive shaft 610 in order to easily engage vehicle 1200 in a four-wheel drive mode. It may be appreciated, however, that when vehicle 1200 is in neutral, front drive shaft 610 may not rotate.

Figure 34:
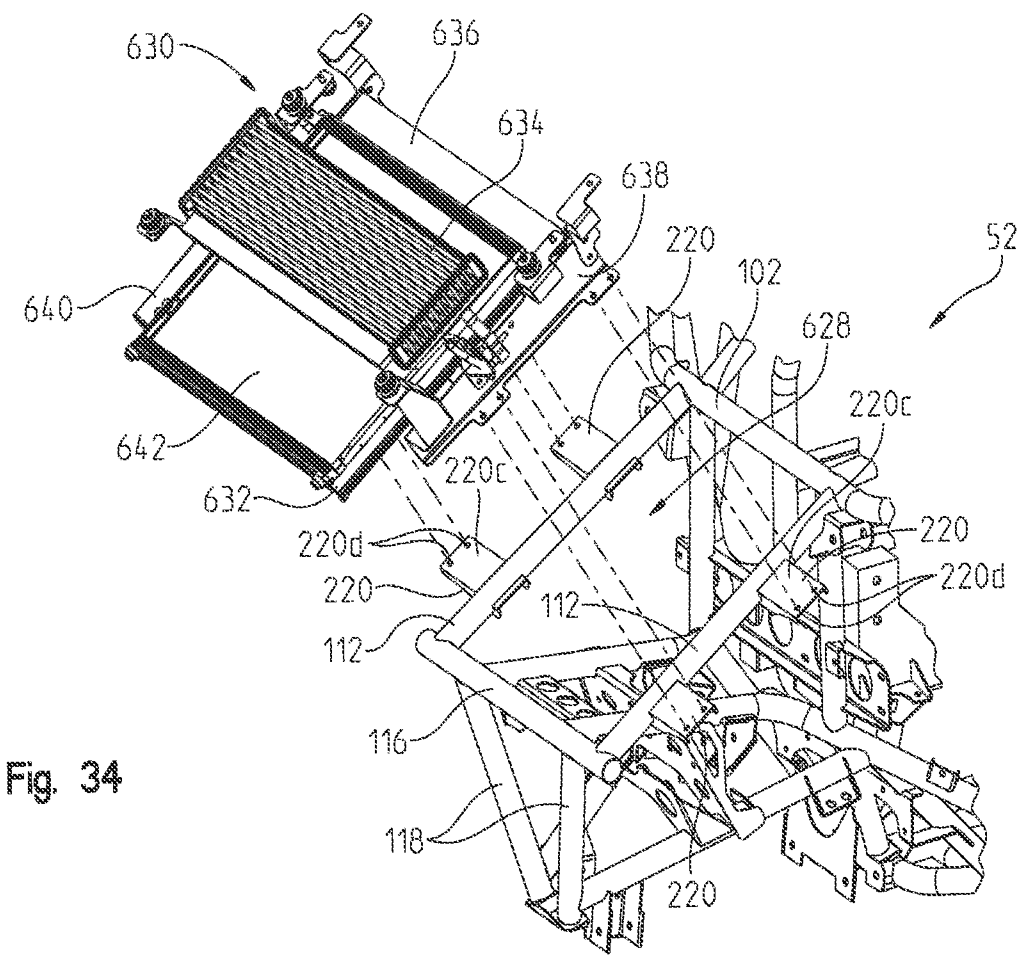
FIG. 34 is an exploded view of a front section of the frame and the cooling assembly of FIG. 29.

Frame 20 also supports a cooling assembly 630 to control the temperature of engine 604. Cooling assembly 630 also may control the temperature of other components of vehicle 2. As shown in FIGS. 29 and 34, cooling assembly 630 includes a first heat exchanger, illustratively a radiator 632, a second heat exchanger, illustratively an intercooler 634 for the turbocharger, an air conditioning condenser 642 of the HVAC system, a cooling assembly frame 636 having side panels 638 and 640, and at least one fan (not shown). In one embodiment, cooling assembly 630 includes two fans in a side-by-side arrangement, i.e., both fans are adjacent the rear surface of radiator 632. Illustrative air conditioning condenser 642 is intermediate turbocharger intercooler 634 and radiator 632, and more particularly, is positioned rearward of turbocharger intercooler 634 and forward of radiator 632.

Cooling assembly frame 636 supports radiator 632, turbocharger intercooler 634, air conditioning condenser 642, and the fans on front section 52 of frame 20. In particular, as shown in FIG. 34, side panels 638, 640 of frame 636 couple with top face 220*c* of brackets 220. Conventional fasteners (not shown) extend through apertures in side panels 638, 640 and apertures 220*d* of bracket 220 in order to support cooling assembly 630 on frame 20. Frame 636 may be configured as a shroud generally surrounding radiator 632.

Referring to FIG. 29, cooling assembly 630 is coupled to the top surface of frame tubes 112. In particular, an uppermost portion of frame 636 is a vertical distance D from the ground and is positioned above engine 604. Illustratively, distance D may be approximately 45-55 inches from the ground, and more particularly, may be approximately 51.5 inches from the ground. Despite being positioned above front section 52 of frame 20, cooling assembly 630 is positioned below a line of sight S of the operator and passenger and, therefore, does not cause the hood of vehicle body 22 to interfere with line of sight S.

Also, because cooling assembly 630 is coupled to the top of frame tubes 112, cooling assembly 630 is angled relative to longitudinal axis L. As such, the approach angle of the air flowing into cooling assembly 630 may be approximately 35 degrees. Cooling assembly 630 is positioned to receive sufficient air flow to control the temperature of engine 604. Alternatively, cooling assembly 630 also may be angled such that the approach angle of the air is less than approximately 35 degrees, or may be between approximately 35 degrees and 90 degrees. Other embodiments of cooling assembly 630 may include ducting or a baffle assembly to further control the approach angle and the air flow through turbocharger intercooler 634, air conditioning condenser 634, and radiator 632.

As is apparent from FIG. 29, cooling assembly 630 is positioned forward of, and generally above, front suspension 370. As such, cooling assembly 630 does not interfere with the suspension travel, and in particular the displacement of shock absorber 376. Additionally, cooling assembly is positioned generally forward of steering assembly 650 and extends above envelope 628. Cooling lines and tubes (not shown) may extend into envelope 628 at front section 52.

Air flowing into cooling assembly 630 and across radiator 632 is exhausted from cooling assembly 630 by the fans. The air from cooling assembly 630 may be directed towards the wheel well area in order to exit vehicle 2.

Figure 34A:
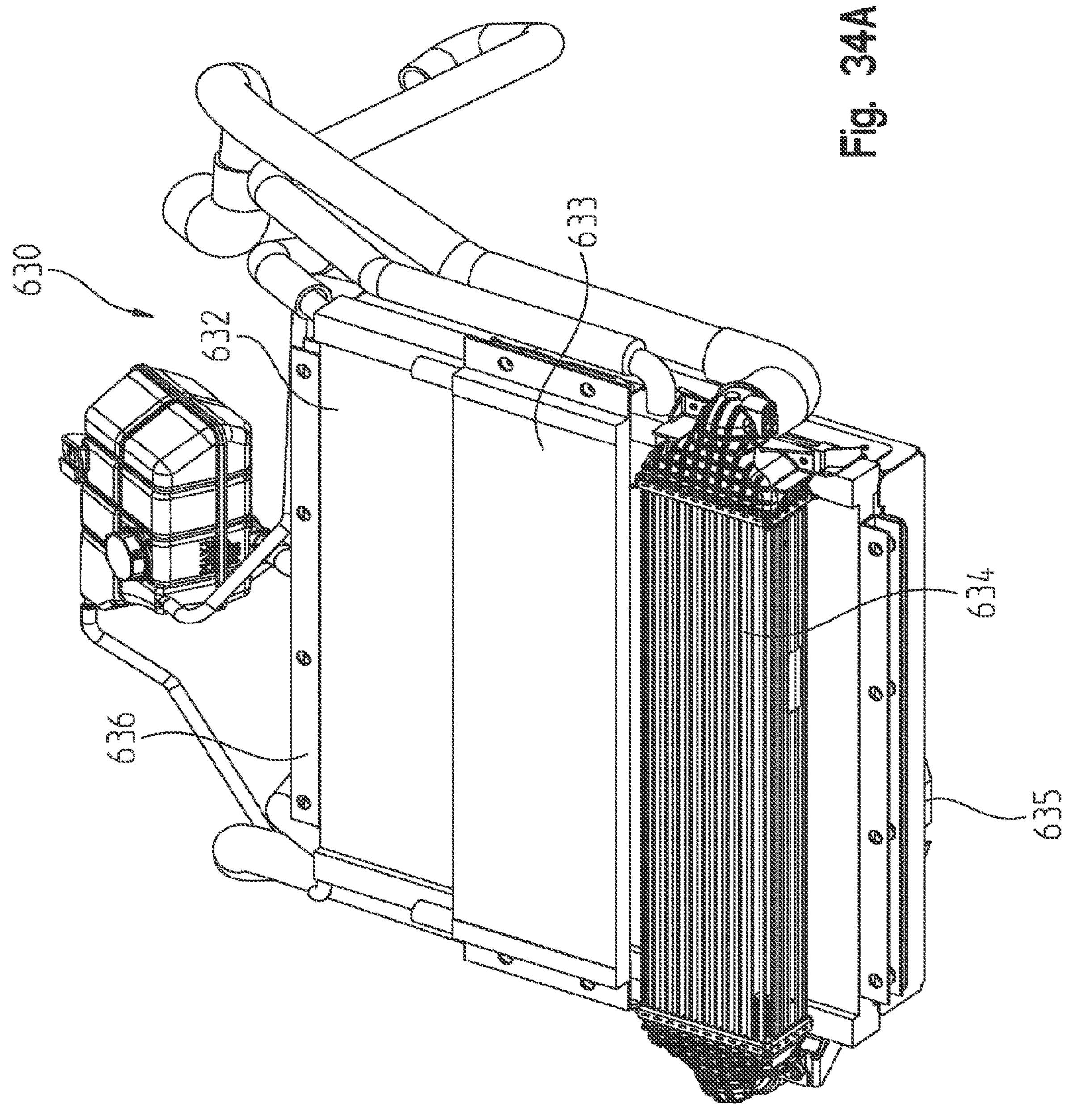
FIG. 34A is a front perspective view of an alternative embodiment of the cooling assembly of FIG. 34.
Figure 34B:
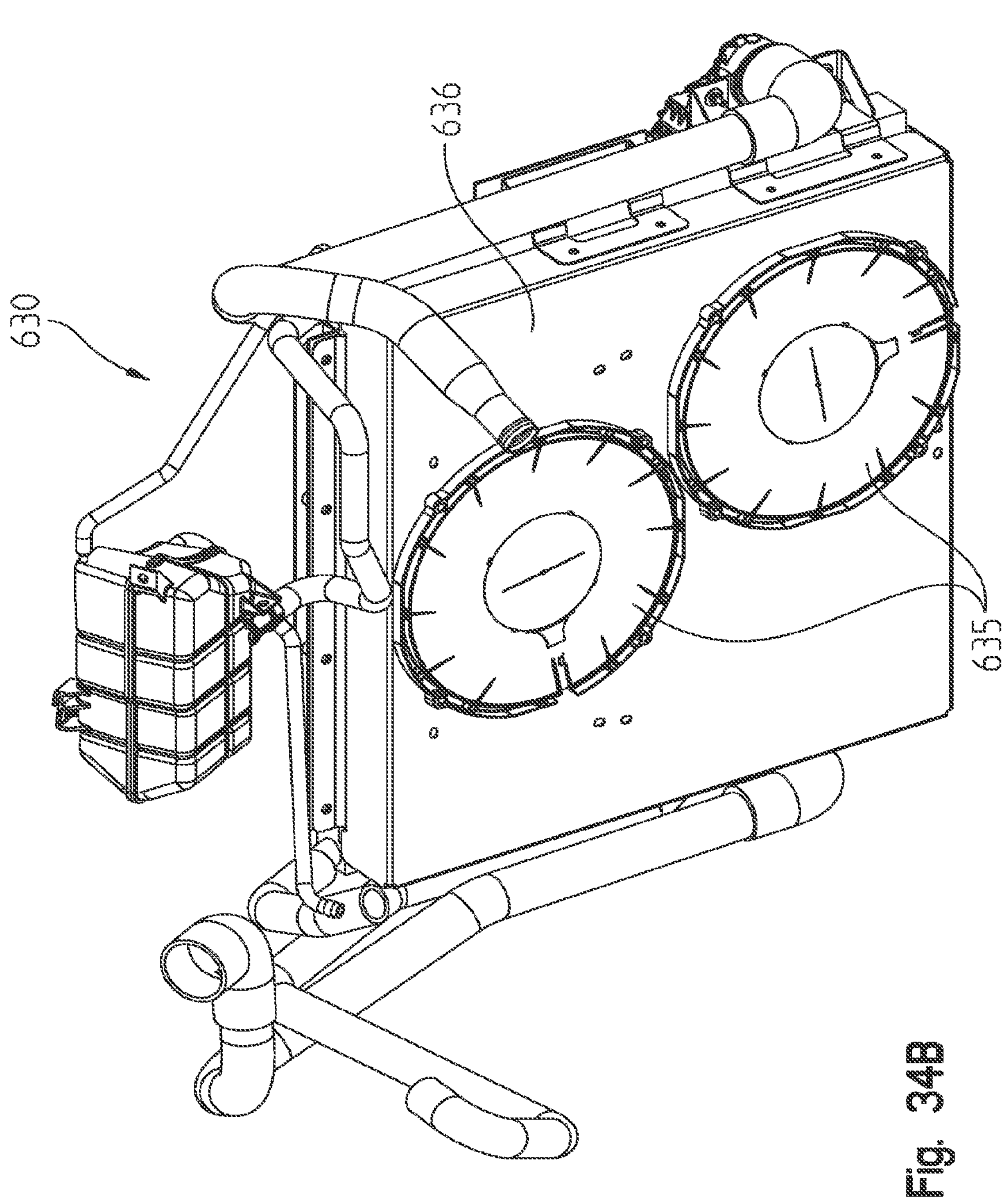
FIG. 34B is a rear perspective view of the alternative embodiment cooling assembly of FIG. 34A.

In one embodiment, as shown in FIG. 34A, cooling assembly 630 includes radiator 632, intercooler 634, and a transmission cooler 633. Illustratively, transmission cooler 633 is positioned above intercooler 634. Additionally, both intercooler 634 and transmission cooler 633 are positioned forward of radiator 632. Intercooler 634 and transmission cooler 633 may be supported by cooling assembly frame or shroud 636. As shown in FIG. 34B, cooling assembly frame 636 may also support at least one fan 635. Illustratively, cooling assembly frame 636 supports two fans 635 rearward of radiator 632. As such, fans 635 are integrally supported on cooling assembly 630. In one embodiment, fans are brushless fans with a high CFM capability.

Figure 35:
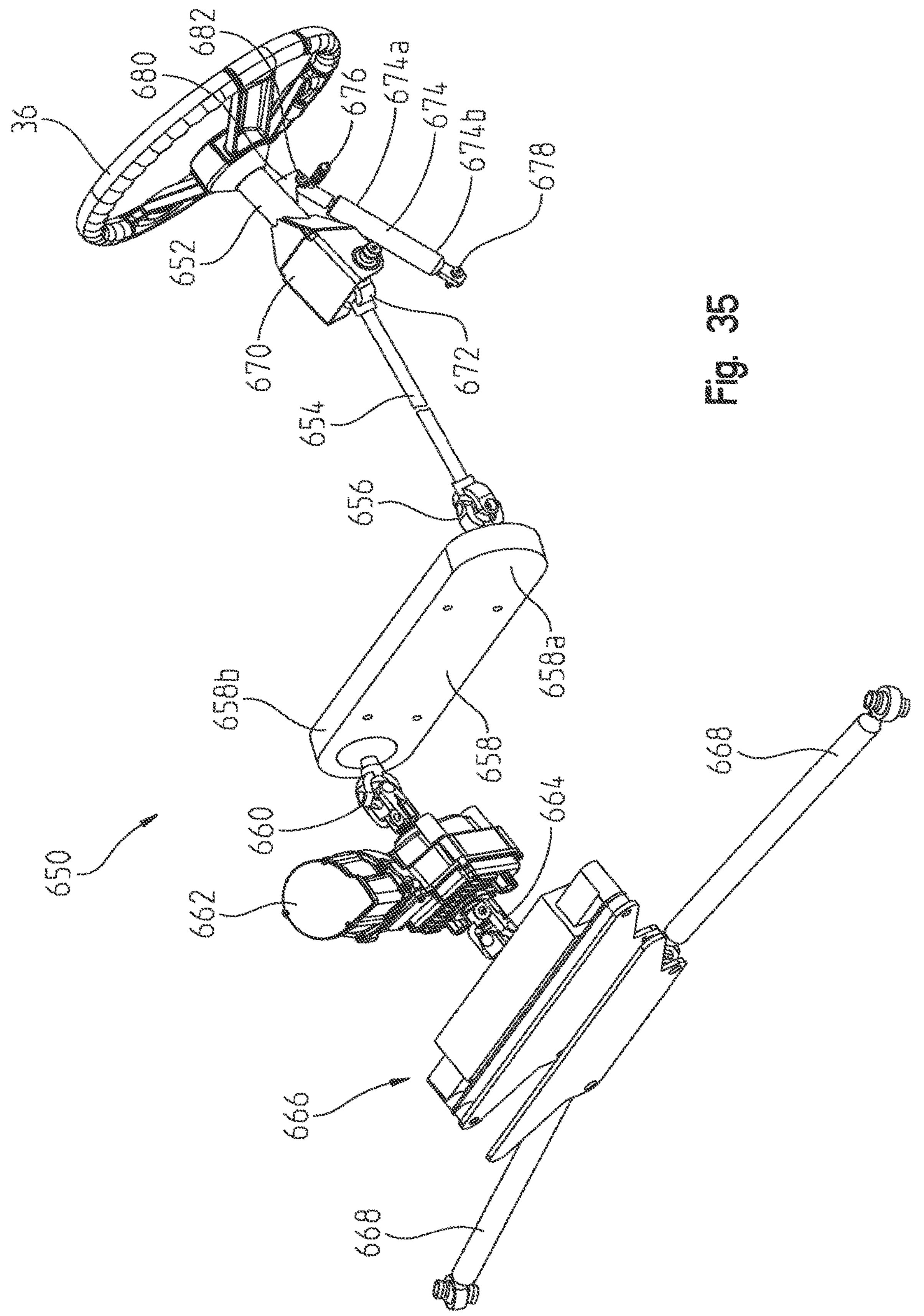
FIG. 35 is a front perspective view of the steering assembly of FIG. 29.

Referring now to FIGS. 35-38, steering assembly 650 extends between front section 52 and midsection 54 of frame 20. At least a portion of steering assembly 650 is positioned below cooling assembly 630, and at least a portion of steering assembly 650 is rearward of cooling assembly 630. Steering assembly 650 includes an operator control, illustratively a steering wheel 36, a steering column 652, a steering shaft 654, a steering transfer case 658 having an outer end **658*a* and an inner end 658*b*, a power assist unit, illustratively an electric power steering unit 662, a gearbox assembly 666, tie rods 668, and knuckles 290. Referring to FIG. 35, steering wheel 36 is operably coupled to steering column 652. Steering column 652 is rotatably coupled to steering shaft 654 via a joint 672, illustratively a U-joint. A torque sensor may be positioned within a housing 670 near a joint 672. Steering shaft 654 is coupled to steering transfer case 658 via a joint 656, illustratively a U-joint, in order to transfer the output of steering shaft 654 to power steering unit 662. Power steering unit 662 is operably coupled to transfer case 658 via a joint 660, and is operably coupled to gearbox assembly 666 via a joint 664. Joints 660 and 664 are illustratively U-joints. Gearbox assembly 666 is positioned forward of power steering unit 662 and is operably coupled to tie rods 668 in order to move front wheels 6**.

Figure 37:
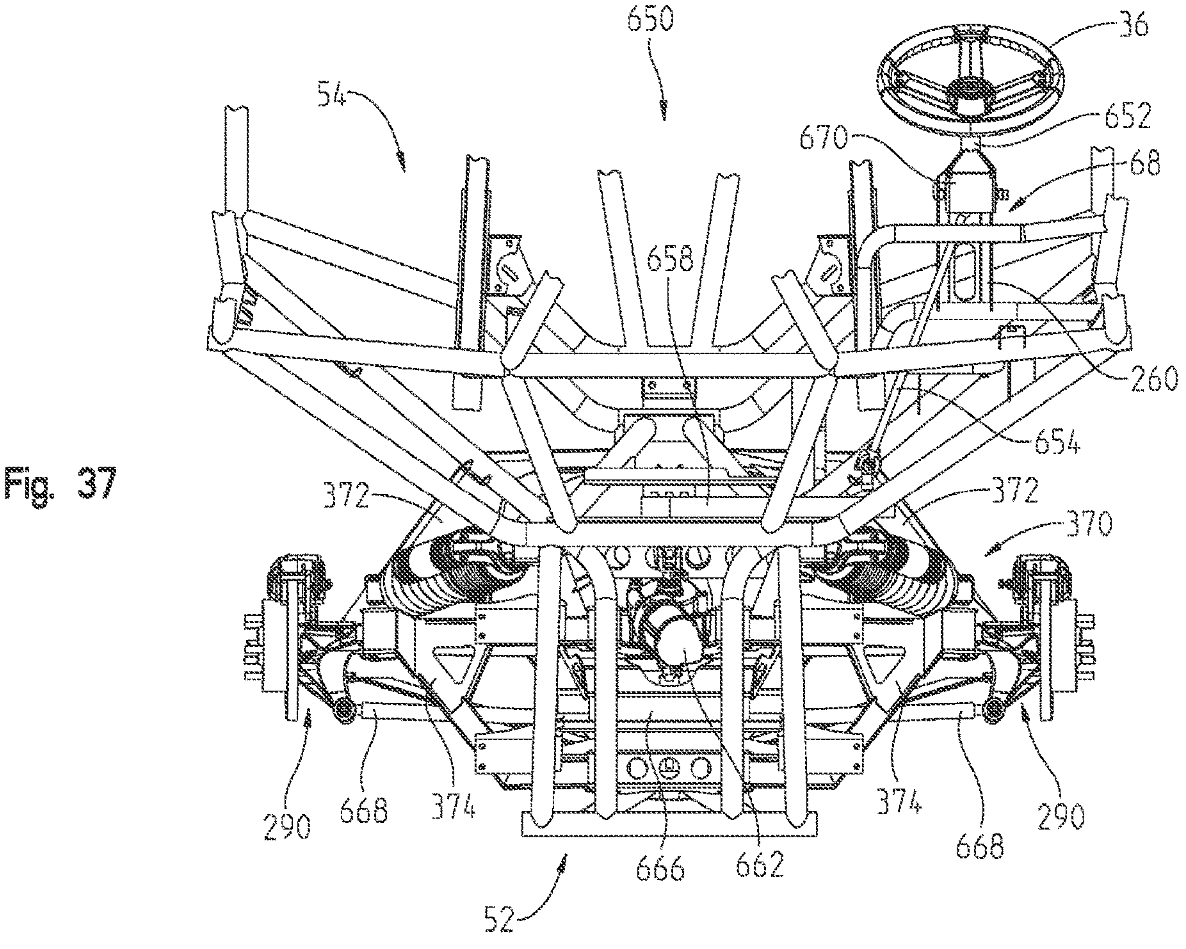
FIG. 37 is a top elevational view of the front end of the frame and the steering assembly of FIG. 36.
Figure 38:
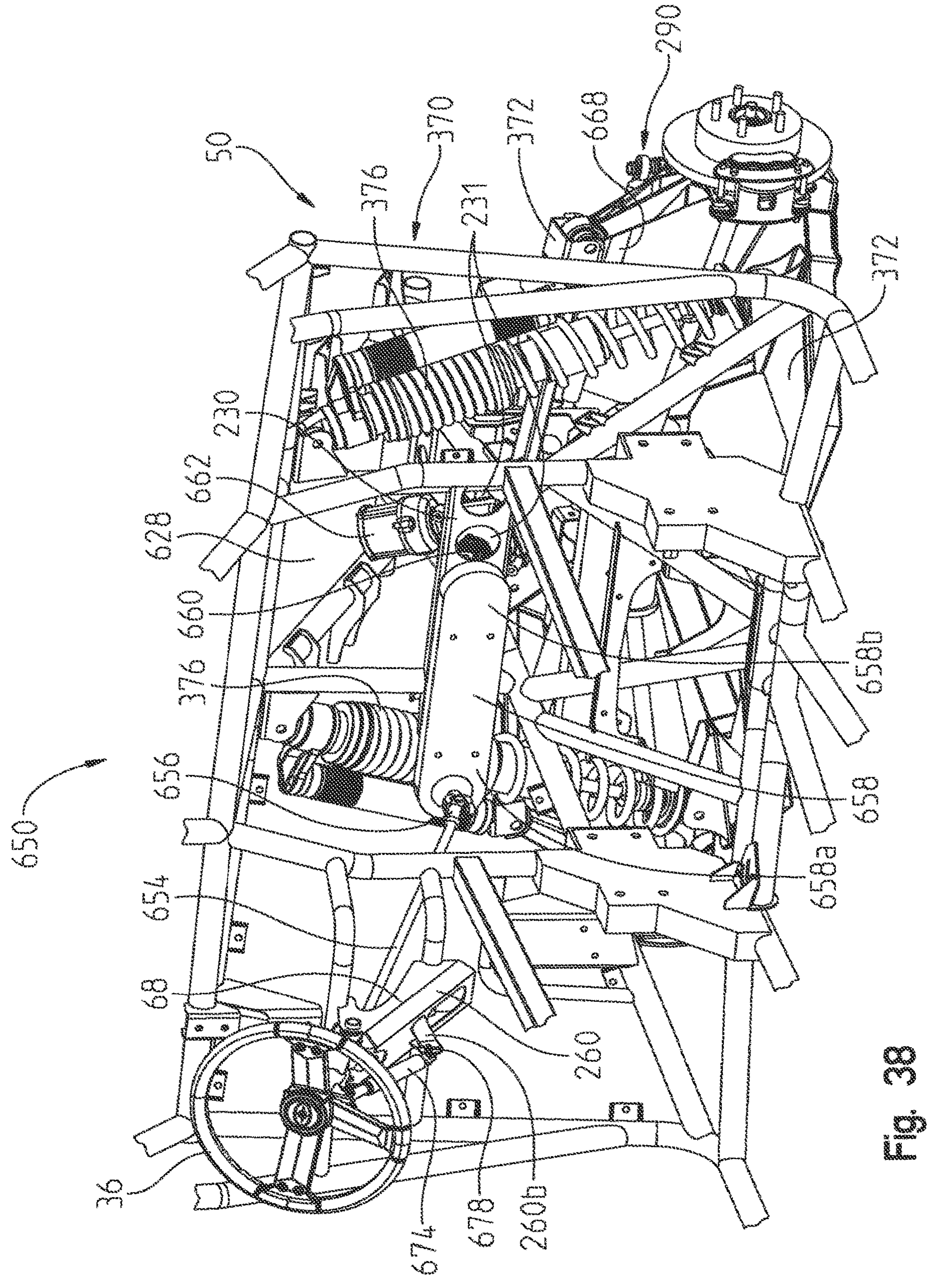
FIG. 38 is a rear perspective view of the steering assembly of FIG. 36 coupled to the front end of the frame.

Steering assembly 650 is supported by both front section 52 and midsection 54 of frame 20. Referring to FIGS. 37 and 38, steering column 652 extends along channel 260. Steering shaft 654 is angled inwardly and downwardly from steering column 652 toward steering transfer case 658. Steering shaft 654 and transfer case 658 are positioned rearward of front suspension 370 and are elevated relative to lower and upper control arms 372, 374 of front suspension.

As shown best in FIG. 38, steering transfer case 658 is coupled to bracket 230 of steering mount 64 at front section 52 of frame 20. Both bracket 230 and steering transfer case 658 may be positioned rearward of shock absorbers 376 of front suspension 370 (see FIG. 29). Joint 660 extends through one of apertures 231 on bracket 230 in order to couple with power steering unit 662, which is centrally positioned on front section 52. Inner end **658*b* of transfer case 658 is coupled to power steering unit 662 at approximately the vehicle centerline. However, outer end 658*a* extends laterally outward from the vehicle centerline because steering wheel 36, steering column 652, and steering shaft 654 are off-center from the vehicle centerline, i.e., laterally spaced apart from the centerline. As such, transfer case 658 operably couples steering shaft 654 to power steering unit 662 by routing the output of steering shaft 654 inwardly toward longitudinal axis L in order to align with the input of power steering unit 662. In particular, steering transfer case 658 may be a chaincase, a combination of gears, or any other type of device to transmit the output from steering shaft 654 to power steering unit 662**.

As shown in FIGS. 29 and 36-38, power steering unit 662 is positioned within envelope 628 defined by front section 52 and front suspension 370. A lower portion of power steering unit 662 is generally positioned between upper control arms 374 of front suspension 370. An upper portion of power steering unit 662 extends upwardly such that the upper portion of power steering unit 662 is elevated relative to lower and upper control arms 372, 374. Additionally, as shown in FIG. 29, power steering unit 662 may be positioned forward of shock absorbers 376. While power steering unit 662 is illustratively shown as an electric power steering unit but also may be a hydraulic power steering unit or other device that assists steering assembly 650.

Gearbox assembly 666 is positioned within envelope 628 and is forward of power steering unit 662 and shock absorbers 376. In particular, gearbox assembly 666 is generally positioned between upper control arms 374, thereby leaving an open area between lower control arms 372 and below gearbox assembly 666 for front final drive 606. Gearbox assembly 666 also is positioned along the vehicle centerline such that the output of power steering unit 662 is directly aligned with the input of gearbox assembly 666. Gearbox assembly 666 may be a rack and pinion assembly or may be other assemblies for controlling the movement of tie rods 668 and front wheels 6.

Figure 36:
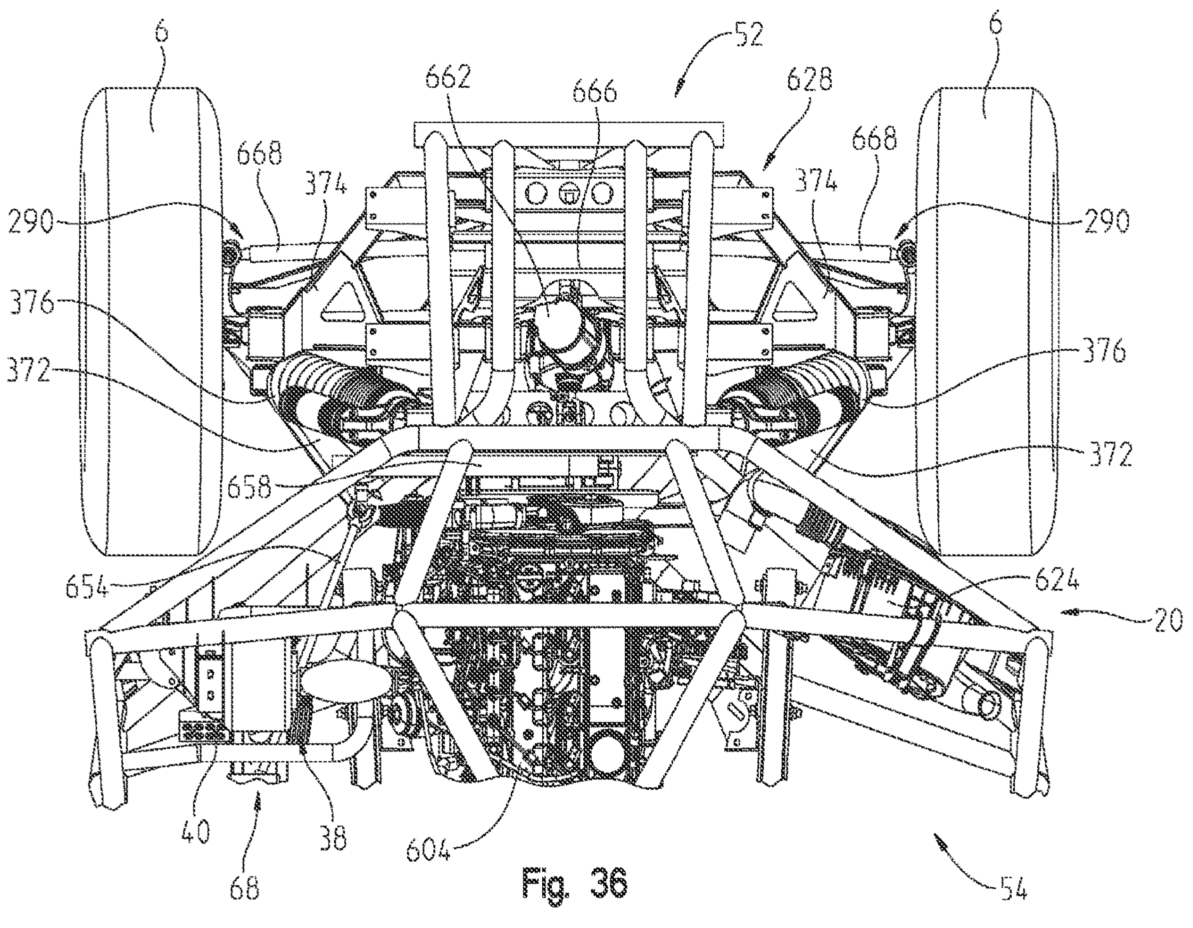
FIG. 36 is a top view of a front end of the vehicle, with a vehicle body removed and showing a portion of the drivetrain assembly, the steering assembly, and the front suspension.

Tie rods 668 extend between gearbox assembly 666 and knuckles 290 at hubs 380 in order to control the movement of front wheels 6. Because tie rods 668 are positioned near the centerline of vehicle 2, the length of tie rods 668 may be increased to approximately 21 inches. As shown in FIGS. 36-38, tie rods 668 are positioned between lower and upper control arms 372, 374 of front suspension 370.

As shown in FIGS. 35 and 38, a tilt adjuster 674 is coupled to steering wheel 36 in order to adjust the position of steering wheel 36. Tilt adjuster 674 includes an inner rod **674*a* that telescopes within an outer portion 674*b*. An operator may activate a lever 676 to move inner rod 674*a* relative to outer portion 674*b*. Tilt adjuster 674 is coupled to steering wheel 36 via a bracket 680 attached to steering column 652. Fasteners, such as bolts 682, secure inner rod 674*a* of tilt adjuster 674 to bracket 680. Additionally, fasteners, such as bolts 678, couple outer portion 674*b* of tilt adjuster 674 to mounting leg 260*b* of controls mount 68**.

The position of steering assembly 650 may increase suspension travel of front suspension 370. For example, by bringing the output from steering shaft 654 to the centerline of vehicle 2, i.e., aligning the output with longitudinal axis L, steering transfer case 658 may increase suspension travel. Additionally, by positioning at least gearbox assembly 666, power steering unit 662, and a portion of transfer case 658 along the centerline of the vehicle, the travel of front suspension 370 may be increased. Also, the length of tie rods 668 may be increased which may contribute increased suspension travel.

Steering assembly 650 also cooperates with front suspension 370 in order to minimize the turning radius of vehicle 2 by maximizing the steering angle. Lower control arms 372 and/or upper control arms 374 of front suspension 370 may include a "stop" to prevent front wheels 6 from overturning in a particular direction and damaging front wheels 6, front suspension 370, and/or steering assembly 650. The "stops" are positioned to prevent wheels 6 from contacting other components of vehicle 2 when steering assembly 650 is at full lock and front suspension 370 is at full jounce or rebound.

An alternative embodiment of steering assembly 650 may be a "drive-by-wire" arrangement, which may eliminate steering components such as steering column 652 and steering shaft 654 from steering assembly 650. Drive-by-wire steering assemblies operate through an electronic control system, thereby eliminating at least a portion of the mechanical components and connections between steering wheel 36 and front wheels 6. Additionally, drive-by-wire steering embodiments may allow vehicle 2 to be operated and controlled remotely. An exemplary drive-by-wire arrangement is electronic throttle control.

Figure 38A:
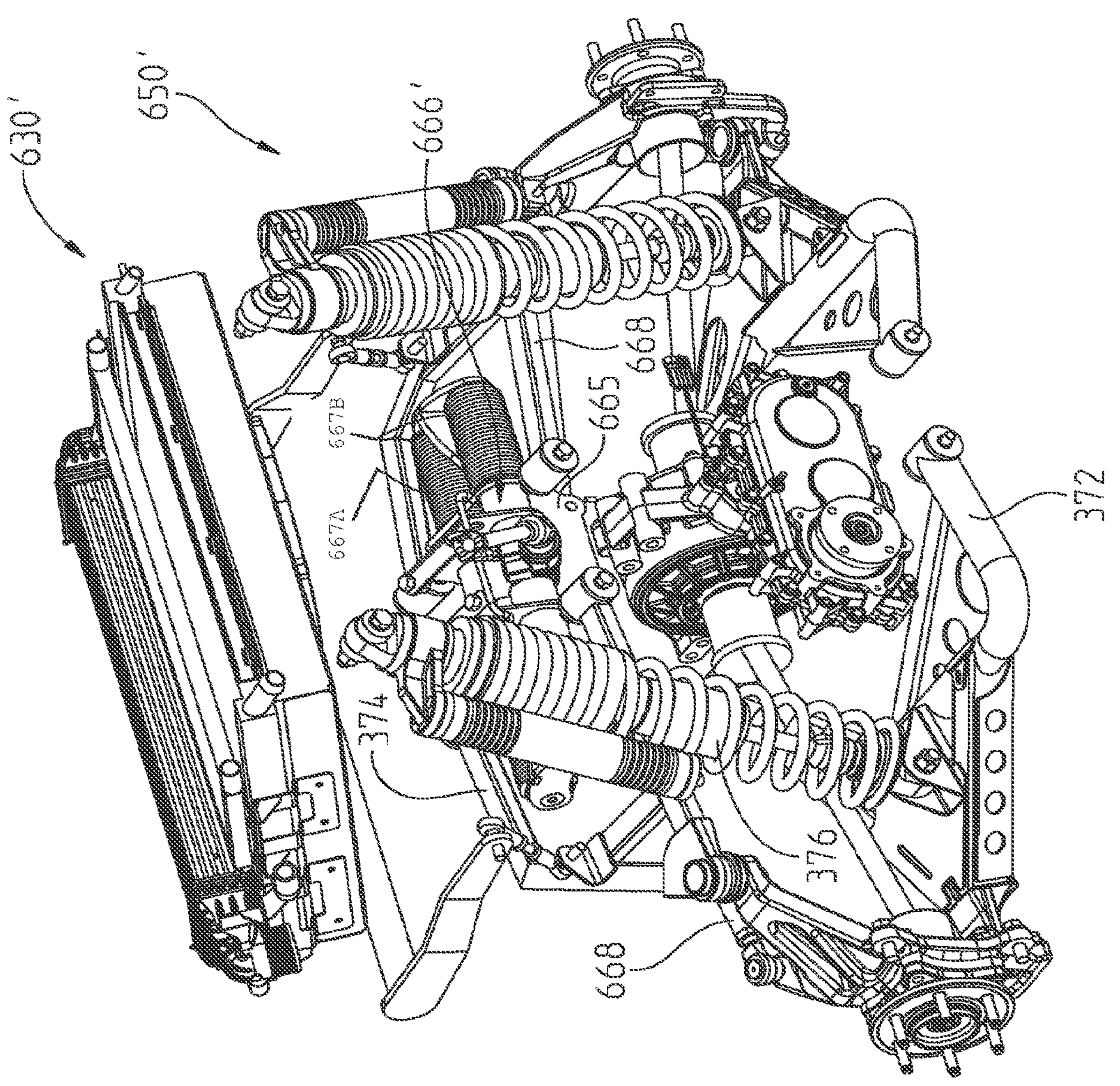
FIG. 38A is a rear perspective view of the cooling assembly of FIG. 34A and an alternative embodiment of the steering assembly of FIG. 35.
Figure 38B:
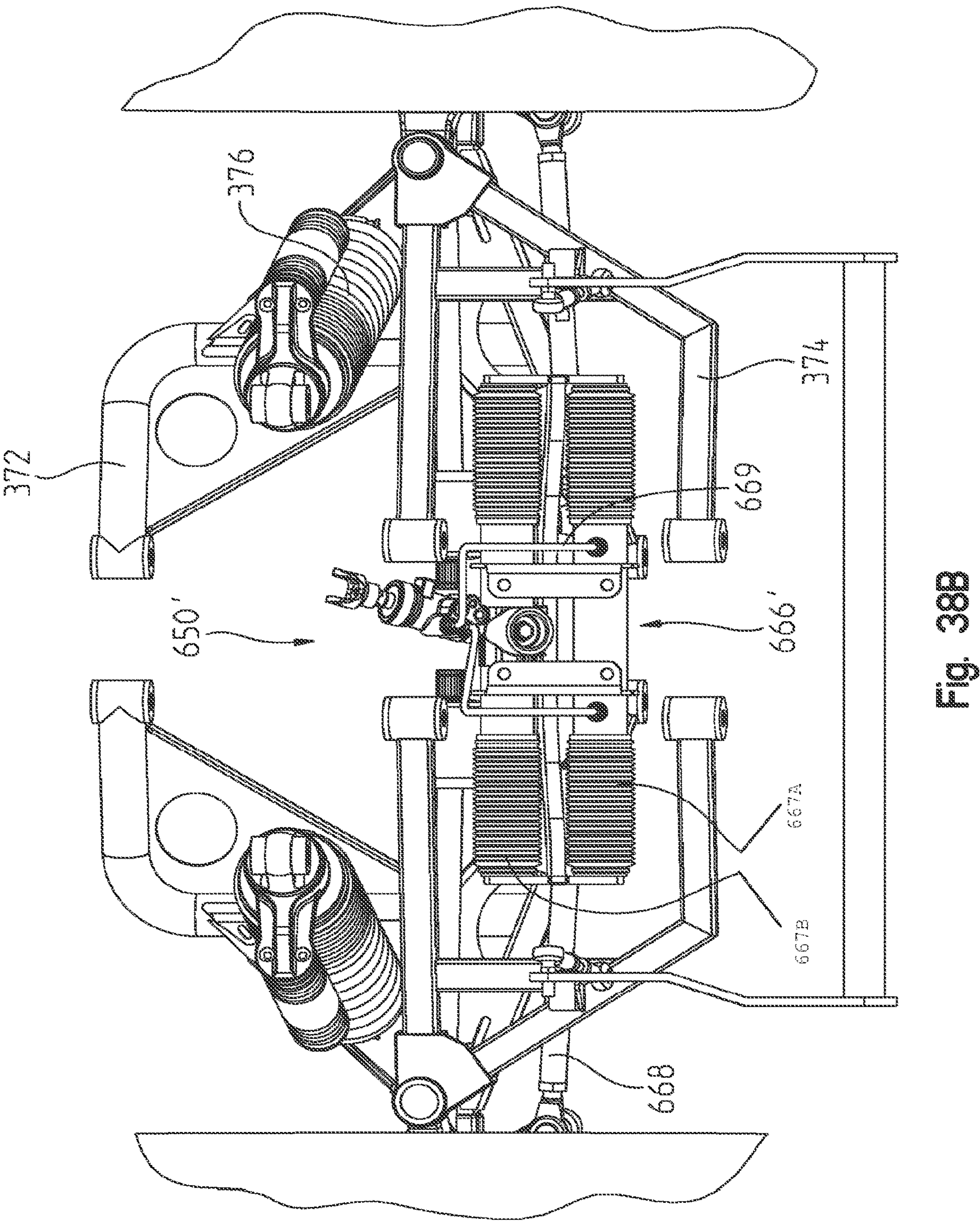
FIG. 38B is a top view of the alternative embodiment steering assembly of FIG. 38A.

A further alternative embodiment of steering assembly 650 is shown in FIGS. 38A and 38B as steering assembly 650'. Steering assembly 650' includes a hydraulically-assisted steering rack assembly 666'. Steering rack assembly 666' is operably coupled to steering shaft 654 (FIG. 35) and operably coupled to tie rods 668 in order to steer front wheels 6. As shown in FIG. 38B, steering rack assembly 666' includes a hydraulic-assist cylinder 667*a*, a steering rack member 667*b*, and hydraulic fluid lines 669. Illustratively, steering rack member 667*b* is rearward of hydraulic-assist cylinder 667*a*. Steering rack assembly 666' is positioned between upper control arms 374 and is vertically intermediate cooling assembly 630' and front final drive 606. Hydraulic-assist cylinder 667*a* and steering rack member 667*b* are illustratively supported on a bracket 665. In operation, hydraulic pressure is supplied by a pump, which may be driven by engine 604 (FIG. 29), to fluid lines 669 in order to assist steering rack member 667*b* with turning front wheels 6. By replacing steering rack 666 and other components of steering assembly 650 with hydraulically-assisted steering rack assembly 666', vehicle 1200 may have a smaller turning radius. Additionally, hydraulically-assisted steering rack assembly 666' may produce less wear on steering rack member 667*b*. Furthermore, the cooperation between electric power steering unit 662 and hydraulically-assisted steering rack assembly 666' provides the steering geometry necessary for long steering and suspension travel and the packaging necessary to create space for front final drive 606.

Figure 2:
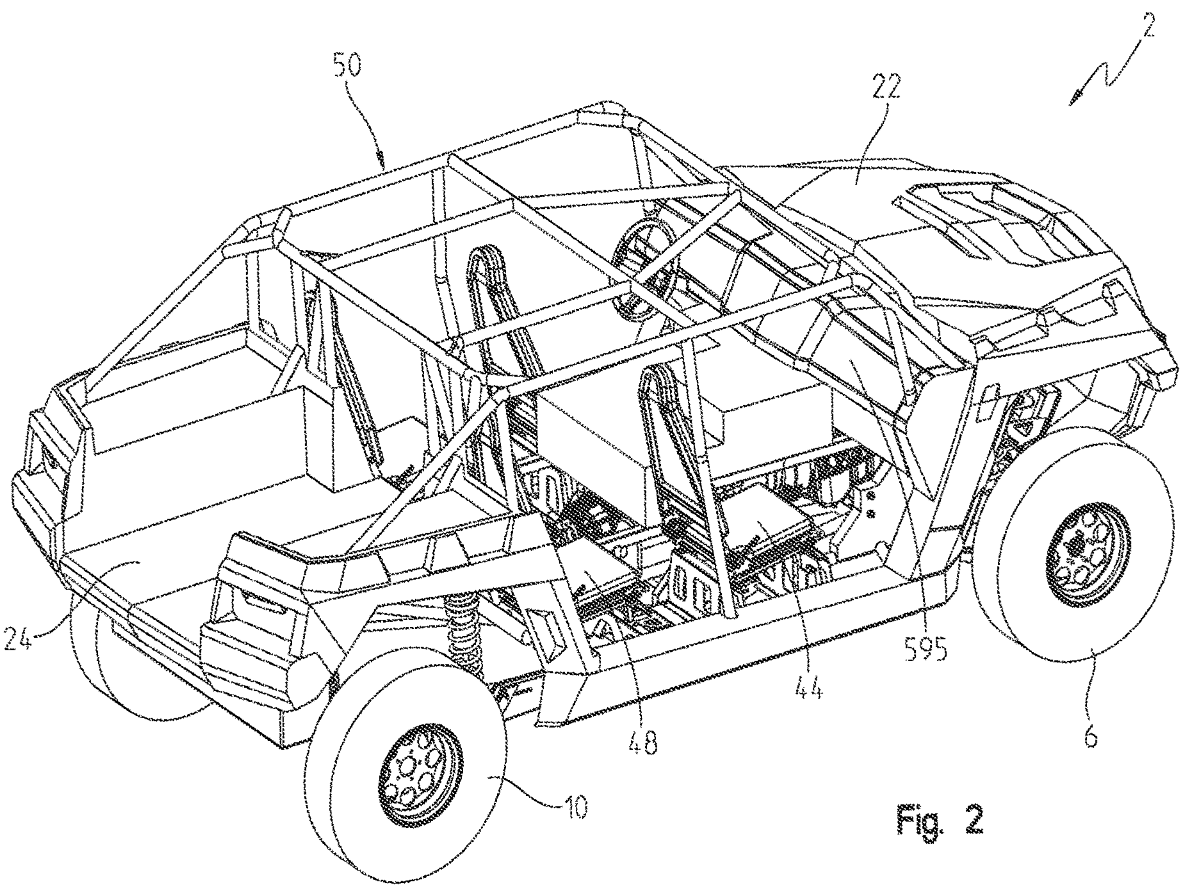
FIG. 2 is a rear right perspective view of the vehicle of FIG. 1.
Figure 39:
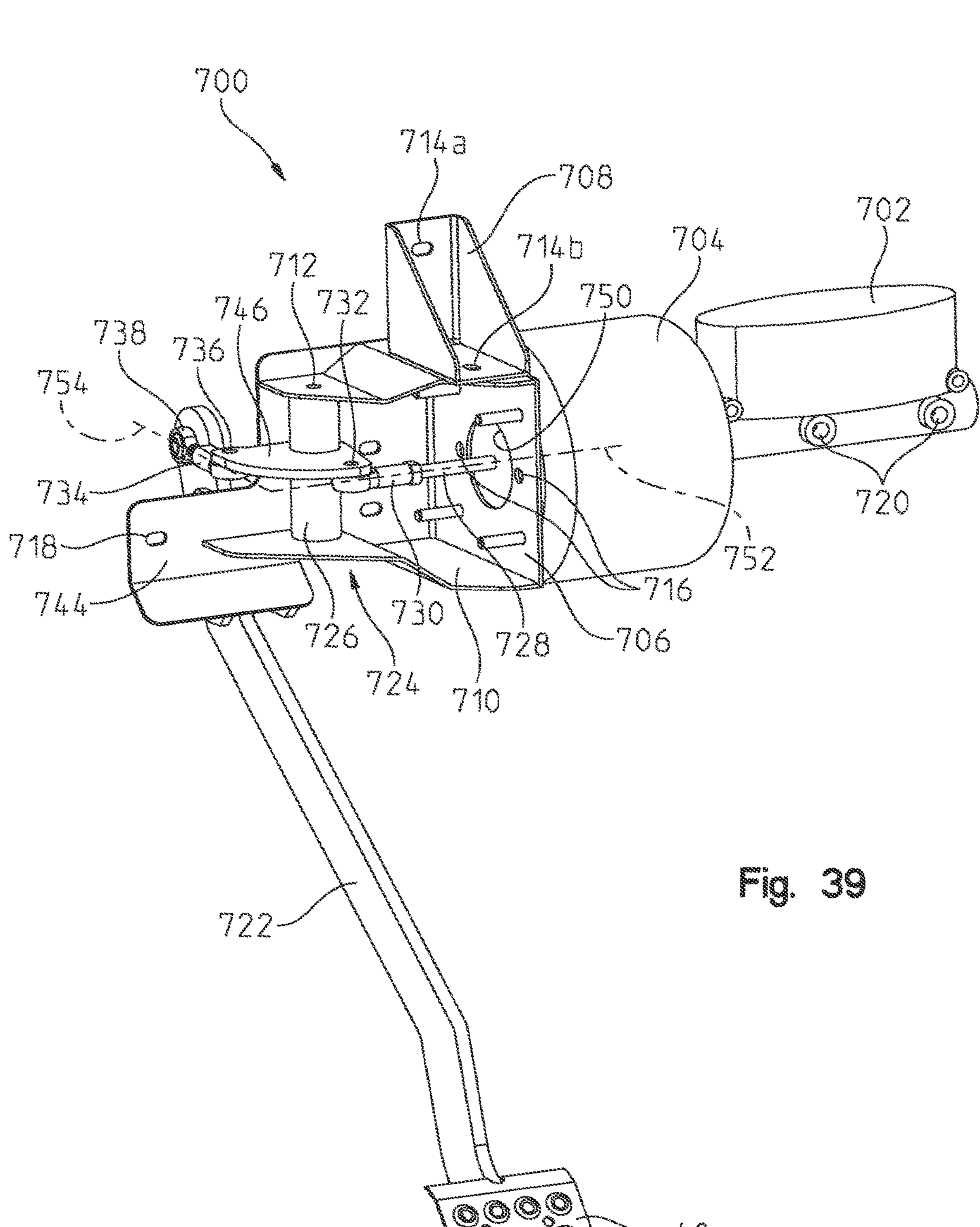
FIG. 39 is a rear perspective view of a brake assembly.
Figure 40:
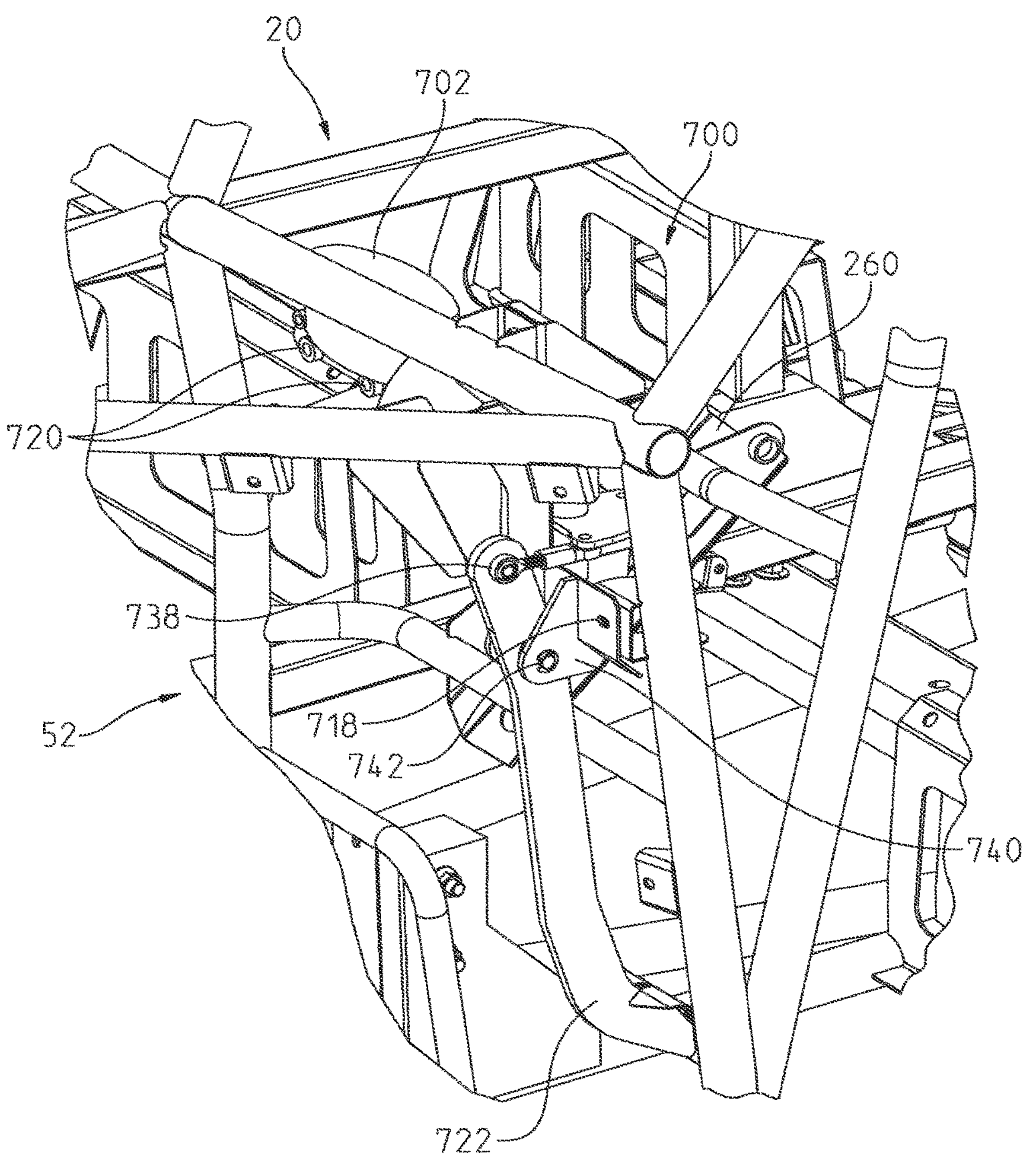
FIG. 40 is a front perspective view of the brake assembly of FIG. 39.
Figure 41:
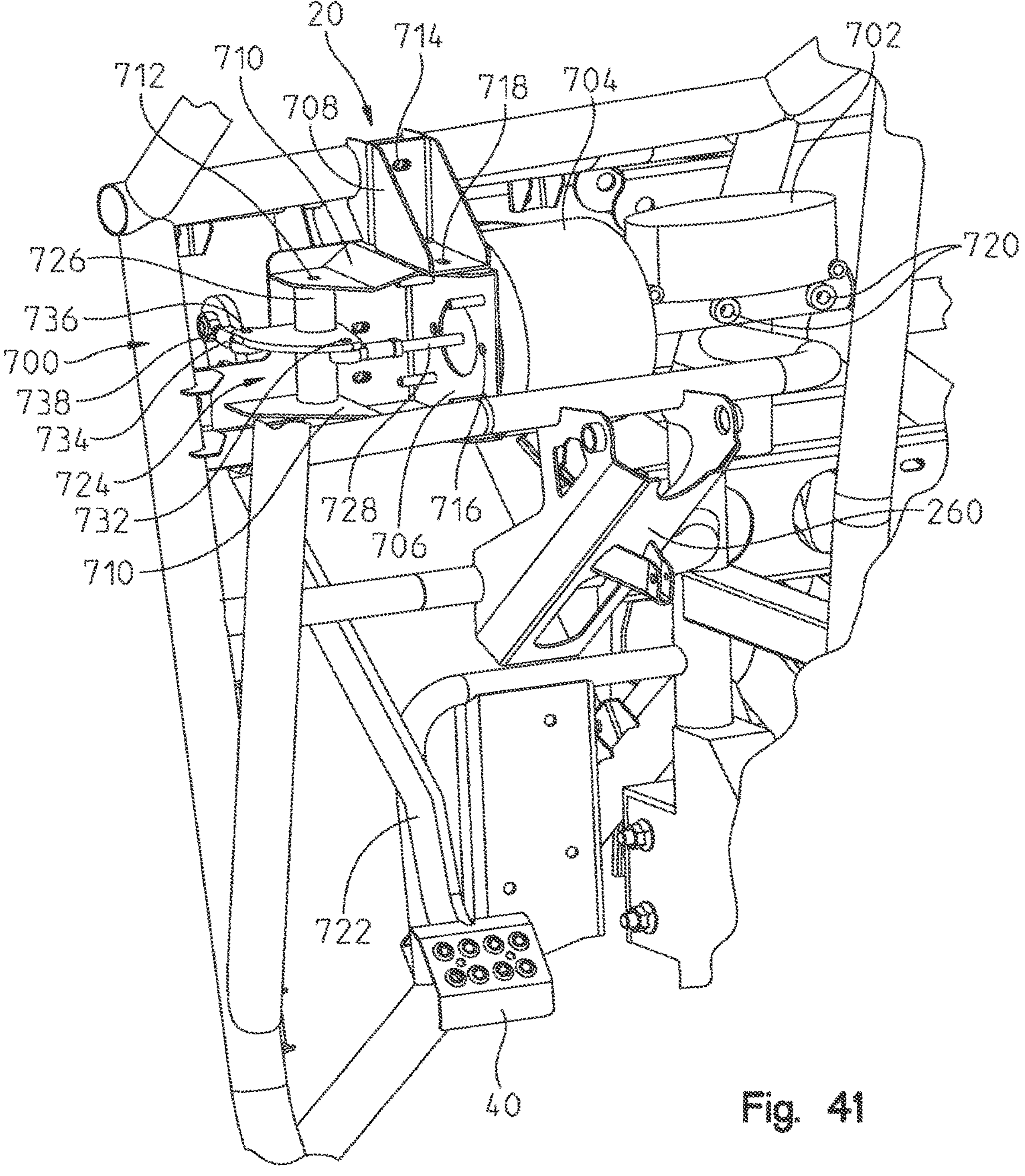
FIG. 41 is a rear perspective view of the brake assembly of FIG. 39 coupled to the front end of the frame.

Referring to FIGS. 39-41, brake assembly 700 is disclosed. Brake assembly 700 includes a master cylinder 702, a brake booster 704, a linkage assembly 724, a lever arm 722, and brake pedal 40. Brake assembly 700 is positioned above channel 260 for steering assembly 650 and is coupled to frame 20, as shown in FIG. 41. Additionally, brake assembly 700 is housed within a dashboard 595 of operator area 30 (FIGS. 1-3). A portion of brake assembly 700, such as lever arm 722 and pedal 40, extend below dashboard 595 and into operator cab 30 to provide access thereto for the operator. By housing brake assembly 700 within and under dashboard 595, front section 52 of frame 20 has additional space for other components of vehicle 2, such as front wheels 6, front suspension 370, and steering assembly 650.

As is apparent from FIGS. 39-41, master cylinder 702 extends laterally from brake booster 704. In particular, master cylinder 702 extends inwardly toward the centerline of vehicle 2. As such, master cylinder 702 does not extend in a forward direction from brake booster 704, but rather, is turned 90 degrees in order to extend laterally. Illustratively, master cylinder 702 is generally perpendicular to the centerline of vehicle 2. By positioning master cylinder 702 to the side of brake booster 704, rather than forward of booster 704, front section 52 of frame 20 has additional space for supporting additional components of vehicle 2. Master cylinder 702 is coupled to ports 720 with hoses (not shown) to allow fluid, for example hydraulic fluid, to flow to and from master cylinder 702 during operation of brake assembly 700.

Brake booster 704 is positioned intermediate master cylinder 702 and linkage assembly 724 and is operably coupled to both master cylinder 702 and linkage assembly 724. As shown in FIG. 39, brake booster is coupled to bracket 706 with conventional fasteners (not shown) that extend through apertures 716. Brake booster 704 includes an input shaft 728, which extends through an opening 750 of bracket 706, and is operably coupled to linkage assembly 724. A braking force is transmitted from the operator to brake booster 704 via linkage assembly 724 and input shaft 728. To facilitate deceleration and stopping of vehicle 2, brake booster 704 receives an input braking force from input shaft 728 and increases the braking force transmitted from master cylinder 702 to the brake calipers at wheels 6, 10.

Bracket 706 is coupled to frame 20 via extensions 708, 710, 744. As shown in FIGS. 39-41, extension 708 includes an aperture 714*a*, which receives a conventional fastener, for example a bolt, for coupling bracket 706 to frame 20. Similarly, extension 710 may include an aperture (not shown) for a conventional fastener in order to further secure bracket 706 to frame 20. Extension 744 includes an aperture 718 which secures bracket 706 to frame 20. Extensions 708, 710, 744 may be separate from bracket 706 and coupled thereto with fasteners, which are received through apertures, for example an aperture 714*b* on extension 708. Alternatively, extensions 708, 710, 744 may be integrally formed with bracket 706.

Bracket 706 also houses linkage assembly 724, which includes a first link 730, a second link 734, a pivot plate 746, and a support member 726. Support member 726 may be coupled to extensions 708, 710 with conventional fasteners (not shown). For example, as shown in FIG. 39, a conventional fastener may be received through aperture 712 on extension 708 in order to couple bracket 706 to support member 726.

Pivot plate 746 is pivotably coupled to support member 726. Pivot plate 746 also includes an aperture 732 for coupling with first link 730, and an aperture 736 for coupling with second link 734. In particular, first link 730 is positioned below pivot plate 746 and is coupled to input shaft 728 of brake booster 704. Additionally, second link 734 is positioned below pivot plate 746 and is coupled to lever arm 722 through fastener 738. As such, pivot plate 746 moves relative to support member 726 in response to pivotal motion from first link 730 and second link 734. As is detailed further herein and shown best in FIG. 39, first link 730 moves along a line 752 in a generally lateral motion and second link 734 moves along a line 754 in a generally fore and aft motion. Therefore, pivot plate 746 facilitates motion in at least two perpendicular directions.

Second link 734 is coupled to lever arm 722 through fastener 738. Lever arm 722 extends below bracket 706 and under dashboard 595 (FIGS. 1-3) and is coupled to brake pedal 40. Lever arm 722 has as curved or bent shape which allows lever arm 722 to extend below bracket 706 and dashboard 595.

In operation, when the operator depresses pedal 40, movement in lever arm 722 is transmitted to second link 734. Second link moves along line 754, which causes pivot plate 746 to rotate relative to support member 726. The rotational movement of pivot plate 746 causes first link 730 to move along line 752, which is generally perpendicular to line 754. The movement of first link 730 moves input shaft 728 relative to brake booster 704. Input shaft 728 engages brake booster 704 in order increase the braking force from master cylinder 702. Through ports 720, master cylinder 702 transmits a braking force to the brake calipers to slow the rolling movement of front wheels 6 and rear wheels 10.

Similar to steering assembly 650, an alternative embodiment of brake assembly 700 also may be operated electronically by wires, thereby eliminating various mechanical components and connections. A brake-by-wire arrangement also may allow vehicle 2 to be operated and controlled remotely.

Referring to FIGS. 42-74, an illustrative alternative embodiment of vehicle 2 is shown as vehicle 1200. Vehicle 1200 includes features similar to those of vehicle 2 of FIGS. 1-41, with like reference numerals indicating like elements having like functionality and structure, except as described below. Vehicle 1200 is illustratively shown as a utility vehicle and includes ground-engaging members 4, illustratively front wheels 6 and rear wheels 10. It should be understood that vehicle 1200 could include any of the components described and depicted in U.S. Pat. Nos. 7,795,602; 8,029,021; 7,717,495; and U.S. Pat. No. 8,205,910 (PLR-09-2019.04P-01), the complete disclosures of which are expressly incorporated by reference herein.

In one embodiment, one or more of wheels 6, 10 may be replaced with tracks, such as the Prospector II Tracks available from Polaris Industries, Inc. located at 2100 Highway 55 in Medina, MN 55340. As shown, wheels 6, 10 include pneumatic tires mounted on standard steel rims. Illustrative wheels 6, 10 may be configured to include 35-inch pneumatic tires. Alternatively, tires could be non-pneumatic tires, as shown in U.S. Pat. Nos. 8,176,957 and 8,104,524; and/or in U.S. Provisional Patent Application Ser. No. 61/611,300, the complete disclosures of which are expressly incorporated by reference herein.

Figure 42:
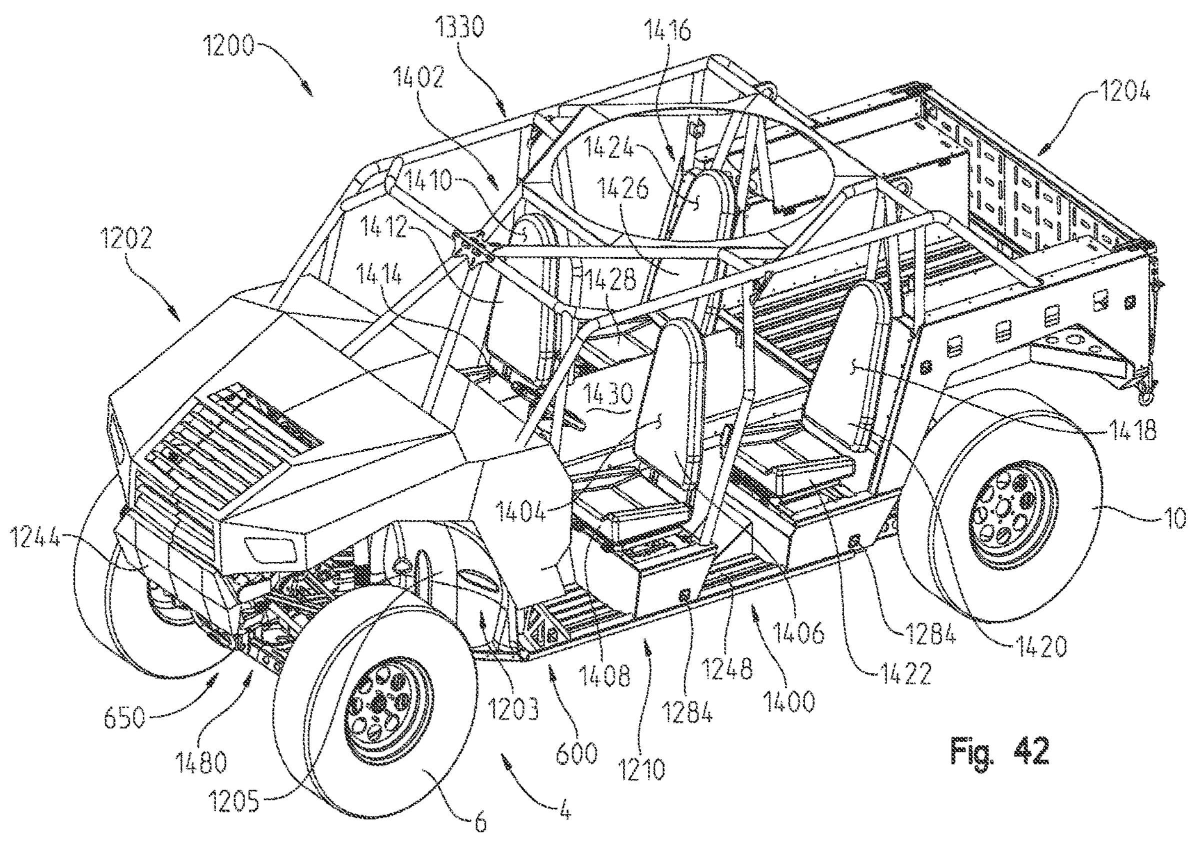
FIG. 42 is a left front perspective view of an alternative embodiment of the vehicle of FIGS. 1-41.

Vehicle 1200 includes a frame assembly 1210 (FIG. 50) supported by ground-engaging members 4. Frame assembly 1210 supports a plurality of vehicle body panels 1202 and a rear cargo area 1204. In one embodiment, body panels 1202 may be coupled with reinforced panels, for example armor, in order to further strengthen and protect vehicle 1200. For example, front wheel wells 1203 may be configured to support armor plates 1205, as shown in FIG. 42.

Vehicle 1200 defines an operator area 1400 which includes a front seating portion 1402 and a rear seating portion 1416. Front seating portion 1402 includes an operator seat 1404, having a seat back 1406 and a seat bottom 1408, and a front passenger seat 1410, having a seat back 1412 and a seat bottom 1414. Similarly, rear seating portion 1416 includes at least a first rear passenger seat 1418, having a seat back 1420 and a seat bottom 1422, and a second rear passenger seat 1424, having a seat back 1426 and a seat bottom 1428. Operator area 1400 may be configured to support additional passengers.

Figure 59:
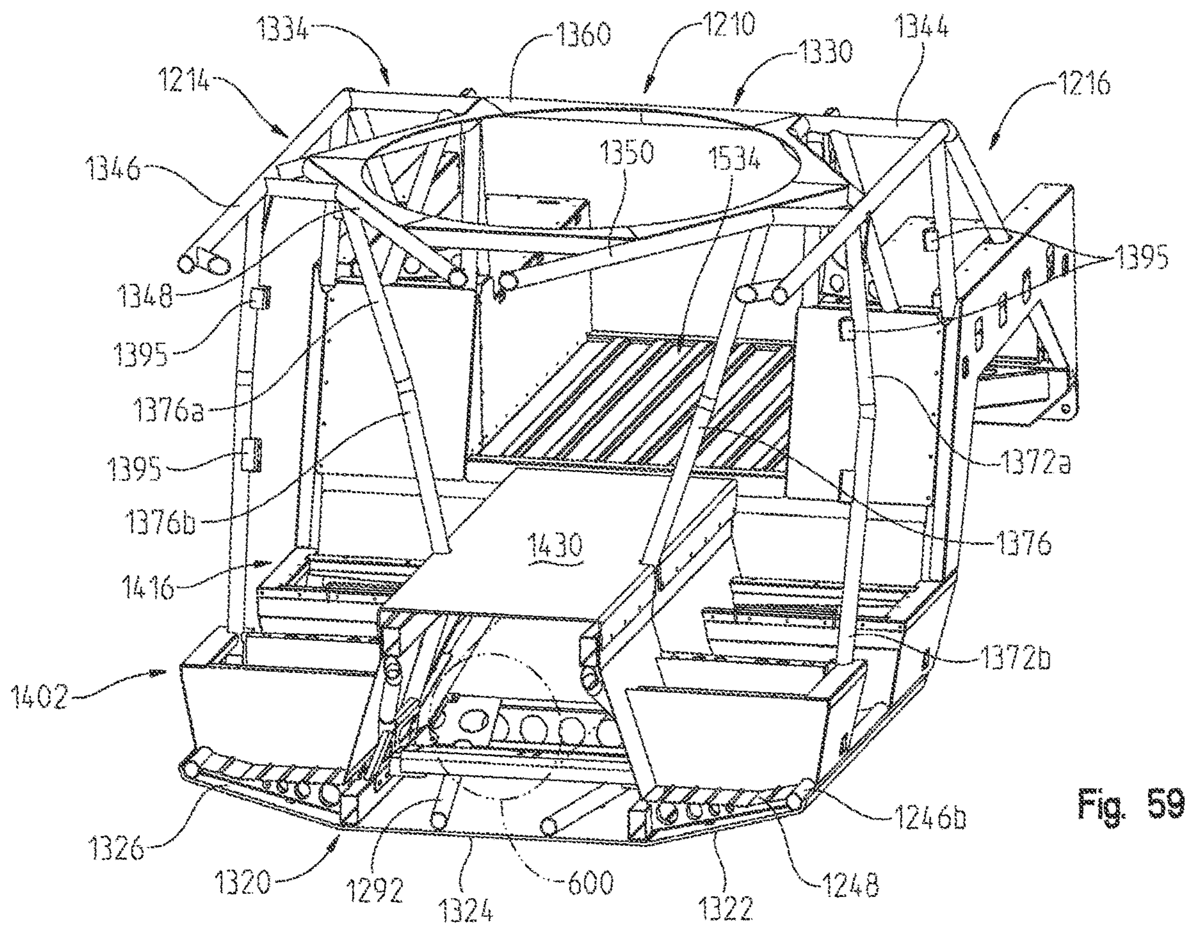
FIG. 59 is a cross-sectional view of the frame assembly and roll cage assembly of FIG. 50, showing a tunnel member generally surrounding a portion of the drivetrain assembly of FIG. 30.

Seats 1404, 1410, 1418, 1424 may be comprised of a mesh or other similar material in order to prevent moisture from remaining within seats 1404, 1410, 1418, 1424 if seats 1404, 1410, 1418, 1424 get wet. Additionally, the seat material may keep seats 1404, 1410, 1418, 1424 cooler in hot weather. Seats 1404, 1410, 1418, 1424 also may include seat belt assemblies (not shown), which may be mounted to brackets 1395 of a roll cage assembly 1330, as shown in FIG. 59.

Roll cage assembly 1330 is coupled to frame assembly 1210 and generally surrounds operator area 1400. Operator area 1400 further includes a plurality of operator controls 1434 by which an operator may control the movement and systems of vehicle 1200. For example, operator controls 1434 are operably coupled to drivetrain assembly 600. Operator controls 1434 and/or drivetrain assembly 600 may be operably coupled to additional systems and components of vehicle 1200, such as a front suspension assembly 1480, a rear suspension assembly 1500, and steering assembly 650 (FIGS. 35-38).

With reference now to FIGS. 50-56, frame assembly 1210 will be described in greater detail. Frame assembly 1210 includes a front frame portion 1212, an intermediate frame portion 1214, and a rear frame portion 1216. In addition to structurally supporting, rigidifying, and defining vehicle 1200, each of front frame portion 1212, intermediate frame portion 1214, and rear frame portion 1216 is configured to support accessories and various components of vehicle 1200.

As shown in FIGS. 50-55, front frame portion 1212 is defined by a plurality of frame members, which may be comprised of any structurally supportive material, for example polymeric materials, metallic materials, such as steel, aluminum, and/or any other material configured to support vehicle 1200 and its various components and systems positioned at front frame portion 1212. For example, front frame portion 1212 may be at least partially comprised of a high-strength steel material, such as chromoly. Additionally, the frame members defining front frame portion 1212 may be coupled together with fasteners, such as welds, rivets, bolts, adhesive, or any other type of fastener.

Front frame portion 1212 includes upper front members 1220 and a cross member 1222 extending therebetween. Illustratively, upper front members 1220 and/or cross member 1222 may be comprised of a high-strength steel material (e.g., chromoly). Upper front members 1220 also are coupled to lower front members 1224. Lower front members 1224 are coupled to a mounting plate 1225, which supports a portion of drivetrain assembly 600, a portion of steering assembly 650, and/or a portion of front suspension assembly 1480 (FIG. 42). Mounting plate 1225 extends rearwardly to couple with a removable portion 1218 of frame assembly 1210. Removable portion 1218 provides lower access to frame assembly 1210 for assembling, disassembling, and servicing drivetrain assembly 600, as detailed further below.

Positioned above removable portion 1218 and mounting plate 1225 are front upper longitudinal frame members 1226. Front upper longitudinal frame members 1226 are coupled to cross member 1222 and extend rearwardly to couple with intermediate frame portion 1214. More particularly, front upper longitudinal frame members 1226 have parallel arms **1226*a* coupled to cross member 1222 and rear ends 1226*b* coupled to intermediate frame portion 1214. Front upper longitudinal frame members 1226 bend outwardly between parallel arms 1226*a* and rear ends 1226*b*** such that the distance between rear ends 1226*b* is greater than the distance between parallel arms 1226*a*. Upstanding members 1234 may be used to couple front upper longitudinal frame members 1226 to upper front members 1220.

A pair of front lower longitudinal frame members 1238 are supported below front upper longitudinal frame members 1226. The forward ends of front lower longitudinal frame members 1238 are coupled to lower front members 1224 and the rearward ends of front lower longitudinal frame members 1238 are coupled to rear ends 1226*b* of front upper longitudinal frame members 1226.

Figure 50:
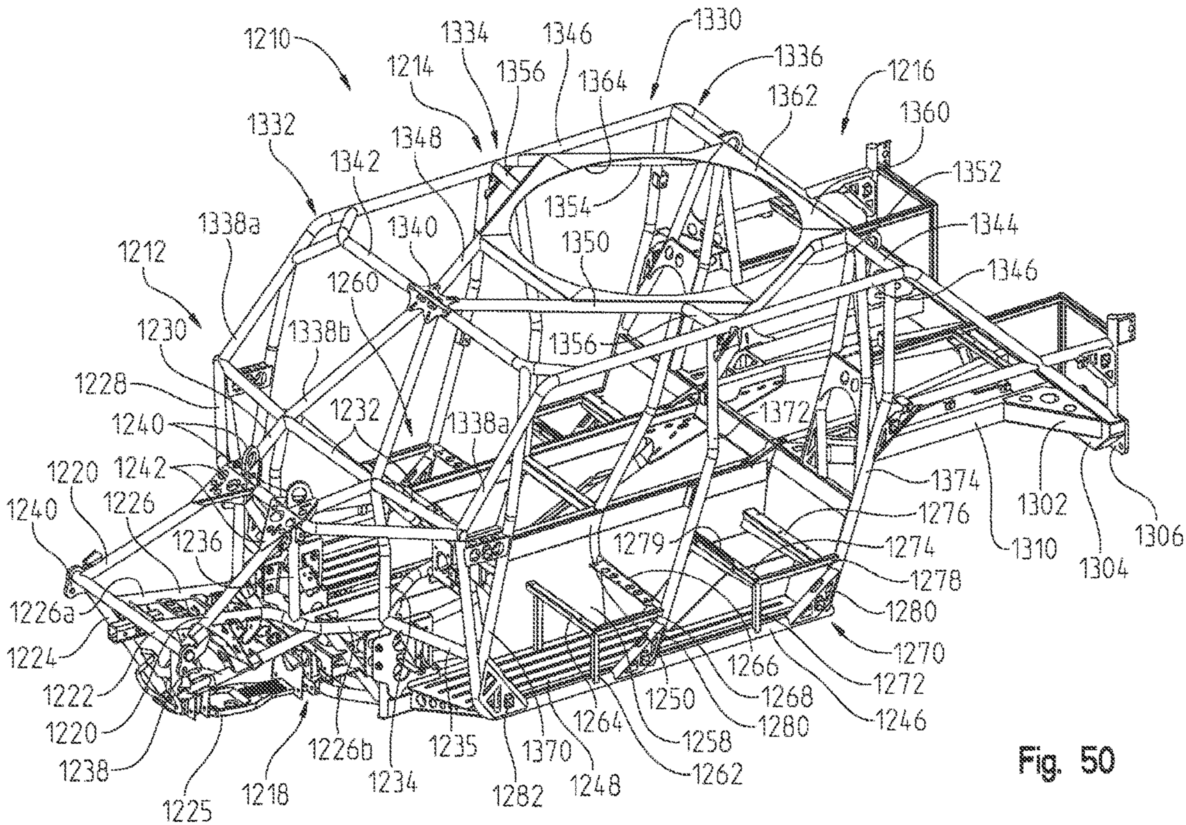
FIG. 50 is a left front perspective view of a frame assembly and a roll cage assembly of the vehicle of FIG. 42.

Front frame portion 1212 further includes frame members 1228 and frame members 1230. As shown in FIG. 50, frame members 1228 and 1230 are generally coupled to upper front members 1220 and extend rearwardly to couple with intermediate frame portion 1214. Upstanding members 1234 may be used to couple rear ends 1226*b* of front upper longitudinal frame members 1226 to frame members 1230. Additionally, front frame portion 1212 includes cross members 1235, which are coupled to upstanding members 1234 and front upper longitudinal frame members 1226. Cross members 1235 also are coupled to intermediate frame portion 1214, as detailed further herein.

Front frame portion 1212 further includes at least one accessory mount 1240. Illustratively, front frame portion 1212 includes at least four accessory mounts 1240, which are coupled to upper front members 1220. Additionally, some accessory mounts 1240 may also be coupled to frame members 1228 and/or lower front members 1224. Additionally, accessory mounts 1240 may be integrally formed with brackets 1242 on upper front members 1220. In this way, accessory mounts 1240 may be integrally coupled to and/or formed with front frame portion 1212, such that accessory mounts 1240 increase the strength, rigidity, and stability of front frame portion 1212.

Illustratively, accessory mounts 1240 are tie-downs configured to support vehicle 1200 during an air lift, an air drop, when secured during transportation, for example on an air craft carrier, or in other similar situations. Additionally, accessory mounts 1240 may be configured for other applications, such as supporting cargo, vehicle systems, and/or vehicle components. For example, accessory mounts 1240 at front frame portion 1212 may be configured to support a front bumper 1244 (FIG. 42) such that the mounting for front bumper 1244 is integrally coupled to front frame portion 1212. In this way, the integration of accessory mounts 1240 with front frame portion 1212 allows loads and forces applied to vehicle 1200 to be transmitted directly to frame assembly 1210 through accessory mounts 1240. As shown in FIG. 42, body panels 1202 may cover at least a portion of accessory mounts 1240, however, accessory mounts 1240 are accessible through body panels 1202 without the need to remove body panels 1202 from vehicle 1200.

Referring to FIGS. 50-54, intermediate frame portion 1214 is positioned rearward of front frame portion 1212 and is coupled thereto with frame members 1228, front upper longitudinal frame members 1226, upstanding members 1234, cross members 1235, and removable portion 1218. More particularly, at least one cross member 1232 of intermediate frame portion 1214 is coupled to frame members 1228, 1230 and upstanding members 1234 of front frame portion 1212. Cross members 1232 of intermediate frame portion 1214 also are coupled to roll cage assembly 1330, as detailed herein.

Cross members 1232 also are coupled to longitudinal frame members 1246 of intermediate frame portion 1214. As shown in FIGS. 50-54, longitudinal frame members 1246 include an upstanding portion 1246*a* coupled to cross members 1232 and a longitudinally-extending portion 1246*b*. Longitudinally-extending portion 1246*b* of longitudinal frame members 1246 generally defines an outer lower boundary of frame assembly 1210 and are positioned laterally outward of floor boards 1248. Illustratively, vehicle 1200 may include one floor board 1248 on each side of vehicle 1200. Alternatively, floor boards 1248 may be divided into multiple portions and coupled to frame assembly 1210 with conventional fasteners, such as welds, rivets, bolts, and/or adhesive.

Figure 51:
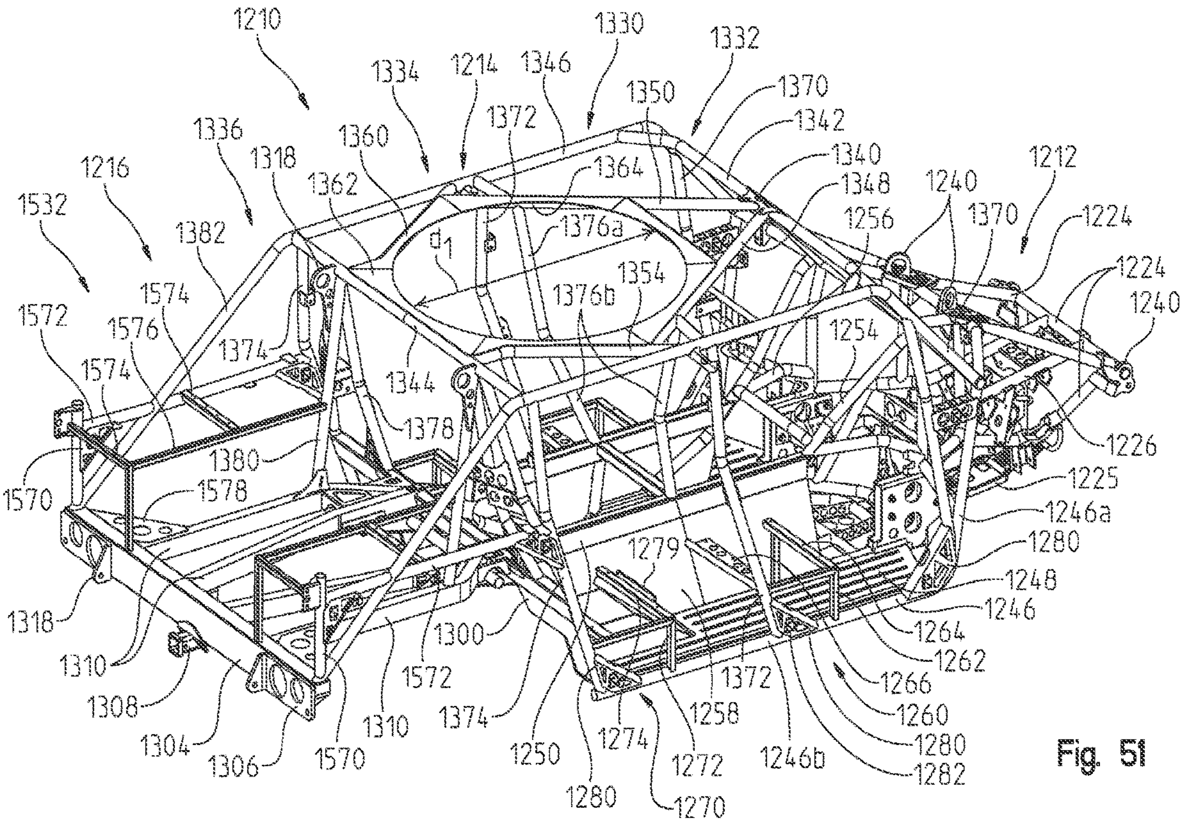
FIG. 51 is a right rear perspective view of the frame assembly and roll cage assembly of FIG. 50.
Figure 52:
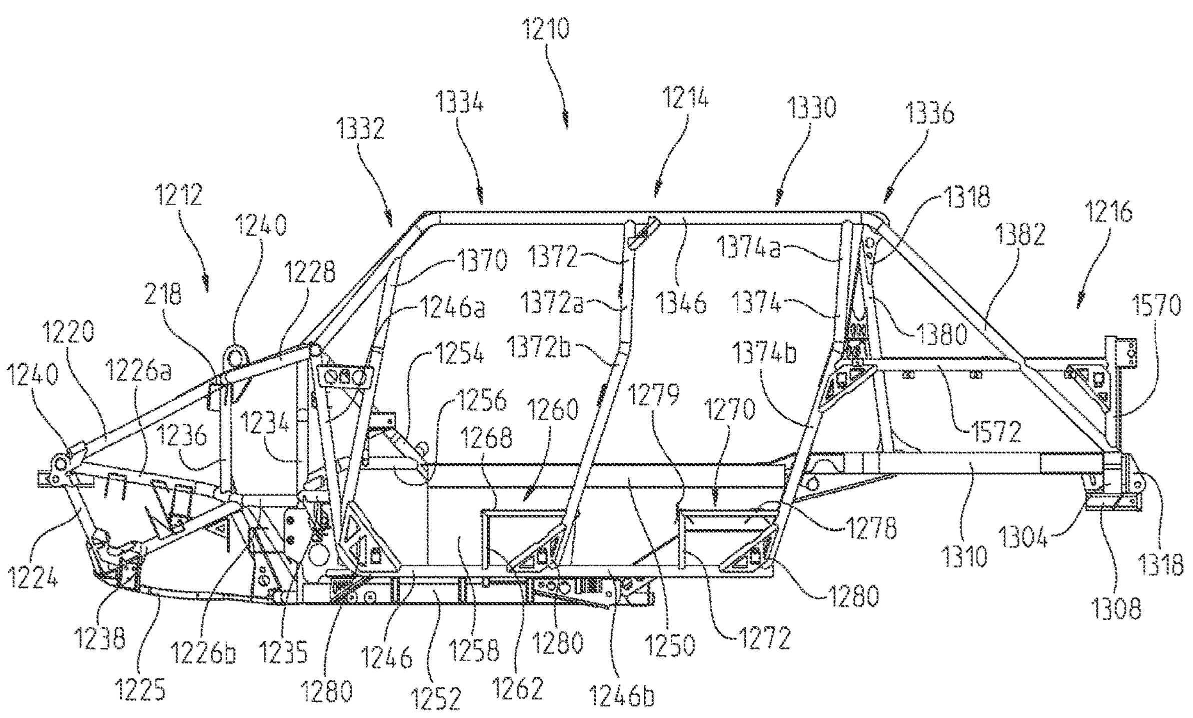
FIG. 52 is a left side view of the frame assembly and roll cage assembly of FIG. 50.

As shown in FIGS. 51 and 52, intermediate frame portion 1214 also includes a controls mount 1254, which extends into operator area 1400. Controls mount 1254 is angled downwardly and rearwardly from cross members 1232. Controls mount 1254 also is coupled to upstanding member 1234 through frame members 1256 of intermediate frame portion 1214. Controls mount 1254 supports various instruments, gauges, and components of operator controls 1434, and also supports a dash board assembly 1432 and other body panels 1202 within operator area 1400.

Figure 46:
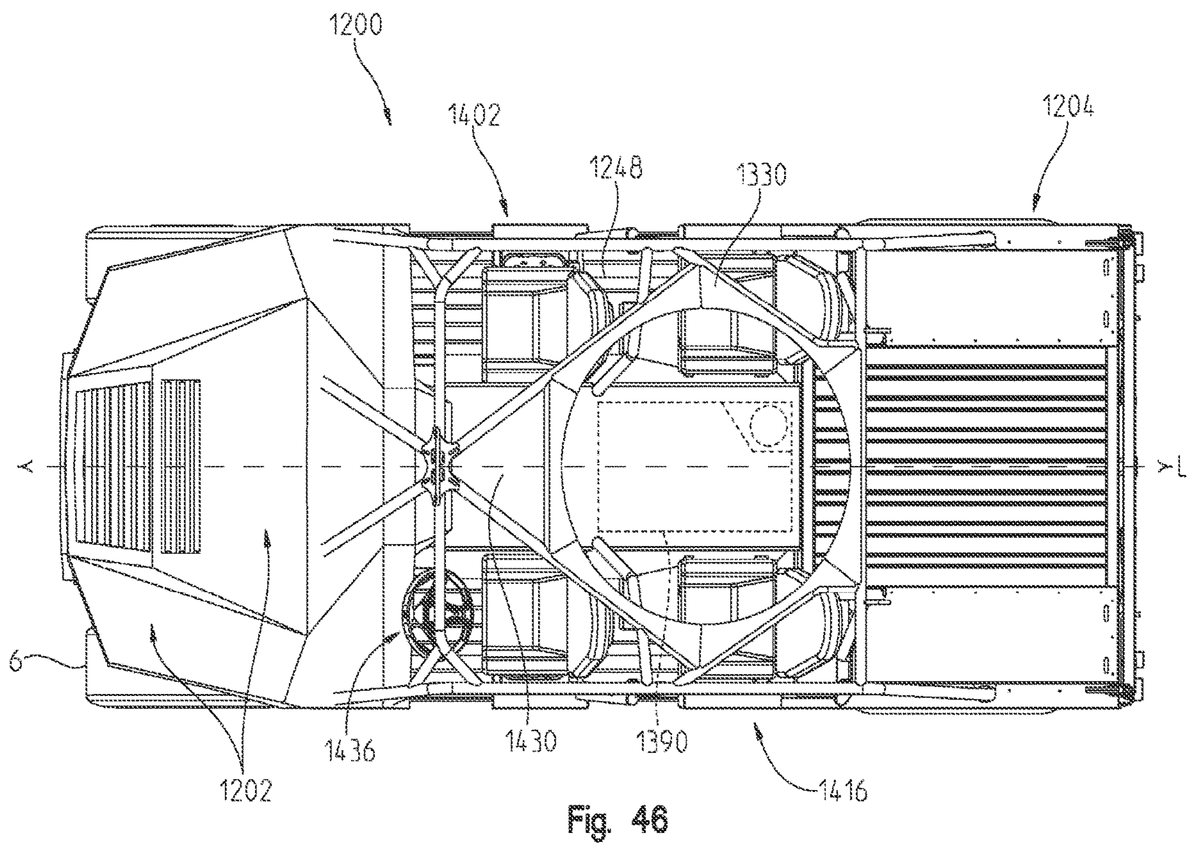
FIG. 46 is a top view of the alternative embodiment vehicle of FIG. 42.
Figure 53:
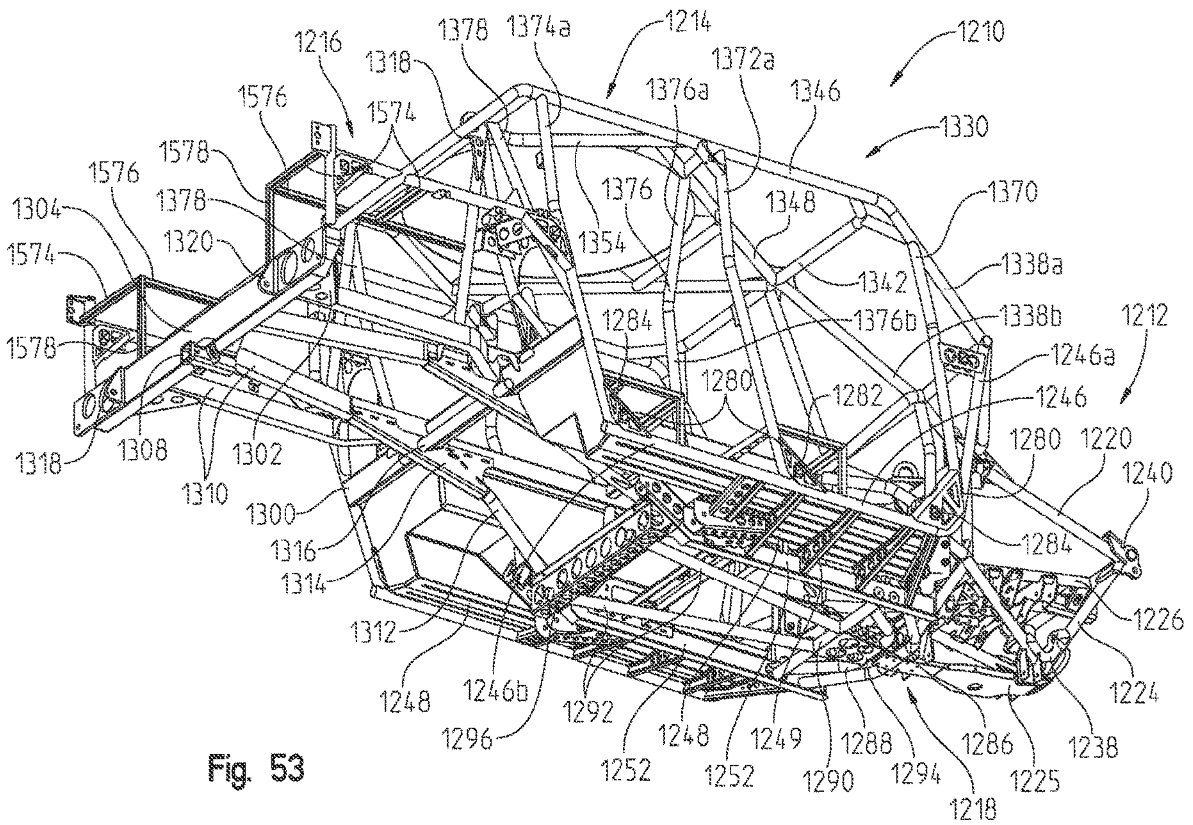
FIG. 53 is a further right rear perspective view of the frame assembly and roll cage assembly of FIG. 50.
Figure 54:
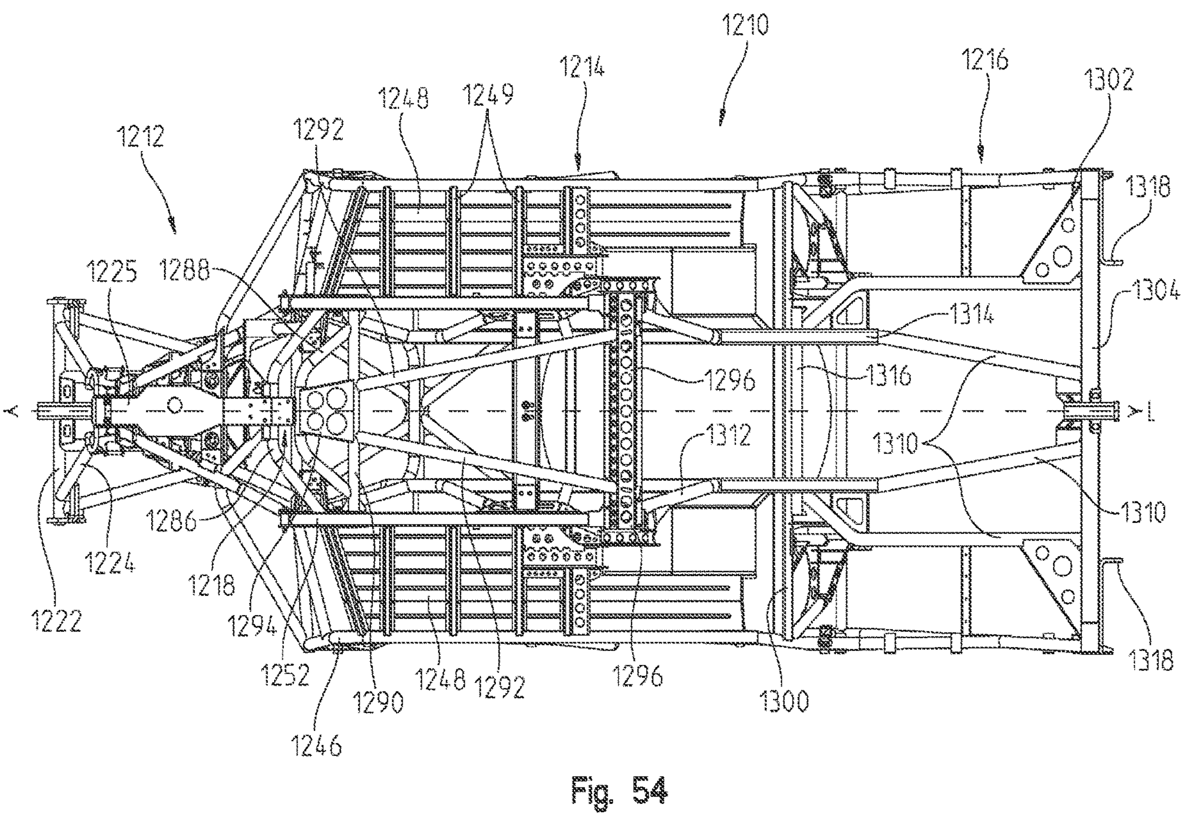
FIG. 54 is a bottom view of the frame assembly of FIG. 50.
Figures 55, 56:
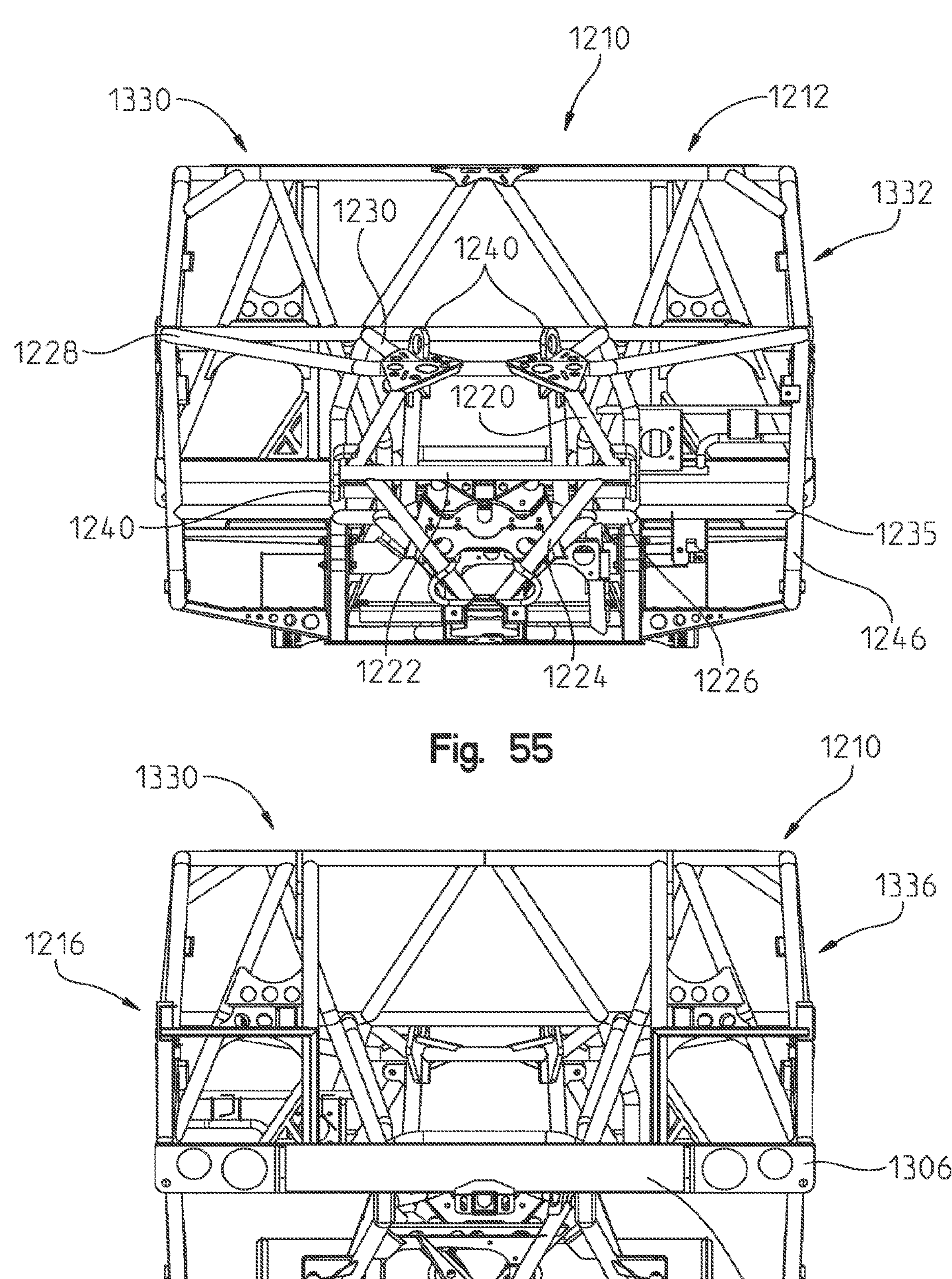
FIG. 55 is a front view of the frame assembly and roll cage assembly of FIG. 50.
FIG. 56 is a rear view of the frame assembly and roll cage assembly of FIG. 50.
Figure 57:
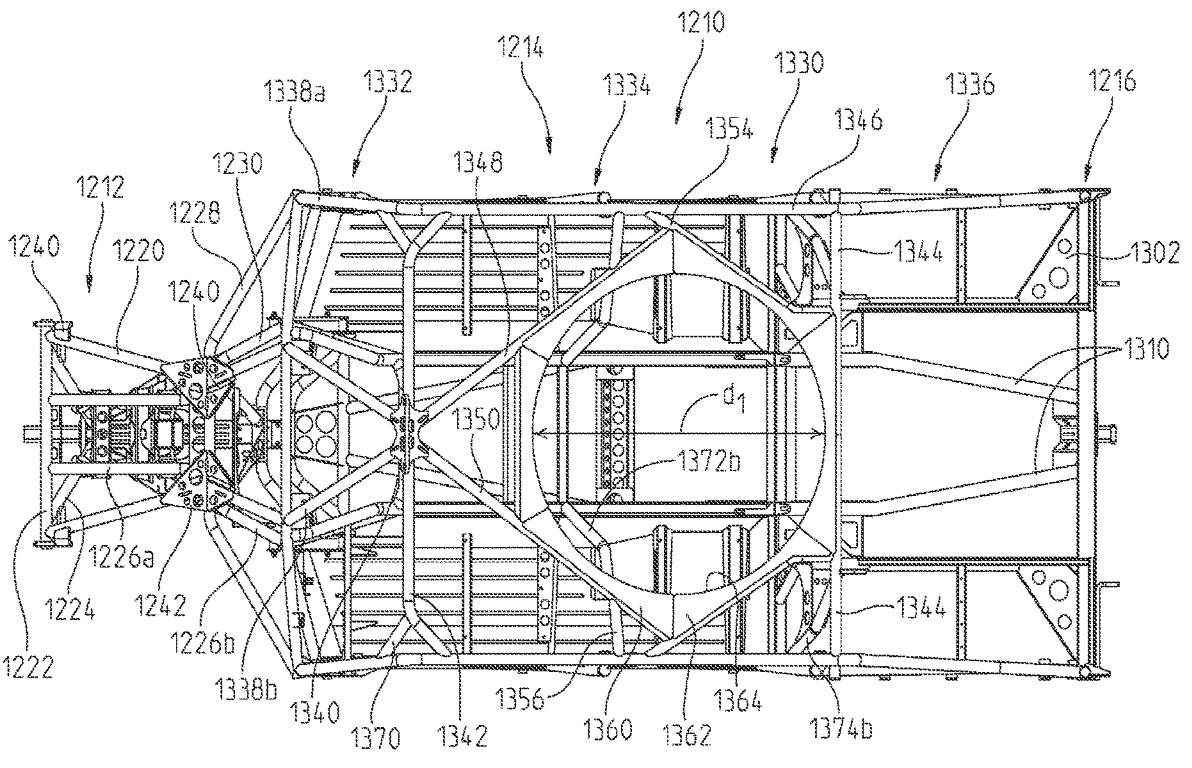
FIG. 57 is a top view of the roll cage assembly of FIG. 50.

Intermediate frame portion 1214 also includes a plurality of frame rails, illustratively upper frame rails 1250 and lower frame rails 1252 (FIGS. 52-54). Upper frame rails 1250 are positioned generally above lower frame rails 1252, and both upper and lower frame rails 1250, 1252 are generally parallel to a longitudinal axis L of vehicle 1200 (FIG. 46). More particularly, as shown best in FIG. 59, lower frame rails 1252 are positioned below and laterally outward from upper frame rails 1250. A rear end of controls mount 1254 is coupled to upper frame rails 1250.

Lower frame rails 1252 are coupled to removable portion 1218 of frame assembly 1210, as detailed further herein. Lower frame rails 1252 also are coupled to floor boards 1248 with a plurality of braces 1249 (FIGS. 53 and 54). Braces 1249 extend between longitudinally-extending portion 1246*b* of longitudinal frame members 1246 and lower frame rails 1252 and are coupled thereto with conventional fasteners, such as welds, rivets, bolts, and/or adhesive. Braces 1249 are generally perpendicular to longitudinal axis L.

Upper and lower frame rails 1250, 1252 define a tunnel area for housing and supporting at least a portion of drivetrain assembly 600. The lateral offset of lower frame rails 1252 relative to upper frame rails 1250 is designed to accommodate the minimum width of drivetrain assembly 600. Walls 1258 may be coupled to upper and lower frame rails 1250, 1252 and extend therebetween in order to shield operator area 1400 from drivetrain assembly 600. More particularly, upper frame rails 1250 define an inner boundary of front and rear seating sections 1402, 1416 and, therefore, walls 1258 shield the operator and passengers within operator area 1400 from the heat, noise, vibration, and movement of drivetrain assembly 600. Walls 1258 may be configured as single components or may be configured as multiple portions coupled together. Walls 1258 may be tapered, as shown best in FIG. 59, due to the lateral offset of lower frame rails 1252 relative to upper frame rails 1250. As such, the front and rear seating sections 1402, 1416 may have increased space for the operator and passengers due to the narrowing or tapered configuration of walls 1258 near upper frame rails 1250.

As shown in FIGS. 50-53, intermediate frame portion 1214 further includes front seat frames 1260 and rear seat frames 1270. Front seat frames 1260 are positioned within front seating section 1402 and include upstanding members 1262, a front brace 1264, a rear brace 1266, and a cross member 1268. Upstanding members 1262 are coupled to longitudinally-extending portion **1246*b* of longitudinal frame members 1246 and/or floor boards 1248. Front and rear braces 1264, 1266 may be coupled to walls 1258 and cross member 1268. Additionally, cross member 1268 may be coupled to roll cage assembly 1330, as detailed further herein. Front seat frames 1260 support operator seat 1404 and front passenger seat 1410 in a side-by-side configuration. Front seat frames 1260 are configured to couple with seat bottom 1408 of operator seat 1404 and seat bottom 1414 of front passenger seat 1410. At least front passenger seat may be removably coupled to front seat frames 1260**.

Similarly, rear seat frames 1270 are positioned within rear seating section 1416 and include upstanding members 1272, a front brace 1274, a rear brace 1276, and a cross member 1278. Upstanding members 1272 are coupled to longitudinally-extending portion **1246*b* of longitudinal frame members 1246 and/or floor boards 1248. Front and rear braces 1274, 1276 may be coupled to walls 1258 and cross member 1278. Additionally, cross members 1278 may be coupled to roll cage assembly 1330, as detailed further herein. Rear seat frames 1270 support at least first and second rear passenger seats 1418, 1424 in a side-by-side configuration. Front brace 1274 may support a seat latch member 1279 for removably coupling first and second rear passenger seats 1418, 1424 to rear seat frames 1270. More particularly, seat bottoms 1422, 1428 of first and second rear passenger seats 1418, 1424 may be removably coupled to seat latch members 1279 for removing first and second rear passenger seats 1418, 1424 from vehicle 1200. As such, first and second rear passenger seats 1418, 1424 may be removed from vehicle 1200** to provide space for additional cargo, as detailed herein.

As shown in FIGS. 42-45 and 50-53, intermediate frame portion 1214 also includes a plurality of brackets, illustratively accessory brackets 1280. As shown best in FIG. 52, each side of vehicle 1200 includes three accessory brackets 1280. Accessory brackets 1280 are coupled to longitudinal frame members 1246 and roll cage assembly 1330. Accessory brackets 1280 are configured to couple with various accessories positioned laterally outward of vehicle 1200. More particularly, accessory brackets 1280 may include a tube portion 1282 extending from accessory brackets 1280 that includes an opening 1284. Accessories, such as an auxiliary standing platform, a litter carrier, an auxiliary cargo platform, and/or a gun or ammunition support member, may be coupled to vehicle 1200 when a portion of such accessories is received within opening 1284 of tube portion 1282. For example, tube portion 1282 may be configured similar to a receiver hitch of a trailer in order to receive a rod, tube, or other similar shaft member of the accessory. Alternatively, accessory brackets 1280 may be configured to couple with the accessories in other ways, for example, through clamps, bolts, latches, cables, wires, ropes, or other similar coupling mechanisms. As such, retrofitted or add-on accessories may be supported by vehicle 1200 and positioned laterally outward from operator area 1400, frame assembly 1210, and roll cage assembly 1330.

Intermediate frame portion 1214 further includes a brace member 1296, which couples removable portion 1218 of frame assembly 1210 to intermediate frame portion 1214. Brace member 1296 is coupled to lower frame rails 1252 and rear frame portion 1216, as detailed further herein. Brace member 1296 is generally positioned below rear seating section 1416 of vehicle 1200.

Removable portion 1218 of frame assembly 1210 is coupled to front and intermediate frame portions 1212, 1214, as shown best in FIGS. 53 and 54. Removable portion 1218 includes a front cross member 1286, a middle cross member 1288, a rear cross member 1290, a movable member 1294, and diagonal members 1292. More particularly, front cross member 1286 is coupled to mounting plate 1225 and lower frame rails 1252. Middle cross member 1288 is spaced apart from front cross member 1286 and is coupled to movable member 1294 and lower frame rails 1252. Additionally, rear cross member 1290 is coupled to movable member 1294 and lower frame rails 1252. Diagonal members 1292 are coupled to rear cross member 1290 and are coupled to brace member 1296. Diagonal members 1292 are angled relative to rear cross member 1290 and longitudinal axis L (FIG. 54).

Movable member 1294 is operably coupled to mounting plate 1225 and is configured to move, pivot, or rotate relative to mounting plate 1225. Alternatively, movable member 1294 may be removably coupled to mounting plate 1225 such that removable portion 1218 may be removed from frame assembly 1210. As such, movable member 1294 allows removable portion 1218 to move away from frame assembly 1210, thereby making the tunnel area accessible for assembling, disassembling, accessing, and servicing drivetrain assembly 600 and/or portions of frame assembly 1210.

Figure 43:
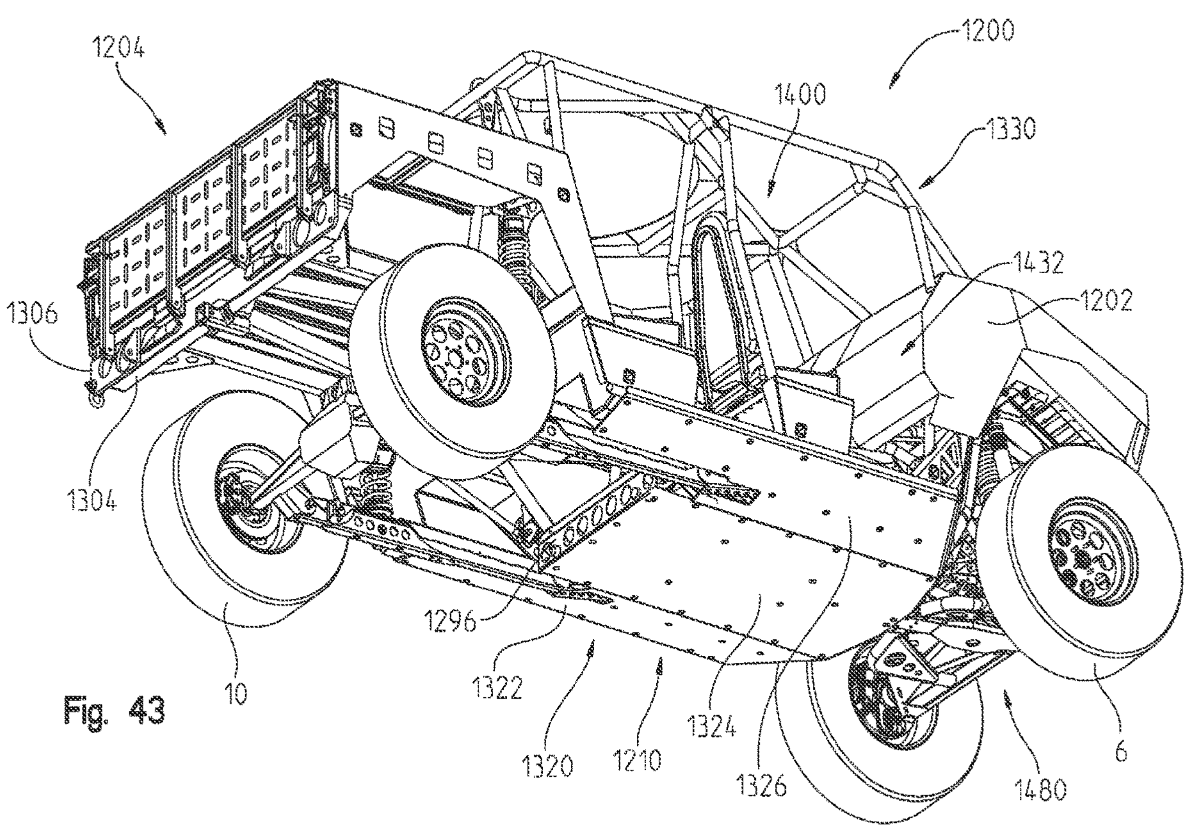
FIG. 43 is a right rear perspective view of the alternative embodiment vehicle of FIG. 42.
Figure 44:
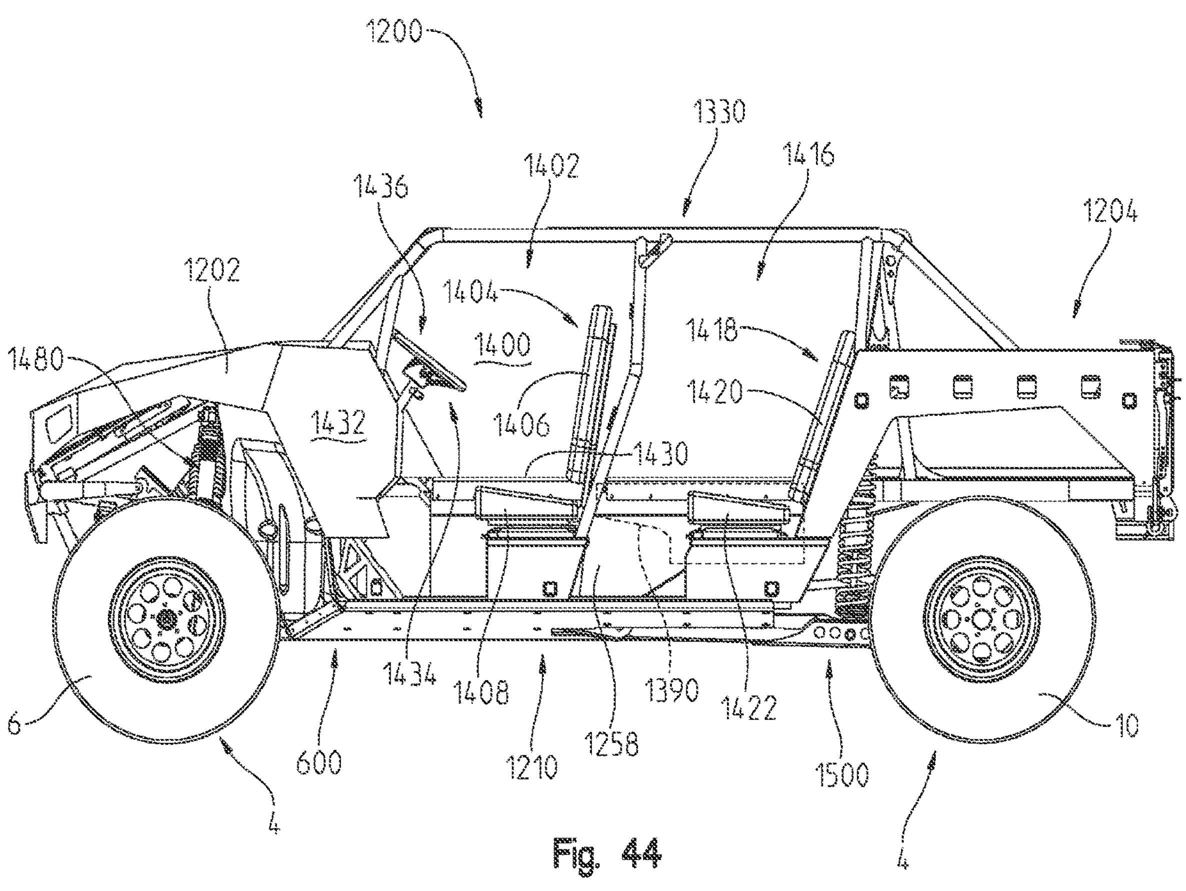
FIG. 44 is a left side view of the alternative embodiment vehicle of FIG. 42.
Figure 45:
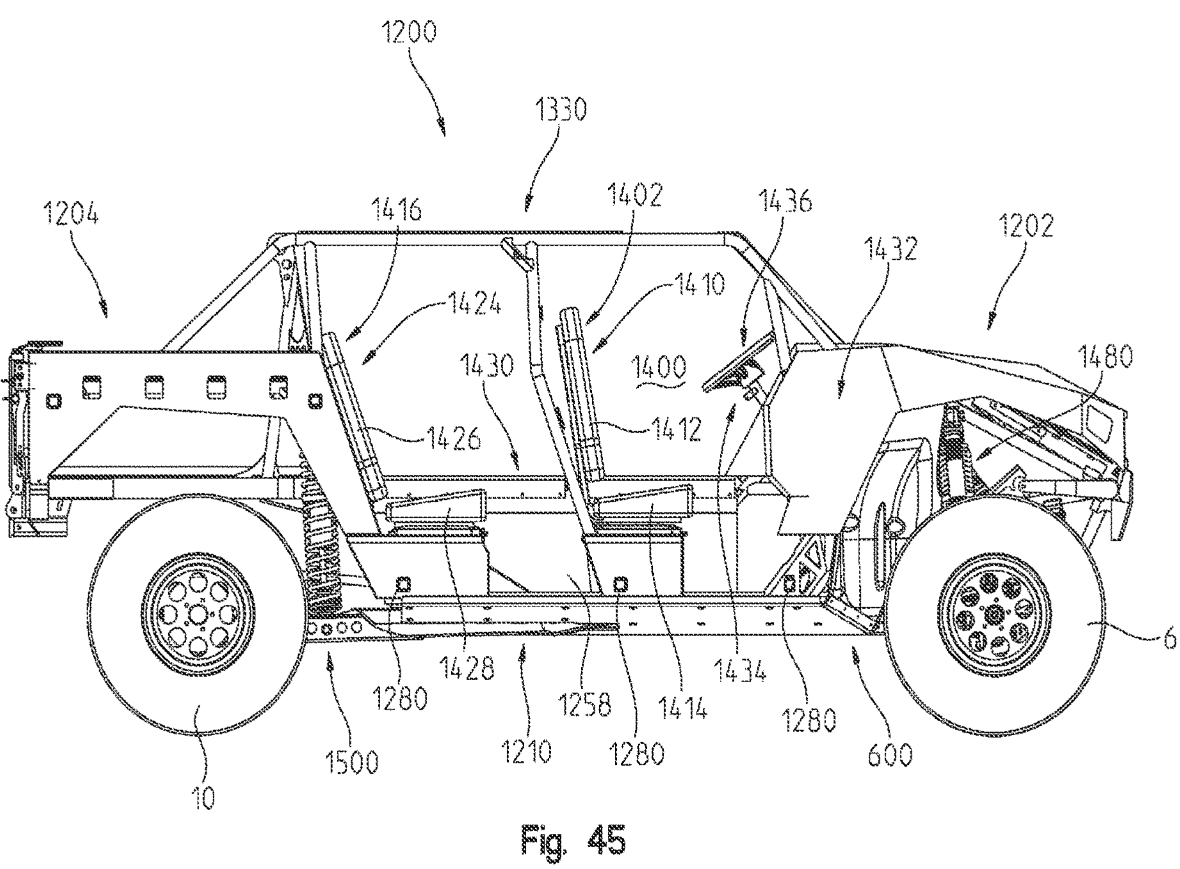
FIG. 45 is a right side view of the alternative embodiment vehicle of FIG. 42.
Figure 47:
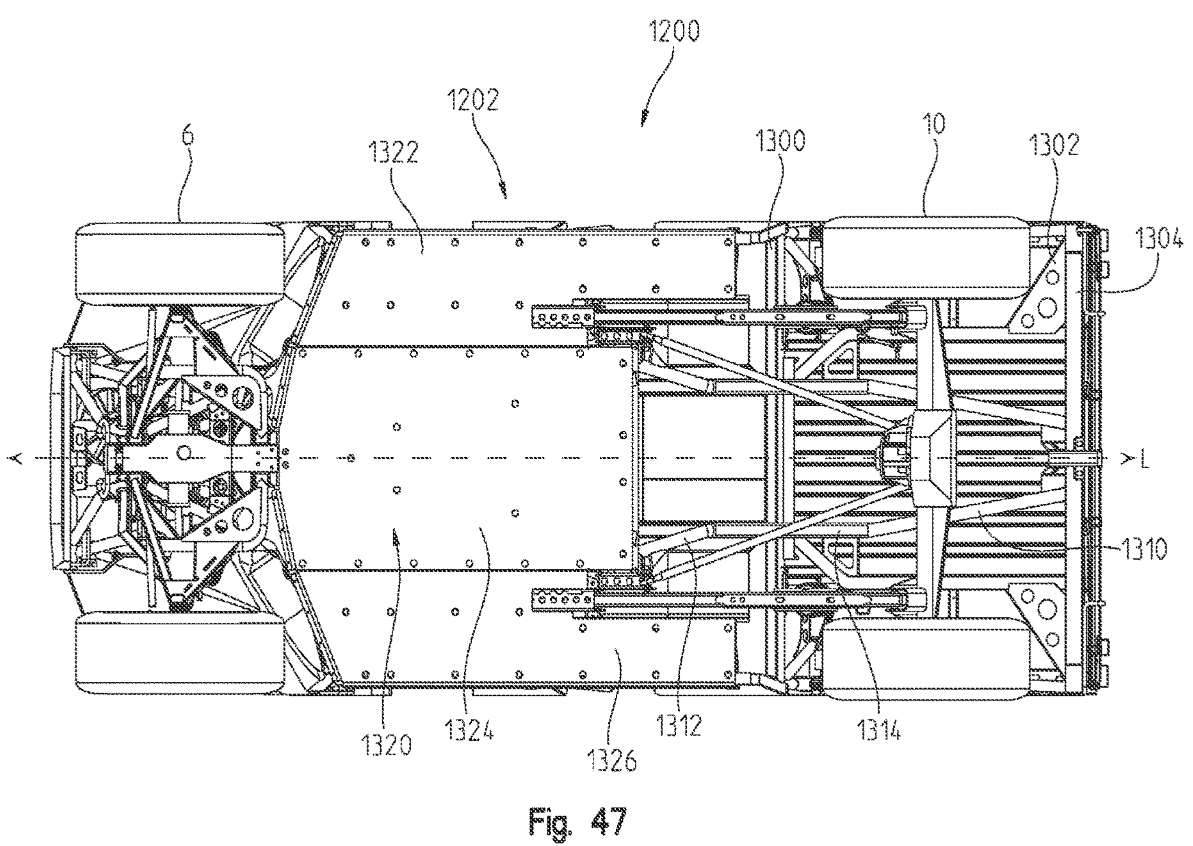
FIG. 47 is a bottom view of the alternative embodiment vehicle of FIG. 42.
Figures 48, 49:
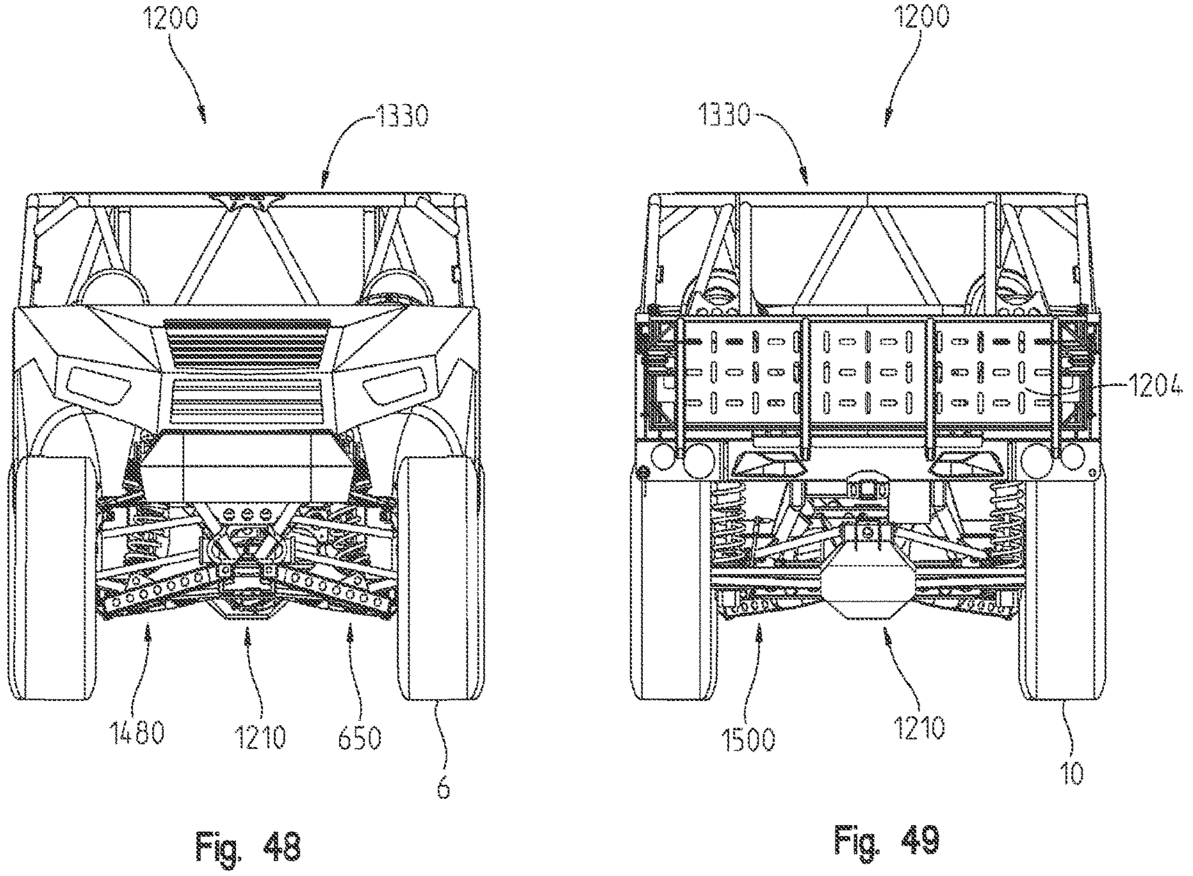
FIG. 48 is a front view of the alternative embodiment vehicle of FIG. 42.
FIG. 49 is a rear view of the alternative embodiment vehicle of FIG. 42.

Intermediate frame portion 1214 also includes a skid plate assembly 1320, as shown best in FIGS. 43 and 47. Skid plate assembly 1320 may be comprised of reinforced materials. For example, skid plate assembly 1320 may be configured as armor for vehicle 1200 or may be configured to support armor for vehicle 1200. Skid plate assembly 1320 illustratively includes a left-side portion 1322, a center portion 1324, and a right-side portion 1326. Portions 1322, 1324, 1326 may be integrally coupled together or coupled together with conventional fasteners, such as welds, rivets, bolts, and/or adhesive. Center portion 1324 generally surrounds removable portion 1218 of frame assembly 1210 and, as shown in FIG. 59, extends in a generally horizontal direction along intermediate frame portion 1214. Conversely, left-side and right-side portions 1322, 1326 are beveled or angled relative to center portion 1324. The angle of left-side and right-side portions 1322, 1326 may be configured for off-camber driving and may increase the ground clearance of vehicle 1200.

As shown in FIGS. 50-56, rear frame portion 1216 is generally positioned rearward of intermediate frame portion 1214 and supports rear cargo area 1204. Rear frame portion 1216 includes a cross brace 1300, brackets 1302, a tailgate support member 1304, rear plates 1306, an accessory mount, illustratively a trailer hitch 1308, a plurality of rear longitudinal support members 1310, frame members 1312, braces 1314, and a cross bar 1316. As shown best in FIG. 53, cross brace 1300 is coupled to roll cage assembly 1330 and is positioned rearward of operator area 1400. Cross brace 1300 generally spans the width of roll cage assembly 1330 and is coupled to rear longitudinal support members 1310.

Rear longitudinal support members 1310 extend rearwardly from cross brace 1300 and are configured to support a cargo surface or platform, as detailed further herein. A forward end of rear longitudinal support members 1310 is coupled to cross brace 1300 and a rearward end of rear longitudinal support members 1310 is coupled to tailgate support member 1304.

Tailgate support member 1304 generally defines the rearward boundary of frame assembly 1210 and is coupled to rear longitudinal support members 1310 with brackets 1302. Tailgate support member 1304 may integrally formed with, or is otherwise coupled to, rear plates 1306 which may support rear lights, such as tail lights, turn signals, reverse lights, and auxiliary lights, on rear frame portion 1216. Rear plates 1306 also include integral accessory mounts 1318. Illustratively, rear frame portion 1216 includes at least two accessory mounts 1318 integrally coupled to and/or formed with rear frame portion 1216. Additionally, accessory mounts 1318 may integrally coupled with roll cage assembly 1330, as detailed further herein. As such, there may be at least four accessory mounts 1318 integrally coupled to vehicle 1200, which may increase the strength, rigidity, and stability of rear frame portion 1216 and roll cage assembly 1330.

Illustratively, accessory mounts 1318 are tie-downs configured to support vehicle 1200 during an air lift, an air drop, when secured during transportation, for example on an air craft carrier, or in other similar situations. Additionally, accessory mounts 1318 may be configured for other applications, such as supporting cargo, vehicle systems, and/or vehicle components. In this way, the integration of accessory mounts 1318 with rear frame portion 1216 allows loads and forces applied to vehicle 1200 to be transmitted directly to frame assembly 1210 through accessory mounts 1318.

Additionally, tailgate support member 1304 may further include integrated couplings for supporting a rear bumper on vehicle 1200. Because the rear bumper is supported by couplings that are integrally formed with rear frame portion 1216, loads and forces applied to the rear bumper may be directly transmitted to frame assembly 1210, thereby increasing the structural integrity of vehicle 1200.

Referring to FIGS. 50-59, roll cage assembly 1330 is shown. Roll cage assembly 1330 includes a front portion 1332, an intermediate portion 1334, and a rear portion 1336. Portions 1332, 1334, and 1336 of roll cage assembly 1330 may be integrally coupled together or may be coupled together with conventional fasteners, such as welds, rivets, bolts, and/or adhesive. Roll cage assembly 1330 may be comprised of a structural material, such as a metallic or polymeric material, for example steel.

Front portion 1332 of roll cage assembly 1330 includes a plurality of frame members 1338 coupled to cross members 1232 of intermediate frame portion 1214. Illustratively, vehicle 1200 includes four frame members 1338 extending upwardly and rearwardly from cross members 1232. More particularly, frame members 1338 include outer frame members **1338*a* and inner frame members 1338*b* extending from cross members 1232. Inner frame members 1338*b* are couple to intermediate portion 1334 of roll cage assembly 1330 through a mounting plate 1340, however, outer frame members 1338*a* are spaced apart from mounting plate 1340. Inner frame members 1338*b* are angled inwardly to couple with mounting plate 1340**.

Intermediate portion 1334 of roll cage assembly 1330 is generally positioned rearward of front portion 1332. Intermediate portion 1334 includes a front cross member 1342, a rear cross member 1344, and longitudinally-extending members 1346 extending therebetween. Longitudinally-extending members 1346 of roll cage assembly 1330 define an outer boundary of roll cage assembly 1330. Illustratively, rear cross member 1344 is coupled to longitudinally-extending members 1346. Similarly, front cross member 1342 also is coupled to longitudinally-extending members 1346 and is further coupled to mounting plate 1340. In one embodiment, front cross member 1342 is a single member extending between longitudinally-extending members 1346. Alternatively, front cross member 1342 may be comprised of at least two separate members coupled together. For example, the various members of front cross member 1342 may be coupled together at mounting plate 1340.

Additionally, intermediate portion 1334 may include a sub-frame assembly defined by front diagonal members 1348, 1350 and rear diagonal members 1352, 1354. Front diagonal members 1348, 1350 are coupled to mounting plate 1340 and extend rearwardly away from each other to couple with rear diagonal members 1354, 1352, respectively. Additionally, the rear end of each front diagonal member 1348, 1350 may be coupled to longitudinally-extending members 1346 via brace members 1356. It may be appreciated that mounting plate 1340 couples together six frame members of roll cage assembly 1330, illustratively inner members **1338*b* of front portion 1332, at least one front cross member 1342 of intermediate portion 1334, and front diagonal members 1348, 1350 of intermediate portion 1334**.

Rear diagonal members 1352, 1354 of intermediate portion 1334 are coupled to longitudinally-extending members 1346 and rear cross member 1344. Rear diagonal members 1352, 1354 extend rearwardly from front diagonal members 1348, 1350 and are angled inwardly towards each other.

The configuration of the sub-frame assembly of intermediate portion 1334 supports a turret mount 1360. Turret mount 1360 is coupled to diagonal members 1348, 1350, 1352, 1354, as well as rear cross member 1344. More particularly, as shown in FIGS. 50-52 and 58, turret mount 1360 may be coupled to the inner surfaces of diagonal members 1348, 1350, 1352, 1354, and rear cross member 1344. As such, turret mount 1360 may be generally flush with the upper surfaces of diagonal members 1348, 1350, 1352, 1354, and rear cross member 1344, such that turret mount 1360 does not extend above diagonal members 1348, 1350, 1352, 1354, or rear cross member 1344. Alternatively, the height of turret mount 1360 may be adjustable such that turret mount 1360 may be coupled to, or spaced apart from, diagonal members 1348, 1350, 1352, 1354, and rear cross member 1344.

Turret mount 1360 includes a plate portion 1362 and an opening 1364. Opening 1364 may have an inner diameter $d_1$ of approximately 40-50 inches. More particularly, inner diameter $d_1$ may be approximately 47-48 inches and, illustratively, inner diameter $d_1$ is approximately 47.7 inches.

Figure 58:
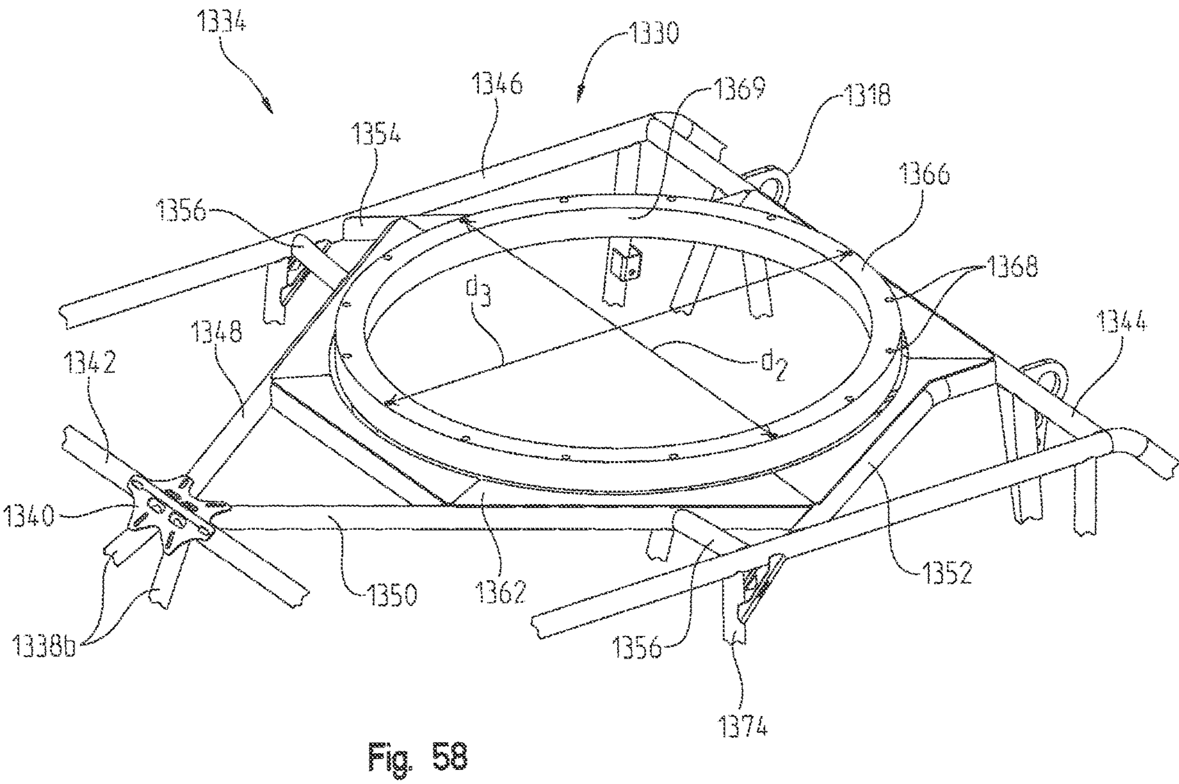
FIG. 58 is a left front perspective view of a portion of the roll cage assembly of FIG. 57.

Referring to FIG. 58, turret mount 1360 is configured to accommodate a gun ring or turret 1366. Gun turret 1366 is configured to couple with turret mount 1360, illustratively on top of plate portion 1362 and/or within opening 1364. Alternatively, the height of gun turret 1366 may be adjustable such that gun turret 1366 may be spaced apart from turret mount 1360. Gun turret 1366 includes a plurality of apertures 1368 for mounting a gun or other weapon thereon. Gun turret 1366 may be configured to move or rotate about opening 1364 in order to adjust the position of any gun or other weapon supported by gun turret 1366 relative to plate portion 1362. Alternatively, a gun or weapon may be rotatably or otherwise movably coupled to gun turret 1366 such that the gun or weapon may move relative to a fixed position of gun turret 1366.

Gun turret 1366 includes an opening 1369, which may have an adjustable diameter $d_2$. For example, diameter $d_2$ may be approximately 35-45 inches and, more particularly, may be approximately 41.9 inches. As such, the size of opening 1369 may be adjusted to accommodate various types and sizes of guns or other weapons. An outer diameter $d_3$ of gun turret 1366 also may be adjustable in order to accommodate various types and sizes of weapons for specific applications. For example, outer diameter $d_3$ may be approximately 40-50 inches and, more particularly, may be approximately 46.7 inches. Additionally, both turret mount 1360 and gun turret 1366 may be removably coupled to each other and/or to roll cage assembly 1330, thereby allowing different turret mounts 1360 and/or gun turrets 1366 to be used with vehicle 1200.

Referring again to FIGS. 50-53, intermediate portion 1334 of roll cage assembly 1330 also includes a front upstanding pillar member 1370, an intermediate upstanding pillar member 1372, and a rear upstanding pillar member 1374. As shown in FIGS. 51 and 52, front upstanding pillar member 1370 is generally linear and is angled rearwarly from longitudinal frame member 1246. Illustratively, front upstanding pillar member 1370 is coupled to longitudinal frame member 1246 and outer frame member 1338*a*. Front upstanding pillar member 1370 also may be coupled to accessory bracket 1280. The rearward angle of front upstanding pillar member 1370 positions front upstanding pillar member 1370 within operator area 1400 but does not cause any interference with front seating section 1402. As such, the operator and front passenger are able to freely move into and out of vehicle 1200 and within operator area 1400.

Intermediate portion 1334 of roll cage assembly 1330 also includes intermediate upstanding pillar member 1372. Intermediate upstanding pillar member 1372 is positioned rearward of front upstanding pillar member 1370 and front seating section 1402, and is coupled to front seat frame 1260, accessory bracket 1280, longitudinal frame member 1246, and longitudinally-extending members 1346. Illustratively, intermediate upstanding pillar member 1372 includes an upper portion 1372*a* and a lower portion 1372*b*. Lower portion 1372*b* is coupled to accessory bracket 1280, longitudinal frame member 1246, and front seat frame 1260, and is angled rearwardly relative thereto. Upper portion 1372*a* is coupled to lower portion 1372*b* and extends generally vertically therefrom in order to couple with longitudinally-extending members 1346 of roll cage assembly 1330. By angling lower portion 1372*b* rearwardly, the operator and front passenger are afforded additional space for ingress and egress. Additionally, the rearward angle of intermediate upstanding pillar member 1372 may provide the operator and front passenger with additional space for movement while seated in front seating section 1402.

As shown in FIGS. 51 and 53, an inner upstanding pillar member 1376 is positioned generally adjacent intermediate upstanding pillar member 1372. As with intermediate upstanding pillar member 1372, inner upstanding pillar member 1376 is positioned rearward of front seating section 1402. Inner upstanding pillar members 1376 are coupled to front diagonal members 1348, 1350 and/or brace members 1356. Inner upstanding pillar members 1376 also are coupled to upper frame rails 1250. Inner upstanding pillar members 1376 have the same general profile as intermediate upstanding pillar members 1372, in that inner upstanding pillar members 1376 include an upper portion 1376*a* and a lower portion 1376*b*. Lower portion 1376*b* is coupled to upper frame rails 1250 and extends rearwardly and upwardly therefrom. Upper portion 1376*a* is coupled to front diagonal members 1348, 1350 and lower portion 1376*b*, and extends generally vertically upward from lower portion 1376*b*. Upper portion 1376*a* may be positioned laterally outward from lower portion 1376*b* such that inner upstanding pillar member 1376 is angled inwardly toward upper frame rails 1250 and does not extend directly downward. As such, inner upstanding pillar member 1376 may be angled inwardly, as well as angled rearwardly. The angled configuration of inner upstanding pillar members 1376 allows the operator and front passenger additional space for movement within operator area 1400 and during ingress and egress. Inner upstanding pillar members 1376 also may increase the structural support and stability of the center portion of vehicle 1200.

Intermediate portion 1334 of roll cage assembly 1330 also includes rear upstanding pillar member 1374, which is positioned rearward of intermediate upstanding pillar member 1372 and rear seating section 1416. Rear upstanding pillar member 1374 is coupled to longitudinal frame member 1246, accessory bracket 1280, rear seat frame 1270, and longitudinally-extending member 1346. Illustratively, rear upstanding pillar member 1374 includes an upper portion 1374*a* and a lower portion 1374*b*. Lower portion 1374*b* is coupled to accessory bracket 1280, longitudinal frame member 1246, and rear seat frame 1270, and is angled rearwardly relative thereto. Upper portion 1374*a* is coupled to lower portion 1374*b* and extends generally vertically upwards therefrom in order to couple with longitudinally-extending members 1346 of roll cage assembly 1330. By angling lower portion 1374*b* rearwardly, the rear passengers are afforded more space for ingress and egress. Additionally, the rearward angle of rear upstanding pillar member 1374 may provide the rear passengers with additional space for movement while seated in rear seating section 1416.

Referring to FIGS. 51 and 53, intermediate portion 1334 of roll cage assembly 1330 may also include rear inner pillar members 1378 positioned generally adjacent to rear upstanding pillar members 1374. Illustratively, intermediate portion 1334 may include four rear inner pillar members 1378. Rear inner pillar members 1378 may be coupled to rear cross member 1344 and cross brace 1300 of rear frame portion 1216. Rear inner pillar members 1378 may have a rearwardly-angled profile similar to that of rear upstanding pillar members 1374 and also are positioned rearward of rear seating section 1416.

As shown in FIGS. 51-53, rear portion 1336 of roll cage assembly 1330 includes upstanding members 1380 and diagonal members 1382. Upstanding members 1380 are coupled to rear longitudinal support members 1310 of rear frame portion 1216 and extend upwardly therefrom. Additionally, upstanding members 1380 are angled forwardly relative to rear longitudinal support members 1310 in order to couple with rear cross member 1344 of roll cage assembly 1330. As shown in FIG. 51, upstanding members 1380 may include accessory mounts 1318. Accessory mounts 1318 may be integrally formed with, or otherwise coupled to, upstanding members 1380 such that any load or force applied to accessory mounts 1318 may be directly transmitted to roll cage assembly 1330, thereby increasing the structural integrity of vehicle 1200. Illustratively, accessory mounts 1318 are tie-downs configured to support vehicle 1200 during an air lift, an air drop, during transportation (e.g., on an aircraft carrier), and also may be configured to support additional cargo for vehicle 1200.

Diagonal members 1382 of rear portion 1336 of roll cage assembly 1330 are coupled to rear cross member 1344 and/or longitudinally-extending members 1346 and are angled rearwardly and downwardly therefrom in order to couple with tailgate support member 1304. Diagonal members 1382 also may be coupled to a cargo bed frame assembly 1532, as detailed further herein.

Referring to FIGS. 42-49 and 59, operator area 1400 includes a plurality of body panels, such as a tunnel member 1430 and a dash board assembly 1432 for covering and protecting the systems and other components of vehicle 1200. In particular, tunnel member 1430 is coupled to upper frame rails 1250 with conventional fasteners, such as bolts, welds, rivets, and/or adhesive. Tunnel member 1430 may increase the strength, rigidity, and structural integrity of frame assembly 1210. Tunnel member 1430 extends rearwardly from dash board assembly 1432 and generally along longitudinal axis L of vehicle 1200. As shown in FIG. 46, tunnel member 1430 is positioned between operator seat 1404 and front passenger seat 1410 and also between first and second rear passenger seats 1418, 1424. In this way, tunnel member 1430 creates a flat or planar platform between seats 1404, 1414, 1418, 1424. Tunnel member 1430 extends rearwardly to couple with cargo bed frame assembly 1532 and is positioned at approximately the same height as a portion of a cargo bed platform 1534, as detailed further herein.

Illustratively, as shown in FIG. 59, tunnel member 1430 cooperates with walls 1258 to define the tunnel area for housing various assemblies, systems, and components of vehicle 1200, such as drivetrain assembly 600. Walls 1258 may be angled outwardly relative to tunnel member 1430 such that the upper portion of the tunnel area has a tapered configuration. In other words, the width at the bottom of the tunnel area (i.e., the width between lower frame rails 1252) is greater than the width at the top of the tunnel area (i.e., the width between upper frame rails 1250). As such, the profile of the tunnel area may be trapezoidal in cross-section. Tunnel member 1430 defines a passenger and cargo platform, as detailed further herein. The width of tunnel member 1430 and, therefore, the width between upper frame rails 1250 is sized to accommodate a passenger and/or cargo. As shown in FIG. 59, tunnel member 1430 generally encloses at least a portion of drivetrain assembly 600.

Also, as shown in FIG. 46, a fuel tank 1390 is generally enclosed by tunnel member 1430. By being positioned below tunnel member 1430, fuel tank 1390 is generally positioned along longitudinal axis L of vehicle 1200. More particularly, fuel tank 1390 is positioned between first and second rear passenger seats 1418, 1424. In this way, fuel tank 1390 is centrally positioned within vehicle 1200 and, therefore, is assists in evenly distributing weight on vehicle 1200. Also, the central position of fuel tank 1390 protects fuel tank 1390 from objects that may contact vehicle 1200, for example off-road debris. Additionally, by supporting fuel tank 1390 below tunnel member 1430, the position of fuel tank 1390 is low within vehicle 1200, which may decrease the overall center of gravity of vehicle 1200. It may also be appreciated that fuel tank 1390 is substantially spaced apart from any gun fire or weapon fire occurring at gun turret 1366. In one embodiment, the capacity of fuel tank 1390 is approximately 18 gallons.

Figure 46A:
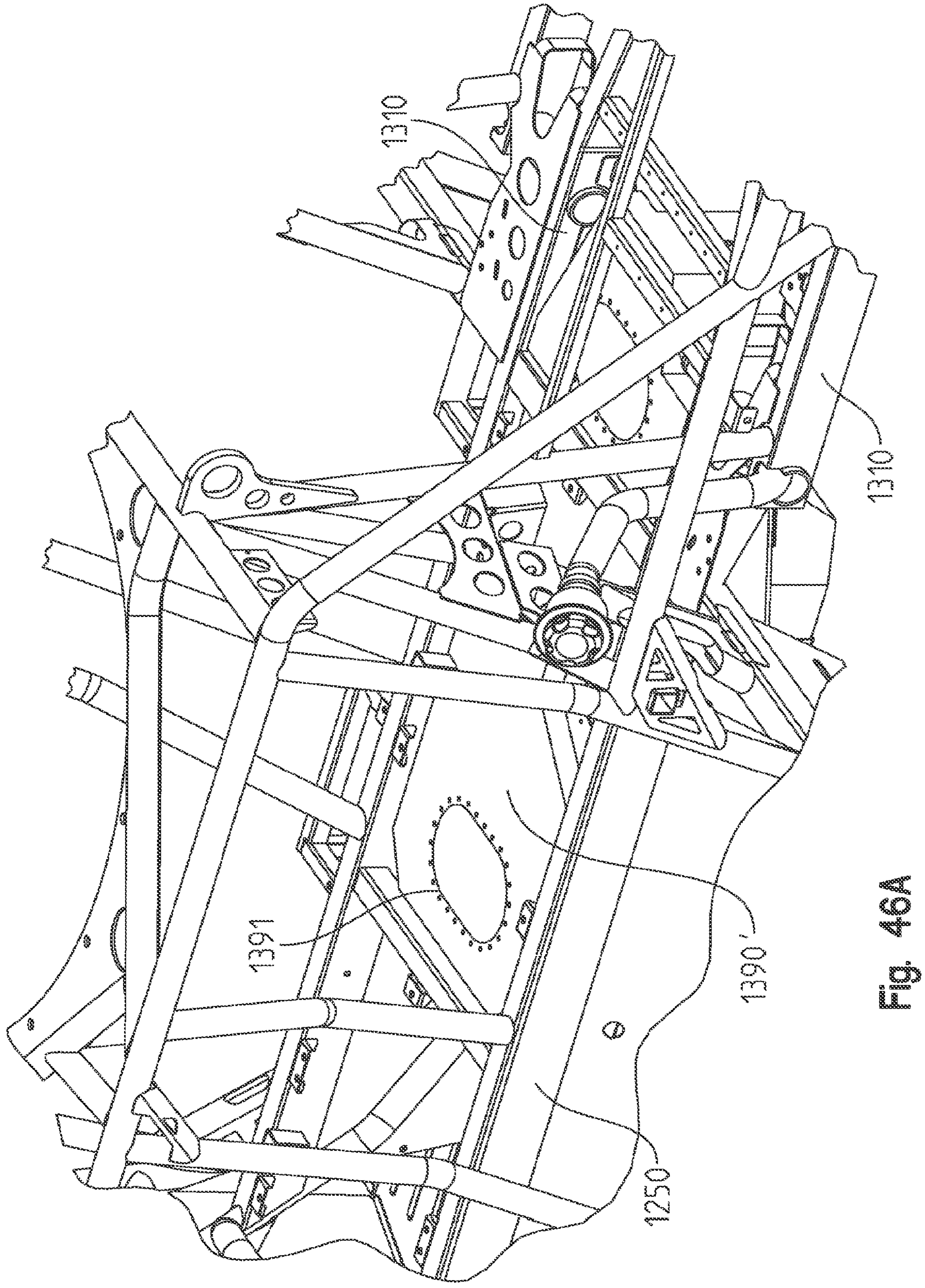
FIG. 46A is a rear perspective view of an alternative embodiment fuel tank assembly.
Figure 46B:
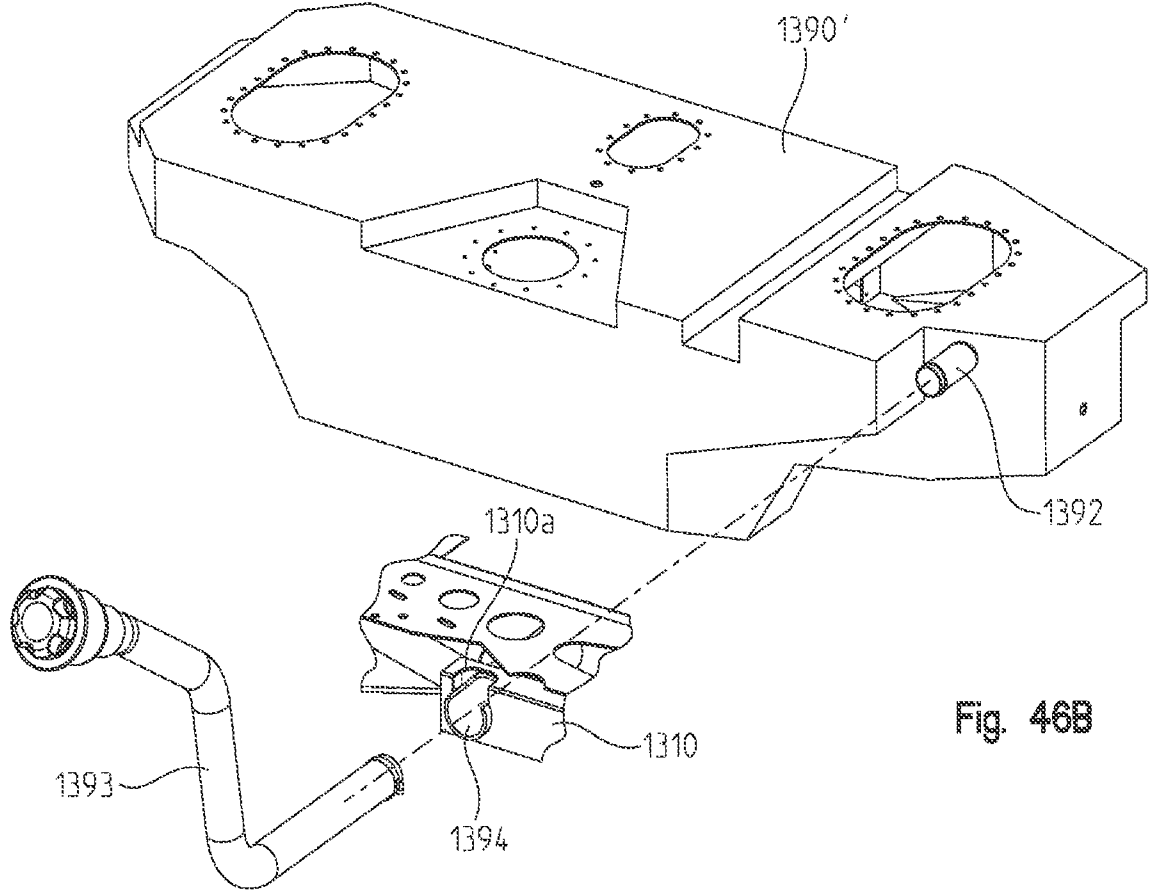
FIG. 46B is an exploded view of the alternative embodiment fuel tank assembly of FIG. 46A.

Referring to FIGS. 46A and 46B, an alternative embodiment fuel tank 1390' is shown. Fuel tank 1390' is positioned under tunnel member 1430 (FIG. 59) and between upper frame rails 1250. Additionally, a portion of fuel tank 1390' extends rearwardly and is supported between rear longitudinal support members 1310. As such, fuel tank 1390' is centrally positioned on vehicle 1200, which both assists in evenly distributing weight on vehicle 1200 and also protects the fuel from any impacts to the side of vehicle 1200. Additionally, frame assembly 1210 is configured to both accommodate fuel tank 1390' and maintain its load-carrying capacity. In other words, frame assembly 1210 is configured to transfer loads to the central portion thereof despite the placement of fuel tank 1390'.

As shown in FIG. 46B, fuel tank 1390' has a generally elongated configuration such that the longitudinal length or dimension of fuel tank 1390' is greater than the vertical depth of fuel tank 1390'. Fuel tank 1390' includes a plurality of apertures 1391, an inlet tube 1392, and a fill tube 1393. Fill tube 1393 is connected to inlet tube 1392 through an intermediate tube 1394, which is supported on one of the rear longitudinal support members 1310. More particularly, intermediate tube 1394 is supported within a notched portion **1310*a* of rear longitudinal support member 1310. By including notched portion 1310*a* on rear longitudinal support member 1310, fill tube 1393 is able to easily connect with intermediate tube 1394 and also extend laterally outward in order to be accessible from the side of vehicle 1200**.

Figure 73:
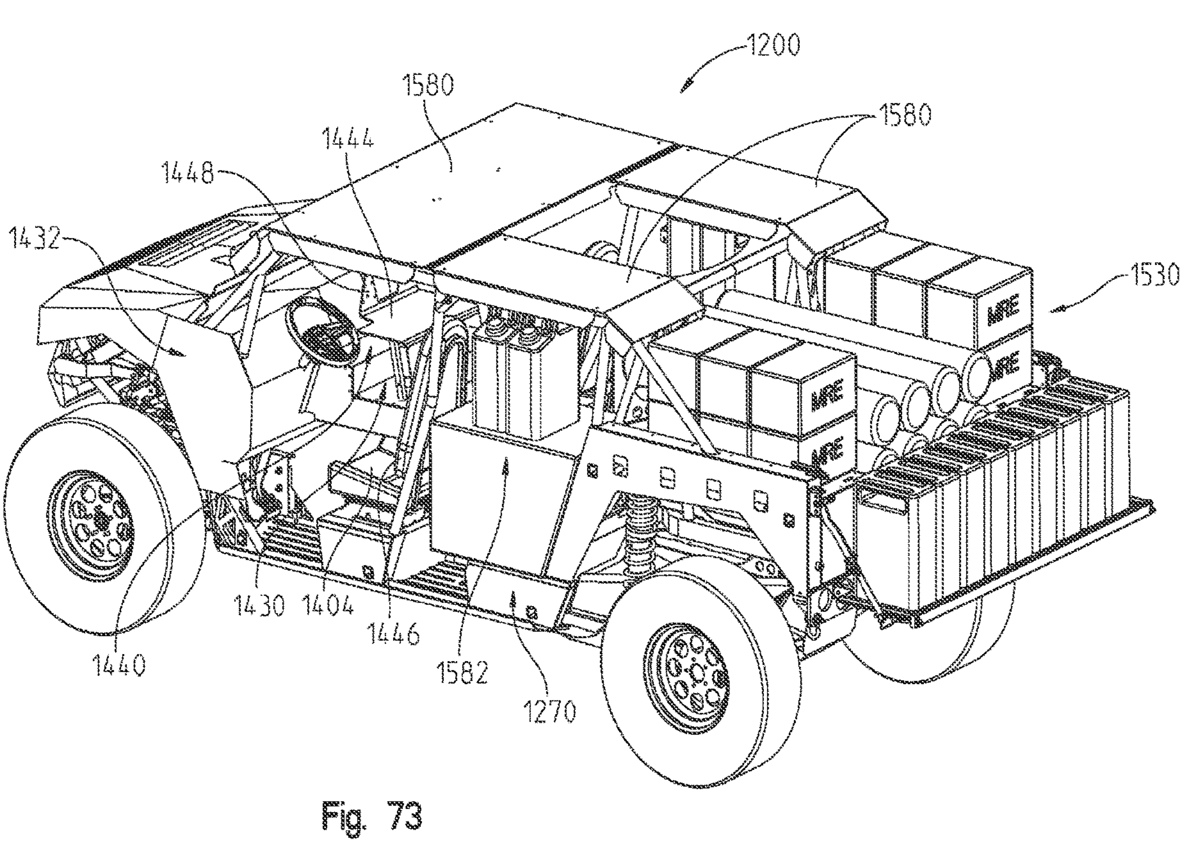
FIG. 73 is left rear perspective view of an alternative embodiment of the vehicle of FIG. 42, showing the vehicle configured to support additional cargo.
Figure 74:
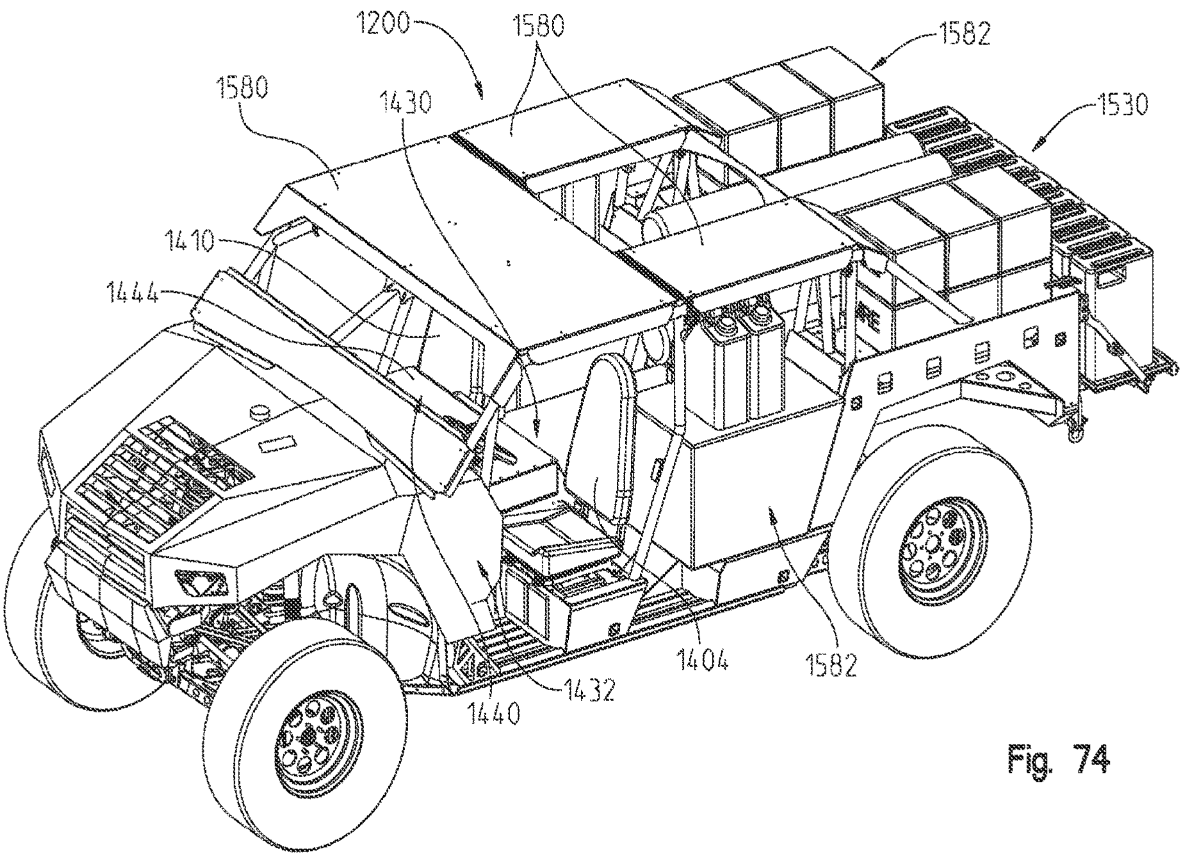
FIG. 74 is a left front perspective view of the alternative embodiment vehicle of FIG. 73.

As shown in FIGS. 42-49, dash board assembly 1432 also encloses various components, systems, and assemblies of vehicle 1200. For example, dash board assembly 1432 encloses a portion of operator controls 1434. Operator controls 1434 include at least a plurality of instruments, gauges, a steering assembly 1436, a brake assembly 1438, and other components operably coupled to an electrical system 1440 of vehicle 1200. Dash board assembly 1432 may enclose at least one electrical panel, such as a breaker panel in order to minimize the number of fuses and/or other electrical connections within dash board assembly 1432 and/or centralize the fuses and other electrical connections within dash board assembly 1432. Additionally, electrical system 1440 may include a plurality of outlets or plug-in adapters that are configured to charge accessories within vehicle 1200, for example cell phones, computers, navigation systems, and radar systems. In one embodiment, electrical system 1440 includes five plug-in adapters for charging accessories. In a further embodiment, for example as shown in FIGS. 73 and 74, a tray 1444 for a computer or other electronic or communications device is included on vehicle 1200. Tray 1444 includes a plurality of legs 1446 coupled to tunnel member 1430 and at least one bracket 1448 coupled to dash board assembly 1432.

Figure 60:
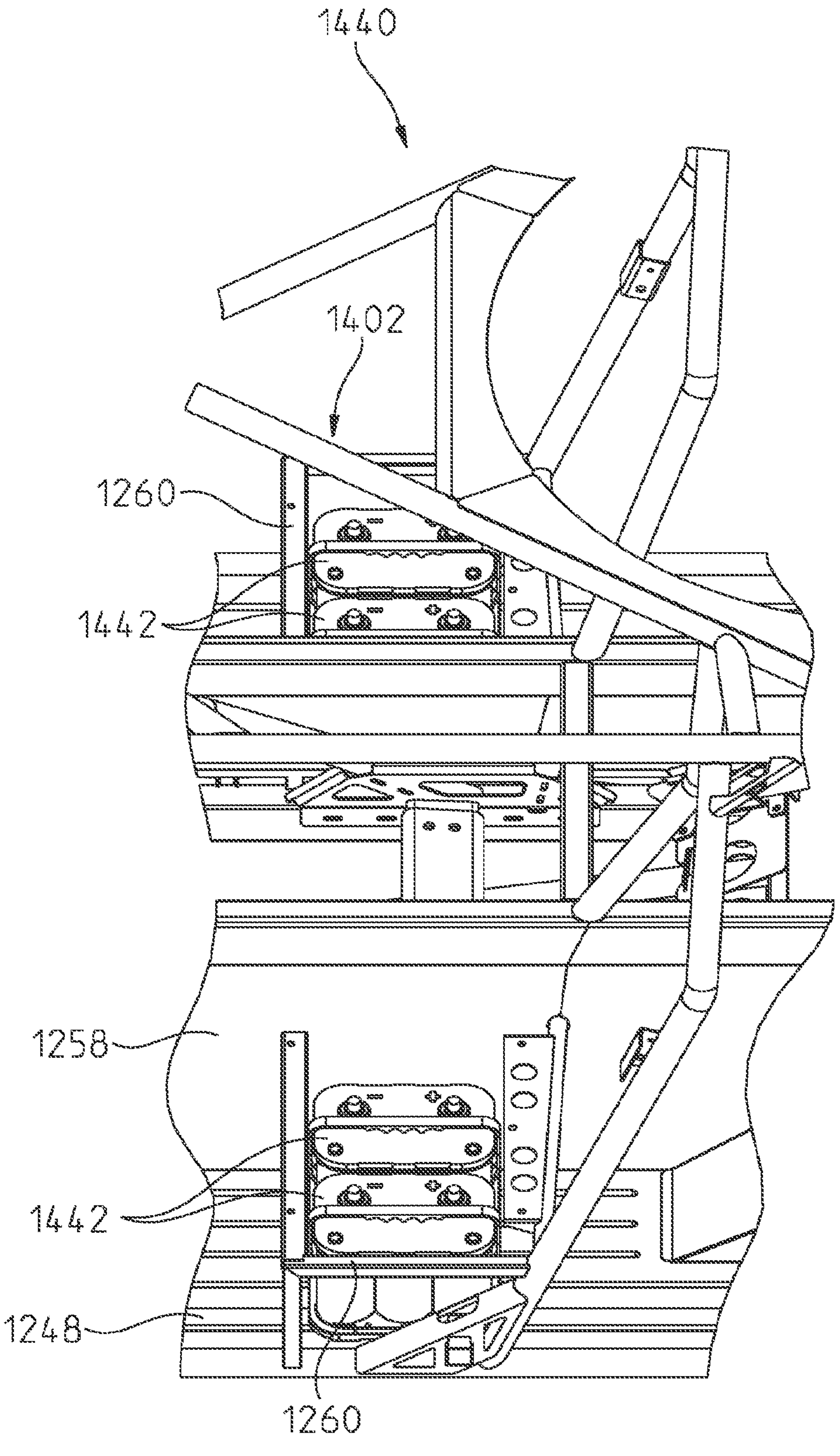
FIG. 60 is a top perspective view of a seating section and a plurality of batteries of the vehicle of FIG. 42.

As shown in FIG. 60, electrical system 1440 includes a plurality of batteries 1442 supported by frame assembly 1210 and positioned below at least one of seats 1404, 1410, 1418, 1424. Illustratively, batteries 1442 are supported on floor boards 1248 and within front seat frames 1260. In one embodiment, at least two batteries 1442 are supported below operator seat 1404 and at least two batteries 1442 are supported below front passenger seat 1410. Additional batteries may be supported below first and second rear passenger seats 1418, 1424. Alternatively, cargo or storage bins or containers may be positioned below any of seats 1404, 1410, 1418, 1424 to increase the storage capacity of vehicle 1200.

Figure 60A:
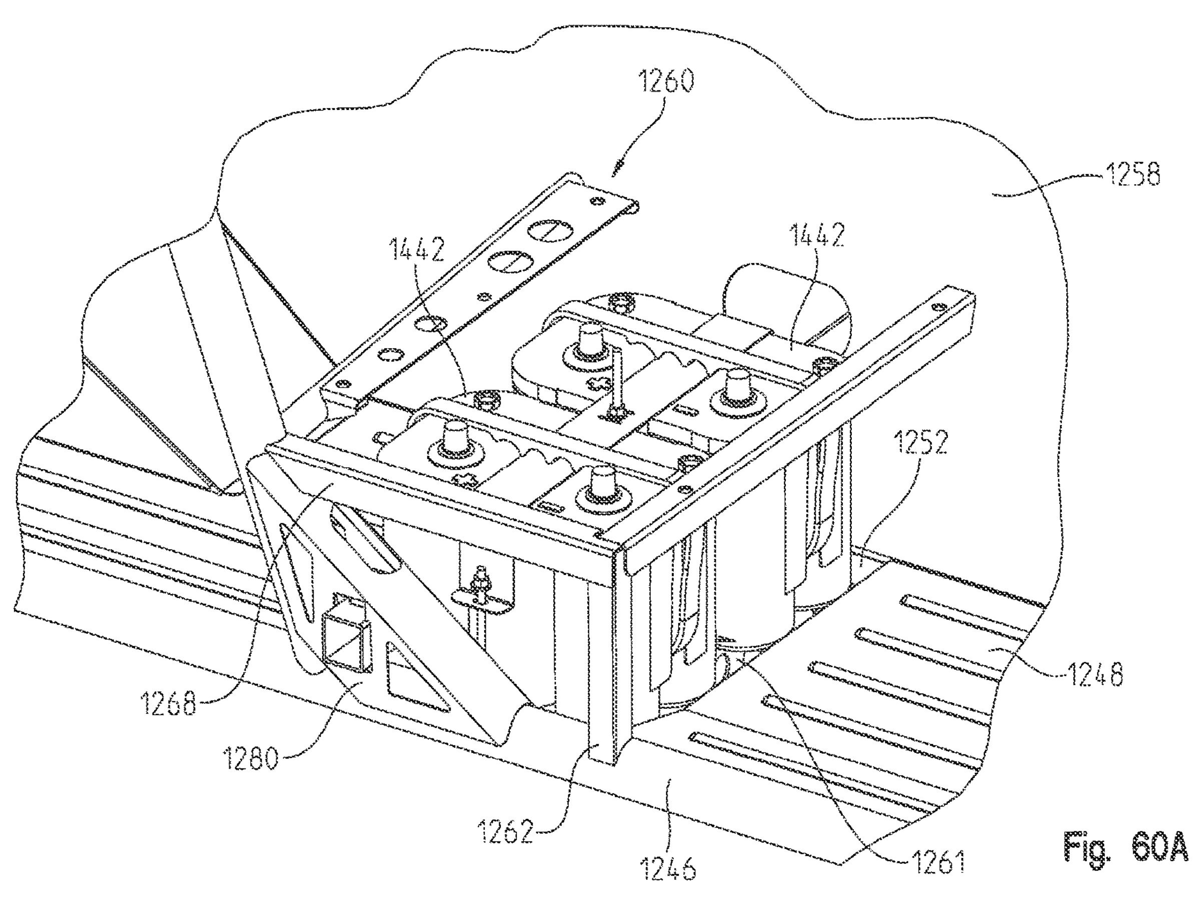
FIG. 60A is a right front perspective view of a support member for batteries.
Figure 60B:
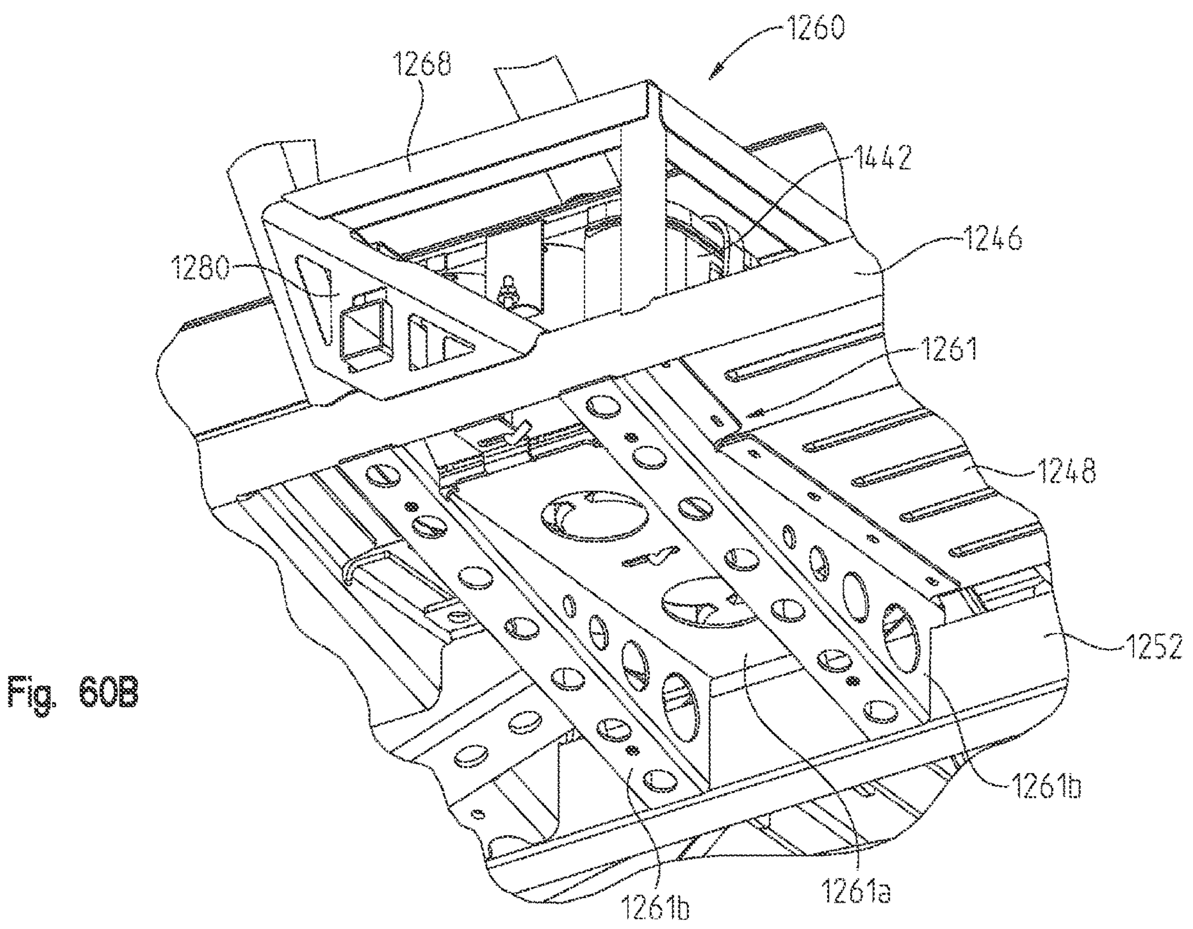
FIG. 60B is a bottom perspective view of the support member of FIG. 60A.

Alternatively, as shown in FIGS. 60A and 60B, a support member 1261 is positioned below front seat frames 1260. Illustratively, support member 1261 is configured to support at least one battery 1442. In one embodiment, support member 1261 is a stamped member. The configuration and position of support member 1261 supports batteries 1442 below front seat frame 1260. As such, the low position of batteries 1442 on vehicle 1200 may lower the center of gravity of vehicle 1200.

Support member 1261 includes a plate member **1261*a* and braces 1261*b*. Plate member 1261*a* is integrally formed with braces 1261*b*. As shown in FIG. 60B, plate member 1261*a* is coupled to floorboards 1248 with conventional fasteners, for example, welds, rivets, and/or bolts. More particularly, plate member 1261*a* is positioned below floorboards 1248 such that the top surface of plate member 1261*a* is coupled to the bottom surface of floorboards 1248. The outer ends of braces 1261*b* are coupled to longitudinal frame members 1246 and the inner ends of braces 1261*b* are coupled to lower frame rails 1252** with conventional couplers, for example welds, rivets, bolts, and/or adhesive.

Electrical system 1440 also may be coupled to dual alternators, each of which is configured with a capacity of approximately 12 volts or 24 volts. Additionally, electrical system 1440 may have a capacity of approximately 120 amps at idle. In one embodiment, electrical system 1440 outputs approximately 200 amps at idle.

Figure 61:
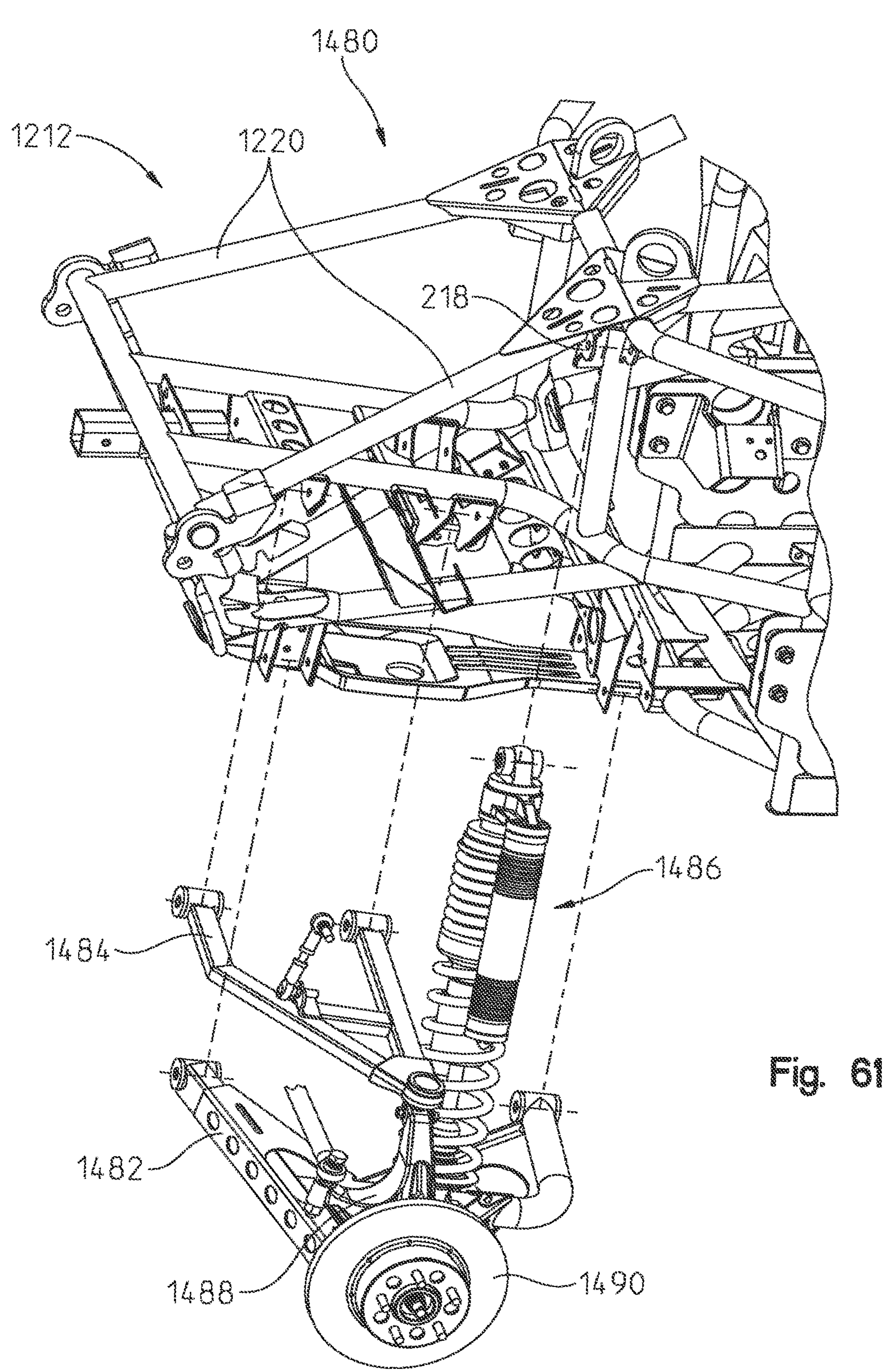
FIG. 61 is an exploded side view of a front suspension assembly of the vehicle of FIG. 42.
Figure 62:
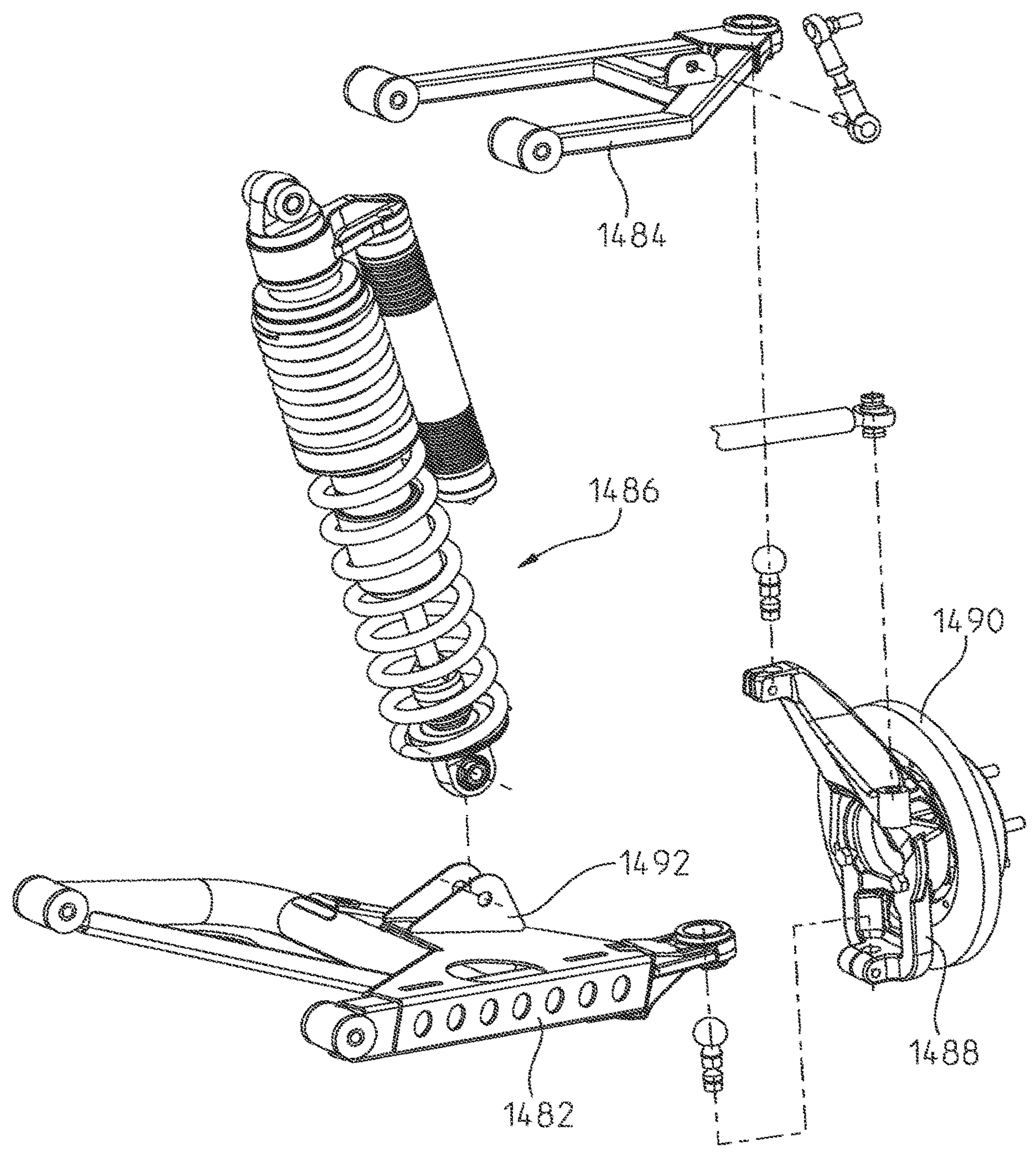
FIG. 62 is a further exploded view of the front suspension assembly of FIG. 61.

Referring now to FIGS. 61 and 62, front suspension assembly 1480 is shown. Front suspension assembly 1480 is similar to front suspension assembly 370 of FIGS. 24 and 25. Front suspension assembly 1480 includes a lower control arm 1482, an upper control arm 1484, and a shock absorber 1486. In one embodiment, shock absorber 1486 is a 3-inch internal bypass shock available from Fox Shox. Upper and lower control arms 1484, 1482 are coupled to a wheel spindle 1488, which is coupled to a wheel hub 1490. Upper control arm 1484 is substantially narrower than lower control arm 1482. The narrowed width of upper control arm 1484 allows shock absorber 1486 to be pivotably coupled to lower control arm 1482 rather than upper control arm 1484. More particularly, shock absorber 1486 is pivotably coupled to a bracket 1492 on lower control arm 1482. Also, shock mount brackets 218 (FIG. 52) are positioned high on frame assembly 1210, which allows shock absorber 1486 to be substantially longer than shock absorbers on prior vehicles. Shock absorber 1486 may have an increased shock stroke length. For example, shock absorber 1486 may have a travel length of approximately 18 inches. In one embodiment, the travel length of shock absorber 1486 may be approximately 19.3 inches. The travel of shock absorber 1486 may be adjusted to increase the steering angle.

Figure 62A:
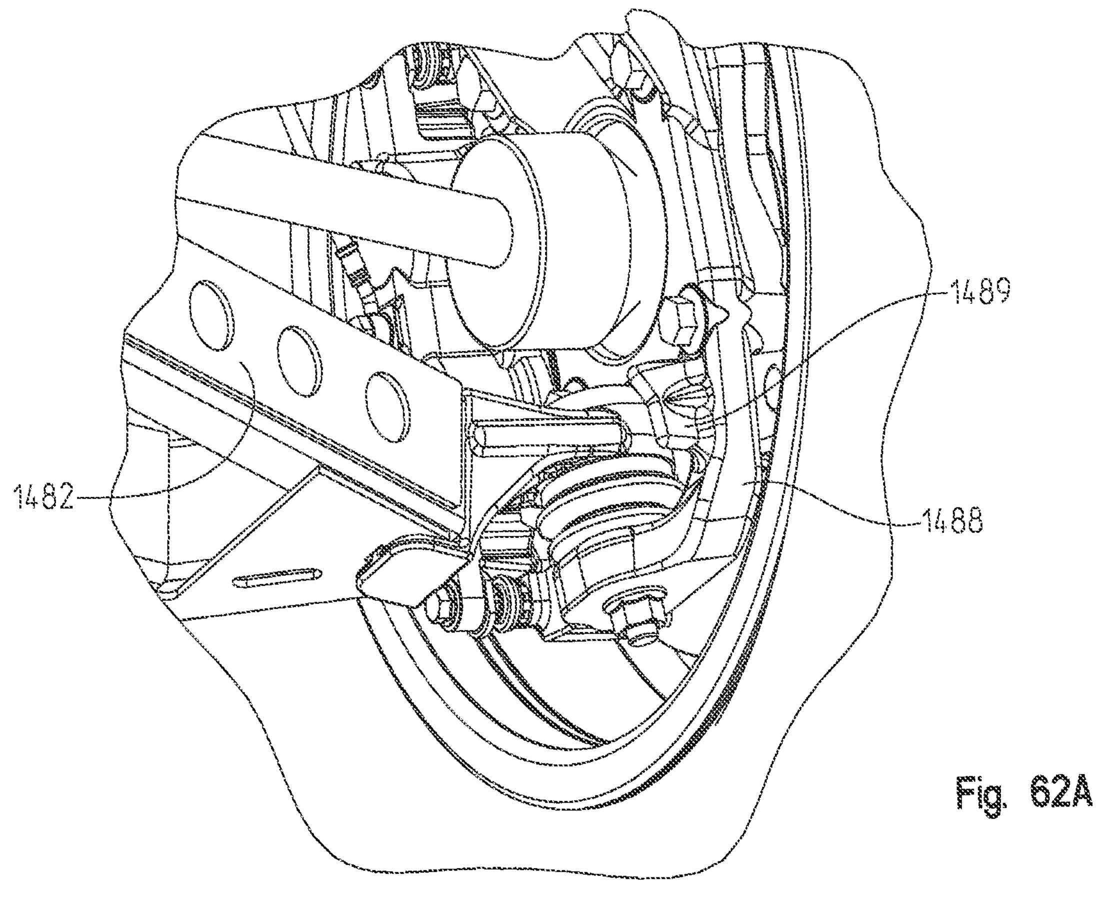
FIG. 62A is a perspective view of a portion of the front suspension assembly of FIG. 62, including a stop member.
Figure 63:
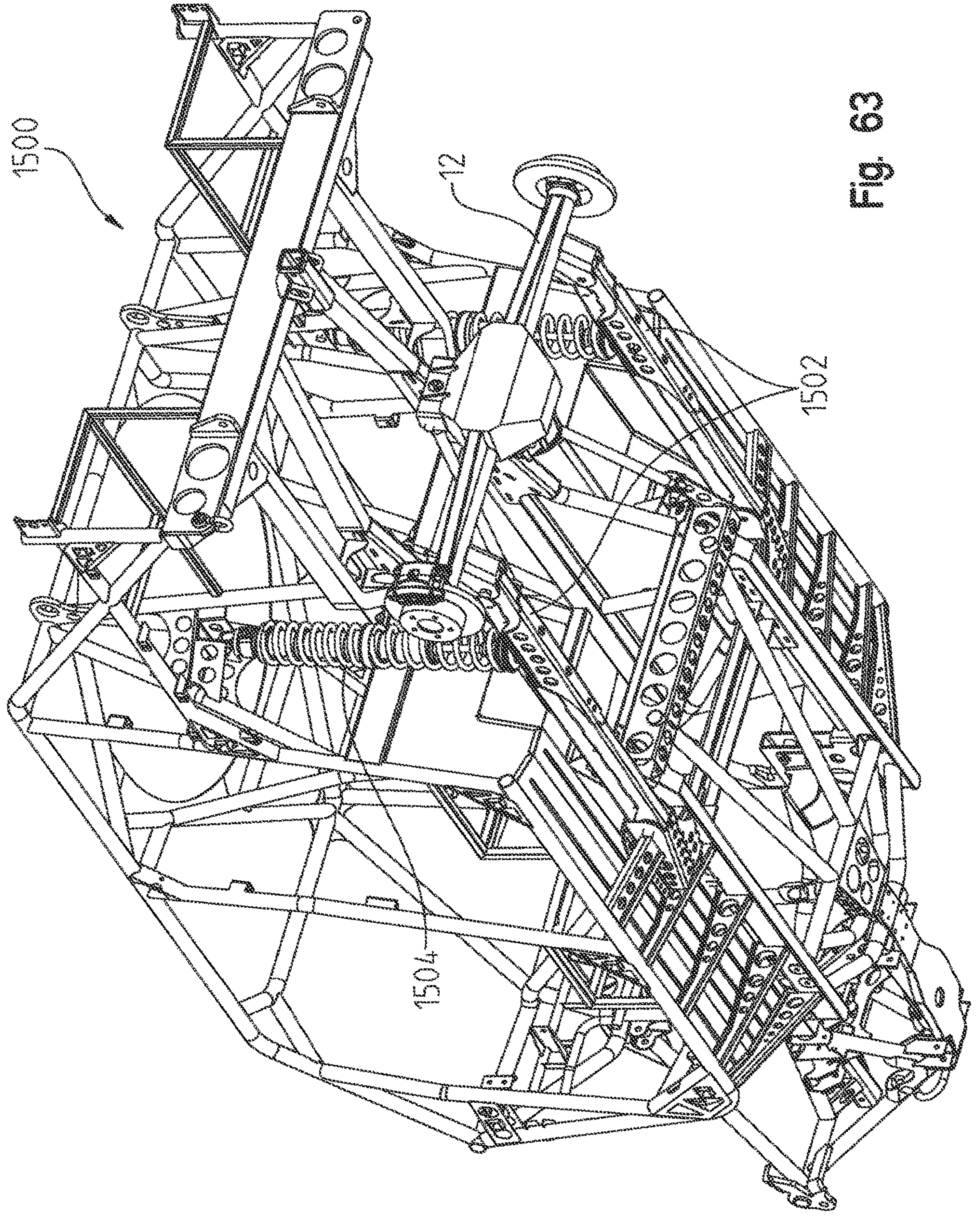
FIG. 63 is a rear bottom perspective view of a rear suspension assembly of the vehicle of FIG. 42.
Figure 64:
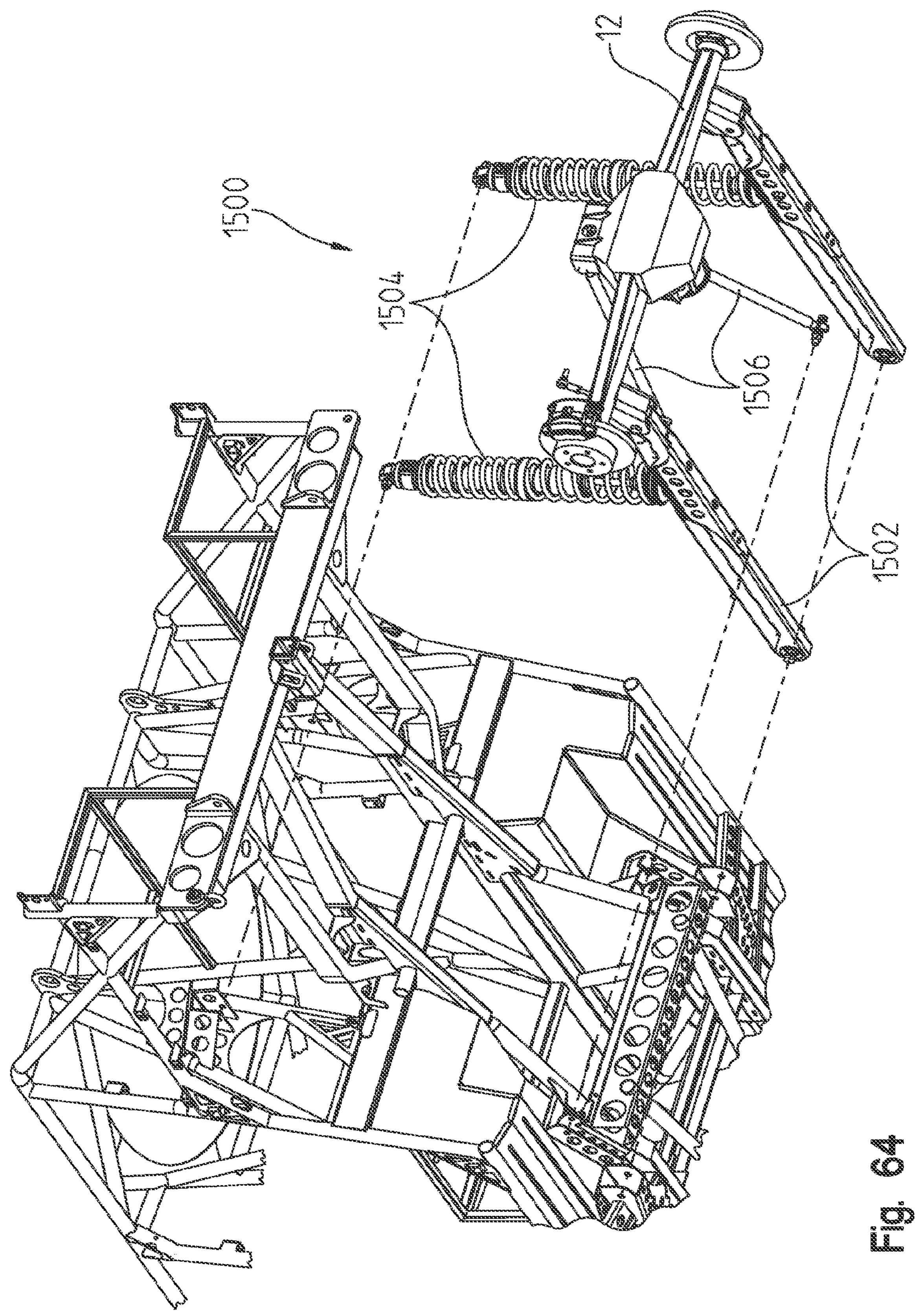
FIG. 64 is an exploded view of the rear suspension assembly of FIG. 63.
Figure 65:
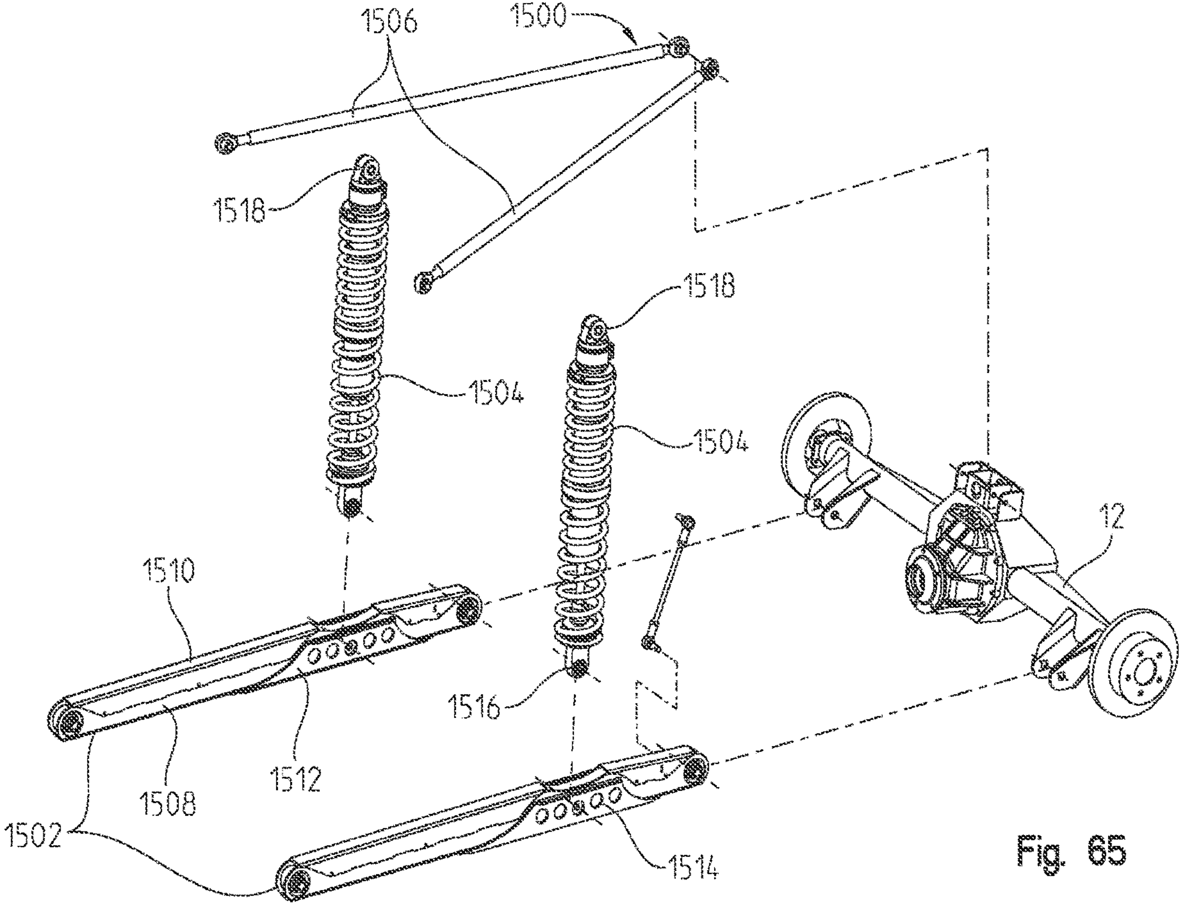
FIG. 65 is a further exploded view of the rear suspension assembly of FIG. 64.

In one embodiment, shown in FIG. 62A, wheel spindle or knuckle 1488 includes a stop member 1489. Stop member 1489 assists in controlling clearances between components of front suspension assembly 1480 during suspension and steering travel. Additionally, stop member 1489 protects the body of vehicle 1200, steering rack assemblies 666 and 666', upper control arm 1484, the CV joints, tie rods 668, and other components of front wheels 6 and front suspension assembly 1480 when vehicle 1200 is at full turn.

With reference now to FIGS. 63-66, rear suspension assembly 1500 includes trailing arms 1502, shock absorbers 1504, and rear alignment arms 1506 coupled to rear axle 12. In one embodiment, shock absorbers 1504 are from Fox Shox. Rear suspension assembly 1500 is generally similar to rear suspension assembly 460 of FIGS. 26-28B. Trailing arms 1502 include elongate arm portions 1508, plate portions 1510, and bracket portions 1512. Elongate arm portions 1508, plate portions 1510, and bracket portions 1512 are coupled together in a clam-shell configuration with conventional fasteners, for example welds, adhesive, bolts, and/or rivets. This clam-shell configuration of trailing arms 1502 is designed to uniformly transfer loads throughout trailing arms 1502.

Figure 66:
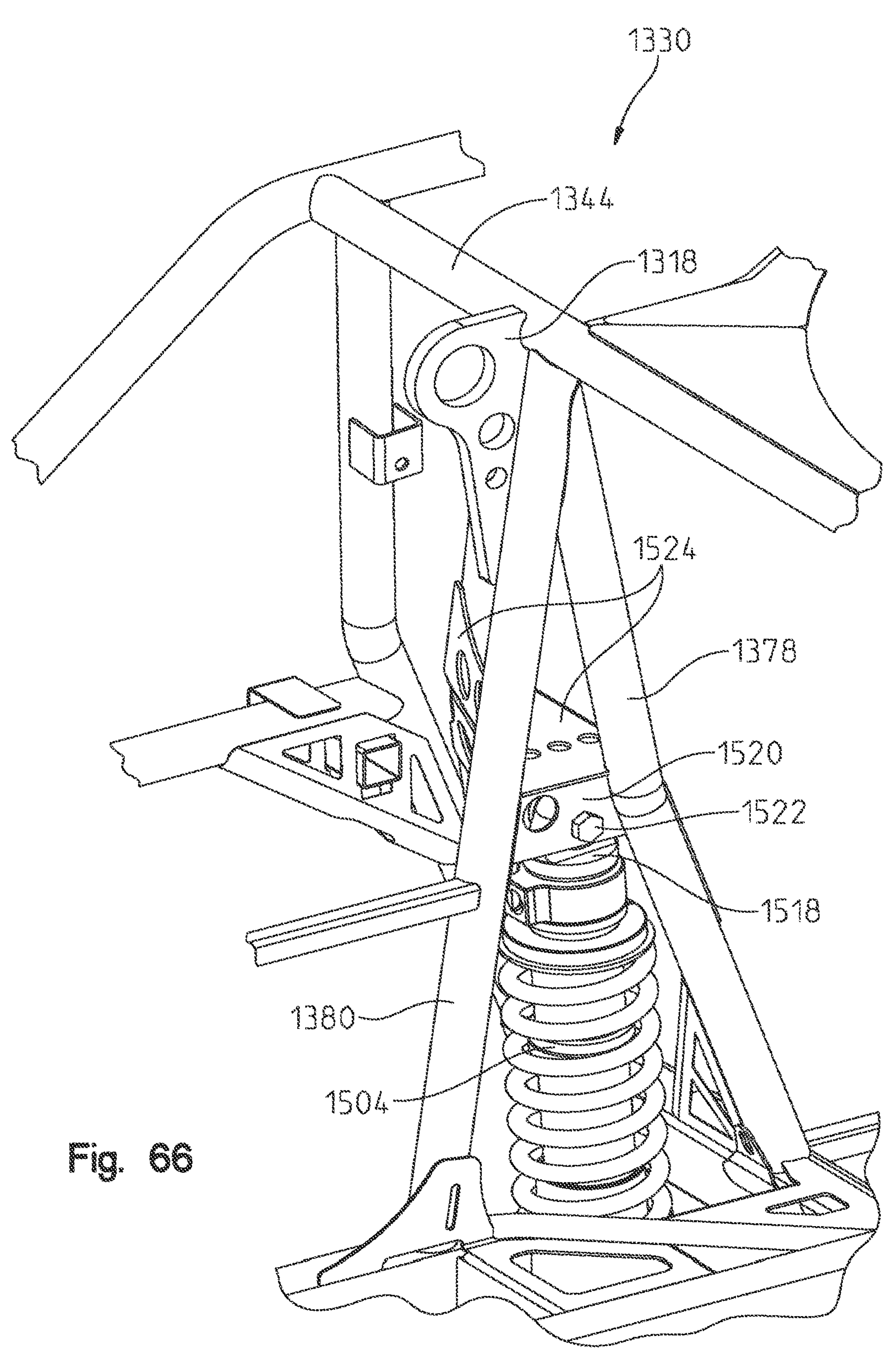
FIG. 66 is a left front perspective view of a portion of the rear suspension assembly and frame assembly of FIG. 64.

Shock absorbers 1504 include lower mounts 1516 and upper mounts 1518. Lower mounts 1516 are coupled to trailing arms 1502 with a conventional fasteners that is received within aperture 1514 of trailing arms 1502 and lower mounts 1516. Upper mounts 1518 of shock absorbers 1504 are configured to couple with roll cage assembly 1330. More particularly, as shown in FIG. 66, upper mounts 1518 are coupled to brackets 1520 with a fastener 1522, illustratively a bolt. Brackets 1520 are coupled to rear inner pillar members 1378 and upstanding members 1380 through conventional methods, for example with welds, adhesive, bolts, and/or rivets. As shown best in FIG. 69, brackets 1520 are positioned laterally outwardly or outboard of tunnel member 1430. Rear cargo bed assembly 1530 is packaged around brackets 1520 and upper mounts 1518 for shock absorbers 1504 in order configure brackets 1520 and upper mounts 1518 outboard of tunnel member 1430.

Additionally, because both brackets 1520 for shock absorbers 1504 and accessory mounts 1318, which may be tie downs for vehicle 1200, are coupled to upstanding members 1380, loads from shock absorbers 1504 and accessory mounts 1318 may be transmitted directly to roll cage assembly 1330, rather than one or more body panels 1202 of vehicle 1200.

At least one support plate 1524 may be coupled to roll cage assembly 1330, illustratively rear inner pillar members 1378 and/or upstanding members 1380, in order to further strengthen the coupling between shock absorber 1504 and roll cage assembly 1330. In one embodiment, shown in FIG. 69, rear suspension assembly 1500 may include one, two, or three support plates 1524 around upper mount 1518 of shock absorbers 1504.

Figure 67:
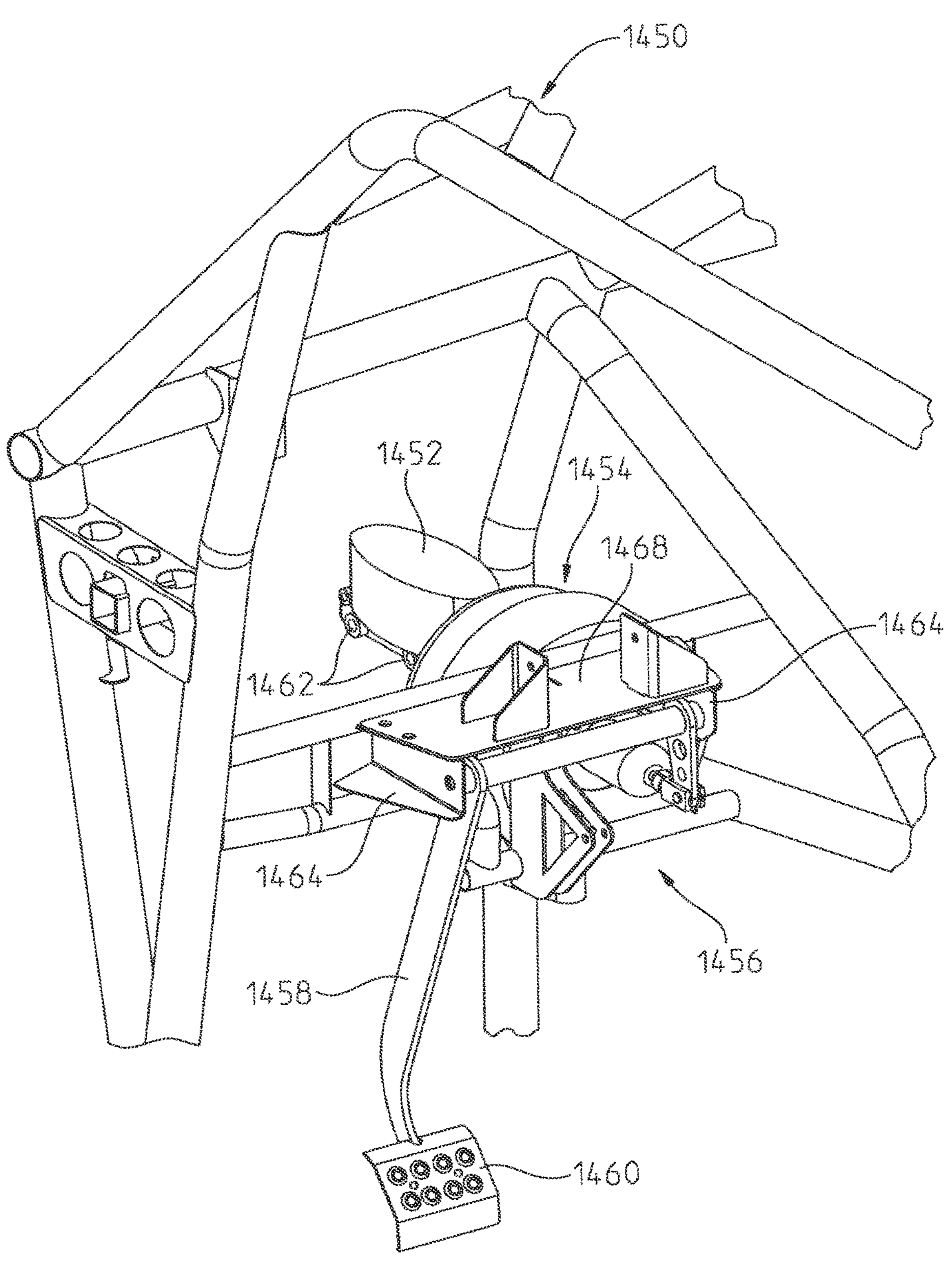
FIG. 67 is a left rear perspective view of a brake assembly of the vehicle of FIG. 62.
Figure 68:
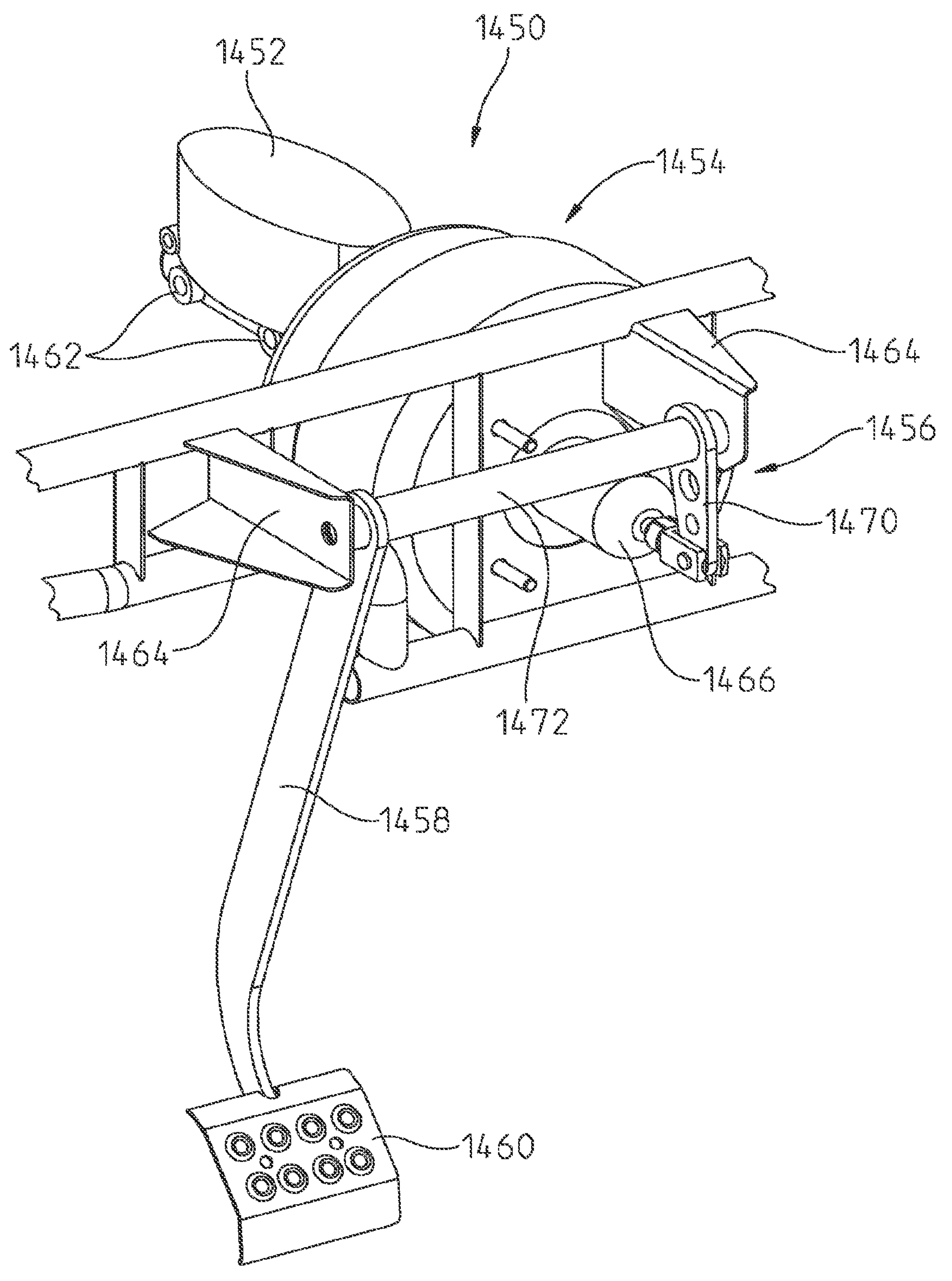
FIG. 68 is a further left rear perspective view of the brake assembly of FIG. 62.
Figure 69:
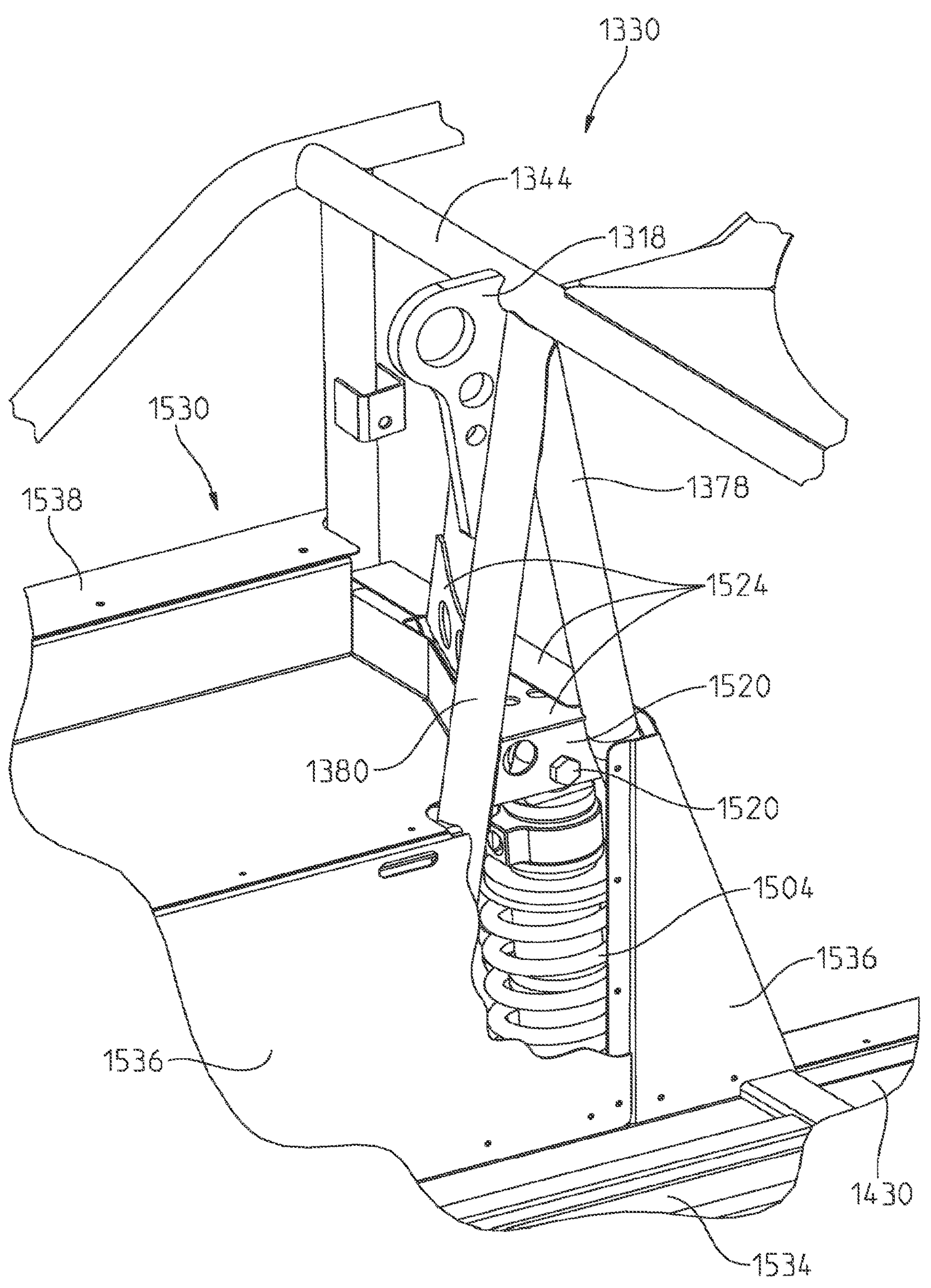
FIG. 69 is a partial cut-away view of a portion of the rear suspension assembly of FIG. 68 and a portion of a cargo bed assembly of the vehicle of FIG. 42.

Referring to FIGS. 67 and 68, a brake assembly 1450 is disclosed. Brake assembly 1450 includes a master cylinder 1452, a brake booster 1454, a linkage assembly 1456, a lever arm 1458, and a brake pedal 1460. Brake assembly 1450 is housed within dash board assembly 1432 and a portion of brake assembly 1450, such as lever arm 1458 and brake pedal 1460, extend below dash board assembly 1432 and into operator area 1400 to provide access thereto for the operator. By housing brake assembly 1450 within and under dash board assembly 1432, front frame portion 1212 of frame assembly 1210 has additional space for other components of vehicle 1200, such as front wheels 6, front suspension assembly 1480, and steering assembly 1436.

As is apparent from FIGS. 67 and 68, master cylinder 1452 extends forward from brake booster 1454. Illustratively, master cylinder 1452 is generally parallel to longitudinal axis L of vehicle 1200. Master cylinder 1452 is coupled to ports 1462 with hoses (not shown) to allow fluid, for example hydraulic fluid, to flow to and from master cylinder 1452 during operation of brake assembly 1450.

Brake booster 1454 is positioned intermediate master cylinder 1452 and linkage assembly 1456 and is operably coupled to both master cylinder 1452 and linkage assembly 1456. As shown in FIG. 68, brake booster 1454 is coupled to a bracket 1464 with conventional fasteners (not shown). Brake booster 1454 includes an input shaft 1466, which is operably coupled to linkage assembly 1456. A braking force is transmitted from the operator to brake booster 1454 via linkage assembly 1456 and input shaft 1466. To facilitate deceleration and stopping of vehicle 1200, brake booster 1454 receives an input braking force from input shaft 1466 and increases the braking force transmitted from master cylinder 1452 to the brake calipers at wheels 6, 10.

As shown in FIG. 67, bracket 1464 is coupled to frame assembly 1210 and a plate member 1468. Plate member 1468 and/or bracket 1464 also may support at least a portion of steering assembly 1436, for example the steering wheel. Bracket 1464 also is coupled to linkage assembly 1456, which includes a first link 1470 and a second link 1472. First link 1470 is pivotably coupled to input shaft 1466 and second link 1472. Second link is pivotably coupled to lever arm 1458. As such, in operation, when the operator depresses pedal 1460, movement in lever arm 1458 is transmitted to second link 1472. Second link 1472 then rotates, pivots, or otherwise moves, thereby causing movement in first link 1470. The movement of first link 1470 is transmitted to input shaft 1466 and, therefore, to brake booster 1454. Input shaft 1466 engages brake booster 1454 in order increase the braking force from master cylinder 1452. Through ports 1462, master cylinder 1452 transmits a braking force to the brake calipers to slow the rolling movement of front wheels 6 and rear wheels 10.

In one embodiment of brake assembly 1450, the brakes at front wheels 6 may include a hydraulic lock or line lock. For example, the line lock may be configured to extend into operator area 1400. For example, the line lock may be positioned within or below tunnel 1430. In a further embodiment, the rear brakes at rear wheels 10 are a drum style. Additionally, brake assembly 1450 may be configured with a four-wheel parking brake.

Referring now to FIGS. 69-72, rear cargo bed assembly 1530 is shown and includes cargo bed frame assembly 1532, a cargo bed surface or platform 1534, inner walls 1536, outer walls 1538, a tailgate member 1540, and a latch assembly 1550. The width of rear cargo bed assembly 1530, including cargo bed frame assembly 1532 and cargo bed platform 1534, may be approximately 1850-1950 mm, and illustratively is approximately 1880 mm. Cargo bed frame assembly 1532 is shown in FIGS. 51-53 and includes outer upstanding members 1570, outer longitudinal members 1572, braces 1574, inner longitudinal members 1576, and inner upstanding members 1578. Outer longitudinal members 1572 are coupled to outer upstanding members 1570, braces 1574, diagonal members 1382, and rear upstanding pillar members 1374. Outer and inner upstanding members 1570 and 1578 are coupled to tailgate support member 1304 and braces 1574. Additionally, inner upstanding members 1578 are coupled to inner longitudinal members 1576. Inner longitudinal members 1576 also are coupled to upstanding members 1380.

Cargo bed frame assembly 1532 defines spaces for cargo and other components of vehicle 1200. For example, outer upstanding members 1570, outer longitudinal members 1572, braces 1574, inner longitudinal members 1576, and inner upstanding members 1578 define two raised spaces of rear cargo bed assembly 1530. Inner and outer walls 1536, 1538 are coupled to outer upstanding members 1570, outer longitudinal members 1572, braces 1574, inner longitudinal members 1576, and inner upstanding members 1578 to define storage containers on rear cargo bed assembly 1530. Cargo bed platform 1534 is positioned between these two storage containers.

Outer walls 1538 of rear cargo bed assembly 1530 may include apertures 1539 which expose a portion of cargo bed frame assembly 1532. Illustratively, apertures 1539 expose outer longitudinal members 1572. As such, apertures 1539 and outer longitudinal members 1572 cooperate to define a tie-down for accessories, cargo, or transportation means for vehicle 1200. In this way, any force applied to vehicle 1200 by the accessory, cargo, or transportation means may be directly transmitted to cargo bed frame assembly 1532 and roll cage assembly 1330.

Figure 70:
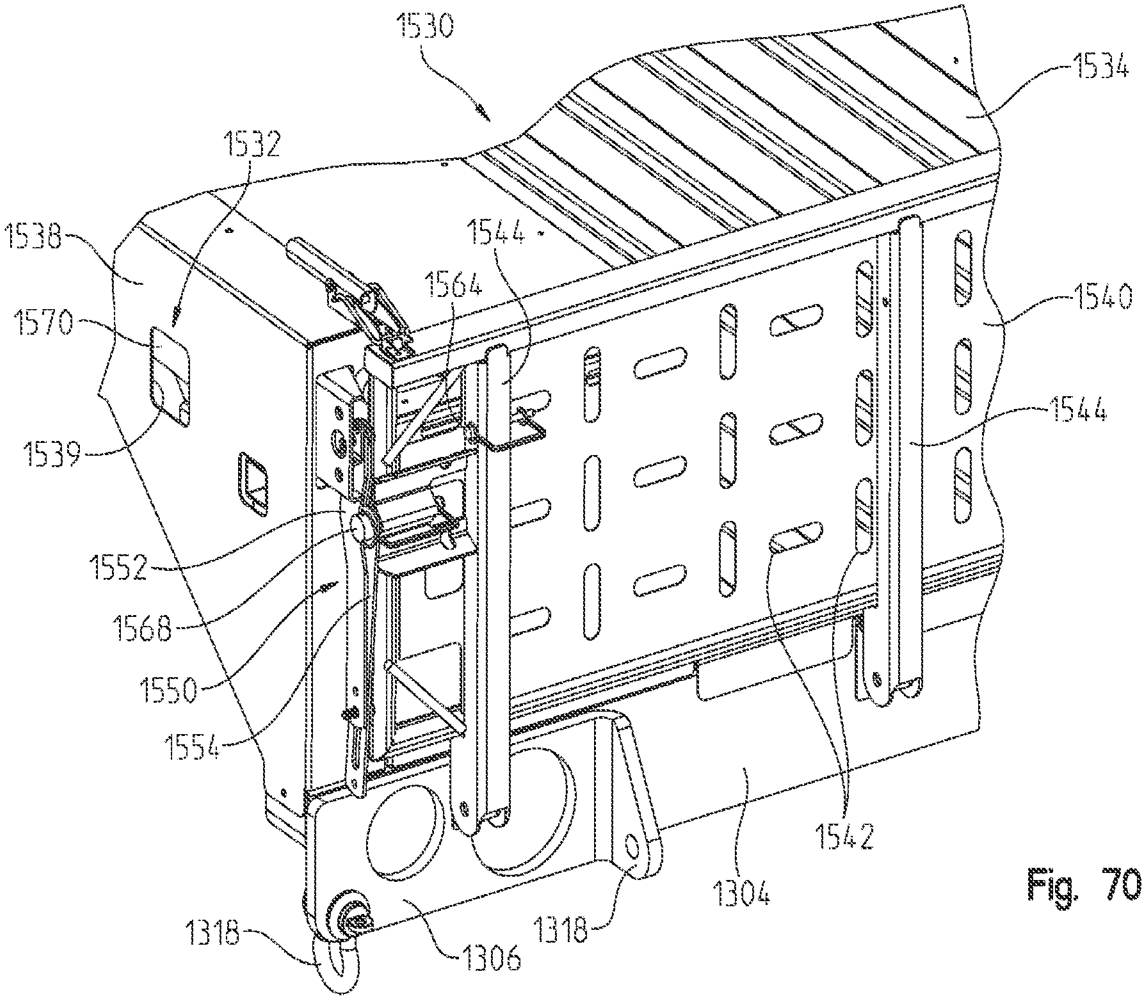
FIG. 70 is a left rear perspective view of a tailgate member of the cargo bed assembly of FIG. 69 in a closed position.
Figure 71:
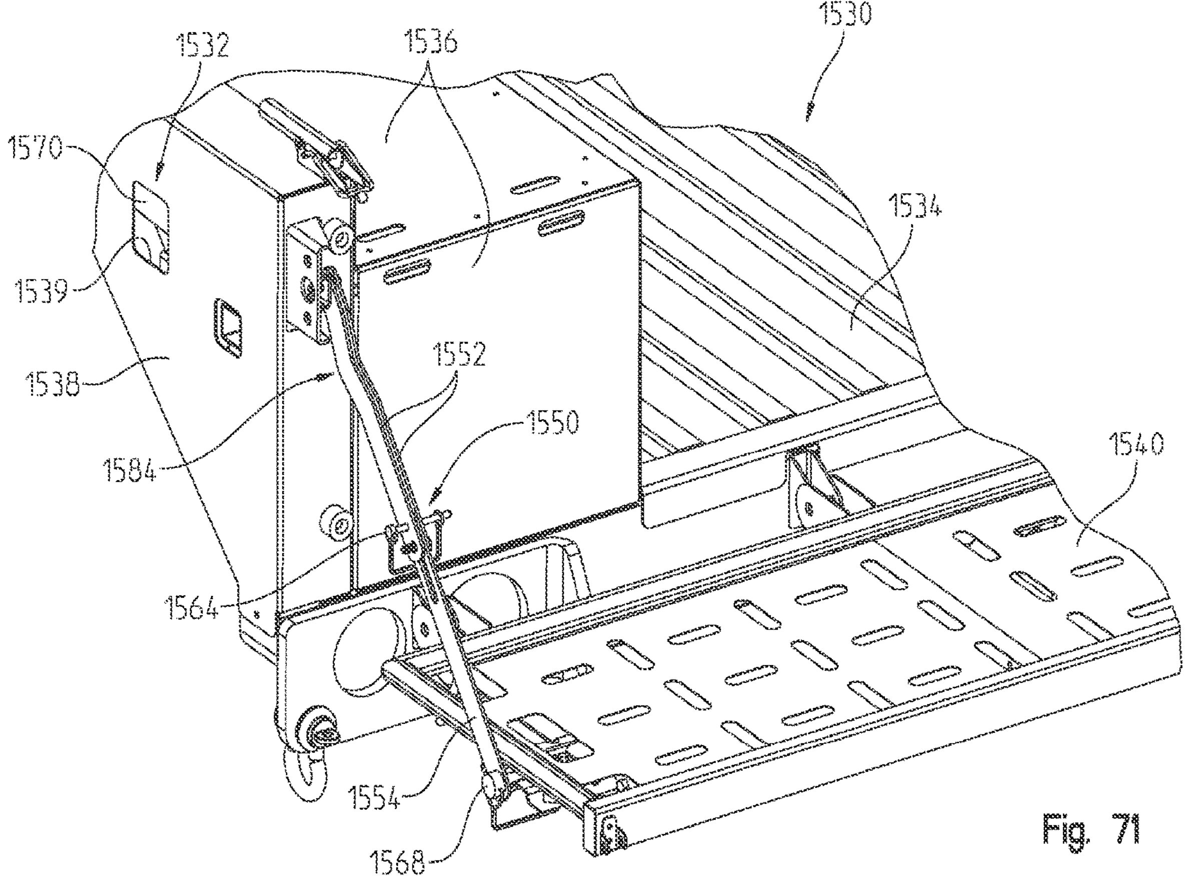
FIG. 71 is a left rear perspective view of the tailgate member of FIG. 70 in an open position.

As shown in FIGS. 70 and 71, tailgate member 1540 includes a plurality of openings 1542 which also may be used as tie-downs for vehicle 1200. Tailgate member 1540 also includes braces 1544 which are coupled to tailgate support member 1304. Latch assembly 1550 also is coupled to one of braces 1544. When latched, latch assembly 1550 closes tailgate member 1540 against cargo bed frame assembly 1532. However, when unlatched, latch assembly 1550 allows tailgate member 1540 to open and extend rearwardly from rear cargo bed assembly 1530.

Figure 72:
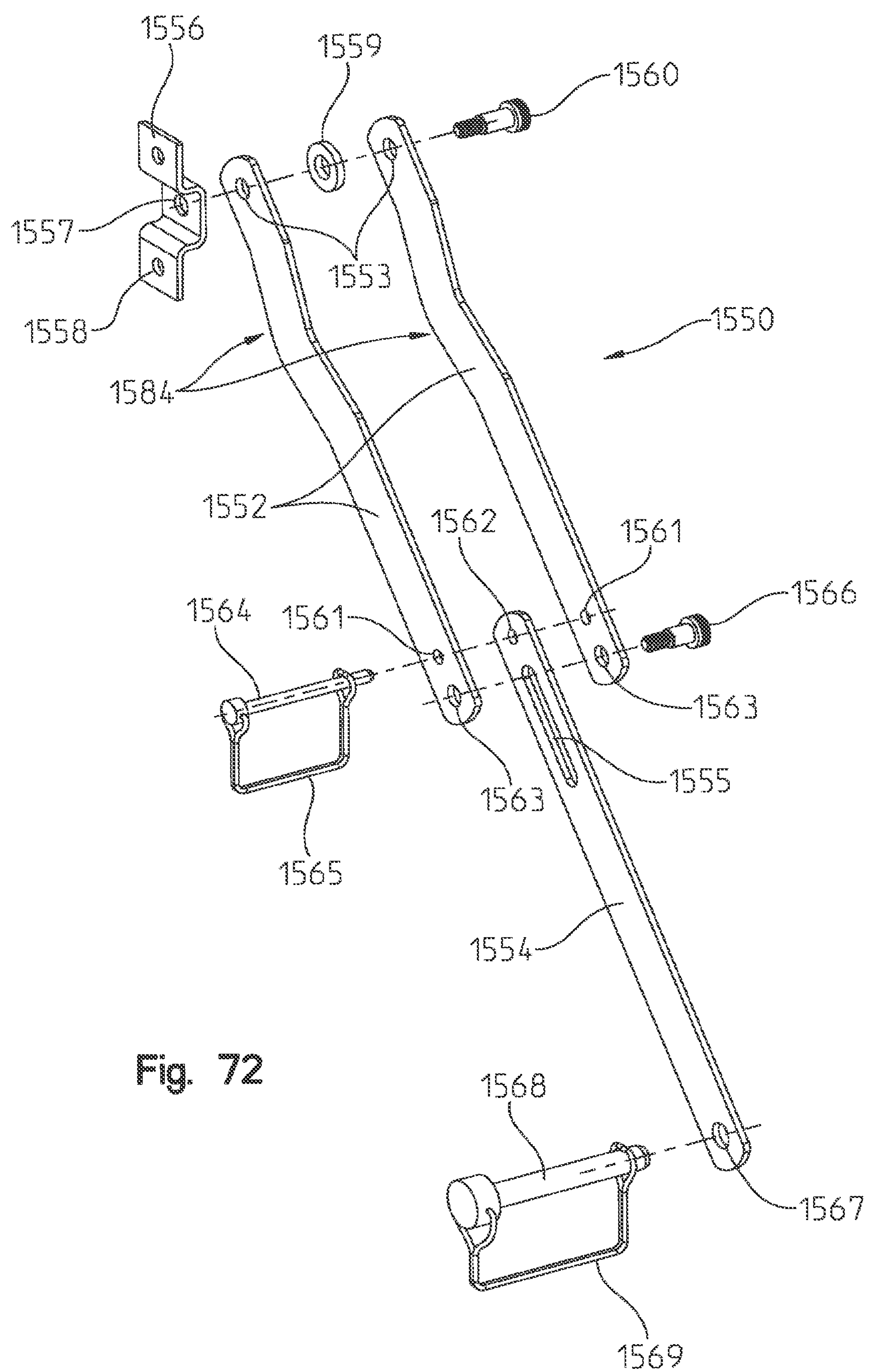
FIG. 72 is an exploded view of a latch assembly of the tailgate member of FIG. 71.
Figures 72A, 72B:
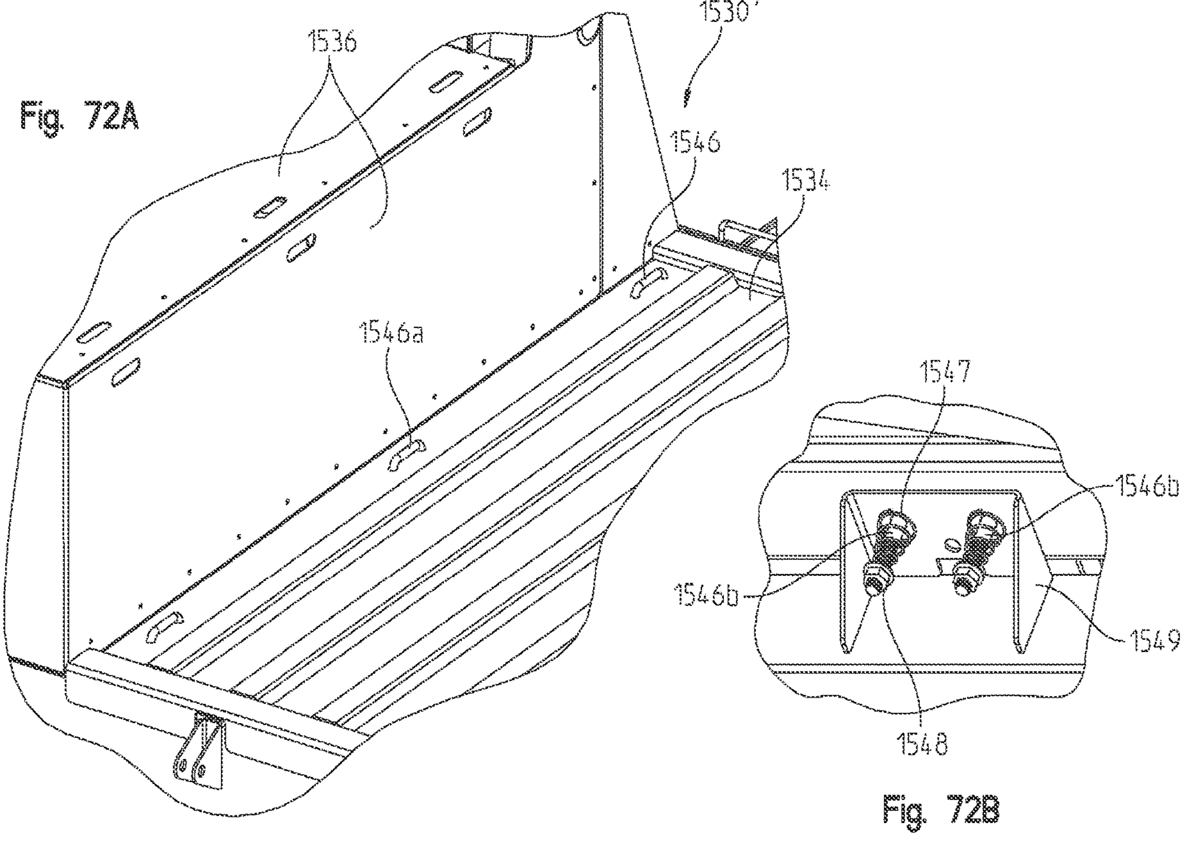
FIG. 72A is a rear perspective view of a portion of an alternative embodiment of the cargo bed assembly of FIG. 70.
FIG. 72B is a bottom perspective view of a tie down member of the alternative embodiment cargo bed assembly of FIG. 72A.

Referring to FIG. 72, latch assembly 1550 includes two upper arms 1552 and one lower arm 1554. Upper arms 1552 are generally parallel to each other and are positioned outwardly from lower arm 1554. The configuration of two upper arms 1552 may prevent bending when tailgate member 1540 and latch assembly 1550 receive a load. Upper arms 1552 include upper apertures 1553, which allow a fastener 1560 to be received therethrough in order to couple upper arms 1552 to spacer 1559, bracket 1556, and rear cargo bed assembly 1530. More particularly, fastener 1560 is received through spacer 1559, upper apertures 1553, and an aperture 1557 of bracket 1556. Other fasteners are received through apertures 1558 of bracket 1556 in order to couple bracket 1556 to rear cargo bed assembly 1530.

Upper arms 1552 are coupled to lower arm 1554 with a fastener 1566. More particularly, fastener 1566 is received through lower apertures 1563 of upper arms 1552 and a slot 1555 of lower arm 1554. Upper arms 1552 also include apertures 1561 for receiving a first pin 1564. First pin 1564 also is received through an upper aperture 1562 of lower arm 1554. A first handle 1565 is received around first pin 1564.

Lower arm 1554 also includes a lower aperture 1567 which receives a second pin 1568 for coupling latch assembly 1550 to tailgate member 1540, as shown in FIG. 70. A second handle 1569 is received around second pin 1568.

As shown in FIGS. 71 and 72, upper arms 1552 include a bend 1584, which allows latch assembly 1550 to be closed without interference. More particularly, as latch assembly 1550 is closed (shown in FIG. 71), lower arm 1554 moves toward upper arms 1552 and slides between upper arms 1552. Bend 1584 in upper arms 1552 prevents upper arms 1552 from interfering with the movement of lower arm 1554 when tailgate member 1540 and latch assembly 1550 are moved to the closed position.

As shown best in FIG. 59, cargo bed platform 1534 defines a surface that extends between tailgate member 1540 and tunnel member 1430. The width of cargo bed platform 1534 may be approximately 900-950 mm and, illustratively, is approximately 920 mm. The longitudinal length of cargo bed platform 1534 may be approximately 1300-1400 mm and, illustratively is approximately 1360 mm. Cargo bed platform 1534 may be coupled to tunnel member 1430 and coupled to rear longitudinal support members 1310. By coupling cargo bed platform 1534 to tunnel member 1430, the structural integrity of vehicle 1200 may increase. Cargo bed platform 1534 may be approximately 38 inches from the ground and, similarly, tunnel member 1430 may be approximately 38 inches from the ground. As such, tunnel member 1430 forms an extension of cargo bed platform 1534. In this way, large or long cargo may be carried on vehicle 1200 by extending the cargo along cargo bed platform 1534 and tunnel member 1430. Additionally, cargo bed platform 1534 and tunnel member 1430 may be configured to receive a litter or other carrier for a passenger. Alternatively, because cargo bed platform 1534 and tunnel member 1430 are at the same height with respect to the ground and define a generally continuous planar surface, a passenger of vehicle 1200 may stand, walk, or otherwise move between operator area 1400 and rear cargo bed assembly 1530 by moving along tunnel member 1430 and cargo bed platform 1534.

Alternatively, as shown in FIGS. 72A-72D, an alternative embodiment of rear cargo bed assembly 1530 is shown as rear cargo bed assembly 1530'. Rear cargo bed assembly 1530' includes cargo bed platform 1534 and walls 1536. A plurality of cargo attachments or tie downs 1546 are included on cargo bed platform 1534. Tie downs 1546 are illustratively U-shaped and include an attachment portion **1546*a* extending above cargo bed platform 1534 and legs 1546*b* extending below cargo bed platform 1534. More particularly, legs 1546*b* extend through openings in a bracket 1549. Legs 1546*b* include springs 1547, which extend between bracket 1549 and conventional fasteners 1548, such that tie downs 1546 are spring loaded. As such, tie downs 1546 are biased in a downward position against the top surface of cargo bed platform 1534. However, a user may pull up on attachment portion 1546***a* in order to couple cargo or accessories to tie downs 1546. In this way, cargo bed platform 1534 supports and maintains the position of cargo and/or accessories on rear cargo bed assembly 1530'.

Figure 72C:
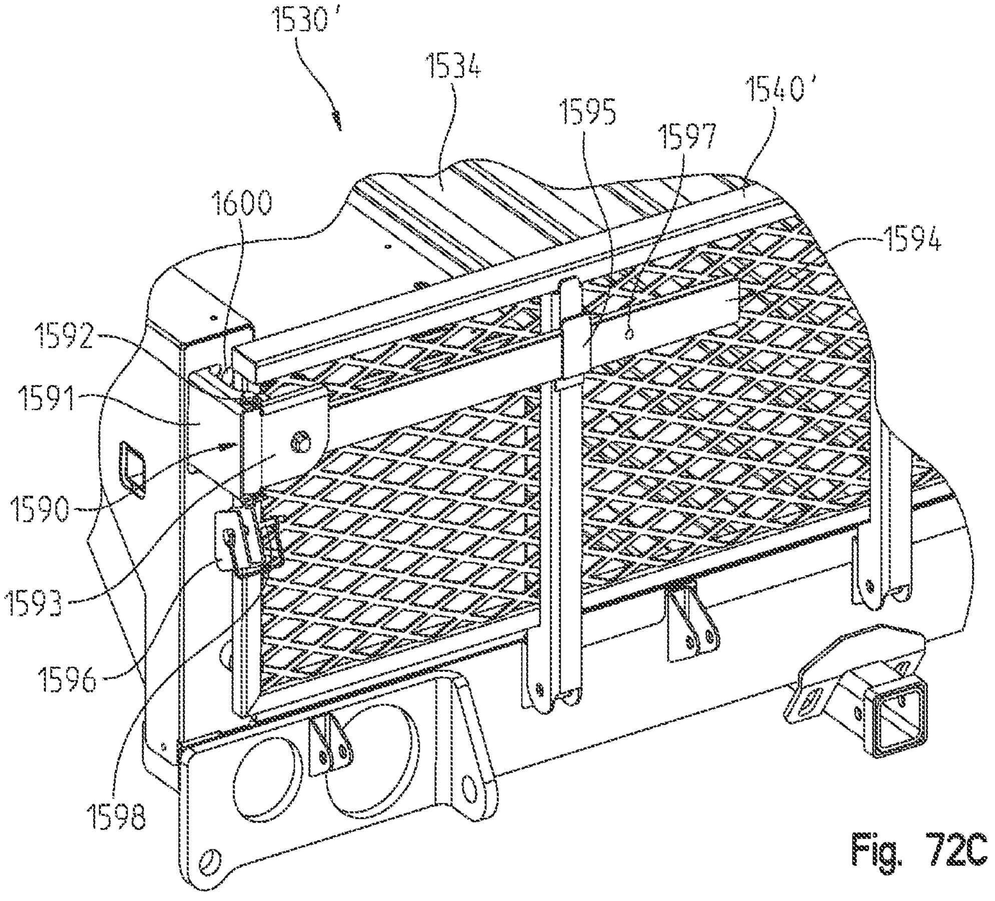
FIG. 72C is a left rear perspective view of a tailgate member of the alternative embodiment cargo bed assembly of FIG. 72A in a closed position.
Figure 72D:
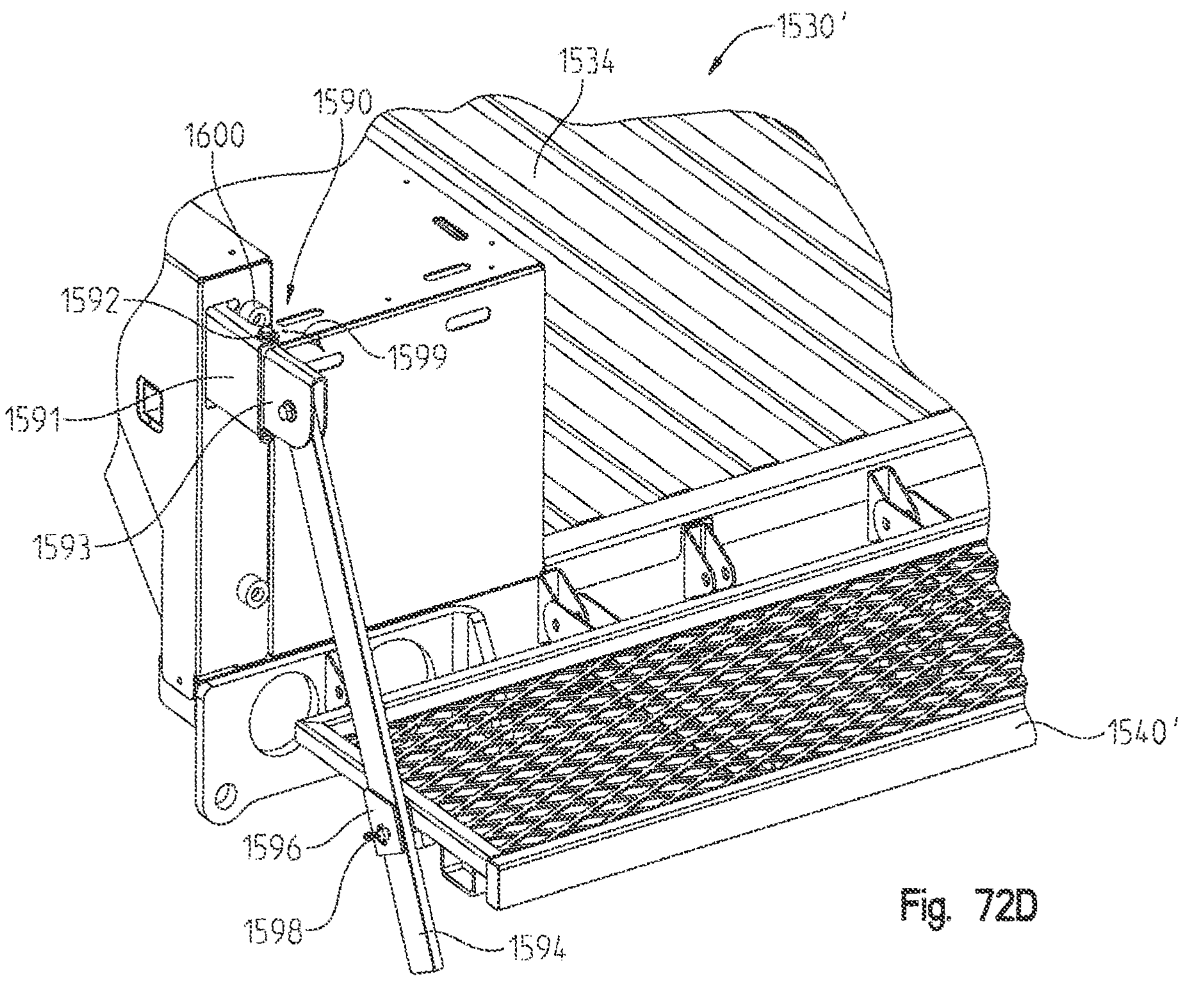
FIG. 72D is a left rear perspective view of the tailgate member of FIG. 72C in an open position.

Additionally, as shown in FIGS. 72C and 72D, rear cargo bed assembly 1530' includes an alternative embodiment tailgate member 1540'. Tailgate member 1540' is configured to pivot between a closed position (FIG. 72C) and an open position (FIG. 72D). Tailgate member 1540' is supported in the closed and open positions by a support member 1594, as detailed herein. Tailgate member 1540' includes a pivot assembly 1590 comprised of a fixed bracket 1592, a pivot bracket 1593, and a fastener, illustratively a bolt 1592. Pivot bracket 1593 is configured to pivot between a closed position (FIG. 72C) corresponding to the closed position of tailgate member 1540' and an open position (FIG. 72D) corresponding to the open position of tailgate member 1540'. More particularly, pivot bracket 1593 is configured to pivot in the direction of arrow 1599 (FIG. 72D) when pivoting between the closed position and the open position.

When in the closed position, shown in FIG. 72C, tailgate member 1540' is in a generally upright or vertical position and contacts isolators 1600 to prevent tailgate member 1540' from vibrating against walls 1536 during operation of vehicle 1200. In the closed position, support member 1594 also is closed such that pivot bracket 1593 is in the closed position and is generally perpendicular to fixed bracket 1591. As such, support member 1594 extends across an upper portion of tailgate member 1540' and engages with a tab 1595. In this way, support member 1594 maintains tailgate member 1540' in the closed position.

However, when in the open position, shown in FIG. 72D, tailgate member 1540' is in a generally horizontal position and is parallel with cargo bed platform 1534. In the open position, pivot bracket 1593 pivots in the direction of arrow 1599 and is generally co-planar with fixed bracket 1591. As such, support member 1594 extends rearwardly from pivot bracket 1593 and fixed bracket 1591. Support member 1594 also is configured to pivot in a downward direction from pivot bracket 1593, such that support member 1594 is angled relative to pivot bracket 1593. Support member 1594 is configured to engage with a bracket 1596 on the side of tailgate member 1540' in order to prevent tailgate member 1540' from bouncing, rattling, or otherwise moving when in the open position. More particularly, a pin 1598 extends through an aperture 1597 in support member 1594 in order to couple support member 1594 with tailgate member 1540' and bracket 1596. Support member 1594 may have more than one aperture 1597 in order to support tailgate member 1540' at multiple positions when in the open position. In this way, support member 1594 is configured to move in two different directions in order to stabilize tailgate member 1540' when in the open position. Furthermore, it may be appreciated that a user may move tailgate member 1540' between the closed and open positions without the use of tools such that operation of tailgate member 1540' is tool-less.

Referring to FIGS. 73 and 74, vehicle 1200 may be configured to store and carry additional cargo 1582 in operator area 1400. As shown, both rear cargo bed assembly 1530 and 1530' are configured to carry cargo, such as fuel, ammunition, MREs, and other supplies. In one embodiment, vehicle 1200 is configured to support a load of approximately 3,250 lbs. More particularly, illustrative rear cargo bed assemblies 1530, 1530' may be configured to carry an additional 100 gallons of fuel, as well as other supplies. In one embodiment, tailgate member 1540 and tailgate support member 1304 may be configured to support a load of approximately 500 lbs. In one embodiment, rear longitudinal support members 1310 and cargo bed platform 1534 may be configured to support a load of approximately 2,000 lbs. Additional cargo 1582 may be supported within operator area 1400, for example on rear seat frames 1270 and tunnel member 1430. In the embodiment shown in FIGS. 73 and 74, first and second rear passenger seats 1418, 1424 have been removed from vehicle 1200 in order to carry additional cargo 1582 on vehicle 1200. With first and second rear passenger seats 1418, 1424 removed, additional cargo 1582, for example dual 60-gallon fuel tanks, may be supported by rear seat frames 1270 in rear seating section 1416.

As shown in FIGS. 73 and 74, an alternative embodiment of vehicle 1200 may include roof panels 1580, which are configured to couple with roll cage assembly 1330.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:

a plurality of ground-engaging members;

a drivetrain assembly operably coupled to the ground-engaging members;

a frame assembly supported by the ground-engaging members and extending along a longitudinal axis of the vehicle, the frame assembly including a roll-over protection assembly; and a seating section defining an operator area and supported by the frame assembly, the seating section including at least a first seat and a second seat in a side-by-side configuration;

wherein the roll-over protection assembly generally surrounds an upper portion of the seating section, the roll-over protection assembly including:

a first cross tube extending laterally at least partially across the frame assembly forward of the first and second seats;

a second cross tube extending laterally at least partially across the frame assembly vertically higher than the first cross tube;

at least one first frame tube coupled to a central region of the second cross tube and extending rearwardly; and a plurality of second frame tubes coupled to the second cross tube wherein the plurality of second frame tubes extend between the first cross tube and the second cross tube, and the plurality of second frame tubes are coupled to the second cross tube at a position at which the at least one first frame tube is coupled to the second cross tube.

2. The utility vehicle of claim 1, wherein the at least one first frame tube extends rearward to a third cross tube that is rearward of the first cross tube and the second cross tube.

3. The utility vehicle of claim 1, wherein the plurality of second frame tubes extend at an angle with respect to one another from the second cross tube toward the first cross tube.

4. The utility vehicle of claim 3, wherein the angle is an acute angle.

5. The utility vehicle of claim 1, wherein the at least one first frame tube is joined to the second cross tube at a top of a windshield area of the roll-over protection assembly and extends rearward to a third cross tube comprising a rear portion of the roll-over protection assembly.

6. The utility vehicle of claim 5, wherein the at least one first frame tube is configured to withstand forces exerted on top of the roll-over protection assembly during a rollover event.

7. The utility vehicle of claim 5, wherein the at least one first frame tube is configured to provide overhead protection to occupants within a passenger cabin portion of the vehicle.

8. The utility vehicle of claim 5, further comprising a plurality of pillar members coupled to the third cross tube.

9. The utility vehicle of claim 8, wherein the plurality of pillar members are coupled to the third cross tube proximate a position where the third cross tube is coupled to the at least one first frame tube.

10. The utility vehicle of claim 9, wherein the plurality of pillar members extend to positions laterally spaced from each other.

11. The utility vehicle of claim 1, further comprising:

a third cross tube rearward of the first cross tube and the second cross tube, the at least one first frame tube extending rearwardly and coupled to the third cross tube; and a plurality of pillar members coupled to the third cross tube.

12. The utility vehicle of claim 11, wherein at least one of the plurality of pillar members is coupled to the third cross tube at a first position, and wherein the at least one first frame tube is coupled to the third cross tube at the first position.

13. The utility vehicle of claim 12, wherein the plurality of pillar members extend generally downward from the third cross tube.

14. The utility vehicle of claim 13, wherein the plurality of pillar members includes a first pillar member and a second pillar member, the first pillar member being positioned closer to a first lateral side of the utility vehicle relative to the second pillar member and the second pillar member being positioned closer to a second lateral side of the utility vehicle relative to the first pillar member.

15. The utility vehicle of claim 14, wherein the first pillar member extends generally downward and laterally towards the first lateral side of the utility vehicle from the third cross tube and the second pillar member extends generally downward and laterally towards the second lateral side of the vehicle from the third cross tube.

16. The utility vehicle of claim 14, wherein the first pillar member and the second pillar member are non-parallel.

17. A utility vehicle, comprising:

a plurality of ground-engaging members;

a drivetrain assembly operably coupled to the ground-engaging members;

a frame assembly supported by the ground-engaging members and extending along a longitudinal axis of the vehicle, the frame assembly including a roll-over protection assembly; and a seating section defining an operator area and supported by the frame assembly, the seating section including at least a first seat and a second seat in a side-by-side configuration;

wherein the roll-over protection assembly generally surrounds an upper portion of the seating section, the roll-over protection assembly including:

a first cross tube extending laterally at least partially across the frame assembly forward of first and second seats;

a second cross tube extending laterally at least partially across the frame assembly vertically higher than the first cross tube;

at least one first frame tube coupled to a central region of the second cross tube and extending rearwardly;

a plurality of second frame tubes coupled to the second cross tube; and a plurality of outer tubes between which the first cross tube and the second cross tube extend, wherein the at least one first frame tube and the plurality of second frame tubes are disposed between the plurality of outer tubes.

* * * * *